(12) United States Patent
Sakano et al.

(10) Patent No.: US 11,287,042 B2
(45) Date of Patent: Mar. 29, 2022

(54) SEALING APPARATUS

(71) Applicant: NOK CORPORATION, Tokyo (JP)

(72) Inventors: Yuya Sakano, Fukushima (JP); Hiroki Matsui, Fukushima (JP); Kokichi Hamamoto, Fukushima (JP); Takehiro Nakagawa, Fukushima (JP); Hisato Yonai, Fukushima (JP); Masahiko Inoue, Fukushima (JP)

(73) Assignee: NOK CORPORATION, Tokyo (JP)

( * ) Notice: Subject to any disclaimer, the term of this patent is extended or adjusted under 35 U.S.C. 154(b) by 288 days.

(21) Appl. No.: 16/423,250

(22) Filed: May 28, 2019

(65) Prior Publication Data

US 2019/0277403 A1 Sep. 12, 2019

Related U.S. Application Data

(63) Continuation of application No. PCT/JP2017/042301, filed on Nov. 24, 2017.

(30) Foreign Application Priority Data

Nov. 25, 2016 (JP) .............................. JP2016-229466
Mar. 17, 2017 (JP) .............................. JP2017-053625
(Continued)

(51) Int. Cl.
*F16J 15/3244* (2016.01)
*F16J 15/3204* (2016.01)

(52) U.S. Cl.
CPC ....... *F16J 15/3244* (2013.01); *F16J 15/3204* (2013.01)

(58) Field of Classification Search
CPC .......................... F16J 15/3244; F16J 15/3204
See application file for complete search history.

(56) References Cited

U.S. PATENT DOCUMENTS

| 5,002,289 A | 3/1991 | Yasui et al. |
| 9,534,636 B2 | 1/2017 | Takayama et al. |
| (Continued) | | |

FOREIGN PATENT DOCUMENTS

| CN | 1934379 A | 3/2007 |
| CN | 104160167 A | 11/2014 |
| (Continued) | | |

OTHER PUBLICATIONS

International Search Report for corresponding International Application No. PCT/JP2017/042301 dated Feb. 27, 2018.
(Continued)

*Primary Examiner* — Eugene G Byrd
(74) *Attorney, Agent, or Firm* — Pearne & Gordon LLP

(57) ABSTRACT

A sealing apparatus which seals an annular gap of a hole into which a shaft is to be inserted, includes a sealing apparatus body to be fitted into the hole, and a slinger to be attached to the shaft. The sealing apparatus body includes a reinforcing ring annular around an axis line, and an elastic body portion attached to the reinforcing ring and annular around the axis line. The slinger includes a flange portion extending toward an outer periphery side and annular around the axis line. The elastic body portion includes an end-face lip extending on one side in an axis line direction, contacting the flange portion from another side in the axis line direction, and annular around the axis line. At least one groove is formed on the other side of the flange portion, and a plurality of projections are formed side by side in a circumferential direction on an inner periphery surface of the end-face lip extending in a spiral manner in a rotation direction of the shaft from the other side to the one side and being formed on an inner periphery side of a slinger contact portion of the end-face lip.

32 Claims, 55 Drawing Sheets

(30) Foreign Application Priority Data

| | | |
|---|---|---|
| May 16, 2017 | (JP) | JP2017-096981 |
| Jun. 29, 2017 | (JP) | JP2017-127326 |
| Jun. 29, 2017 | (JP) | JP2017-128055 |
| Jun. 30, 2017 | (JP) | JP2017-128857 |

(56) References Cited

U.S. PATENT DOCUMENTS

| | | | |
|---|---|---|---|
| 9,568,105 B2 * | 2/2017 | Oshima | F16J 15/3244 |
| 10,371,260 B2 * | 8/2019 | Nakagawa | F16J 15/3244 |
| 2007/0187901 A1 | 8/2007 | Matsui | |
| 2009/0127791 A1 * | 5/2009 | Buro | F16J 15/3256 277/352 |
| 2011/0193294 A1 | 8/2011 | Munekata | |
| 2013/0175763 A1 * | 7/2013 | Berdichevsky | F16J 15/324 277/552 |
| 2014/0346850 A1 | 11/2014 | Shibata | |
| 2017/0114901 A1 * | 4/2017 | Yamanaka | F16J 15/32 |
| 2018/0023707 A1 * | 1/2018 | Yamaguchi | F16J 15/3244 277/400 |
| 2018/0066757 A1 * | 3/2018 | Sakano | F16J 15/164 |

FOREIGN PATENT DOCUMENTS

| | | | |
|---|---|---|---|
| JP | H1-312274 | A | 12/1989 |
| JP | 03-048165 | U1 | 5/1991 |
| JP | 09-177988 | A | 7/1997 |
| JP | 2000-028005 | A | 1/2000 |
| JP | 2000-179700 | A | 6/2000 |
| JP | 2005-147356 | A | 6/2005 |
| JP | 2005-273864 | A | 10/2005 |
| JP | 4471079 | B2 | 6/2010 |
| JP | 5637172 | B2 | 12/2014 |
| JP | 6252622 | B2 | 12/2017 |
| WO | 2015/190450 | A1 | 12/2015 |

OTHER PUBLICATIONS

Written Opinion for corresponding International Application No. PCT/JP2017/042301 dated Feb. 27, 2018.

Decision to Grant issued in a corresponding Japanese Patent Application No. 2018-546047 dated Oct. 9, 2018 and English translation.

Extended European Search Report dated Jun. 24, 2020 for corresponding European Application No. 17874564.2.

International Preliminary Report on Patentability for corresponding International Application No. PCT/JP2017/042301 dated May 28, 2019.

English translation of the Written Opinion for corresponding International Application No. PCT/JP2017/042301 dated Feb. 27, 2018.

2nd Chinese Office Action dated Apr. 21, 2020 for corresponding Chinese Application No. 201780073264.1 and English translation.

3rd Chinese Office Action dated Jul. 6, 2020 for corresponding Chinese Application No. 201780073264.1 and English translation.

Corrected Extended European Search Report dated Sep. 15, 2020 for corresponding European Application No. 17874564.2 (correctly reflecting reference, JP H03 48165 U, which was previously cited in IDS filed on May 28, 2019).

Chinese Office Action dated Oct. 14, 2019 for corresponding Chinese Application No. 201780073264.1 and English translation.

* cited by examiner

SEALING APPARATUS

CROSS REFERENCE TO RELATED APPLICATIONS

The present application is a continuation application of International Application No. PCT/JP2017/42301, filed on Nov. 24, 2017, which claims priority to Japanese Patent Application No. 2016-229466, filed on Nov. 25, 2016, Japanese Patent Application No. 2017-053625, filed on Mar. 17, 2017, Japanese Patent Application No. 2017-096981, filed on May 16, 2017, Japanese Patent Application No. 2017-127326, filed on Jun. 29, 2017, Japanese Patent Application No. 2017-128055, filed on Jun. 29, 2017 and Japanese Patent Application No. 2017-128857, filed on Jun. 30, 2017. The contents of these applications are incorporated herein by reference in their entirety.

BACKGROUND

Technical Field

The present disclosure relates to a sealing apparatus to realize sealing between a shaft and a hole into which this shaft is to be inserted.

Background Art

In a vehicle, general-purpose machine, or the like, in order to prevent leakage of a target to be sealed such as, for example, a lubricant, and in order to seal a gap between a shaft and a hole into which this shaft is to be inserted, a sealing apparatus has been conventionally used. In such a sealing apparatus, sealing between the shaft and the sealing apparatus is realized by a seal lip being brought into contact with the shaft or an annular member attached to the shaft. Contact between this seal lip and the shaft for sealing also becomes sliding resistance (torque resistance) to the shaft. In recent years, in response to a request for fuel efficiency of a vehicle, or the like, it has been desired to reduce sliding resistance to the shaft, and a structure which can realize reduction of sliding resistance to the shaft while maintaining or improving sealing performance has been desired.

While it is considered to increase the number of seal lips to improve sealing performance of the sealing apparatus, sliding resistance increases as a result of the number of seal lips being increased. To address this, a structure is disclosed which realizes improvement of sealing performance of a sealing apparatus through pumping action exerted by a screw structure which is provided at an annular member attached to a seal lip or a shaft, instead of sealing by increase of the number of seal lips (see, for example, Japanese Patent No. 5637172 and International Publication No. WO2015/190450).

In such a conventional sealing apparatus which utilizes pumping action, it is possible to realize reduction of sliding resistance while realizing improvement of sealing performance. However, in a so-called end-face seal-type sealing apparatus which is such a conventional sealing apparatus utilizing pumping action and in which a seal lip contacts a flange surface of a slinger fixed at a shaft, there is a case where a target to be sealed oozes outside if rotation speed of the shaft becomes higher.

In this manner, in the conventional sealing apparatus which utilizes pumping action, a structure in which a target to be sealed does not ooze even in the case where the rotation speed of the shaft becomes higher has been desired.

The present disclosure is related to providing a sealing apparatus which can suppress ooze of a target to be sealed regardless of a value of rotation speed of a shaft even in the case where pumping action is utilized.

SUMMARY

A sealing apparatus for sealing an annular gap between a shaft and a hole into which the shaft is to be inserted includes a sealing apparatus body to be fitted into the hole, and a slinger to be attached to the shaft, the sealing apparatus body including a reinforcing ring annular around an axis line, and an elastic body portion which is formed with an elastic body attached to the reinforcing ring and which is annular around the axis line, the slinger including a flange portion which is a portion extending toward an outer periphery side and annular around the axis line, the elastic body portion including an end-face lip which is a lip extending toward one side in an axis line direction, contacting the flange portion from another side in the axis line direction, and annular around the axis line, at least one groove being formed on the other side of the flange portion of the slinger, a plurality of projections being formed side by side in a circumferential direction on a surface on an inner periphery side of the end-face lip, and the projections extending in a spiral manner in a rotation direction of the shaft from the other side toward the one side, and being formed on an inner periphery side of a slinger contact portion which is a portion where the end-face lip contacts the slinger at the end-face lip.

In a sealing apparatus according to one aspect of the present disclosure, the projections are formed at intervals from the slinger contact portion at the end-face lip.

In a sealing apparatus according to one aspect of the present disclosure, the projections are formed at the intervals from the slinger contact portion so as to reach a pumping region from a circular current region in the sealing apparatus.

In a sealing apparatus according to one aspect of the present disclosure, the projections partially overlap with the projections adjacent on a side of a rotation direction of the shaft when seen from an inner periphery side to an outer periphery side in the axis line direction.

A sealing apparatus for sealing an annular gap between a shaft and a hole into which the shaft is to be inserted includes a sealing apparatus body to be fitted into the hole, and a slinger to be attached to the shaft, the sealing apparatus body including a reinforcing ring annular around an axis line, and an elastic body portion which is formed with an elastic body attached to the reinforcing ring and which is annular around the axis line, the slinger including a flange portion which is a portion extending toward an outer periphery side and annular around the axis line, the elastic body portion including an end-face lip which is a lip extending toward one side in an axis line direction, contacting the flange portion from another side in the axis line direction and annular around the axis line, at least one groove being formed on the other side of the flange portion of the slinger, a plurality of projections being formed side by side in a circumferential direction at regular intervals on a surface on an inner periphery side of the end-face lip, and the projections extending so that at least tip portions are along a rotation direction of the shaft.

In a sealing apparatus according to one aspect of the present disclosure, the tip portions are formed by being bent from predetermined positions of body portions of the projections, and the tip portions extend so as to be along a rotation direction of the shaft.

In a sealing apparatus according to one aspect of the present disclosure, the tip portions are formed by being bent in a crank shape or in an S shape from predetermined positions of body portions of the projections, and the tip portions extend so as to be along a rotation direction of the shaft.

In a sealing apparatus according to one aspect of the present disclosure, the projections are formed while being wholly curved in a convex shape from an inner periphery side toward an outer periphery side of the end-face lip, and the tip portions extend so as to be along a rotation direction of the shaft.

In a sealing apparatus according to one aspect of the present disclosure, the projections partially overlap with each other when seen from an inner periphery side to an outer periphery side in the axis line direction.

A sealing apparatus for sealing an annular gap between a shaft and a hole into which the shaft is to be inserted includes a sealing apparatus body to be fitted into the hole, and a slinger to be attached to the shaft, the sealing apparatus body including a reinforcing ring annular around an axis line and an elastic body portion which is formed with an elastic body attached to the reinforcing ring and which is annular around the axis line, the slinger including a flange portion which is a portion extending toward an outer periphery side and annular around the axis line, the elastic body portion including an end-face lip which is a lip extending toward one side in an axis line direction, contacting the flange portion from another side in the axis line direction, and annular around the axis line, at least one groove being formed on the other side of the flange portion of the slinger, a plurality of main projections being formed side by side in a circumferential direction on a surface on an inner periphery side of the end-face lip, and, in addition to the plurality of main projections, a plurality of sub-projections which are parallel to the plurality of main projections and which are shorter than the plurality of main projections being formed on the surface on the inner periphery side of the end-face lip.

In a sealing apparatus according to one aspect of the present disclosure, the plurality of sub-projections are alternately disposed between the plurality of main projections.

In a sealing apparatus according to one aspect of the present disclosure, the plurality of sub-projections are disposed closer to an end portion on the outer periphery side than the plurality of main projections.

In a sealing apparatus according to one aspect of the present disclosure, the main projections and the sub-projections are formed on an inner periphery side of a slinger contact portion which is a portion where the end-face lip contacts the slinger at the end-face lip.

In a sealing apparatus according to one aspect of the present disclosure, the main projections and the sub-projections partially overlap with each other when seen from the inner periphery side to the outer periphery side in the axis line direction.

A sealing apparatus for sealing an annular gap between a shaft and a hole into which the shaft is to be inserted includes a sealing apparatus body to be fitted into the hole, and a slinger to be attached to the shaft, the sealing apparatus body including a reinforcing ring annular around an axis line, and an elastic body portion which is formed with an elastic body attached to the reinforcing ring and which is annular around the axis line, the slinger including a flange portion which is a portion extending toward an outer periphery side and annular around the axis line, the elastic body portion including an end-face lip which is a lip extending toward one side in an axis line direction, contacting the flange portion from another side in the axis line direction, and annular around the axis line, at least one groove being formed on the other side of the flange portion of the slinger, normal rotation projections and reverse rotation projections being alternately formed side by side in a circumferential direction on a surface on the inner periphery side of the end-face lip, the normal rotation projections including a plurality of projections aligned in the circumferential direction, the projections extending with tilting to a normal rotation direction of the shaft from the other side toward the one side, and being formed on an inner periphery side of a slinger contact portion which is a portion where the end-face lip contacts the slinger at the end-face lip, the reverse rotation projections including a plurality of projections aligned in the circumferential direction, the projections extending with tilting to a reverse rotation direction of the shaft from the other side toward the one side, and being formed on the inner periphery side of the slinger contact portion which is the portion where the end-face lip contacts the slinger at the end-face lip.

In a sealing apparatus according to one aspect of the present disclosure, the plurality of projections of the normal rotation projections have respectively different lengths in an extending direction, and the plurality of projections of the reverse rotation projections have respectively different lengths in an extending direction.

In a sealing apparatus according to one aspect of the present disclosure, of the plurality of projections of the normal rotation projections, the further on a side of the normal rotation direction the projection is located, the longer the length in the extending direction of the projection is, and, of the plurality of projections of the reverse rotation projections, the further on a side of the reverse rotation direction the projection is located, the longer the length in the extending direction of the projection is.

In a sealing apparatus according to one aspect of the present disclosure, the plurality of projections of the normal rotation projections have respectively different extending directions, and the plurality of projections of the reverse rotation projections have respectively different extending directions.

In a sealing apparatus according to one aspect of the present disclosure, the plurality of projections of the normal rotation projections and the plurality of projections of the reverse rotation projections are symmetric with respect to a line.

A sealing apparatus for sealing an annular gap between a shaft and a hole into which the shaft is to be inserted includes a sealing apparatus body to be fitted into the hole, and a slinger to be attached to the shaft, the sealing apparatus body including a reinforcing ring annular around an axis line, and an elastic body portion which is formed with an elastic body attached to the reinforcing ring and which is annular around the axis line, the slinger including a flange portion which is a portion extending from an inner periphery side toward an outer periphery side and annular around the axis line, the elastic body portion including an end-face lip which is a lip extending toward one side in an axis line direction, contacting the flange portion from another side in the axis line direction, and annular around the axis line, at least one groove being formed on the other side of the flange portion of the slinger, a plurality of ribs being provided on a surface on an inner periphery side of the end-face lip, and the plurality of ribs being disposed in a manner such that a first rib extending so that a tip portion of the rib is along a rotation direction of the slinger as progresses from the inner periphery side toward the outer periphery side, and a second rib extending so that a tip portion of the rib is along a reverse direction of the rotation direction of the slinger as progresses from the inner periphery side toward the outer periphery side, are paired and a plurality of the paired first and second ribs are disposed side by side in a circumferential direction.

In a sealing apparatus according to one aspect of the present disclosure, the tip portion of the first rib and the tip portion of the second rib extend in a substantially V shape so that the tip portions are further separate from each other as progresses from the inner periphery side toward the outer periphery side.

In a sealing apparatus according to one aspect of the present disclosure, the slinger includes a cylindrical portion attached to the shaft, the end-face lip includes a dust lip extending toward an inner periphery surface of the cylindrical portion and an outer side, and an intermediate lip extending toward the inner periphery surface of the cylindrical portion and an inner side between the end-face lip and the dust lip, and the ribs whose base end portions on an opposite side of the tip portions extend to the intermediate lip, are integrated with the intermediate lip.

In a sealing apparatus according to one aspect of the present disclosure, the ribs are formed at intervals from a slinger contact portion which is a portion where the end-face lip contacts the slinger at the end-face lip.

In a sealing apparatus according to one aspect of the present disclosure, the first rib in the rib and the second rib in another rib adjacent to the rib are disposed away from each other by a predetermined distance in the circumferential direction.

In a sealing apparatus according to one aspect of the present disclosure, a radial-direction projection provided in a manner such that the radial-direction projection tilts from another side to one side so as to be along the rotation direction of the slinger is provided between the first rib in the rib and the second rib in the other rib adjacent to the rib.

In a sealing apparatus according to one aspect of the present disclosure, the radial-direction projection provided in a manner such that the radial-direction projection tilts from the other side to the one side so as to be along a rotation direction of the slinger is provided also between the pair of the first rib and the second rib in the rib.

A sealing apparatus for sealing an annular gap between a shaft and a hole into which the shaft is to be inserted includes a sealing apparatus body to be fitted into the hole, and a slinger to be attached to the shaft, the sealing apparatus body including a reinforcing ring annular around an axis line, and an elastic body portion which is formed with an elastic body attached to the reinforcing ring and which is annular around the axis line, the slinger including a flange portion which is a portion extending toward an outer periphery side and annular around the axis line, the elastic body portion including an end-face lip which is a lip extending toward one side in an axis line direction, contacting the flange portion from another side in the axis line direction, and annular around the axis line, at least one groove being formed on the other side of the flange portion of the slinger, and, on a surface on an inner periphery side of the end-face lip, a plurality of concave portions which are concave from the surface on the inner periphery side are formed side by side in a circumferential direction at regular intervals.

In a sealing apparatus according to one aspect of the present disclosure, the concave portions extend so that at least concave portions on a tip side are along a rotation direction of the shaft.

In a sealing apparatus according to one aspect of the present disclosure, the concave portions are formed at intervals from the slinger contact portion at the end-face lip.

In a sealing apparatus according to one aspect of the present disclosure, the concave portions are formed at intervals from the slinger contact portion so as to reach a pumping region from a circular current region in the sealing apparatus.

In a sealing apparatus according to one aspect of the present disclosure, the concave portions partially overlap with the concave portions adjacent on a side of the rotation direction of the shaft when seen from the inner periphery side to the outer periphery side in the axis line direction.

In a sealing apparatus according to one aspect of the present disclosure, the groove formed at the slinger is a screw groove.

According to a sealing apparatus according to the present disclosure, even in the case where pumping action is utilized, it is possible to suppress ooze of a target to be sealed regardless of a value of rotation speed of a shaft.

DESCRIPTION OF EMBODIMENTS

Embodiments of the present disclosure will be described blow with reference to the drawings.

First Embodiment

Figure 1:
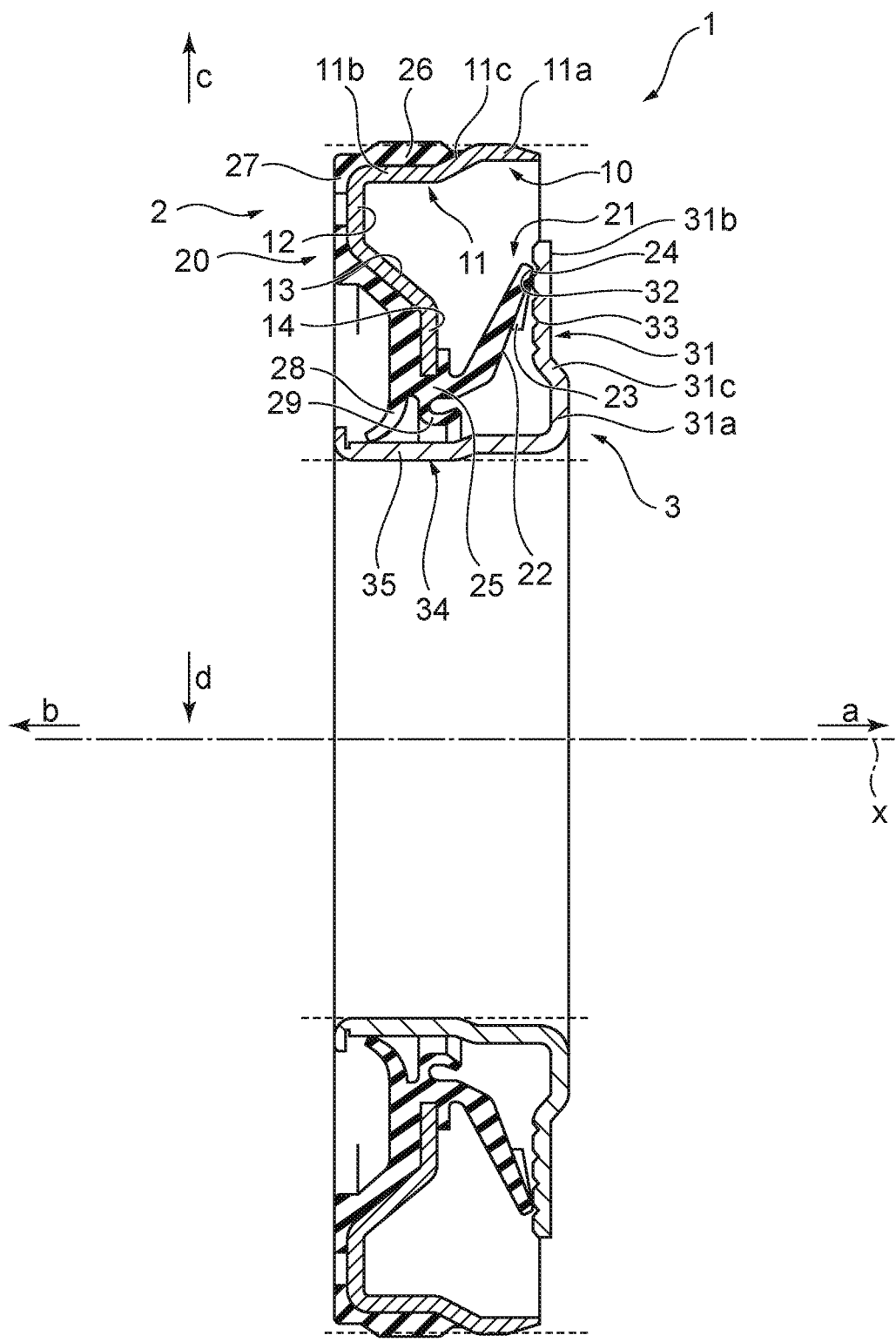
FIG. 1 is a cross-sectional diagram on a cross-section along an axis line x for illustrating a schematic configuration of a sealing apparatus according to a first embodiment of the present disclosure.
Figure 2:
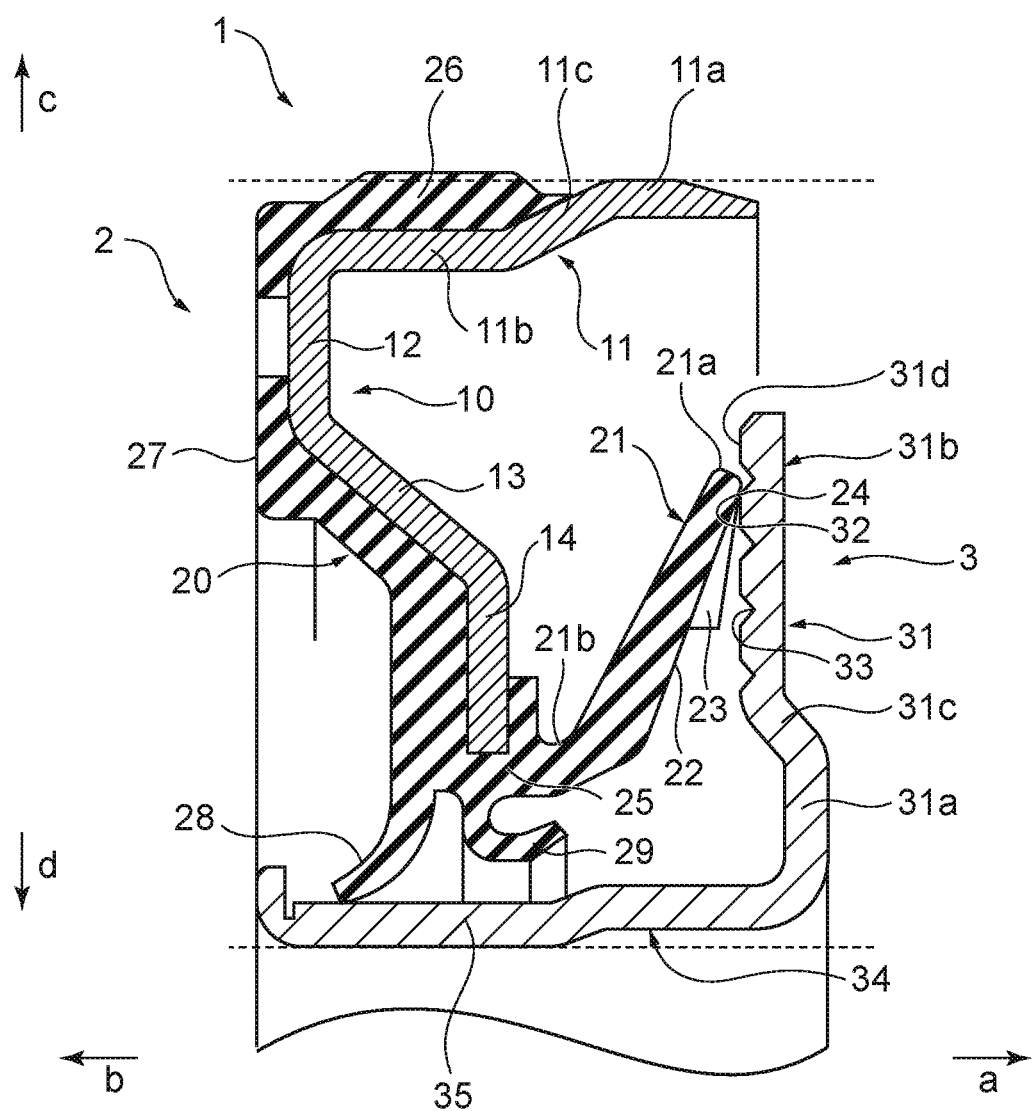
FIG. 2 is a partially enlarged cross-sectional diagram illustrating enlarged part of the cross-section along the axis line of the sealing apparatus according to the first embodiment of the present disclosure.

FIG. 1 is a cross-sectional diagram on a cross-section along an axis line x for illustrating a schematic configuration of a sealing apparatus 1 according to a first embodiment of the present disclosure, and FIG. 2 is a partially enlarged cross-sectional diagram illustrating enlarged part of the cross-section along the axis line x of the sealing apparatus 1 according to the first embodiment of the present disclosure. The sealing apparatus 1 according to the present embodiment is a sealing apparatus for sealing an annular gap between a shaft and a hole into which this shaft is to be inserted, and is used to seal a gap between a shaft and a hole (shaft hole) which is formed at a housing, or the like, and into which this shaft is to be inserted in a vehicle or general-purpose machine. For example, the sealing apparatus is used to seal annular space between a crank shaft of an engine and a crank hole which is a shaft hole formed at a front cover or a cylinder block and a crank case. Note that targets to which the sealing apparatus 1 according to the first embodiment of the present disclosure is applied are not limited to the above.

In the following description, for the purpose of illustration, a direction of an arrow a (see FIG. 1) in an axis line x direction (one side in the axis line direction) is set as an inner side, and a direction of an arrow b (see FIG. 1) in the axis line x direction (another side in the axis line direction) is set as an outer side. More specifically, the inner side is a side of space to be sealed (side of a target to be sealed) and a side of space where a target to be sealed such as a lubricant exists, and the outer side is an opposite side of the inner side. Further, in a direction perpendicular to the axis line x (hereinafter, also referred to as a "radial direction"), a direction away from the axis line x (a direction of an arrow c in FIG. 1) is set as an outer periphery side, and a direction approaching the axis line x (a direction of an arrow d in FIG. 1) is set as an inner periphery side.

As illustrated in FIG. 1, the sealing apparatus 1 includes a sealing apparatus body 2 to be fitted into a hole as an attachment target which will be described later and a slinger 3 to be attached to a shaft 52 as an attachment target which will be described later. The sealing apparatus body 2 includes a reinforcing ring 10 which is annular around the axis line x, and an elastic body portion 20 which is formed with an elastic body attached to the reinforcing ring 10, and which is annular around the axis line x. The slinger 3 includes a flange portion 31 which is a portion extending toward the outer periphery side (the direction of the arrow c) and annular around the axis line x. The elastic body portion 20 includes an end-face lip 21 which is a lip extending toward one side (inner side, the direction of the arrow a) in an axis line x direction, contacting the flange portion 31 from another side (outer side, a side of the direction of the arrow b) in the axis line direction x and which is annular around the axis line x.

At least one groove 33 is formed on the other side (outer side) of the flange portion 31 of the slinger 3, and a plurality of projections 23 are formed side by side in a circumferential direction on a surface on the inner periphery side (inner periphery surface 22) of the end-face lip 21. As will be described later, the projections 23 extend in a spiral manner in a rotation direction of the shaft 52 (slinger 3) which will be described later from the other side (outer side) to the one side (inner side), and are formed on the inner periphery side of a slinger contact portion 24 which is a portion where the end-face lip 21 contacts the slinger 3 at the end-face lip 21.

Respective configurations of the sealing apparatus body 2 and the slinger 3 of the sealing apparatus 1 will be specifically described below.

As illustrated in FIG. 1 and FIG. 2, in the sealing apparatus body 2, the reinforcing ring 10 is an annular metal member which is centered on or substantially centered on the axis line x and is formed so that the sealing apparatus body 2 is pressed, engaged and fitted into a shaft hole of a housing which will be described later. The reinforcing ring 10 includes, for example, a cylindrical portion 11 which is a cylindrical portion located on the outer periphery side, a disk portion 12 which is a hollow disk-shaped portion extending from a tip portion on the outer side of the cylindrical portion 11 to the inner periphery side, a conical ring portion 13 which is a conical cylindrical annular portion extending from a tip portion on the inner periphery side of the disk portion 12 to the inner side and the inner periphery side, and a disk portion 14 which is a hollow disk-shaped portion extending in a radial direction from a tip portion on the inner side or the inner periphery side of the conical ring portion 13 to the inner periphery side and reaching a tip portion on the inner periphery side of the reinforcing ring 10. More specifically, the cylindrical portion 11 of the reinforcing ring 10 includes an outer periphery side cylindrical portion 11a which is a cylindrical or substantially cylindrical portion located on the outer periphery side, an inner periphery side cylindrical portion 11b which is a cylindrical or substantially cylindrical portion extending on the outer side and the inner periphery side of the outer periphery side cylindrical portion 11a, and a connecting portion 11c which is a portion connecting the outer periphery side cylindrical portion 11a and the inner periphery side cylindrical portion 11b. The outer periphery side cylindrical portion 11a of the cylindrical portion 11 is fitted into the shaft hole 51 so that, when the sealing apparatus body 2 is fitted into the shaft hole 51 of the housing which will be described later, the axis line x of the sealing apparatus body 2 matches an axis line of the shaft hole 51. An elastic body portion 20 is attached to the reinforcing ring 10 from a substantially outer periphery side and the outer side, so as to reinforce the elastic body portion 20.

As illustrated in FIG. 1 and FIG. 2, the elastic body portion 20 includes a base portion 25 which is a portion attached to a tip portion on the inner periphery side of the disk portion 14 of the reinforcing ring 10, a gasket portion 26 which is a portion attached to the cylindrical portion 11 of the reinforcing ring 10 from the outer periphery side, and a rear cover portion 27 which is a portion attached to the reinforcing ring 10 between the base portion 25 and the gasket portion 26 from the outer side. More specifically, as illustrated in FIG. 2, the gasket portion 26 is attached to the inner periphery side cylindrical portion 11b of the cylindrical portion 11 of the reinforcing ring 10. Further, an outer diameter of the gasket portion 26 is greater than a diameter of an inner periphery surface (see FIG. 5) of the shaft hole 51 which will be described later. Therefore, in the case where the sealing apparatus body 2 is fitted into the shaft hole 51 which will be described later, the gasket portion 26 is compressed in a radial direction between the inner periphery side cylindrical portion 11b of the reinforcing ring 10 and the shaft hole 51 and seals a gap between the shaft hole 51 and the inner periphery side cylindrical portion 11b of the reinforcing ring 10. By this means, space between the sealing apparatus body 2 and the shaft hole 51 is sealed. The gasket portion 26 does not have to be have an outer diameter greater than the diameter of the inner periphery surface of the shaft hole 51 over the whole axis line x direction, and may have the outer diameter partially greater than the diameter of the inner periphery surface of the shaft hole 51. For example, an annular convex portion whose tip has a diameter greater than the diameter of the inner periphery surface of the shaft hole 51 may be formed on a surface on the outer periphery side of the gasket portion 26.

Further, at the elastic body portion 20, the end-face lip 21 extends from the base portion 25 to the inner side (direction of the arrow a) in an annular shape centered on or substantially centered on the axis line x, and is formed so that, in a state where the sealing apparatus 1 is used which will be described later where the sealing apparatus 1 is attached to a desired position at an attachment target, a tip portion contacts the flange portion 31 of the slinger 3 from the outer side with a predetermined interference (slinger contact portion 24). The end-face lip 21 has, for example, a conical cylindrical shape whose diameter becomes greater toward the inner side (direction of the arrow a) in the axis line x direction. That is, as illustrated in FIG. 1 and FIG. 2, the end-face lip 21 extends obliquely with respect to the axis line x from the base portion 25 to the inner side and the outer periphery side on a cross-section along the axis line x (hereinafter, also simply referred to as a "cross-section"). A plurality of projections 23 are provided on an inner periphery surface 22 of the end-face lip 21. Details of the projections 23 will be described later.

Further, the elastic body portion 20 includes a dust lip 28 and an intermediate lip 29. The dust lip 28 is a lip extending from the base portion 25 toward the axis line x, extends from the base portion 25 in an annular shape centered on or substantially centered on the axis line x, and is formed so that, in a state where the sealing apparatus 1 is used which will be described later, a tip portion contacts the slinger 3 from the outer periphery side with a predetermined interference. The dust lip 28 has, for example, a conical cylindrical shape whose diameter becomes smaller toward the outer side (direction of the arrow b) in the axis line x direction. The dust lip 28 prevents a foreign matter such as dust and moisture from intruding inside of the sealing apparatus 1 from the outer side which is an opposite side of a side of a target to be sealed in the usage state. The dust lip 28 may be formed so as not to contact the slinger 3 in the state where the sealing apparatus 1 is used.

Figure 8:
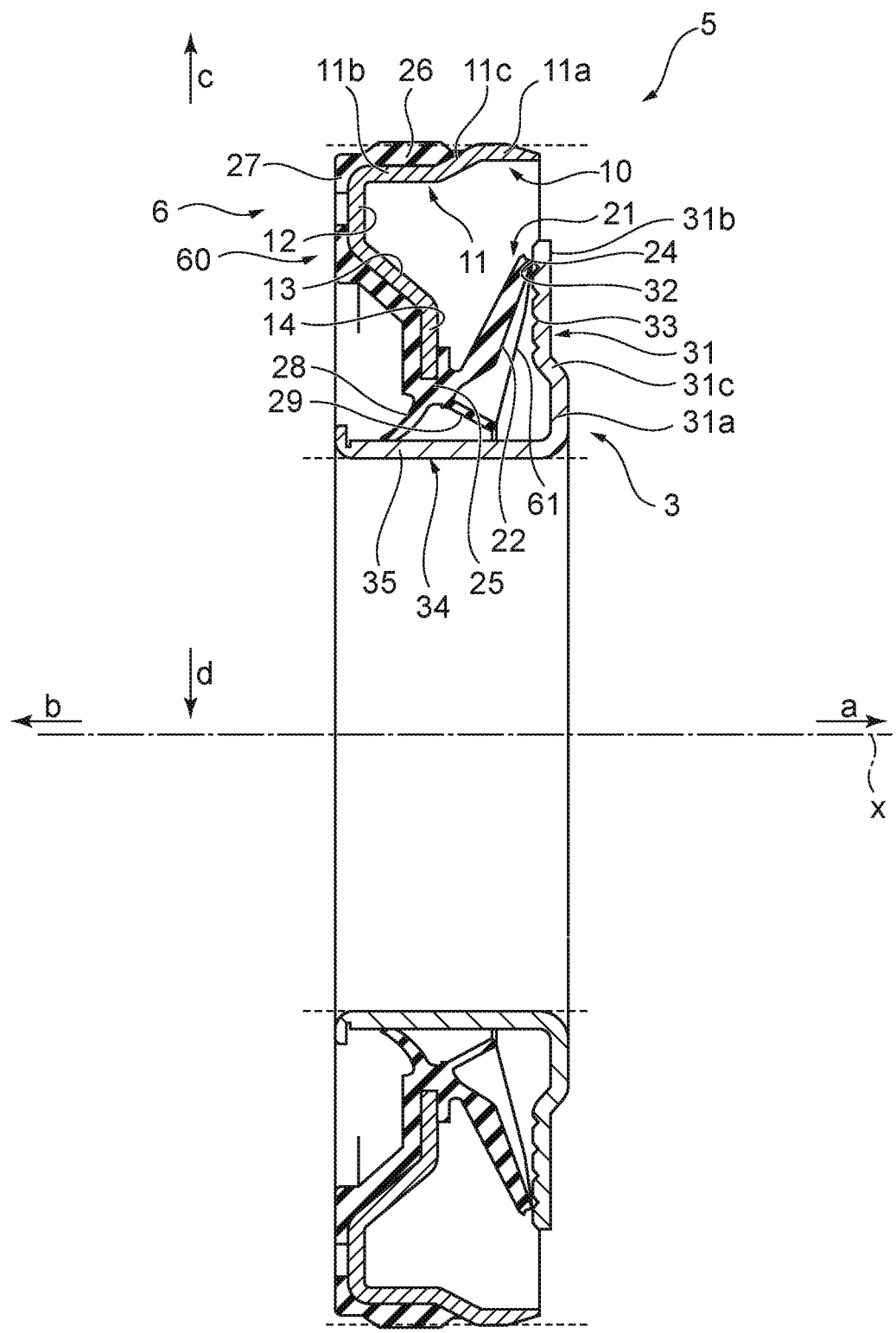
FIG. 8 is a cross-sectional diagram on a cross-section along an axis line x for illustrating a schematic configuration of a sealing apparatus according to a second embodiment of the present disclosure.
Figure 9:
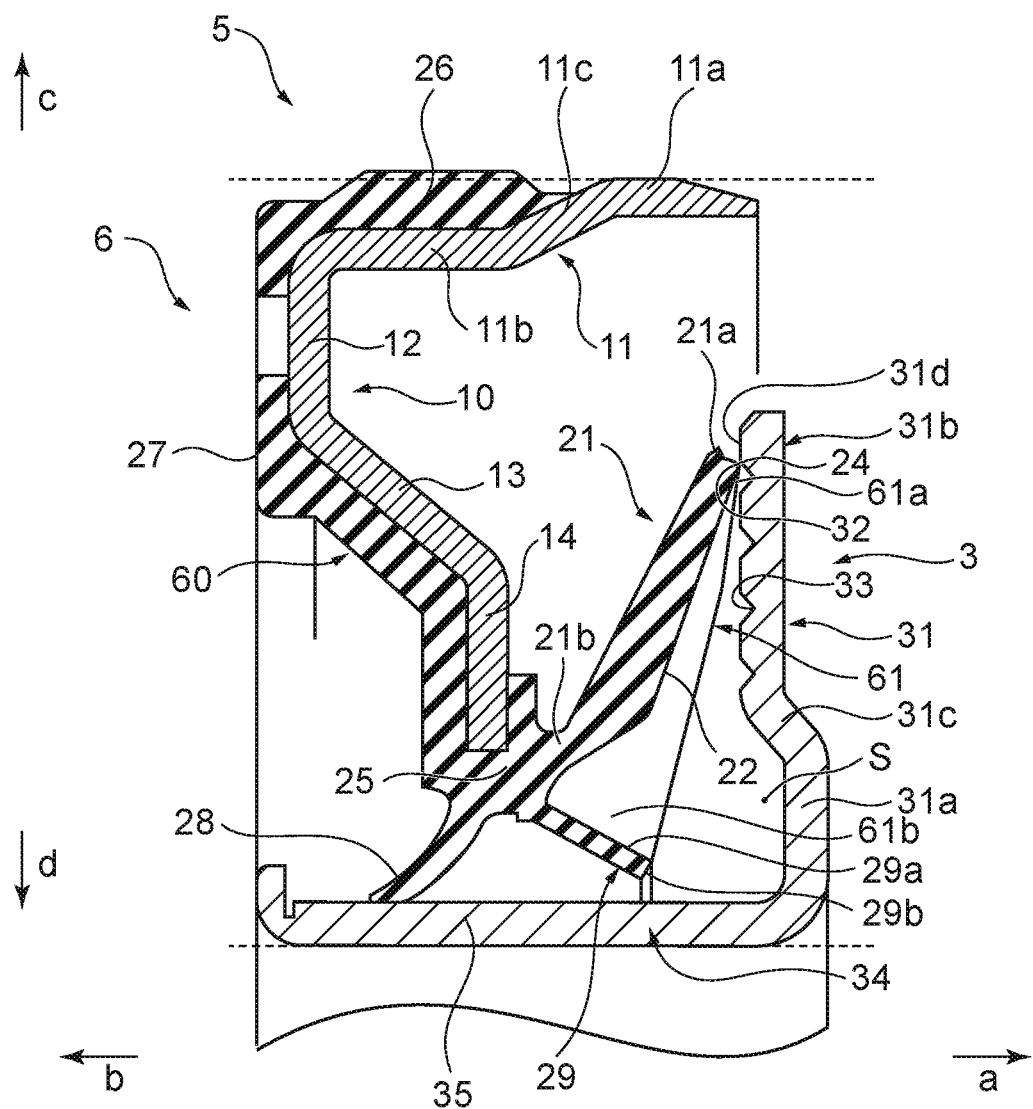
FIG. 9 is a partially enlarged cross-sectional diagram illustrating enlarged part of the cross-section along the axis line x of the sealing apparatus according to the second embodiment of the present disclosure.

As illustrated in FIG. 2, the intermediate lip 29, which is a lip extending from the base portion 25 toward the inner side to form a cross-section having a substantially L shape, extends from the base portion 25 in an annular shape centered on or substantially centered on the axis line x, and forms an annular concave portion which opens toward the inner side between the intermediate lip 29 and the base portion 25. The intermediate lip 29 does not contact the slinger 3 in a state where the sealing apparatus 1 is used which will be described later. The intermediate lip 29 is formed to, in the usage state, in the case where a target to be sealed oozes inside over the slinger contact portion 24 which contacts the slinger 3 of the end-face lip 21, accommodate the oozing target to be sealed in a concave portion formed between the intermediate lip 29 and the base portion 25. As illustrated in FIG. 8 and FIG. 9 which will be described later, the intermediate lip 29 may have a conical cylindrical shape whose diameter becomes smaller toward the inner side in the axis line x direction. The intermediate lip 29 may be formed to contact the slinger 3 in a state where the sealing apparatus 1 is used.

Figure 3:
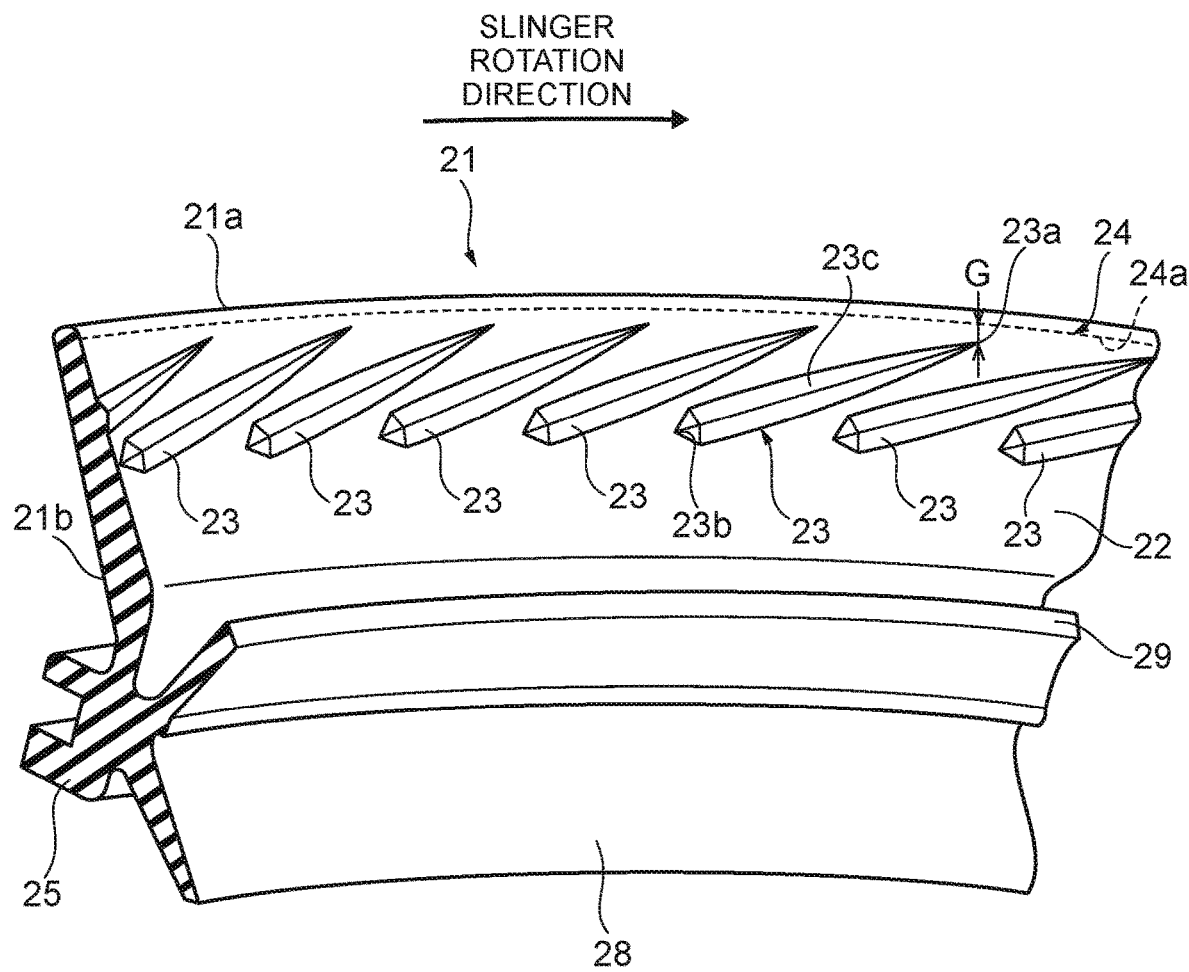
FIG. 3 is a partially enlarged perspective view of an elastic body portion in the sealing apparatus illustrated in FIG. 1 in a state where the elastic body portion at a portion on an inner periphery side from a base portion is cut on a plane along the axis line.

A shape of the end-face lip 21 will be described in more detail next. FIG. 3 is a partially enlarged perspective view of the elastic body portion 20 seen from the inner periphery side in a state where the elastic body portion 20 at a portion on the inner periphery side from the base portion 25 is cut on a plane along the axis line x. As illustrated in FIG. 3, a plurality of projections 23 are arranged at equal angular intervals or substantially equal angular intervals in a circumferential direction and at equal pitch intervals or substantially equal pitch intervals on the same or substantially the same circumference on the inner periphery surface 22 of the end-face lip 21. As described above, the respective projections 23 extend in a spiral manner in a rotation direction of the shaft 52 (slinger 3) which will be described later from the outer side (lower side in FIG. 3) toward the inner side (upper side in FIG. 3). That is, the respective projections 23 extend obliquely in the rotation direction of the slinger 3 from a side of a root 21b of the end-face lip 21 toward a side of a tip 21a of the end-face lip 21. Further, the respective projections 23 are formed at intervals from the slinger contact portion 24, and are formed on the inner periphery side (outer side) of the slinger contact portion 24, that is, on the side of the root 21b of the end-face lip 21, of the slinger contact portion 24.

At the end-face lip 21, the projections 23 are formed at intervals from the slinger contact portion 24. Specifically, as illustrated in FIG. 3, inner ends 23a which are end portions on the inner side (outer periphery side) of the projections 23 are located at positions away from an outer edge 24a which is an edge portion on the outer side (inner periphery side) of the slinger contact portion 24 by a predetermined interval G in a direction along the axis line x along the inner periphery surface 22. This interval G is an interval such that the projections 23 at least partially exist in a region on the inner periphery side of a region where pumping action based on the groove 33 of the slinger 3 occurs in a state where the sealing apparatus 1 is used which will be described later.

Further, as illustrated in FIG. 2, the respective projections 23 are formed in a shape so as not to contact the slinger 3 in a state where the sealing apparatus 1 is used. That is, a height of the projections 23 from the inner periphery surface 22 and the interval G are set so that the projections 23 do not contact a surface on the outer side of the flange portion 31 of the slinger 3 in the usage state. In the present embodiment, as illustrated in FIG. 2 and FIG. 3, while the height of the projections 23 from the inner periphery surface 22 becomes higher from the inner ends 23a toward the outer ends 23b which are end portions on the side of the root 21b of the end-face lip 21, the height of the projections 23 from the inner periphery surface 22 is not limited to this. The height of the projections 23 from the inner periphery surface 22 may be fixed from the inner ends 23a to the outer ends 23b, or the height from the inner periphery surface 22 may become lower from the inner ends 23a toward the outer ends 23b. Further, the height of the projections 23 from the inner periphery surface 22 from the inner ends 23a to the outer ends 23b may be various kinds of combination of the above-described becoming higher, becoming lower, being fixed, or the like. Further, a shape of a cross-section of the projections 23 orthogonal to an extending direction may be various shapes such as, for example, a triangle, a rectangle and an inverted U-shape. In a state where the sealing apparatus 1 is used, because the projections 23 are formed in a shape which does not contact the slinger 3, sliding resistance to the slinger 3 does not increase by the projections 23.

Further, as illustrated in FIG. 3, a shape of the projections 23 in the extending direction may be various shapes such as a shape which is tapered from the outer ends 23b toward the inner ends 23a, and a shape having a fixed width in a direction orthogonal to the extending direction between the outer ends 23b and the inner ends 23a. Further, the projections 23 may extend straight between the inner ends 23a and the outer ends 23b, or may extend while being curved.

As described above, the elastic body portion 20 includes the end-face lip 21, the base portion 25, the gasket portion 26, the rear cover portion 27, the dust lip 28 and the intermediate lip 29, respective portions are integrated, and the elastic body portion 20 is integrally formed with the same material.

The above-described reinforcing ring 10 is formed with a metal material, and examples of this metal material can include, for example, stainless steel and SPCC (cold rolled steel sheet). Further, examples of the elastic body of the elastic body portion 20 can include, for example, various kinds of rubber materials. The various kinds of rubber materials can include, for example, synthetic rubber such as nitrile rubber (NBR), hydrogenated nitrile rubber (H-NBR), acryl rubber (ACM) and fluorine-containing rubber (FKM).

The reinforcing ring 10 is manufactured through, for example, press work or forging, and the elastic body portion 20 is molded through cross-linking (vulcanization) molding using a mold. Upon this cross-linking molding, the reinforcing ring 10 is disposed in the mold, the elastic body portion 20 is adhered to the reinforcing ring 10 through cross-linking adhesion, and the elastic body portion 20 and the reinforcing ring 10 are integrally molded.

The slinger 3 is an annular member attached to the shaft 52 in a state where the sealing apparatus 1 is used which will be described later, and is an annular member centered on or substantially centered on the axis line x. The slinger 3 has a cross-section having a substantially L shape, and includes the flange portion 31 and the cylindrical or substantially tubular portion 34 which is connected to an end portion on the inner periphery side of the flange portion 31 and which extends in the axis line x direction.

The flange portion 31 specifically includes an inner periphery side disk portion 31a having a hollow disk shape or a substantially hollow disk shape extending from the tubular portion 34 in the radial direction, an outer periphery side disk portion 31b in a hollow disk shape or a substantially hollow disk shape which expands on the outer periphery side of the inner periphery side disk portion 31a and which extends in the radial direction, and a connecting portion 31c which connects an end portion on the outer periphery side of the inner periphery side disk portion 31a and an end portion on the inner periphery side of the outer periphery side disk portion 31b. The outer periphery side disk portion 31b is located outer side of the inner periphery side disk portion 31a in the axis line x direction. Note that the shape of the flange portion 31 is not limited to the above-described shape, and may be various shapes in accordance with an application target. For example, the flange portion 31 does not have to include the inner periphery side disk portion 31a and the connecting portion 31c, and the outer periphery side disk portion 31b may extend to the tubular portion 34 and may be connected to the tubular portion 34, and may be a portion in a hollow disk shape or a substantially hollow disk shape extending from the tubular portion 34 in the radial direction.

Figure 4:
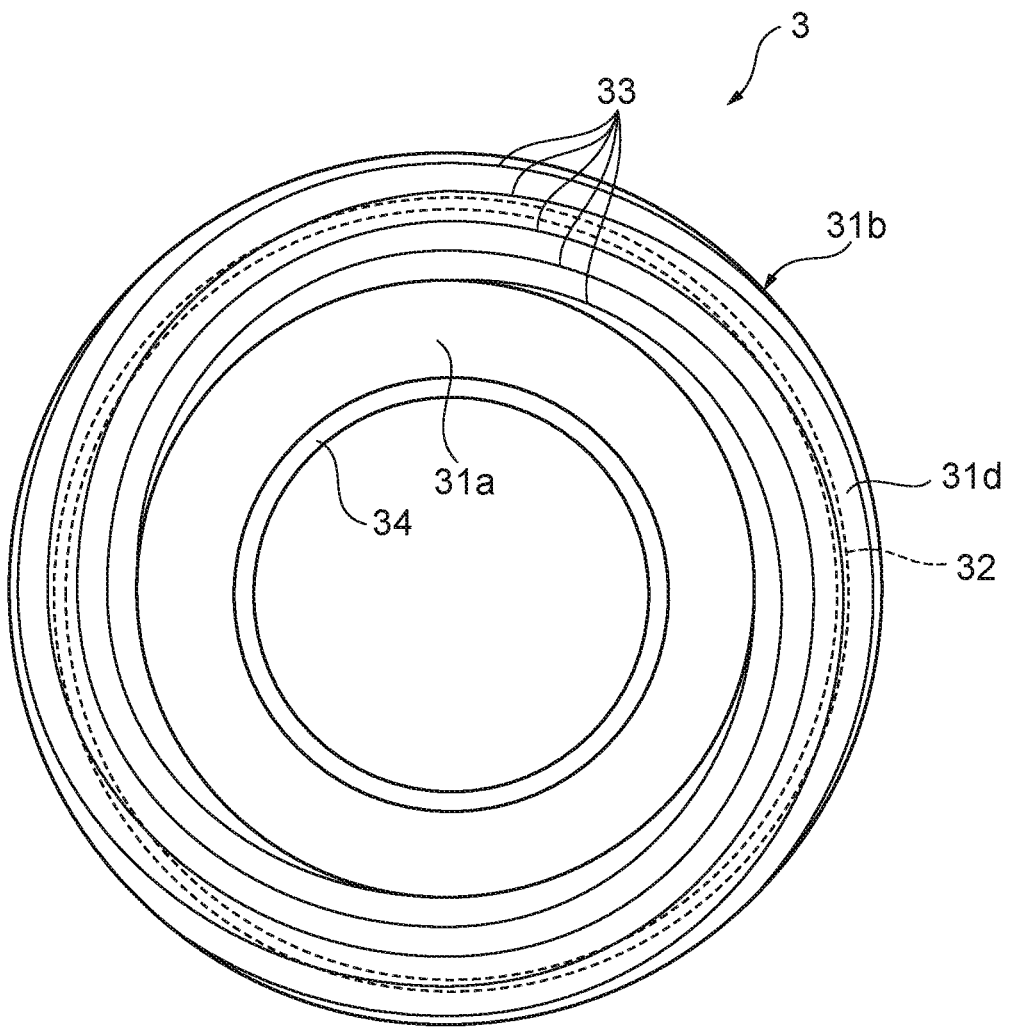
FIG. 4 is a diagram of a slinger in the sealing apparatus illustrated in FIG. 1 seen from outside.

The lip contact portion 32 which is a portion where the slinger 3 contacts the end-face lip 21 is located on the outer side surface 31d which is a surface facing the outer side of the outer periphery side disk portion 31b at the flange portion 31. It is preferable that the outer side surface 31d is a surface along a plane expanding in the radial direction. Further, as illustrated in FIG. 4, a groove 33 is formed with a concave portion which is concave inward on the outer side surface 31d of the flange portion 31. The groove 33 is, for example, a screw groove. With this groove 33, it is possible to cause pumping action when the slinger 3 rotates. On the outer side surface 31*d* of the flange portion 31, the groove 33 is formed over a region from the inner periphery side of the lip contact portion 32 to the outer periphery side of the lip contact portion 32. The groove 33 may be formed while extending from an end portion on the inner periphery side toward an end portion on the outer periphery side on the outer side surface 31*d* of the outer periphery side disk portion 31*b*, or may be formed in a region (periphery) of a width of part of the radial direction of the outer side surface 31*d* including the lip contact portion 32. Further, the groove 33 may be located on the inner periphery side of the lip contact portion 32 on the outer side surface 31*d* of the outer periphery side disk portion 31*b*. For example, a plurality of grooves 33 are formed on the outer side surface 31*d* of the flange portion 31, and, on the outer side surface 31*d* of the flange portion 31, as illustrated in FIG. 4, for example, four screw grooves 33 are formed, and these four screw grooves 33 form a four-start screw. The number of grooves 33 and a shape formed by the grooves 33 extending may be other types of screws other than the four-start screw. The grooves 33 have, for example, a shape along a line drawn on a plane when a screw groove in a spiral manner formed on a conical surface is projected on the plane orthogonal to an axis line of this conical surface.

Further, at the slinger 3, as illustrated in FIG. 2, the tubular portion 34 has a cylindrical portion 35 which is at least partially cylindrical or substantially cylindrical portion, and this cylindrical portion 35 is formed so as to be able to be fitted into the shaft 52. That is, an inner diameter of the cylindrical portion 35 is smaller than a diameter of the outer periphery surface of the shaft 52 so that the cylindrical portion 35 can be interference-fitted at the shaft 52. The slinger 3 is not limited to a part fixed by the cylindrical portion 35 being interference-fitted at the shaft 52, and may be fixed at the shaft 52 through adhesion at the tubular portion 34, or may be fixed at the shaft 52 using other publicly known fixing method. Note that the whole of the tubular portion 34 may be formed with the cylindrical portion 35.

The slinger 3 is made using a metal material as a base material, and, for example, made using SPCC (cold rolled steel sheet) as a base material, by phosphate coating being performed on the SPCC to perform rust-proofing. Examples of the phosphate coating can include, for example, zinc phosphate coating. With the slinger 3 having high rust-proofing, it is possible to suppress occurrence of rust at the lip contact portion 32 which is a sliding portion with respect to the end-face lip 21, so that it is possible to maintain a sealing function and sealing performance of the end-face lip 21 longer. Further, because the slinger 3 is subjected to rust-proofing, it is possible to suppress change of the shape of the groove 33 due to rusting, so that it is possible to suppress reduction of a pumping effect exerted by the groove 33. As a base material of the slinger 3, other metals such as stainless, which excels in rust resistance and rust-proofness may be used. Further, rust-proofing to be performed on the base material of the slinger 3 may be other treatment such as metal plating.

Figure 5:
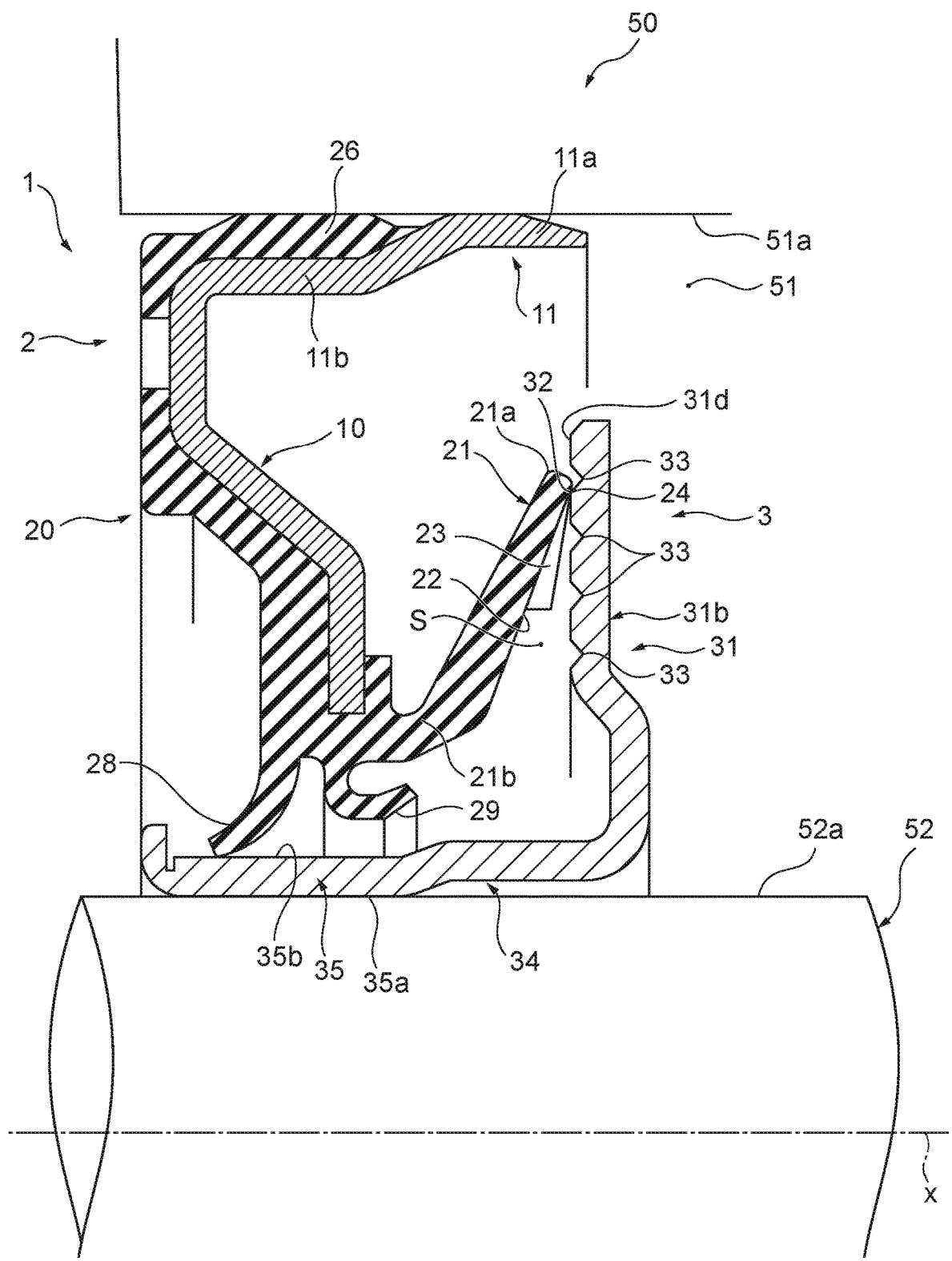
FIG. 5 is a partially enlarged cross-sectional diagram of the sealing apparatus in a usage state where the sealing apparatus according to the first embodiment of the present disclosure is attached to a housing and a shaft inserted into a shaft hole.

Action of the sealing apparatus 1 having the above-described configuration will be described next. FIG. 5 is a partially enlarged cross-sectional diagram of the sealing apparatus 1 in a usage state where the sealing apparatus 1 is attached to the housing 50 as an attachment target and the shaft 52 inserted into the shaft hole 51 which is a through-hole formed at the housing 50. The housing 50 is, for example, a front cover of an engine or a cylinder block and a crank case, and the shaft hole 51 is a crank hole formed at the front cover, or the cylinder block and the crank case. Further, the shaft 52 is, for example, a crank shaft.

As illustrated in FIG. 5, in the state where the sealing apparatus 1 is used, the sealing apparatus body 2 is fitted into the shaft hole 51 by being pressed into the shaft hole 51 of the housing 50, and the slinger 3 is attached to the shaft 52 by being interference-fitted at the shaft 52. More specifically, the outer periphery side cylindrical portion 11*a* of the reinforcing ring 10 contacts the inner periphery surface 51*a* of the shaft hole 51, so that a shaft center of the sealing apparatus body 2 is made to match a shaft center of the shaft hole 51, and the gasket portion 26 tightly contacts the inner periphery surface 51*a* of the shaft hole 51 by the gasket portion 26 of the elastic body portion 20 being compressed in the radial direction between the inner periphery surface 51*a* of the shaft hole 51 and the inner periphery side cylindrical portion 11*b* of the reinforcing ring 10, so that sealing between the sealing apparatus body 2 and the shaft hole 51 is realized. Further, the cylindrical portion 35 of the slinger 3 is pressed into the shaft 52, and the inner periphery surface 35*a* of the cylindrical portion 35 tightly contacts the outer periphery surface 52*a* of the shaft 52, so that the slinger 3 is fixed at the shaft 52.

In a state where the sealing apparatus 1 is used, relative positions between the sealing apparatus body 2 and the slinger 3 in the axis line x direction are determined so that the end-face lip 21 of the elastic body portion 20 contacts the lip contact portion 32 which is the portion of the outer side surface 31*d* of the outer periphery side disk portion 31*b* of the flange portion 31 of the slinger 3 at the slinger contact portion 24 which is the portion on a side of the tip 21*a* of the inner periphery surface 22. Further, a portion on the tip side of the dust lip 28 contacts the tubular portion 34 of the slinger 3 from the outer periphery side. The dust lip 28, for example, contacts the outer periphery surface 35*b* of the cylindrical portion 35 of the slinger 3.

In this manner, in the state where the sealing apparatus 1 is used, the end-face lip 21 contacts the lip contact portion 32 of the flange portion 31 so that the slinger 3 can slide at the lip contact portion 32 at the slinger contact portion 24, and the end-face lip 21 and the slinger 3 prevent the target to be sealed such as a lubricant from oozing inside from the side of the target to be sealed beyond the slinger contact portion 24 and the lip contact portion 32. Further, the dust lip 28 contacts the tubular portion 34 so that the tubular portion 34 of the slinger 3 can slide, and prevents the foreign matter from entering inside from outside.

Further, in the state where the sealing apparatus 1 is used, the groove 33 which forms a four-start screw formed at the outer periphery side disk portion 31*b* of the flange portion 31 of the slinger 3 provides pumping action in the case where the shaft 52 (slinger 3) rotates. By rotation of the shaft 52 (slinger 3), pumping action occurs in a region in the vicinity of the slinger contact portion 24 and the lip contact portion 32 in narrow space S which is space between the flange portion 31 and the end-face lip 21. By this pumping action, even in the case where the target to be sealed oozes from the side of the target to be sealed to the narrow space S, the target to be sealed which has oozed is returned from the narrow space S to the side of the target to be sealed beyond the slinger contact portion 24 and the lip contact portion 32. In this manner, by the pumping action occurring by the groove 33 formed at the flange portion 31 of the slinger 3, ooze of the target to be sealed to the narrow space S is suppressed.

In the narrow space S, the target to be sealed which has further oozed outside beyond the region where the pumping action by the groove 33 occurs (hereinafter, also referred to as a pumping region) rotates around the axis line x in a rotation direction of the slinger 3 in the region adjacent to the pumping region on the inner periphery side by rotation of the shaft 52, and is retained in the region (hereinafter, also referred to as a circular current region).

At the end-face lip 21, projections 23 are formed on the inner periphery surface 22, and the projections 23 extend from positions away from the outer edge 24a of the slinger contact portion 24 by the interval G, and at least partially extend in the circular current region. Therefore, the target to be sealed which is retained in the circular current region while rotating collides with the projections 23 or the target to be sealed which is retained in the circular current region while rotating is led to inner ends 23a which are end portions on the inner side (outer periphery side) of the projections 23 from the outer ends 23b which are end portions on the outer side (inner periphery side) of the projections 23 along the projections 23, and the target to be sealed which is retained in the circular current region is led to the pumping region. The target to be sealed led to the pumping region by the projections 23 is returned to the side of the target to be sealed by receiving pumping action.

Figure 6:
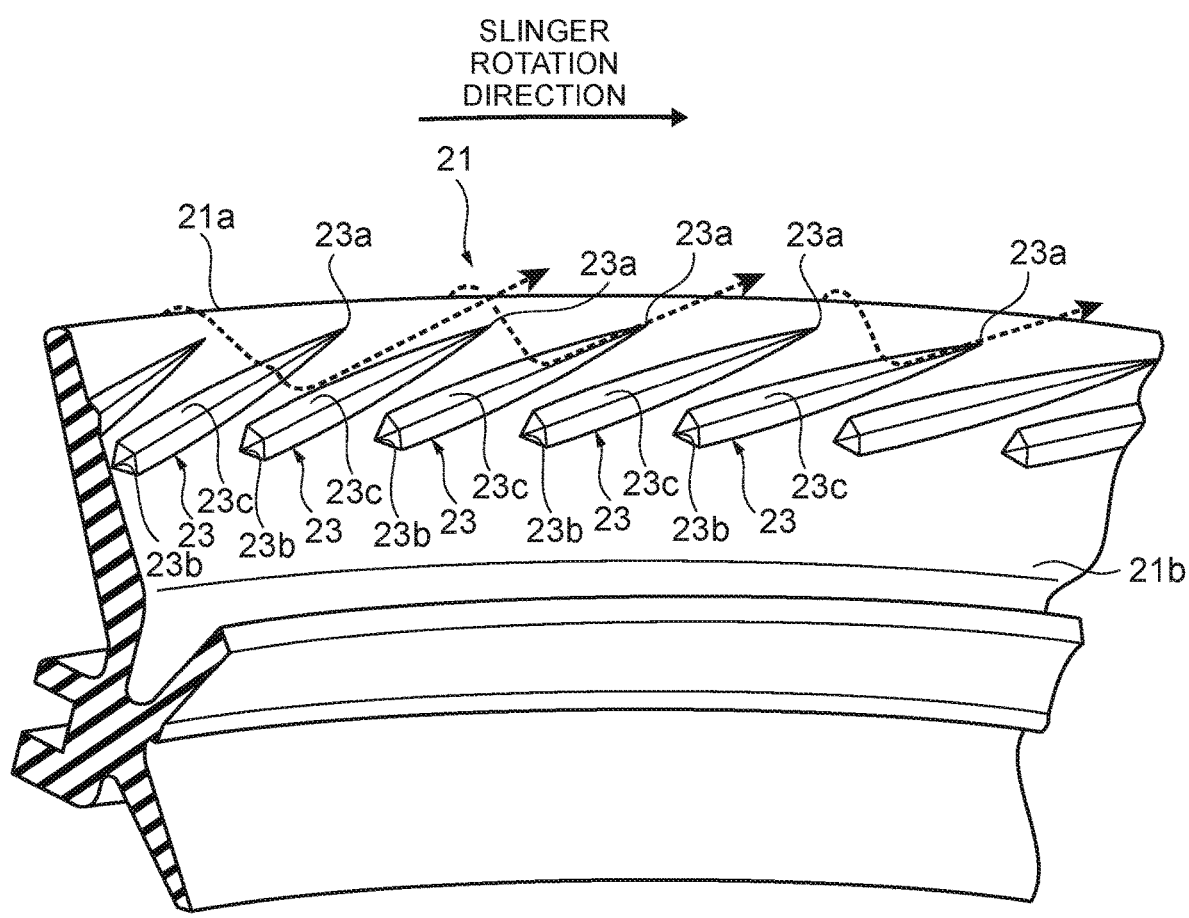
FIG. 6 is a diagram for illustrating aspect of flow of a target to be sealed by action of projections of an end-face lip.

FIG. 6 is a diagram for explaining action of the projections 23 of the end-face lip 21 and for illustrating aspect of flow of the target to be sealed by the action of the projections 23 of the end-face lip 21. In FIG. 6, as indicated with dashed lines, the target to be sealed which has oozed on a side of the circular current region beyond the pumping region collides with side surfaces 23c which are side surfaces of the projections 23 facing the outer periphery side and is bounced on a side of the pumping region or led to the inner ends 23a along the side surfaces 23c of the projections 23 and returned from the inner ends 23a to the pumping region. Therefore, the projections 23 are preferably formed so that part on the side of the inner ends 23a enters the pumping region on the inner periphery surface 22 of the end-face lip 21. As will be described later, it is considered that a width of the pumping region in a radial direction changes in accordance with rotation speed of the shaft 52. Therefore, it is preferable that part of the projections 23 on the side of the inner ends 23a is formed so as to enter the pumping region regardless of the rotation speed of the shaft 52. Further, in the case where the whole of the projections 23 is formed so as to exist in the circular current region, the interval G from the outer edge 24a of the slinger contact portion 24 is set in a range where the target to be sealed which has oozed to the side of the circular current region beyond the pumping region can be returned to the pumping region again as described above.

Further, there is also a target to be sealed which is not bounced even if the target to be sealed hits against the side surfaces 23c of the projections 23 and which is not led to the inner ends 23a along the side surfaces 23c and further moves on the side of the root 21b of the end-face lip 21 beyond the side surfaces 23c. Therefore, it is preferable that the projections 23 are arranged so as to partially overlap with the projections 23 adjacent on the side of the rotation direction of the shaft 52 (slinger 3) when seen from the inner periphery side (outer side) to the outer periphery side (inner side) in the axis line x direction. As indicated with dashed lines in a left part of FIG. 6, even if the target to be sealed flows to the side of the root 21b of the end-face lip 21 beyond the side surface 23c of the projection 23 on the side of the inner end 23a, the target to be sealed which has moved beyond this projection 23 hits against the side surface 23c of the projection 23 adjacent on the side of the rotation direction of the slinger 3, so that it is possible to lead the target to be sealed to the inner end 23a along the side surface 23c and return the target to be sealed from the inner end 23a to the pumping region. Further, it is preferable that the projections 23 are arranged so that, with a part of one projection 23, which does not overlap with the projection 23 adjacent to the one projection 23 on the opposite side of the rotation direction of the slinger 3 when seen from the outer periphery side (inner side) to the inner periphery side (outer side) in the axis line x direction, the projection 23 adjacent to the one projection 23 on the side of the rotation direction of the slinger 3 partially overlap when seen from the inner periphery side (outer side) to the outer periphery side (inner side) in the axis line x direction.

Further, to improve a function to return the target to be sealed which has moved beyond the adjacent projections 23 described above to the pumping region, and to make a portion where the projections 23 which are adjacent to each other overlap with each other when seen from the inner periphery side to the outer periphery side in the axis line x direction larger, it is preferable to adjust an extending direction (angle) of the projections 23 and an interval (pitch) between the projections 23 which are adjacent to each other. Further, it is preferable that the projections 23 are adjacent to each other at equal intervals so that the end-face lip 21 equally has the above-described functions of the projections 23 in the circumferential direction.

In this manner, in the sealing apparatus 1, even if the target to be sealed further oozes to the circular current region beyond the pumping region where the pumping action is exerted, it is possible to return this target to be sealed which has oozed to the pumping region by the projections 23 and further return the target to be sealed to the side of the target to be sealed by the pumping action. In this manner, according to the sealing apparatus 1, it is possible to use the pumping action exerted by the groove 33 formed at the slinger 3 more effectively by the projections 23 formed at the end-face lip 21, so that it is possible to suppress ooze of the target to be sealed compared to the related art. Further, because the projections 23 do not contact the slinger 3, according to the sealing apparatus 1, it is possible to suppress ooze of the target to be sealed without increasing sliding resistance to the slinger 3.

The pumping action based on the groove 33 of the slinger 3 is reduced as rotation speed of the slinger 3 becomes higher. It can be considered that this is because the pumping region contracts toward the side of the slinger contact portion 24 and the lip contact portion 32 as the rotation speed of the slinger 3 becomes higher. Therefore, in the case where the target to be sealed oozes from the side of the target to be sealed to the narrow space S, the target to be sealed which enters the circular current region increases as the rotation speed of the slinger 3 becomes higher. If an amount of the target to be sealed which circulates in the circular current region exceeds an amount of the target to be sealed which can be retained in the circular current region, the target to be sealed further oozes inside, and there is a case where the target to be sealed further oozes outside the sealing apparatus 1.

In the sealing apparatus 1 according to the first embodiment of the present disclosure, as described above, even if the target to be sealed oozes to the circular current region beyond the pumping region, it is possible to return this target to be sealed which has oozed to the pumping region by the projections 23, and further return the target to be sealed to the side of the target to be sealed by pumping action. Therefore, even if the rotation speed of the slinger 3 becomes higher and the target to be sealed which is retained in the circular current region increases, it is possible to return this target to be sealed which is retained in the circular current region to the pumping region by the projections 23, so that it is possible to prevent the amount of the target to be sealed which circulates in the circular current region from exceeding the amount of the target to be sealed which can be retained in the circular current region. Further, even if the pumping action is reduced by high-speed rotation of the slinger 3, because the target to be sealed is returned to the pumping region by the projections 23, it is possible to return a more amount of the target to be sealed to the side of the target to be sealed by the pumping action upon high-speed rotation of the slinger 3. Because speed of the target to be sealed which circulates in the circular current region becomes higher as the rotation speed of the shaft 52 becomes higher, the target to be sealed which is retained in the circular current region is further more likely to be led to the pumping region.

In this manner, according to the sealing apparatus 1 according to the first embodiment of the present disclosure, even in the case where the pumping action by the groove 33 of the slinger 3 is utilized, it is possible to suppress ooze of the target to be sealed regardless of a value of the rotation speed of the shaft 52.

Further, according to the sealing apparatus 1 according to the first embodiment, it can be estimated that the following effects can be obtained. In accordance with rotation of the slinger 3, flow of air in the rotation direction of the slinger 3 occurs in the narrow space S formed by the end-face lip 21 and the slinger 3. This air is derived to the side of the tip 21a of the end-face lip 21 by colliding with the projections 23 on the inner periphery surface 22 of the end-face lip 21, and flows toward the slinger contact portion 24.

As a result, because flow of the air which occurs from the narrow space S to the side of the slinger contact portion 24 by the presence of the projections 23 functions to push back the lubricant which oozes from the side of the target to be sealed to the narrow space S, to the pumping region, it is possible to reduce ooze of the lubricant.

Particularly, because such flow of air becomes higher as the rotation speed of the slinger 3 becomes higher, the flow of air becomes faster, strength of the air flowing from the tip 21a of the end-face lip 21 to the side of the target to be sealed increases, so that the function to push back the lubricant to the pumping region becomes further strong. In this manner, according to the sealing apparatus 1, even in the case where the rotation speed of the shaft 52 becomes higher, it is possible to suppress ooze of the target to be sealed by an effect of flow of air occurring by the projections 23.

Figure 7:
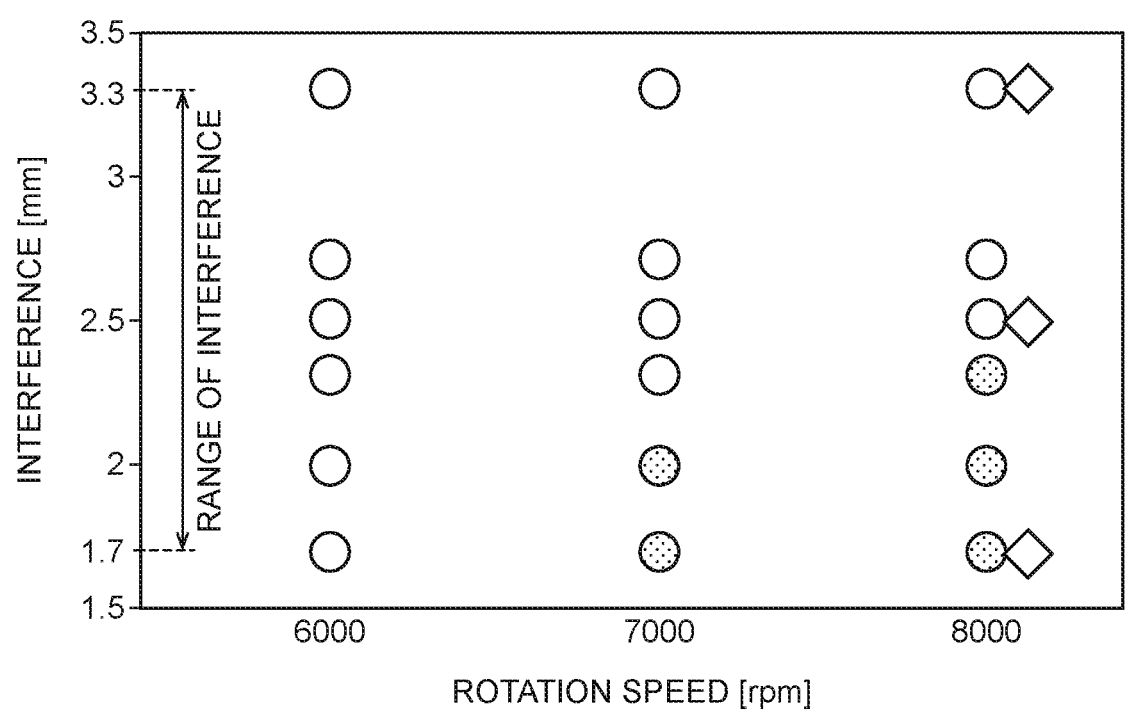
FIG. 7 is a diagram illustrating a graph indicating results of evaluation tests.

Evaluation test results of the sealing apparatus 1 according to the first embodiment of the present disclosure will be described next. The present inventor manufactured the above-described sealing apparatus 1 according to the first embodiment of the present disclosure (test examples 1 to 3) and performed evaluation tests for sealing performance of this sealing apparatus 1. FIG. 7 is a diagram illustrating a graph indicating results of the evaluation tests. Note that, in the present evaluation tests, in place of the slinger 3 of the sealing apparatus 1, a plate-like disk-shaped slinger having the outer periphery side disk portion 31b of the flange portion 31 was used. Further, the tests were performed by the test examples 1 to 3 being attached to a pseudo housing and a pseudo shaft for evaluation tests.

In the test example 1, the interference was set at 1.7 mm. The interference is a width in the axis line x direction along the inner periphery surface 22 of the end-face lip 21 of the slinger contact portion 24 of the end-face lip 21. In the test example 2, the interference was set at 2.5 mm. In the test example 3, the interference was set at 3.3 mm.

Further, as comparative examples, sealing apparatuses in which the projections 23 were removed from the end-face lip 21 of the test examples 1 to 3, and which has an end-face lip not having the projections 23 were manufactured (comparative examples 1 to 6). In the comparative example 1, the interference was set at 1.7 mm, in the comparative example 2, the interference was set at 2.0 mm, in the comparative example 3, the interference was set at 2.3 mm, in the comparative example 4, the interference was set at 2.5 mm, in the comparative example 5, the interference was set at 2.7 mm, and, in the comparative example 6, the interference was set at 3.3 mm.

In the evaluation tests, a lubricant was used as the target to be sealed, the respective sealing apparatuses (the test examples 1 to 3, and the comparative examples 1 to 6) were made to rotate for 24 hours respectively at rotation speed of 6,000 rpm, 7,000 rpm and 8,000 rpm. The sealing performance was confirmed through visual confirmation of a state of ooze of oil from the slinger contact portion 24 and the lip contact portion 32 to the inner side after the evaluation tests.

Results as illustrated in FIG. 7 could be obtained from the above-described evaluation tests. In FIG. 7, diamond-shaped markers indicate evaluation results in the test examples 1 to 3, circular markers indicate evaluation results in the comparative examples 1 to 6. Concerning the respective markers, filled markers indicate sealing apparatuses in which ooze of the lubricant has been visually confirmed, and outlined markers indicate sealing apparatuses in which ooze of the lubricant has not been visually confirmed.

As can be seen from FIG. 7, it could be understood from the comparative example 1 (the interference is 1.7 mm) that the lubricant cannot be sealed in the case where the shaft 52 is made to rotate at rotation speed of 7,000 and 8,000 rpm. It could be understood from the comparative example 2 (the interference is 2.0 mm) that the lubricant cannot be sealed in the case where the shaft 52 is made to rotate at rotation speed of 7,000 and 8,000 rpm. It could be understood from the comparative example 3 (the interference is 2.3 mm) that the lubricant cannot be sealed in the case where the shaft 52 is made to rotate at rotation speed of 8,000 rpm. It could be understood from the comparative examples 4 to 6 (the interference is 2.5 mm, 2.7 mm and 3.3 mm) that the lubricant can be sealed even if the shaft 52 is made to rotate at rotation speed of 6,000, 7,000 and 8,000 rpm. In this manner, it could be understood that, in the sealing apparatuses (comparative examples 1 to 6) in which projections are not formed at the end-face lip, in the case where the interference is small (1.7 mm, 2.0 mm and 2.3 mm), the target to be sealed oozes if the rotation speed of the shaft 52 becomes higher.

Meanwhile, in the sealing apparatus 1 (test examples 1 to 3) according to the first embodiment of the present disclosure, it could be understood that, at all the sealing apparatuses having the interference of 1.7 mm (test example 1), 2.5 mm (test example 2) and 3.3 mm (test example 3), the lubricant can be sealed even if the shaft 52 is made to rotate at high rotation speed of 8,000 rpm. In this manner, in the sealing apparatus 1 according to the first embodiment of the present disclosure in which the projections 23 are formed at the end-face lip 21, it could be understood that ooze of the target to be sealed can be suppressed regardless of a size of the interference even if the shaft 52 is made to rotate at high rotation speed.

In this manner, it can be understood also from the present evaluation tests that, in the sealing apparatus 1 according to the first embodiment of the present disclosure, even in the case where pumping action by the slinger 3 is utilized, it is possible to suppress ooze of the target to be sealed regardless of a value of the rotation speed of the shaft 52.

Second Embodiment

A sealing apparatus 5 according to a second embodiment of the present disclosure will be described below with reference to the drawings. The sealing apparatus 5 according to the second embodiment of the present disclosure is different from the sealing apparatus 1 according to the first embodiment of the present disclosure in a shape of the elastic body portion. Hereinafter, the same reference numerals are assigned to components having functions which are the same as or similar to those of the above-described sealing apparatus 1 according to the first embodiment of the present disclosure, description thereof will be omitted, and only different part will be described.

FIG. 8 is a cross-sectional diagram on a cross-section along an axis line x for illustrating a schematic configuration of the sealing apparatus 5 according to the second embodiment of the present disclosure, and FIG. 9 is a partially enlarged cross-sectional diagram illustrating enlarged part of the cross-section along the axis line x of the sealing apparatus 5. The sealing apparatus 5 according to the present embodiment is a sealing apparatus for sealing an annular gap between a shaft and a hole into which this shaft is to be inserted in a similar manner to the above-described sealing apparatus 1.

As illustrated in FIG. 8 and FIG. 9, the sealing apparatus 5 includes a sealing apparatus body 6 corresponding to the sealing apparatus body 2 of the above-described sealing apparatus 1, and a slinger 3. The sealing apparatus body 6 includes a reinforcing ring 10, and an elastic body portion 60 which is formed with an elastic body attached to the reinforcing ring 10, and which is annular around the axis line x. The elastic body portion 60 is different from the elastic body portion 20 of the above-described sealing apparatus 1 in a shape of projections, and has projections 61 different from the projections 23 of the above-described elastic body portion 20.

Figure 10:
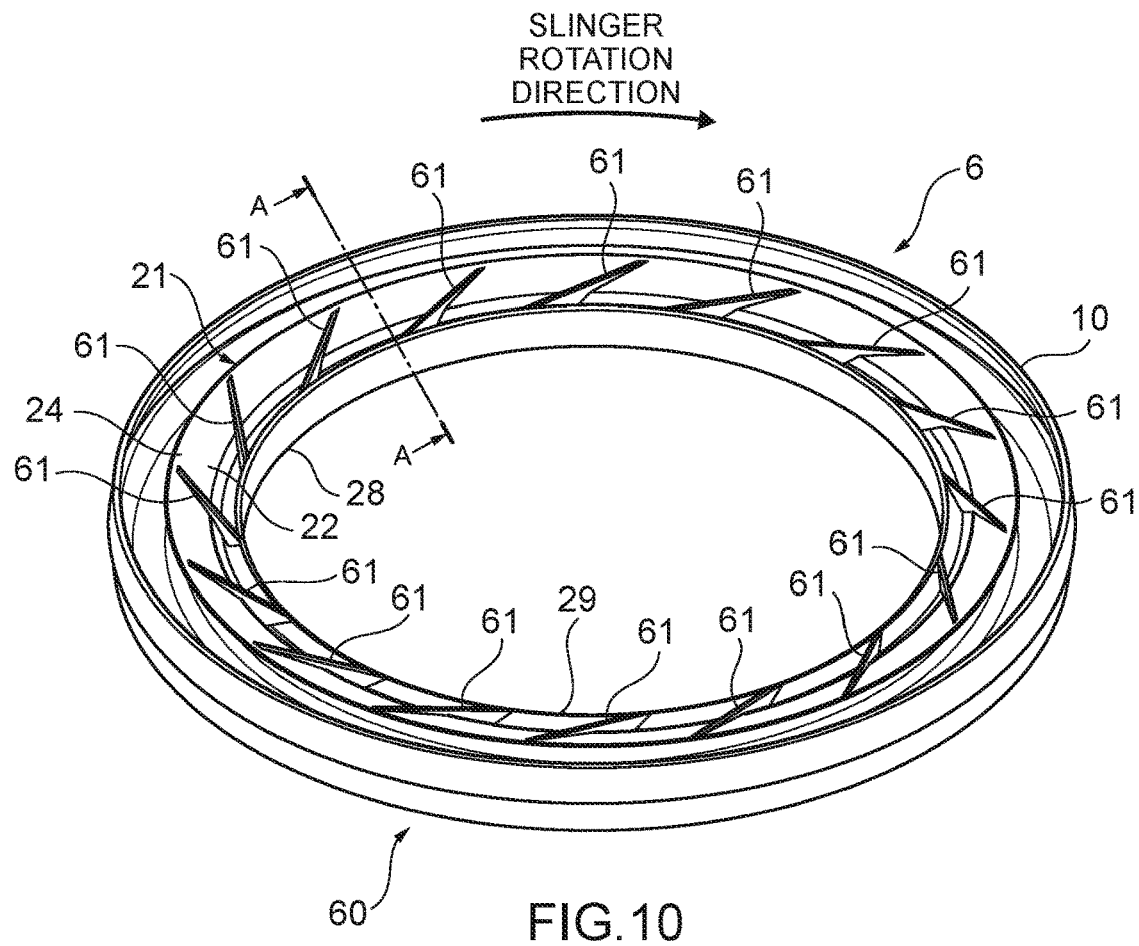
FIG. 10 is a perspective view of a sealing apparatus body of the sealing apparatus according to the second embodiment of the present disclosure, seen from inside.

At the elastic body portion 60, as illustrated in FIG. 10, a plurality of projections 61 are formed side by side in a circumferential direction on an inner periphery surface 22 of an end-face lip 21. In a similar manner to the projections 23, as will be described later, the projections 61 extend in a spiral manner in a rotation direction of a shaft 52 (slinger 3) from an outer side toward an inner side and are formed on an inner periphery side of a slinger contact portion 24 which is a portion where the end-face lip 21 contacts the slinger 3 at the end-face lip 21.

Figure 11:
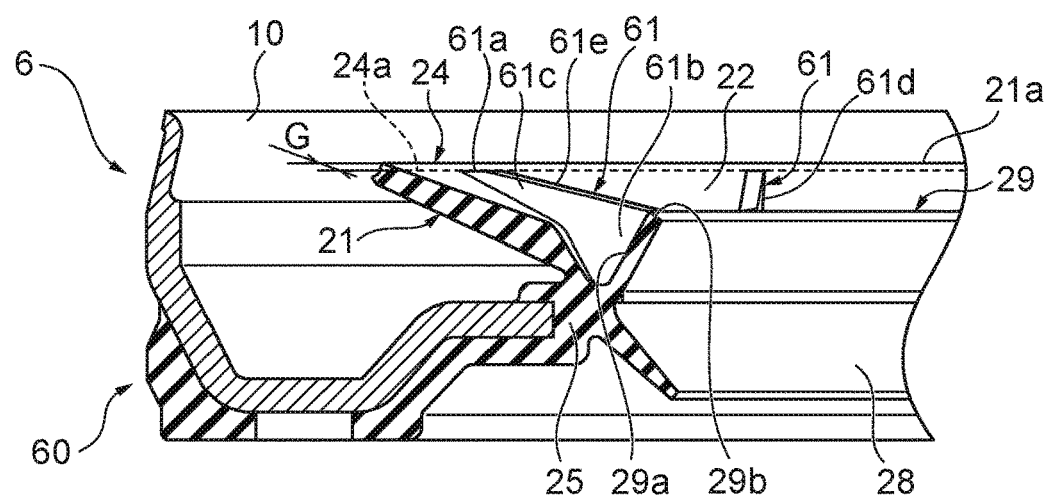
FIG. 11 is a partial perspective view of the sealing apparatus body illustrating a cross-section along a line A-A in FIG. 10.

As illustrated in FIG. 10 and FIG. 11, the plurality of projections 61 are arranged at equal angular intervals or substantially equal angular intervals in the circumferential direction, and arranged at equal pitch intervals or substantially equal pitch intervals, on the same or substantially the same circumference on the inner periphery surface 22 of the end-face lip 21. As described above, the respective projections 61 extend in a spiral manner in the rotation direction of the shaft 52 (slinger 3) from the outer side (lower side in FIG. 10 and FIG. 11) toward the inner side (upper side in FIG. 10 and FIG. 11). That is, the respective projections 61 extend from the side of a base portion 25 toward a side of a tip 21a of the end-face lip 21 while tilting in the rotation direction of the slinger 3. Further, the respective projections 61 are formed at intervals from the slinger contact portion 24, and are formed on an inner periphery side (outer side) of the slinger contact portion 24, that is, on a side of a root 21b of the end-face lip 21.

At the end-face lip 21, the projections 61 are formed at intervals from the slinger contact portion 24 in a similar manner to the above-descried projections 23, and inner ends 61a which are end portions on the inner side (outer periphery side) of the projections 61 are located at positions away from an outer edge 24a of the slinger contact portion 24 in a direction along the axis line x along the inner periphery surface 22 by a predetermined interval G (see FIG. 3). Further, the projections 61 extend to an intermediate lip 29 along the inner periphery surface 22 of the end-face lip 21, and outer ends 61b which are end portions on the outer side (inner periphery side) of the projections 61 are connected to an outer periphery surface 29a which is a surface on the outer periphery side of the intermediate lip 29.

Further, as will be described later, the respective projections 61 are formed in a shape so as not to contact the slinger 3 in a state where the sealing apparatus 5 is used in a similar manner to the projections 23 of the above-described sealing apparatus 1. That is, a height of the projections 61 from the inner periphery surface 22 and the interval G are set so that the projections 61 do not contact a surface on the outer side of the flange portion 31 of the slinger 3 in the usage state. In the present embodiment, as illustrated in FIG. 9 and FIG. 11, the height of the projections 61 from the inner periphery surface 22 becomes higher from the inner ends 61a toward the outer ends 61b. Further, the projections 61 extend over the whole width in the axis line x direction of the outer periphery surface 29a of the intermediate lip 29 at the outer ends 61b, and the outer ends 61b of the projections 61 extend from the root to the tip 29b of the intermediate lip 29.

As described above, the projections 61 are formed in a rib shape from positions away from the outer edge 24a of the slinger contact portion 24 by the interval G to the outer periphery surface 29a of the intermediate lip 29 on the inner periphery surface 22 of the end-face lip 21, and the side surfaces 61c and 61d which are surfaces facing in the circumferential direction extend while being orthogonal to or substantially orthogonal to the inner periphery surface 22 of the end-face lip 21. The side surfaces 61c and 61d may extend while tilting without being orthogonal to the inner periphery surface 22, and, for example, the side surfaces 61c may tilt to the side of the inner periphery surface 22. The side surfaces 61c and the side surfaces 61d extend in parallel or substantially parallel to each other, and the end faces 61e which form surfaces of the projections 61 on the side of the slinger 3 extend in a planar shape or substantially planar shape. As illustrated in FIG. 11, a shape of portions on the side of the inner ends 61a is set so that the end faces 61e are smoothly connected to the inner periphery surface 22 of the end-face lip 21 at the inner ends 61a. For example, portions of the end faces 61e on the side of the inner ends 61a are flexed or curved from another portion.

The height of the projections 61 from the inner periphery surface 22 is not limited to the above-described specific shape. The height of projections 61 from the inner periphery surface 22 may be fixed from the inner ends 61a to the outer ends 61b, or the height from the inner periphery surface 22 may become lower from the inner ends 61a toward the outer ends 61b. Therefore, the projections 61 do not have to extend over the whole width in the axis line x direction of the outer periphery surface 29a of the intermediate lip 29 at the outer ends 61b, and may extend over a part of the width in the axis line x direction of the outer periphery surface 29a of the intermediate lip 29. Further, the height of the projections 61 from the inner periphery surface 22 from the inner ends 61a to the outer ends 61b may be various kinds of combination of becoming higher, becoming lower, being fixed, or the like, described above. Further, the cross-section orthogonal to the extending direction of the projections 61 may have various shapes such as, for example, a triangle, a rectangle and an inverted U-shape. In a state where the sealing apparatus 5 is used, because the projections 61 are formed in a shape which does not contact the slinger 3, sliding resistance to the slinger 3 does not increase by the projections 61.

Further, the shape of the projections 61 in an extending direction may be various shapes such as a shape which is tapered from the outer ends 61b toward the inner ends 61a in a similar manner to the above-described projections 23 (see FIG. 3) and a shape such that a width in a direction orthogonal to the extending direction changes in the extending direction between the outer ends 61b and the inner ends 61a. Further, the projections 61 may extend straight between the inner ends 61a and the outer ends 61b or may extend while being curved.

Figure 12:
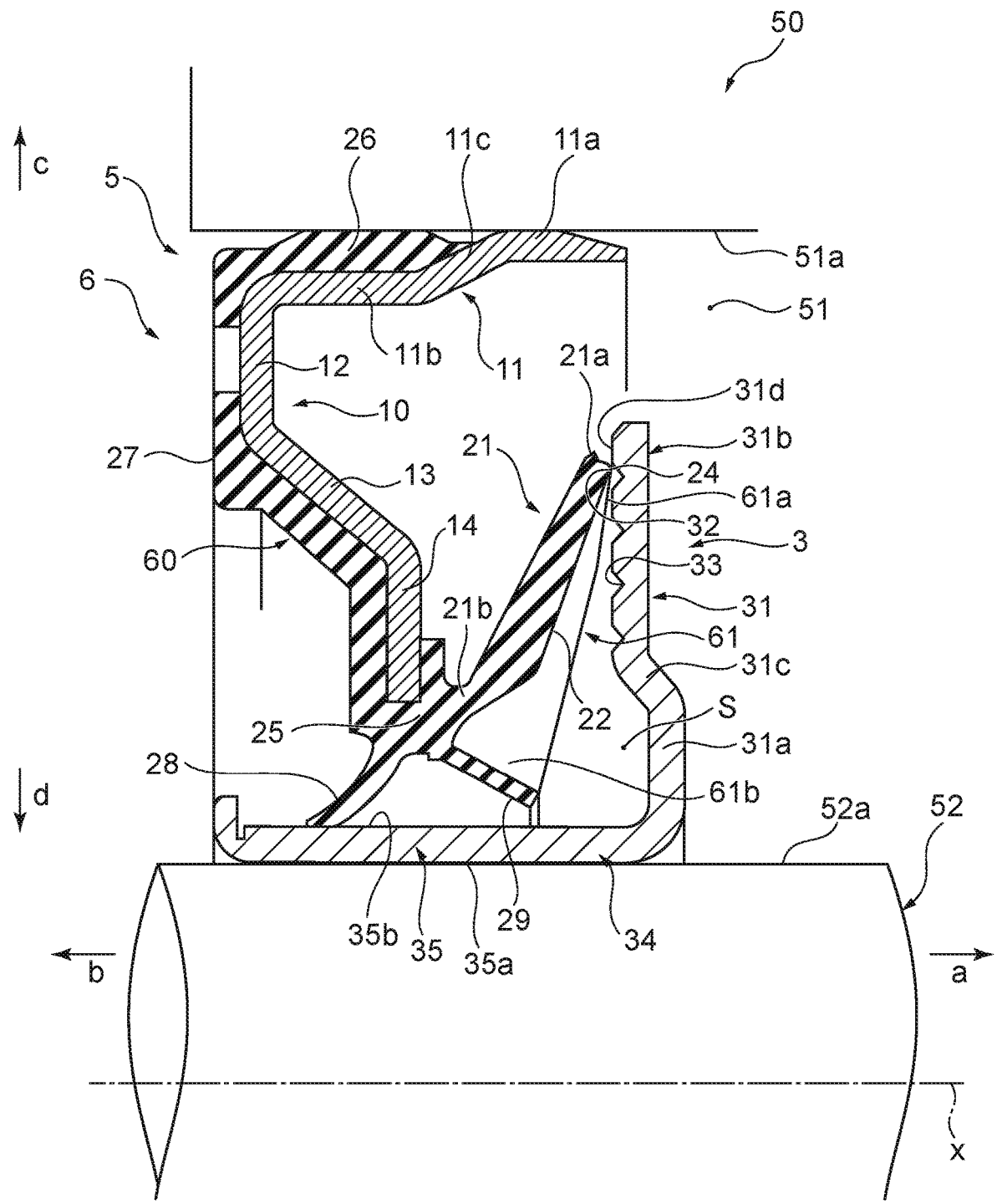
FIG. 12 is a partially enlarged cross-sectional diagram of the sealing apparatus illustrated in FIG. 8 in a usage state where the sealing apparatus is attached to a housing as an attachment target and a shaft inserted into a shaft hole.

Action of the sealing apparatus 5 having the above-described configuration will be described next. FIG. 12 is a partially enlarged cross-sectional diagram of the sealing apparatus 5 in a usage state where the sealing apparatus 5 is attached to the housing 50 as an attachment target and the shaft 52 inserted into the shaft hole 51. In the usage state, the sealing apparatus 5 is attached in a similar manner to the above-described sealing apparatus 1, and positional relationship between the sealing apparatus body 6 and the slinger 3 is similar to the above-described relative positions between the sealing apparatus body 2 and the slinger 3.

In a similar manner to the projections 23, at the end-face lip 21, the projections 61 extend from positions away from the outer edge 24a of the slinger contact portion 24 by the interval G and at least partially extend in the circular current region. Therefore, also in the present embodiment, the projections 61 acts in a similar manner to the above-described projections 23 in the first embodiment of the present disclosure (see FIG. 6), and the target to be sealed which is retained in the circular current region while rotating hits and is bounced against the side surfaces 61c which are side surfaces of the projections 61 facing the outer periphery side, or the target to be sealed which is retained in the circular current region while rotating is led from the side of the outer ends 61b to the inner ends 61a of the projections 61 along the side surfaces 61c of the projections 61, and the target to be sealed which is retained in the circular current region is led to the pumping region. The target to be sealed led to the pumping region by the projections 61 is returned to the side of the target to be sealed by receiving pumping action.

In a similar manner to the projections 23, it is preferable that the projections 61 are formed so that part on the side of the inner ends 61a enters the pumping region on the inner periphery surface 22 of the end-face lip 21 and are formed so that part on the side of the inner ends 61a enters the pumping region regardless of rotation speed of the shaft 52. Further, in the case where the projections 61 are formed so that the whole projections 61 exist in the circular current region, the interval G from the outer edge 24a of the slinger contact portion 24 is set in a range where the target to be sealed which has oozed to the side of the circular current region beyond the pumping region can be returned to the pumping region again as described above. Further, in a similar manner to the projections 23, it is preferable that the projections 61 are arranged so as to partially overlap with the projections 61 adjacent on the side of the rotation direction of the shaft 52 (slinger 3) when seen from the inner periphery side (outer side) to the outer periphery side (inner side) in the axis line x direction. Further, it is preferable that the projections 23 are arranged so that the projection 61 adjacent to one projection 23 on the side of the rotation direction of the slinger 3 partially overlaps with a portion of the projection 61, which does not overlap with the projection 61 adjacent to the one projection 61 on an opposite side of the rotation direction of the slinger 3 when seen from the outer periphery side (inner side) to the inner periphery side (outer side) in the axis line x direction, when seen from the inner periphery side (outer side) to the outer periphery side (inner side) in the axis line x direction. Further, to make a portion where the projections 61 which are adjacent to each other overlap with each other when seen from the inner periphery side to the outer periphery side in the axis line x direction larger, it is preferable to adjust the extending direction (angle) of the projections 61 and an interval (pitch) of the projections 61 which are adjacent to each other, and it is preferable that the projections 61 are adjacent to each other at equal intervals.

In the sealing apparatus 5, in a similar manner to the sealing apparatus 1, even if the target to be sealed further oozes to the circular current region beyond the pumping region where the pumping action is exerted, it is possible to return this target to be sealed which has oozed to the pumping region by the projections 61, and it is possible to further return the target to be sealed to the side of the target to be sealed using pumping action. Also in this case, because speed of the target to be sealed which circulates in the circular current region becomes higher as the rotation speed of the shaft 52 becomes higher, the target to be sealed which is retained in the circular current region is further more likely to be led to the pumping region. In this manner, according to the sealing apparatus 5, it is possible to use the pumping action exerted by the groove 33 formed at the slinger 3 more effectively by the projections 61 formed at the end-face lip 21, so that it is possible to suppress ooze of the target to be sealed compared to the related art. Further, because the projections 61 do not contact the slinger 3, according to the sealing apparatus 5, it is possible to suppress ooze of the target to be sealed without increasing sliding resistance to the slinger 3. Further, the sealing apparatus 5 can provide effects similar to those provided by the above-described sealing apparatus 1.

In this manner, according to the sealing apparatus 5 according to the second embodiment of the present disclosure, even in the case where the pumping action by the groove 33 of the slinger 3 is utilized, it is possible to suppress ooze of the target to be sealed regardless of a value of the rotation speed of the shaft 52.

Further, according to the sealing apparatus 5 according to the second embodiment, it can be estimated that the following effects can be obtained. Flow of air in the rotation direction of the slinger 3 occurs in the narrow space S formed by the end-face lip 21 and the slinger 3 in accordance with rotation of the slinger 3. This air is derived to the side of the tip 21a of the end-face lip 21 by colliding with the projections 61 on the inner periphery surface 22 of the end-face lip 21 and flows toward the slinger contact portion 24.

As a result, because the flow of air occurring from the narrow space S to the side of the slinger contact portion 24 by the presence of the projections 61 functions to push back the lubricant oozing from the side of the target to be sealed to the narrow space S, to the pumping region, it is possible to reduce ooze of the lubricant.

Particularly, because such flow of air becomes higher as the rotation speed of the slinger 3 becomes higher, the flow of air becomes faster, and strength of the air flowing from the tip 21a of the end-face lip 21 to the side of the target to be sealed increases, so that the function to push back the lubricant to the pumping region becomes further strong.

Particularly, because the projections 61 are formed so as to be longer as the projections 61 reach the outer periphery surface 29a of the intermediate lip 29, flow of air becomes stronger than in the case of the projections 23 in the first embodiment, and the function to push back the lubricant to the pumping region is exerted further effectively. In this manner, according to the sealing apparatus 5, even in the case where the rotation speed of the shaft 52 becomes higher, it is possible to suppress ooze of the target to be sealed by the effect of the flow of air occurring by the projections 61.

While the first and the second preferred embodiments of the present disclosure have been described above, the present disclosure is not limited to the above-described sealing apparatuses 1 and 5 according to the first and the second embodiments and may incorporate any aspect included in the concept of the present disclosure and the scope of the claims. Further, the respective components may be selectively combined as appropriate so as to solve or provide at least part of the above-described problems or effects. Further, for example, the shapes, materials, arrangement, sizes, or the like, of the respective components in the above-described first and second embodiments can be changed as appropriate in accordance with specific usage aspect of the present disclosure.

Figure 13:
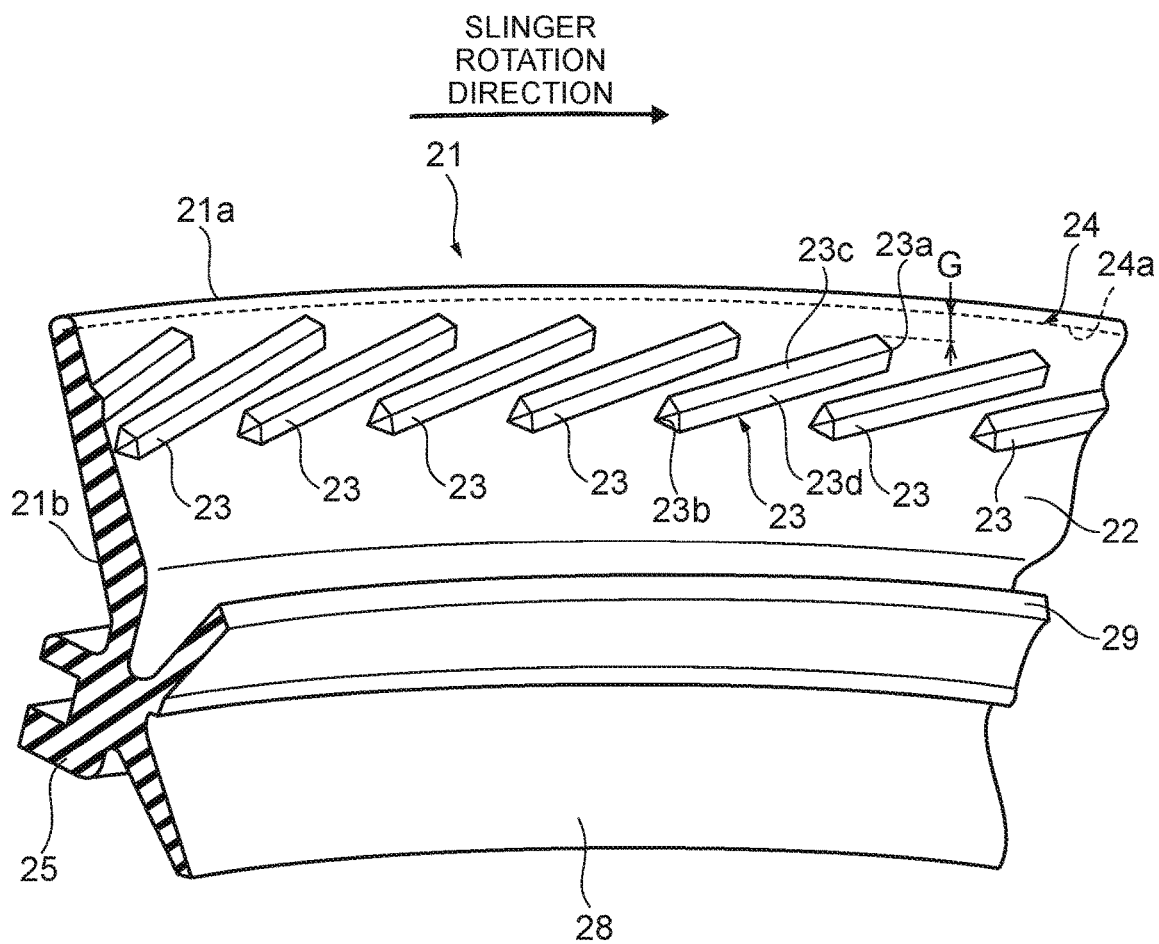
FIG. 13 is a partial perspective view of an elastic body portion for illustrating a modified example of a shape of tip portions of projections in the sealing apparatus illustrated in FIG. 1 in an extending direction.

While, as illustrated in FIG. 3, the shape of the tip portions (portions on the side of the inner ends 23a) of the projections 23 in the extending direction is a shape (tapered shape) tapered toward the tips (inner ends 23a), the shape of the tip portions of the projections 23 in the extending direction is not limited to this tapered shape, and, as illustrated in FIG. 13, may be a shape in which the side surfaces 23c and the side surfaces 23d on the opposite side of the side surfaces 23c extend in parallel or substantially parallel, and the tips are not sharpened. Further, while, in the modified example in FIG. 13, the tips of the projections 23 have surfaces facing in the extending direction of the projections 23, the tips of the projections 23 may have a shape which is smoothly connected to the inner periphery surface 22 of the end-face lip 21. The tips of the projections 23 having a tapered shape or having a shape which is smoothly connected to the inner periphery surface 22 of the end-face lip 21 are preferable in that the projections 23 can be made to extend closer to the side of the tip 21a of the end-face lip 21 without the projections 23 being brought into contact with the slinger 3, and are preferable in formability.

Figures 14A, 14B, 14C, 14D:
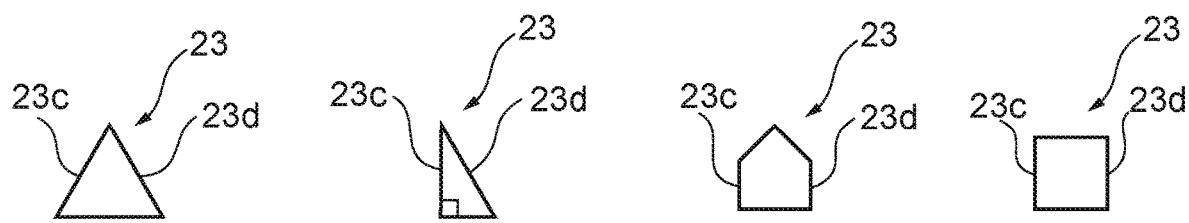
FIGS. 14A to 14D are cross-sectional diagrams for illustrating a cross-sectional shape on a cross-section orthogonal to the extending direction of the projections in the sealing apparatus illustrated in FIG. 1, and respectively illustrating examples of the cross-sectional shape of the projections.

Further, a shape of the cross-section orthogonal to the extending direction of the projections 23 may be various shapes as illustrated in FIG. 14A to FIG. 14D. In the sealing apparatus 1 according to the above-described first embodiment, while the cross-sectional shape of the projections 23 is a triangle as illustrated in FIG. 14A, the cross-sectional shape of the projections 23 may be a shape in which the side surfaces 23c against which the target to be sealed to be returned hits extend while being at least partially orthogonal or substantially orthogonal to the inner periphery surface 22 of the end-face lip 21. For example, as illustrated in FIG. 14B, the cross-sectional shape of the projections 23 is a right triangle or a substantially right triangle in which the side surfaces 23c are orthogonal or substantially orthogonal to the inner periphery surface 22. Further, for example, as illustrated in FIG. 14C, the cross-sectional shape of the projections 23 is a pentagon in which portions of the side surfaces 23c and 23d on the side of the end-face lip 21 are orthogonal or substantially orthogonal to the inner periphery surface 22. Further, for example, as illustrated in FIG. 14D, the cross-sectional shape of the projections 23 is a rectangle in which the side surfaces 23c and 23d are orthogonal or substantially orthogonal to the inner periphery surface 22. According to the projections 23 according to the modified examples illustrated in FIG. 14B to FIG. 14D, it is possible to suppress the target to be sealed to move beyond the projections 23, so that it is possible to return the target to be sealed to the side of the pumping region more efficiently. Further, according to the projections 23 according to the modified examples illustrated in FIG. 14B to FIG. 14D, it is possible to obtain the projections having a height (height in a direction orthogonal to the inner periphery surface 22 of the end-face lip 21) which is the same as the height of the projections 23 having a triangle cross-sectional shape illustrated in FIG. 14A, with a smaller width (width in a direction orthogonal to the extending direction of the projections 23), so that it is possible to increase the number of projections 23 which can be disposed at the end-face lip 21.

While, in the sealing apparatus 5 according to the second embodiment of the present disclosure, as illustrated in FIG. 10 and FIG. 11, surfaces (end faces 61e) of the projections 61 facing the slinger 3 have a planar shape, the end faces 61e may have various shapes such as a curved shape and a shape sharpened to the side of the slinger 3 as the projections 23. The projections 61 may have cross-sectional shapes as illustrated in FIG. 14A to FIG. 14C.

Further, while the projections 23 and 61 extend in a spiral manner, the projections 23 and 61 extend so as to form various shapes on the inner periphery surface 22 of the end-face lip 21, and may be disposed in a spiral manner on the inner periphery surface 22 of the end-face lip 21. Further, the side surfaces 23c and 23d and the side surfaces 61c and 61d of the respective projections 23 and 61 may have a planar shape or a curved shape.

Figure 15A:
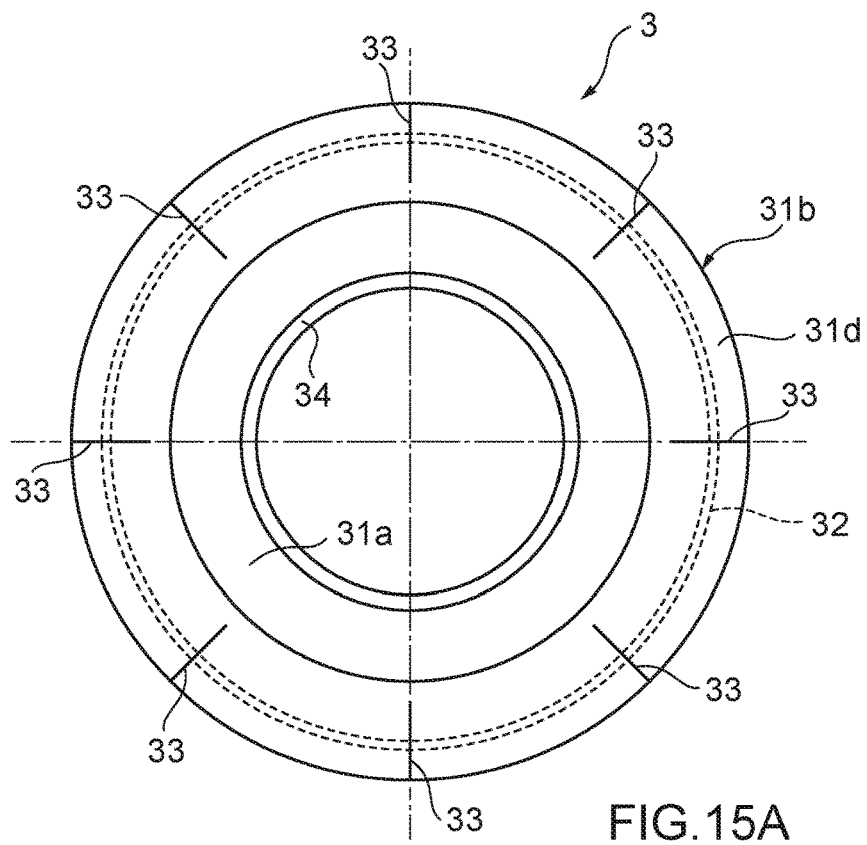
FIG. 15A is a diagram for illustrating a modified example of a groove of a slinger in the sealing apparatus, and illustrating one modified example of the groove.
Figure 15B:
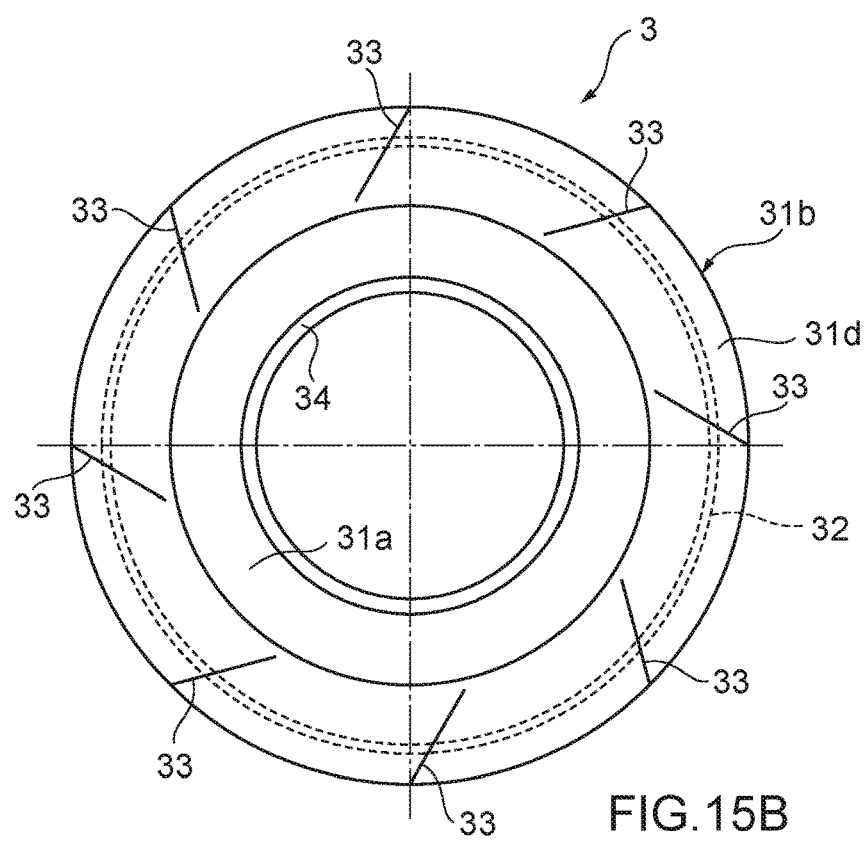
FIG. 15B is a diagram for illustrating a modified example of a groove of a slinger in the sealing apparatus, and illustrating another modified example of the groove.

As described above, the shape of the groove 33 provided at the slinger 3 is not limited to the screw (four-start screw) shape illustrated in FIG. 4 and may be other shapes. For example, as illustrated in FIG. 15A, the groove 33 may be a groove which extends in a radial manner centered on or substantially centered on the axis line x from the inner periphery side toward the outer periphery side, or, as illustrated in FIG. 15B, may be a groove which extends while tilting in the circumferential direction.

While, in the sealing apparatuses 1 and 5, the elastic body portions 20 and 60 include the dust lip 28 and the intermediate lip 29, the elastic body portions 20 and 60 may not have to include the dust lip 28 and the intermediate lip 29, and may include only one of the dust lip 28 and the intermediate lip 29.

Further, while description has been provided that the sealing apparatuses 1 and 5 according to the first and the second embodiments are applied to a crank hole of an engine, an application target of the sealing apparatus according to the present disclosure is not limited to this, and the present disclosure can be applied to all configurations which can utilize effects provided by the present disclosure, such as other vehicles, general-purpose machine and industrial machine.

Third Embodiment

Figure 16:
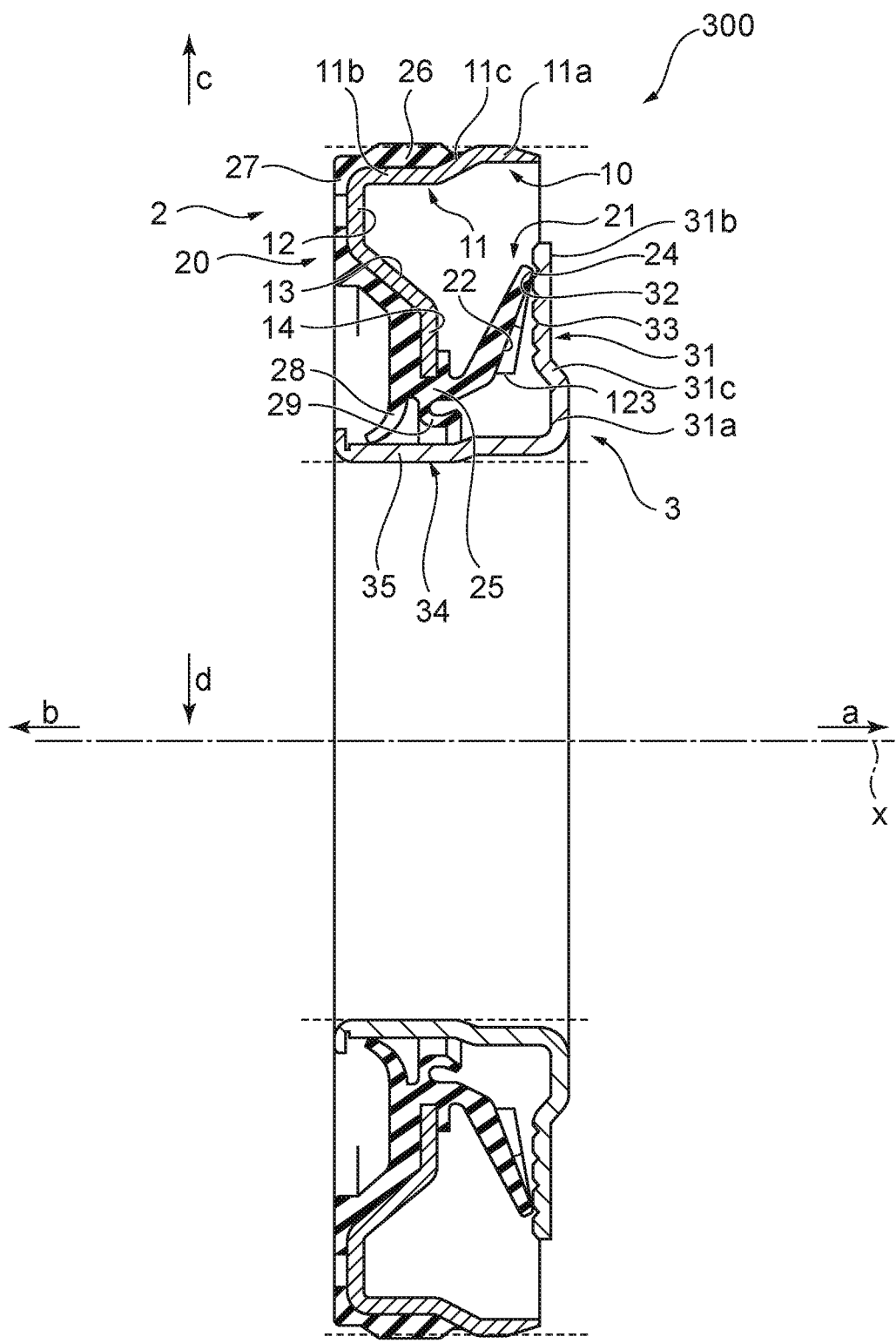
FIG. 16 is a cross-sectional diagram on a cross-section along an axis line x for illustrating a schematic configuration of a sealing apparatus according to a third embodiment of the present disclosure.
Figure 17:
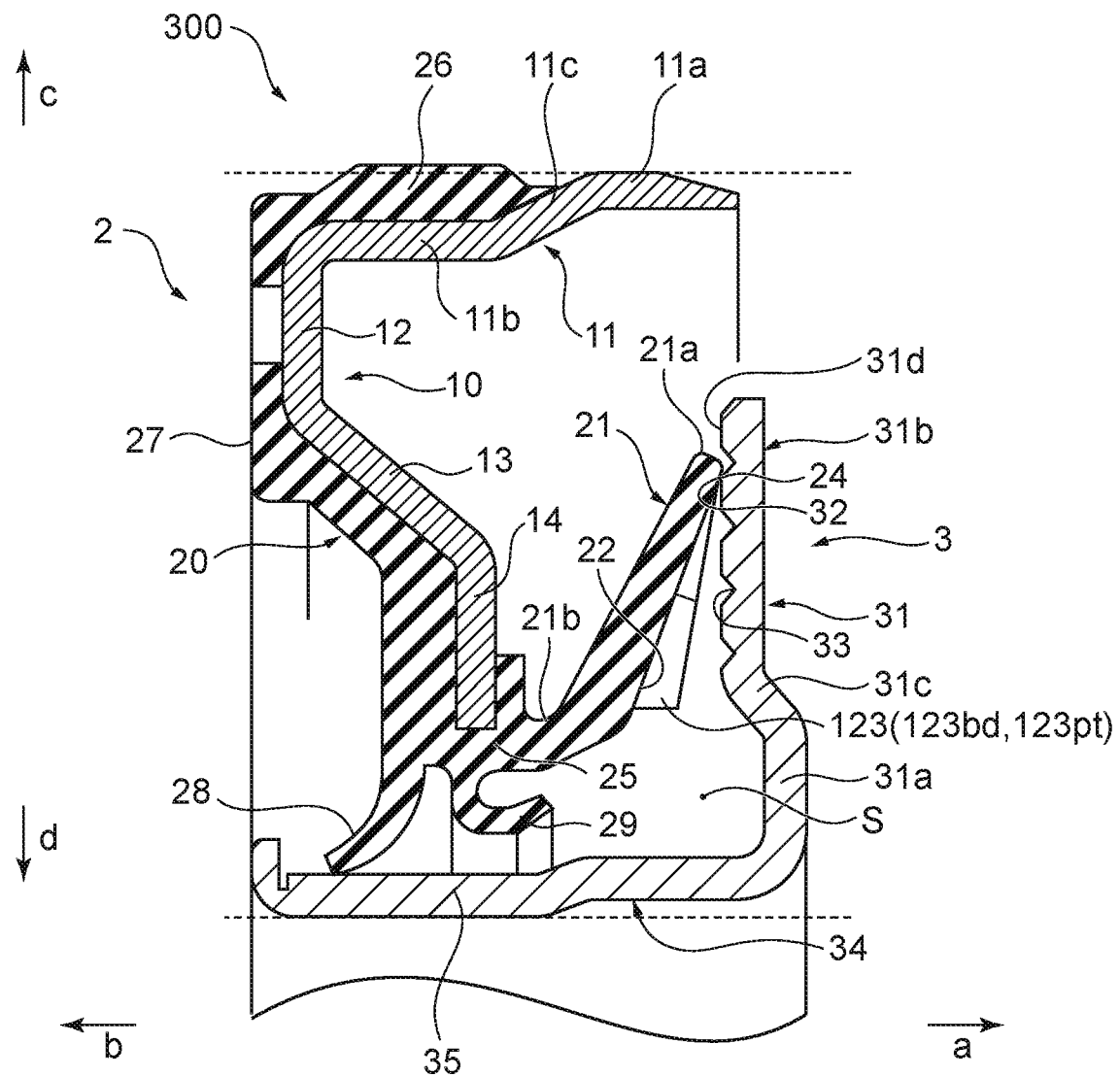
FIG. 17 is a partially enlarged cross-sectional diagram illustrating enlarged part of the cross-section along the axis line in the sealing apparatus according to the third embodiment of the present disclosure.

FIG. 16 is a cross-sectional diagram on a cross-section along an axis line x for illustrating a schematic configuration of a sealing apparatus 300 according to a third embodiment of the present disclosure, and FIG. 17 is a partially enlarged cross-sectional diagram illustrating enlarged part of the cross-section along the axis line x of the sealing apparatus 300 according to the third embodiment of the present disclosure. The sealing apparatus 300 according to the third embodiment of the present disclosure is a sealing apparatus for sealing an annular gap between a shaft and a hole into which this shaft is to be inserted, and is used to seal a gap between a shaft and a hole (shaft hole) which is formed at a housing, or the like, and into which this shaft is to be inserted, at a vehicle and general-purpose machine. For example, the sealing apparatus is used to seal annular space between a crank shaft of an engine and a crank hole which is a shaft hole formed at a front cover, a cylinder block and a crank case. Note that targets to which the sealing apparatus 300 according to the third embodiment of the present disclosure is applied are not limited to the above.

Hereinafter, for the purpose of illustration, a direction of an arrow a (see FIG. 16) in the axis line x direction (one side in the axis line direction) is set as an inner side, and a direction of an arrow b (see FIG. 16) in the axis line x direction (another side in the axis line direction) is set as an outer side. More specifically, the inner side is a side of space to be sealed (side of the target to be sealed) and a side of space where the target to be sealed such as a lubricant exists, and the outer side is an opposite side of the inner side. Further, in a direction perpendicular to the axis line x (hereinafter, also referred to as a "radial direction"), a direction away from the axis line x (a direction of an arrow c in FIG. 16) is set as an outer periphery side, and a direction approaching the axis line x (a direction of an arrow d in FIG. 1) is set as an inner periphery side.

As illustrated in FIG. 16, the sealing apparatus 300 includes a sealing apparatus body 2 to be fitted into a hole as an attachment target which will be described later, and a slinger 3 to be attached to a shaft as an attachment target which will be described later. The sealing apparatus body 2 includes a reinforcing ring 10 annular around the axis line x, and an elastic body portion 20 which is formed with an elastic body attached to the reinforcing ring 10 and which is annular around the axis line x. The slinger 3 includes a flange portion 31 which is a portion extending toward the outer periphery side (the direction of the arrow c) and which is annular around the axis line x. The elastic body portion 20 includes an end-face lip 21 which is a lip extending toward the one side (the inner side, the direction of the arrow a) in the axis line x direction, contacting the flange portion 31 from the other side (the outer side, the side of the direction of the arrow b) in the axis line x direction, and annular around the axis line x.

On the other side (outer side) of the flange portion 31 of the slinger 3, at least one groove 33 is formed, and on a surface on the inner periphery side (inner periphery surface 22) of the end-face lip 21, a plurality of projections 123 are formed side by side in a circumferential direction. As will be described later, the projections 123 extend in a spiral manner in a rotation direction of the shaft 52 (slinger 3), which will be described later, from the other side (outer side) toward the one side (inner side) and are formed on an inner periphery side of a slinger contact portion 24 which is a portion where the end-face lip 21 contacts the slinger 3 at the end-face lip 21.

Respective configurations of the sealing apparatus body 2 and the slinger 3 of the sealing apparatus 300 will be specifically described below.

In the sealing apparatus body 2, as illustrated in FIG. 16 and FIG. 17, the reinforcing ring 10 is an annular metal member centered on or substantially centered on the axis line x, and is formed so that the sealing apparatus body 2 is pressed, engaged and fitted into a shaft hole 51 of a housing which will be described later. Because the reinforcing ring 10 is the same as the reinforcing ring 10 of the sealing apparatus 1 in the first embodiment, description thereof will be omitted here.

Because a basic configuration of the elastic body portion 20 is also the same as that of the elastic body portion 20 of the sealing apparatus 1 in the first embodiment, description thereof will be omitted here, and only different part will be described.

Further, at the elastic body portion 20, the end-face lip 21 extends obliquely with respect to the axis line x to the inner side and the outer periphery side from a base portion 25 on the cross-section along the axis line x (hereinafter, also simply referred to as a cross-section). A plurality of projections 123 are provided on the inner periphery surface 22 of the end-face lip 21. Details of the projections 123 will be described later.

Further, the elastic body portion 20 includes a dust lip 28 and an intermediate lip 29. Because the dust lip 28 and the intermediate lip 29 are also the same as the dust lip 28 and the intermediate lip 29 of the elastic body portion 20 in the first embodiment, description thereof will be omitted here.

Figure 18:
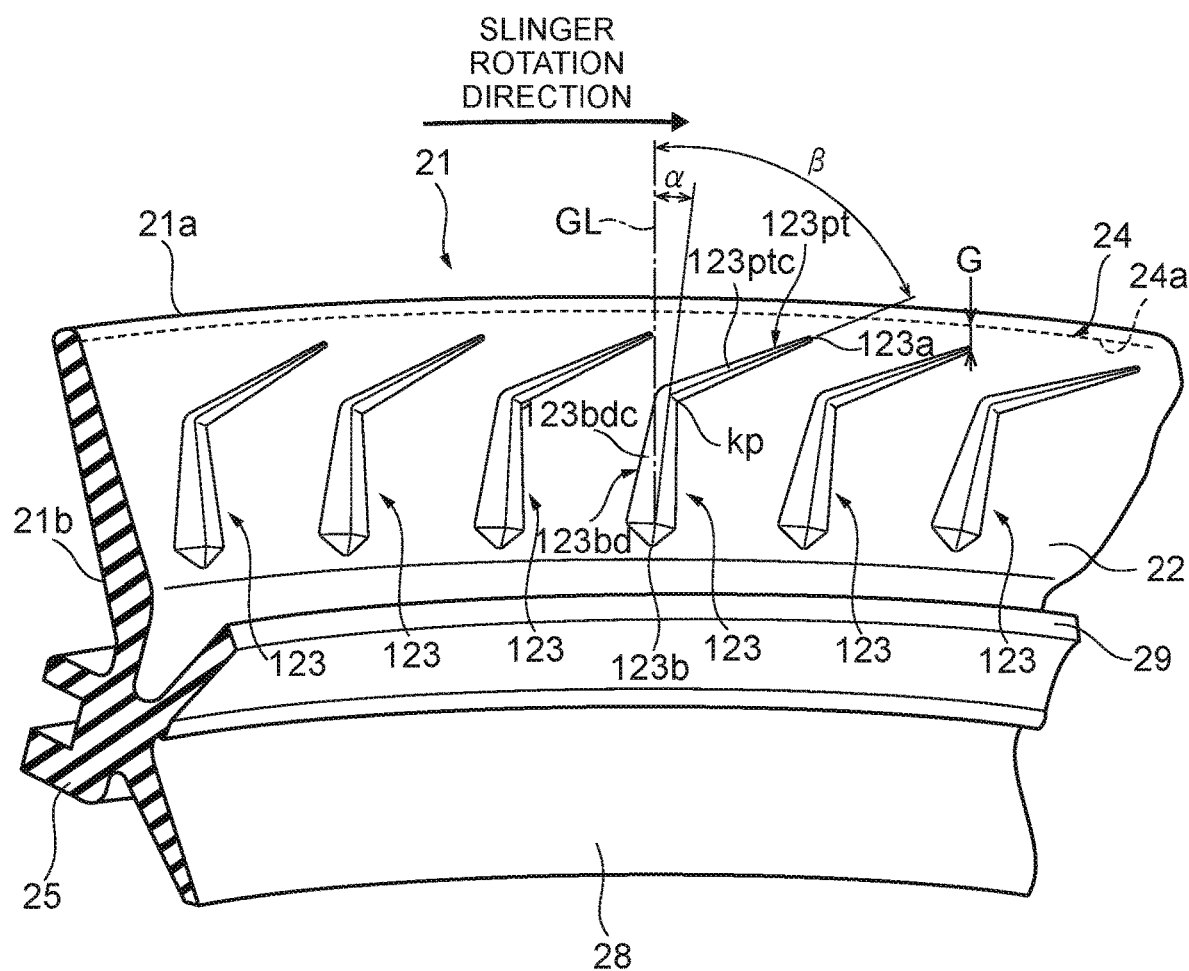
FIG. 18 is a partially enlarged perspective view of an elastic body portion in the sealing apparatus illustrated in FIG. 16 in a state where the elastic body portion at a portion on an inner periphery side from a base portion is cut on a plane along the axis line.

The shape of the end-face lip 21 will be described in more detail next. FIG. 18 is a partially enlarged perspective view of the elastic body portion 20 seen from the inner periphery side in a state where the elastic body portion 20 at a portion on the inner periphery side from the base portion 25 is cut on a plane along the axis line x. As illustrated in FIG. 18, on the inner periphery surface 22 of the end-face lip 21, a plurality of projections 123 are arranged at equal angular intervals or substantially equal angular intervals in the circumferential direction and arranged at equal pitch intervals or substantially equal pitch intervals on the same or substantially the same circumference. The respective projections 123 include body portions 123*bd* and tip portions 123*pt*. As described above, the body portions 123*bd* are portions extending from the outer side (lower side in FIG. 18) toward the inner side (upper side in FIG. 18). The tip portions 123*pt* are portions which are bent at predetermined positions of the body portions 123*bd* and extend in a tapered manner so as to be along the rotation direction of the shaft 52 (slinger 3) which will be described later. That is, the tip portions 123*pt* of the respective projections 123 extend while tilting in a manner such that the tip portions 123*pt* are along the rotation direction of the slinger 3 from a side of a root 21*b* of the end-face lip 21 toward a side of a tip 21*a* of the end-face lip 21.

Further, the respective projections 123 are formed at intervals from the slinger contact portion 24 and formed on the inner periphery side (outer side) of the slinger contact portion 24, that is, closer to the side of the root 21*b* of the end-face lip 21 than the slinger contact portion 24.

Specifically, as illustrated in FIG. 18, inner ends 123*a* which are end portions on the inner side (outer periphery side) of the tip portions 123*pt* of the projections 123 are located at positions away by a predetermined interval G from an outer edge 24*a* which is an edge portion on the outer side (inner periphery side) of the slinger contact portion 24 in a direction along the axis line x along the inner periphery surface 22. This interval G is an interval such that, in a state where the sealing apparatus 300 is used which will be described later, the projections 123 at least partially exist in a region on the inner periphery side of a region where pumping action based on the groove 33 of the slinger 3 occurs.

Further, as illustrated in FIG. 17, the respective projections 123 are formed in a shape which does not contact the slinger 3 in the state where the sealing apparatus 300 is used. That is, a height of the projections 123 from the inner periphery surface 22 and the interval G are set so that, in the usage state, the projections 123 do not contact an outer side surface 31*d* which is a surface on the outer side of the flange portion 31 of the slinger 3. In the present embodiment, as illustrated in FIG. 17 and FIG. 18, while the height of the projections 123 from the inner periphery surface 22 becomes gradually higher from the inner ends 123*a* of the tip portions 123*pt* toward outer ends 123*b* which are end portions of the body portions 123*bd* on the side of the root 21*b* of the end-face lip 21, the height of the projections 123 from the inner periphery surface 22 is not limited to this. The height of the projections 123 from the inner periphery surface 22 may be fixed from the inner ends 123*a* to the outer ends 123*b*, or the height from the inner periphery surface 22 may become lower from the inner ends 123*a* toward the outer ends 123*b*. Further, the height of the projections 123 from the inner periphery surface 22 from the inner ends 123*a* to the outer ends 123*b* may be various kinds of combination of the above-described becoming higher, becoming lower, being fixed, or the like. Further, a shape of a cross-section of the body portions 123*bd* and the tip portions 123*pt* of the projections 123, orthogonal to the extending direction may be various shapes such as, for example, a triangle and an inverted U-shape. Because, in the state where the sealing apparatus 300 is used, the projections 123 are formed in a shape which does not contact the slinger 3, sliding resistance to the slinger 3 does not increase by the projections 123.

Further, as illustrated in FIG. 18, the shape of the body portions 123*bd* of the projections 123 in the extending direction extends straight and in a tapered shape from the outer ends 123*b* toward an upper part in the figure, and the shape of the tip portions 123*pt* in the extending direction extends straight and in a tapered shape along the rotation direction of the shaft 52 (slinger 3) after being bent at predetermined positions of the body portions 123*bd*.

Specifically, the body portions 123*bd* of the projections 123 are provided in a state where the body portions 123*bd* slightly tilt by an inclination angle α with respect to a virtual line GL which is substantially perpendicular to the axis line x and which is from the outer side (lower side in FIG. 18) toward the inner side (upper side in FIG. 18) on the inner periphery surface 22 of the end-face lip 21. However, the inclination angle α may be an arbitrary angle between 0 and 45 degrees based on the virtual line GL. The body portions 123*bd* have side surfaces 123*bdc* which are side surfaces facing on the outer periphery side, and the side surfaces 123*bdc* function as surfaces suppressing intrusion of the target to be sealed.

Meanwhile, the tip portions 123*pt* are bent at a predetermined angle so as to be along the rotation direction of the shaft 52 (slinger 3) from bend points kp on the side of the tips of the body portions 123*bd* and are provided on the inner periphery surface 22 of the end-face lip 21 in a state where the tip portions 123*pt* tilt with respect to the virtual line GL by an inclination angle β. In this case, the inclination angle β is greater than the inclination angle α (β>α), that is, the tip portions 123*pt* tilt with respect to the body portions 123*bd* by an inclination angle β−α. Here, the inclination angle β only has to be 90 degrees>β>α. That is, it is only necessary that the inner ends 123*a* of the tip portions 123*pt* are directed at least slightly toward the inner ends 123*a*. The tip portions 123*pt* include side surfaces 123*ptc* which are side surfaces facing on the outer periphery side, and the side surfaces 123*ptc* function as surfaces suppressing intrusion of the target to be sealed.

Further, at the projections 123, the tip portions 123*pt* are bent from the bend points kp set at positions such that a length of the body portions 123*bd* becomes substantially the same as a length of the tip portions 123*pt*. However, the length is not limited to this, and the tip portions 123*pt* may be longer than the body portions 123*bd*, or the tip portions 123*pt* may be shorter than the body portions 123*bd*. Note that a plurality of tip portions 123*pt* at the plurality of projections 123 partially overlap with each other when seen from the inner periphery side to the outer periphery side.

Further, the height of the body portions 123*bd* of the projections 123 from the inner periphery surface 22 is the highest on the side of the outer ends 123*b*, and the height becomes gradually lower from the outer ends 123*b* toward the tip portions 123*pt* and further to the side on the inner ends 123*a*.

For comparison, the tip portions 123*pt* of the projections 123 having a tapered shape or a shape which is smoothly connected to the inner periphery surface 22 of the end-face lip 21 are preferable in that the projections 123 can be made to extend closer to the side of the tip 21*a* of the end-face lip 21 without the projections 123 being brought into contact with the slinger 3, and are preferable in formability.

As described above, the elastic body portion 20 includes the end-face lip 21, the base portion 25, the gasket portion 26, the rear cover portion 27, the dust lip 28 and the intermediate lip 29, and, in the elastic body portion 20, the respective portions are integrally formed with the same material.

The slinger 3 is an annular member attached to the shaft in a state where the sealing apparatus 300 is used which will be described later, and, because the slinger 3 is the same as the slinger 3 of the sealing apparatus 1 in the first embodiment, description thereof will be omitted here.

Figure 19:
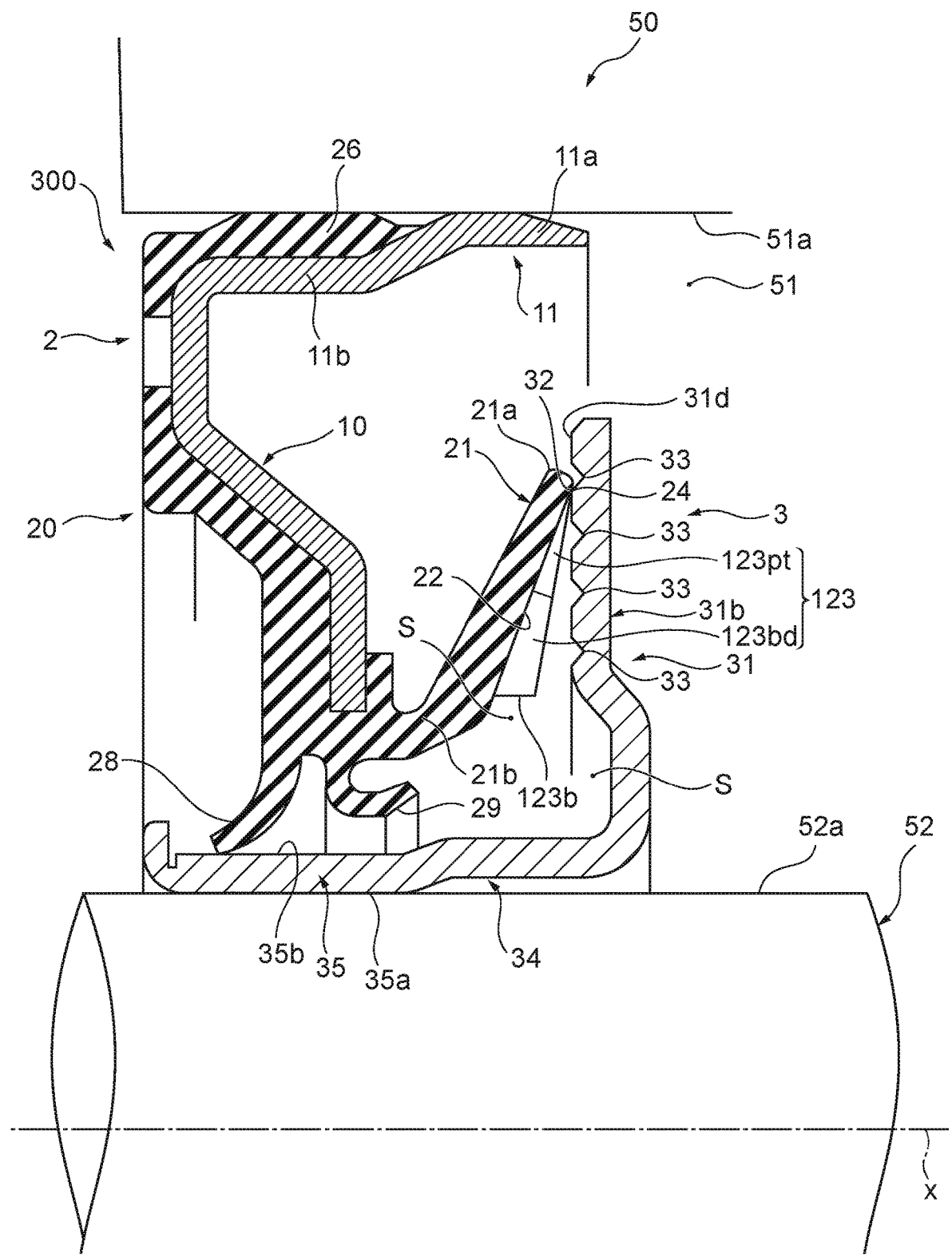
FIG. 19 is a partially enlarged cross-sectional diagram of the sealing apparatus in a usage state where the sealing apparatus according to the third embodiment of the present disclosure is attached to a housing and a shaft inserted into a shaft hole.

Action of the sealing apparatus 300 having the above-described configuration will be described next. FIG. 19 is a partially enlarged cross-sectional diagram of the sealing apparatus 300 in a usage state where the sealing apparatus 300 is attached to a housing 50 as an attachment target and a shaft 52 inserted into a shaft hole 51 which is a through-hole formed at this housing 50. In this case, a lateral side of the body portions 123*bd* and the tip portions 123*pt* of the projections 123 are seen. The housing 50 is, for example, a front cover of an engine, a cylinder block and a crank case, and the shaft hole 51 is a crank hole formed at the front cover, or the cylinder block and the crank case. Further, the shaft 52 is, for example, a crank shaft.

As illustrated in FIG. 19, in the state where the sealing apparatus 300 is used, the sealing apparatus body 2 is fitted into the shaft hole 51 by being pressed into the shaft hole 51, and the slinger 3 is attached to the shaft 52 by being interference-fitted at the shaft 52. More specifically, the outer periphery side cylindrical portion 11*a* of the reinforcing ring 10 contacts the inner periphery surface 51*a* of the shaft hole 51, so that a shaft center of the sealing apparatus body 2 is made to match a shaft center of the shaft hole 51, and the gasket portion 26 of the elastic body portion 20 is compressed in a radial direction between the inner periphery surface 51*a* of the shaft hole 51 and the inner periphery side cylindrical portion 11*b* of the reinforcing ring 10, so that the gasket portion 26 tightly contacts the inner periphery surface 51*a* of the shaft hole 51, and sealing between the sealing apparatus body 2 and the shaft hole 51 is realized. Further, the cylindrical portion 35 of the slinger 3 is pressed into the shaft 52, the inner periphery surface 35*a* of the cylindrical portion 35 tightly contacts the outer periphery surface 52*a* of the shaft 52, so that the slinger 3 is fixed at the shaft 52.

In the state where the sealing apparatus 300 is used, relative positions between the sealing apparatus body 2 and the slinger 3 in the axis line x direction are determined so that the end-face lip 21 of the elastic body portion 20 contacts a lip contact portion 32 which is the portion of the outer side surface 31*d* of the outer periphery side disk portion 31*b* of the flange portion 31 of the slinger 3 at the slinger contact portion 24 which is the portion on the side of the tip 21*a* of the inner periphery surface 22. Further, a portion on the tip side of the dust lip 28 contacts the tubular portion 34 of the slinger 3 from the outer periphery side. The dust lip 28, for example, contacts the outer periphery surface 35*b* of the cylindrical portion 35 of the slinger 3.

In this manner, in the state where the sealing apparatus 300 is used, the end-face lip 21 contacts the lip contact portion 32 of the flange portion 31 so as to be able to slide at the slinger contact portion 24, and the end-face lip 21 and the slinger 3 prevent the target to be sealed such as a lubricant from oozing from the side of the target to be sealed to the inside beyond the slinger contact portion 24 and the lip contact portion 32. Further, the dust lip 28 contacts an inner periphery surface of the tubular portion 34 of the slinger 3 so as to be able to slide and prevents a foreign matter from entering inside from outside.

Further, in the state where the sealing apparatus 300 is used, a groove 33 which forms a four-start screw formed at the outer periphery side disk portion 31*b* of the flange portion 31 of the slinger 3 exerts pumping action in the case where the shaft 52 (slinger 3) rotates. By rotation of the shaft 52 (slinger 3), pumping action occurs in a region in the vicinity of the slinger contact portion 24 and the lip contact portion 32 in narrow space S which is space between the flange portion 31 and the end-face lip 21. By this pumping action, even in the case where the target to be sealed oozes from the side of the target to be sealed to the narrow space S, the target to be sealed which has oozed is returned from the narrow space S to the side of the target to be sealed beyond the slinger contact portion 24 and the lip contact portion 32. In this manner, by the pumping action caused by the groove 33 formed at the flange portion 31 of the slinger 3, ooze of the target to be sealed to the narrow space S is suppressed.

In the narrow space S, the target to be sealed which has further oozed to outside beyond the pumping region where the pumping action by the groove 33 occurs, rotates around the axis line x in the rotation direction of the slinger 3 in a region adjacent to the pumping region on the inner periphery side by the rotation of the shaft 52, and is retained in the circular current region.

The projections 123 are alternately formed on the inner periphery surface 22 of the end-face lip 21 so as to be along the rotation direction of the slinger 3. The projections 123 extend in a substantially L shape toward the inner periphery side from positions of the interval G from an outer edge 24*a* of the slinger contact portion 24 and at least partially extend in the circular current region. Therefore, the target to be sealed which is retained in the circular current region while rotating collides with the body portions 123*bd* and the tip portions 123*pt* of the projections 123, or the target to be sealed which is retained in the circular current region while rotating is led from the side of the outer ends 123*b* which are end portions on the outer side (inner periphery side) of the projections 123 toward the inner ends 123*a* which are end portions on the inner side (outer periphery side) along the body portions 123*bd* and the tip portions 123*pt* of the projections 123, and the target to be sealed which is retained in the circular current region is led to the pumping region. The target to be sealed led to the pumping region by the projections 123 is returned to the side of the target to be sealed by receiving pumping action by the groove 33.

Figure 20:
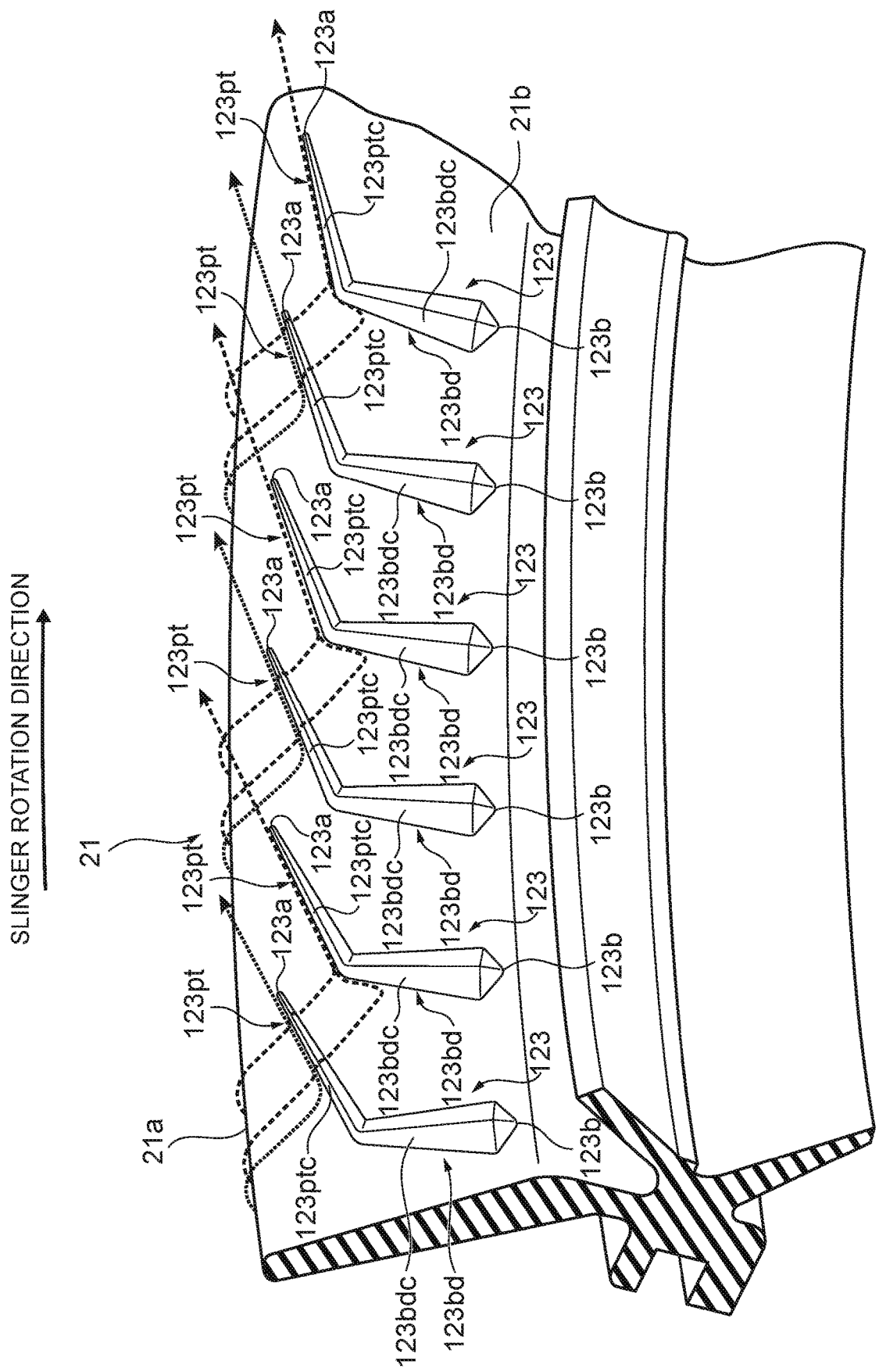
FIG. 20 is a diagram for illustrating aspect of flow of a target to be sealed by action of projections of an end-face lip.

FIG. 20 is a diagram for illustrating aspect of flow of the target to be sealed by action of the projections 123 of the end-face lip 21, for explaining action of the projections 123 of the end-face lip 21. In FIG. 20, the target to be sealed which has oozed to the side of the circular current region beyond the pumping region collides with the side surfaces 123*ptc* of the tip portions 123*pt* of the projections 123 and is bounced to the side of the pumping region or, as indicated with dashed lines and dotted lines, is returned to the pumping region along the side surfaces 123*bdc* of the body portions 123*bd* and the side surfaces 123*ptc* of the tip portions 123*pt* of the projections 123. Therefore, it is preferable that the projections 123 are formed on the inner periphery surface 22 of the end-face lip 21 so that part on the side of the inner ends 123*a* of the tip portions 123*pt* enters the pumping region. Because it can be considered that a width of the pumping region in the radial direction changes in accordance with rotation speed of the shaft 52, it is preferable that part on the side of the inner ends 123*a* of the projections 123 is formed so as to enter the pumping region regardless of the rotation speed of the shaft 52. Further, in the case where the whole projections 123 are formed so as to exist in the circular current region, the interval G from the outer edge 24*a* of the slinger contact portion 24 is set in a range where the target to be sealed which has oozed to the side of the circular current region beyond the pumping region can be returned to the pumping region again as described above.

Further, there is also a target to be sealed which is not bounced even if the target to be sealed hits against the side surfaces 123*ptc* of the tip portions 123*pt* of the projections 123, and, as indicated with dashed lines, further moves to the side of the root 21*b* of the end-face lip 21 beyond the side surfaces 123*ptc* of the tip portions 123*pt*. Therefore, it is preferable that the projections 123 are arranged so as to partially overlap with the projections 123 adjacent on the side of the rotation direction of the shaft 52 (slinger 3) when seen from the inner periphery side (outer side) to the outer periphery side (inner side) in the axis line x direction. Even if the target to be sealed further flows to the side of the root 21*b* of the end-face lip 21 beyond the side surface 123*ptc* of the tip portion 123*pt* of the projection 123, the target to be sealed which has moved beyond the side surface 123*ptc* of this tip portion 123*pt* hits against the side surface 123*bdc* of the body portion 123*bd* of the projection 123 which is adjacent on the side of the rotation direction of the slinger 3, so that the target to be sealed can be returned to the pumping region from the side surface 123*bdc* of the body portion 123*bd* along the side surface 123*ptc* of the tip portion 123*pt*.

Further, as an intrusion angle of the target to be sealed which intrudes into the inner periphery surface 22 of the end-face lip 21 becomes closer to parallel to the rotation direction of the slinger, the target to be sealed which has moved beyond the side surface 123*ptc* of the tip portion 123*pt* of the projection 123 sequentially hits against the side surface 123*ptc* of the tip portion 123*pt* of the projection 123 adjacent on the side of the rotation direction of the slinger 3, and, further, the side surface 123*ptc* of the tip portion 123*pt* of the adjacent projection 123, . . . , and, finally, the target to be sealed is led to the inner end 123*a* along the side surface 123*ptc* of the tip portion 123*pt* of the projection 123. In this case, the end-face lip 21 can return the target to be sealed to the pumping region while progression speed of the target to be sealed being made slower in a stepwise manner by the plurality of projections 123. In this manner, because, as the intrusion angle of the target to be sealed becomes closer to parallel to the rotation direction of the slinger, the target to be sealed is returned to the pumping region after colliding with both the tip portions 123*pt* and the body portions 123*bd* of the projections 123 a plurality of times, it is possible to return the target to be sealed in the circular current region to the pumping region more reliably.

Further, to improve a function to return the target to be sealed to the pumping region by the projections 123 which are adjacent to each other as described above, and to make a portion where the projections 123 overlap with each other when seen from the inner periphery side to the outer periphery side in the axis line x direction larger, it is preferable to adjust the extending direction (angle) of the projections 123 and an interval (pitch) between the projections 123 which are adjacent to each other. Further, it is preferable that the projections 123 are adjacent to each other at equal intervals so that the end-face lip 21 equally has the above-described functions of the projections 123 in the circumferential direction.

Figure 21A:
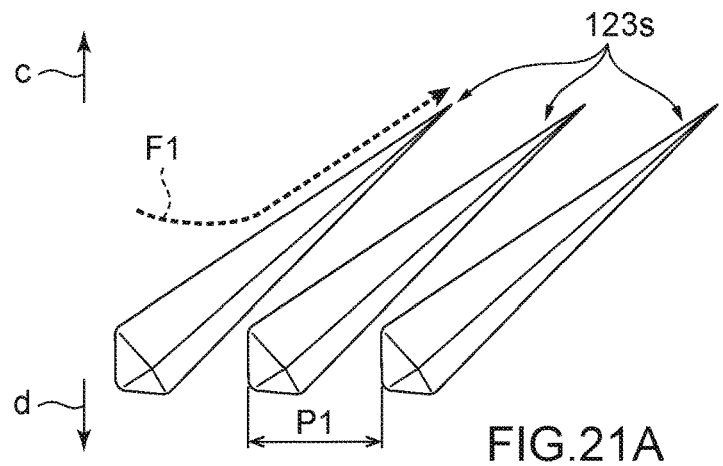
FIGS. 21A to 21C are diagrams for explaining a return effect by the target to be sealed of the projections.

Note that, as illustrated in FIG. 21A, in a case of the projections 123*s* which extend straight without being bent in the middle, to return the target to be sealed F1 to the pumping region effectively, it is necessary to dispose a number of projections 123*s* at a predetermined inclination angle as illustrated. However, because the projections 123*s* become gradually wider toward the side of the root 21*b* of the end-face lip 21, if the projections 123*s* are disposed while the projections 123*s* are made to tilt in this manner, because the projections 123*s* are more likely to contact each other while a pitch P1 between the projections 123*s* becomes wider, it is impossible to increase the number of projections 123*s*.

Figure 21B:
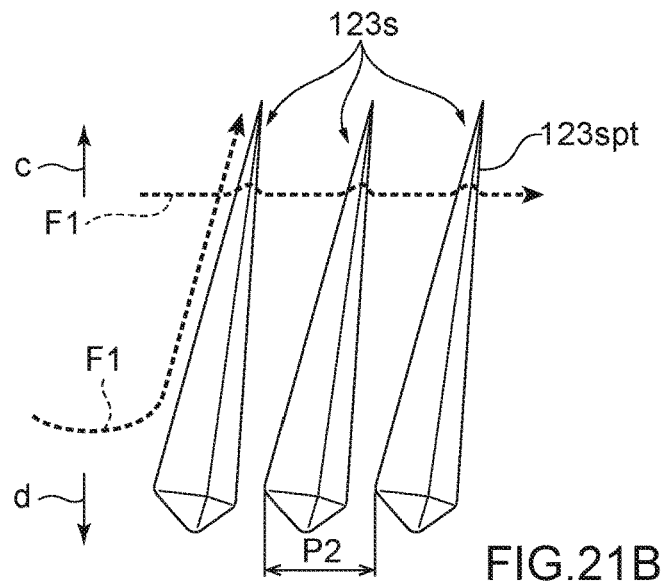

As illustrated in FIG. 21B, to increase the number of projections 123*s*, while a pitch P2 can be shortened by minimizing the inclination angle of the projections 123*s* with respect to the radial direction (cd direction) and making the projections 123*s* erect from the inner periphery side (d direction) toward the outer periphery side (c direction), because, in this case, inversely, the target to be sealed F1 collides with the tip portions 123*spt* where the height of the projections 123*s* is particularly low, at an angle close to vertical, the target to be sealed F1 is more likely to move beyond the tip portions 123*spt* of the projections 123*s*, and the target to be sealed F1 cannot be effectively returned to the pumping region.

Figure 21C:
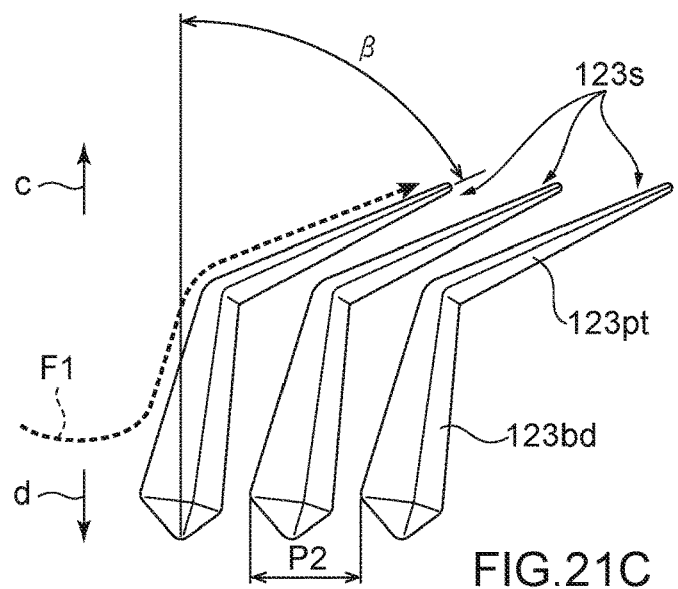

Therefore, as illustrated in FIG. 21C, as the projections 123 of the present disclosure, the body portions 123*bd* are disposed at a narrow pitch P2 so as to be along the radial direction (cd direction) as possible, and only the tip portions 123*pt* are made to tilt with respect to the body portions 123*bd* at a predetermined inclination angle β. By this means, at the end-face lip 21, it is possible to increase the number of projections 123 as much as possible, and it is possible to return the target to be sealed F1 to the pumping region effectively by the tilting tip portions 123*pt*, so that it is possible to realize two conflicting effects of increase of the number of projections 123 and improvement in a return effect of the target to be sealed F1.

In this manner, in the sealing apparatus 300, even if the target to be sealed further oozes to the circular current region beyond the pumping region where the pumping action is exerted, it is possible to effectively return this target to be sealed which has oozed to the pumping region by the plurality of projections 123 and it is possible to further return the target to be sealed to the side of the target to be sealed by the pumping action. In this manner, according to the sealing apparatus 300, it is possible to cause the pumping action exerted by the groove 33 formed at the slinger 3 to be exerted more effectively by the plurality of projections 123 formed at the end-face lip 21, so that it is possible to suppress ooze of the target to be sealed compared to the related art. Further, because the projections 123 do not contact the slinger 3, according to the sealing apparatus 300, it is possible to suppress ooze of the target to be sealed without increasing sliding resistance to the slinger 3.

The pumping action based on the groove 33 of the slinger 3 is reduced as rotation speed of the slinger 3 becomes higher. It can be considered that this is because the pumping region contracts toward the side of the slinger contact portion 24 and the lip contact portion 32 as the rotation speed of the slinger 3 becomes higher. Therefore, in the case where the target to be sealed oozes from the side of the target to be sealed to the narrow space S, the target to be sealed which enters the circular current region increases as the rotation speed of the slinger 3 becomes higher. If an amount of the target to be sealed which circulates in the circular current region exceeds an amount of the target to be sealed which can be retained in the circular current region, the target to be sealed further oozes inside, and there is a case where the target to be sealed further oozes outside the sealing apparatus 300.

In the sealing apparatus 300 according to the third embodiment of the present disclosure, as described above, even if the target to be sealed oozes to the circular current region beyond the pumping region, it is possible to return this target to be sealed which has oozed to the pumping region by the plurality of projections 123, and it is possible to further return the target to be sealed to the side of the target to be sealed by the pumping action. Therefore, even if the target to be sealed which is retained in the circular current region increases as a result of the rotation speed of the slinger 3 becoming higher, it is possible to return this target to be sealed which is retained in the circular current region to the pumping region by the plurality of projections 123, and it is possible to suppress the amount of the target to be sealed which circulates in the circular current region to exceed the amount of the target to be sealed which can be retained in the circular current region. Further, even if the pumping action is reduced by high-speed rotation of the slinger 3, because the target to be sealed is returned to the pumping region by the plurality of projections 123, it is possible to increase the target to be sealed which can be returned to the side of the target to be sealed by the pumping action upon high-speed rotation of the slinger 3. Also in this case, the speed of the target to be sealed which circulates in the circular current region becomes higher as the rotation speed of the shaft 52 becomes higher, the target to be sealed which is retained in the circular current region is further more likely to be led to the pumping region.

In this manner, according to the sealing apparatus 300 according to the third embodiment of the present disclosure, even in the case where the pumping action by the groove 33 of the slinger 3 is utilized, it is possible to suppress ooze of the target to be sealed regardless of a value of the rotation speed of the shaft 52.

Further, it can be estimated that the following effects can be obtained also in the sealing apparatus 300 according to the third embodiment. In accordance with rotation of the slinger 3, flow of air in the rotation direction of the slinger 3 occurs in the narrow space S formed by the end-face lip 21 and the slinger 3. This air is led to the side of the tip 21a of the end-face lip 21 by colliding with the projections 123 on the inner periphery surface 22 of the end-face lip 21 and flows toward the slinger contact portion 24.

As a result, because the flow of air occurring from the narrow space S to the side of the slinger contact portion 24 by the presence of the projections 123 functions to push back a lubricant oozing from the side of the target to be sealed to the narrow space S, to the pumping region, it is possible to reduce ooze of the lubricant.

Particularly, because such flow of air becomes higher as the rotation speed of the slinger 3 becomes higher, the flow of air becomes faster, and strength of air flowing from the tip 21a of the end-face lip 21 to the side of the target to be sealed increases, so that the function to push back the lubricant to the pumping region becomes further strong. In this manner, according to the sealing apparatus 300, even in the case where the rotation speed of the shaft 52 becomes higher, it is possible to suppress ooze of the target to be sealed by the effect of flow of air occurring by the projections 123.

While the preferred third embodiment of the present disclosure has been described above, the present disclosure is not limited to the above-described sealing apparatus 300 according to the third embodiment, and incorporates any aspect included in the concept of the present disclosure and the scope of the claims. Further, the respective configurations may be selectively combined as appropriate so that at least part of the above-described problems or effects can be solved or provided. Further, for example, the shapes, materials, arrangement, sizes, or the like, of the respective components in the above-described third embodiment can be changed as appropriate in accordance with specific usage aspect of the present disclosure.

Further, the shape of the cross-section orthogonal to the extending direction of the projections 123 may be various shapes as illustrated in FIG. 14A to FIG. 14D. While, in the sealing apparatus 300 according to the above-described third embodiment, the cross-sectional shape of the projections 123 is a triangle, a cross-sectional shape of the body portions 123bd and the tip portions 123pt of the projections 123 may be a shape in which the side surfaces 123bdc and 123ptc against which the target to be sealed to be returned hits extend while being at least partially orthogonal or substantially orthogonal to the inner periphery surface 22 of the end-face lip 21. That is, the cross-sectional shape of the projections 123 may be a right triangle or a substantially right triangle, or a substantially pentagon, or a substantially rectangle.

Figure 22:
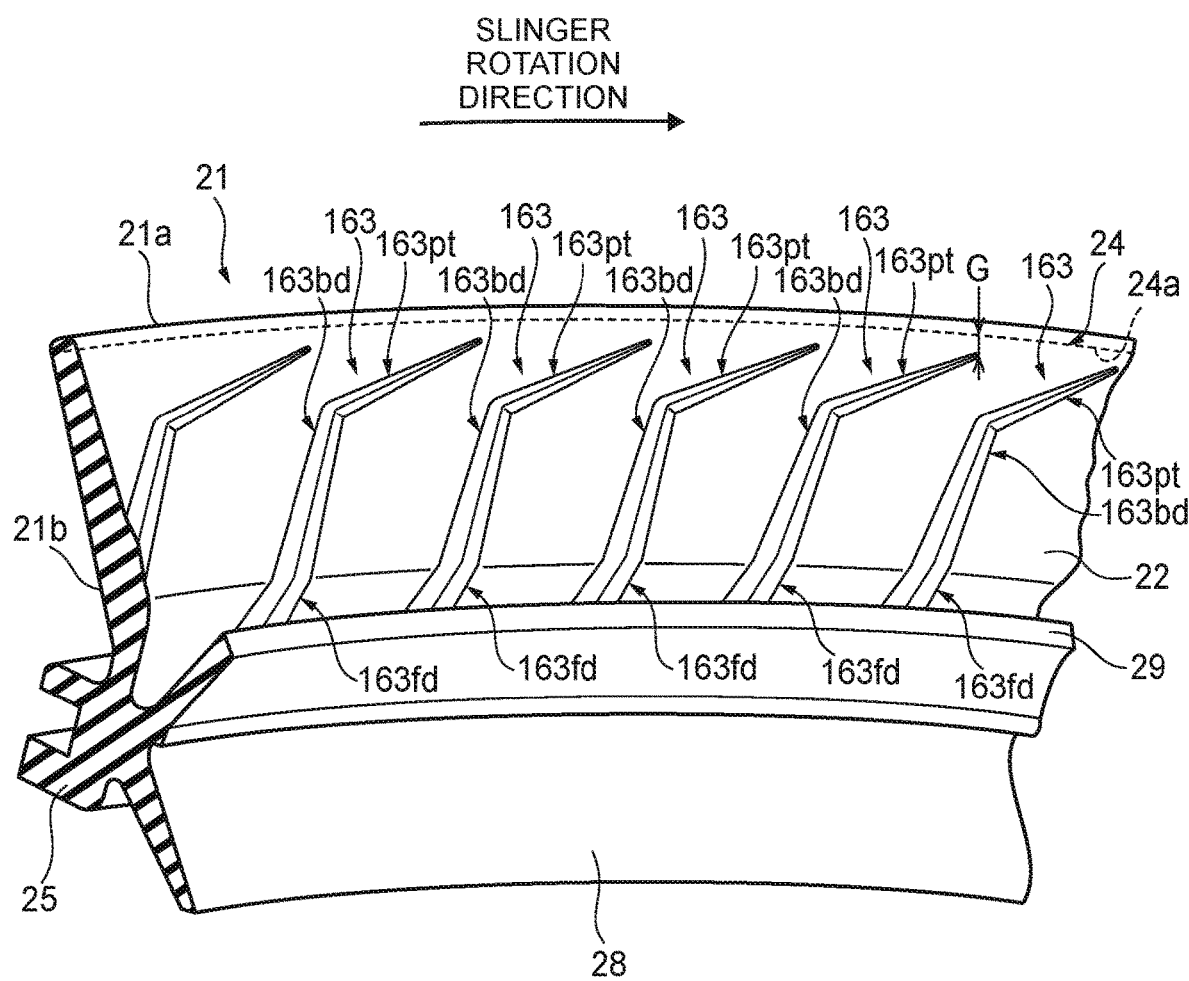
FIG. 22 is a partial perspective view of an elastic body portion for illustrating a modified example of a shape of tip portions of projections in the sealing apparatus illustrated in FIG. 16 in an extending direction.

As illustrated in FIG. 18, while a shape of the projections 123 in the extending direction is a substantially L shape including the body portions 123bd and the tip portions 123pt, the shape is not limited to this, and, as illustrated in FIG. 22, at the projections 163, in addition to the tip portions 163pt, the body portions 163bd may extend to a portion in the vicinity of a portion where the root 21b of the end-face lip 21 is connected to the intermediate lip 29. It is desirable that a plurality of tip portions 163pt of these plurality of projections 163 also partially overlap with each other when seen from the inner periphery side to the outer periphery side.

The body portions 163bd of the projections 163 have a triangular cross-sectional shape, have the same height from the inner periphery side toward the outer periphery side, and maintain the same cross-sectional area. However, the shape is not limited to this, and the body portions 163bd may have other various cross-sectional shapes such as a rectangle, may have a height which becomes gradually lower from the inner periphery side toward the outer periphery side, and may have a tapered shape.

Figure 23:
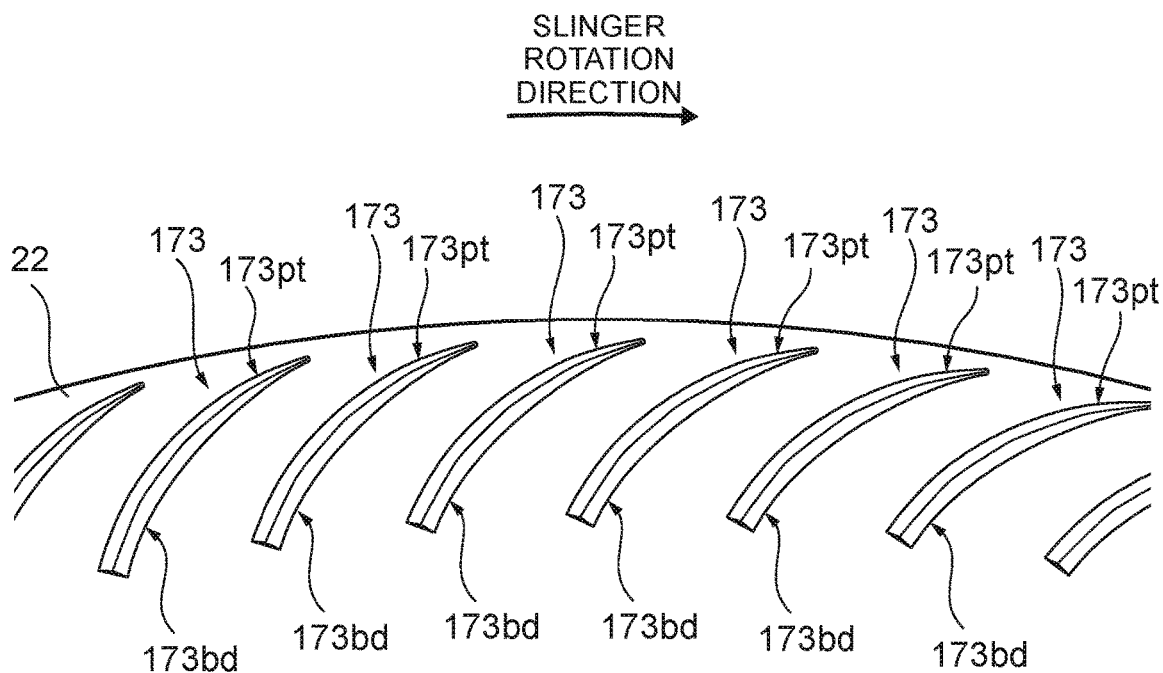
FIG. 23 is a diagram for illustrating a further modified example of the projections in the sealing apparatus.

While, in the sealing apparatus 300 according to the third embodiment, a case has been described where the plurality of projections 123 are arranged on the inner periphery surface 22 of the end-face lip 21, the present disclosure is not limited to this, and, as illustrated in FIG. 23, a plurality of projections 173 which expand in a convex shape toward the outer periphery side from the inner periphery side toward the outer periphery side of the end-face lip 21, which are curved from body portions 173bd to tip portions 173pt so as to be along the rotation direction of the shaft 52 (slinger 3), and which extend in a curved shape, may be arranged. Also at the projections 173, the tip portions 173pt extend so as to be along the rotation direction of the shaft 52 (slinger 3). Note that, also in this case, a plurality of tip portions 173pt of the plurality of projections 173 are arranged so as to alternately partially overlap with each other when seen from the inner periphery side to the outer periphery side. In this case, it is possible to return the target to be sealed to the pumping region along curved surfaces of the body portions 173bd and the tip portions 173pt more smoothly with the projections 173 than with the projections 123 in the third embodiment.

Figure 24:
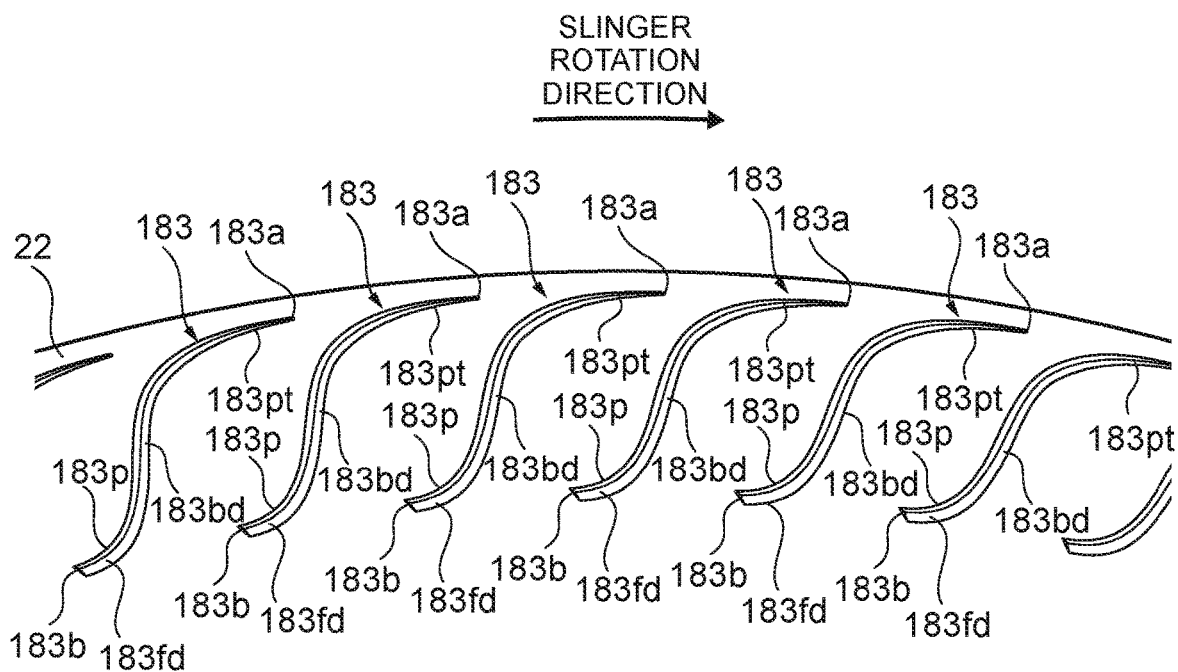
FIG. 24 is a diagram for illustrating a further modified example of the projections in the sealing apparatus.

Further, while, in the sealing apparatus 300 according to the embodiment, a case has been described where a plurality of projections 123 are arranged on the inner periphery surface 22 of the end-face lip 21, the present disclosure is not limited to this, and, as illustrated in FIG. 24, a plurality of projections 183 having a substantially S shape in which base end portions 183fd on the inner periphery side, tip portions 183pt on the tip side, and body portions 183bd which connect the base end portions 183fd and the tip portions 183pt with smooth curved lines are integrated, may be arranged. The projections 183 also extend so that at least the tip portions 183pt are along the rotation direction of the shaft 52 (slinger 3). Note that, also in this case, the projections 183 are arranged so that the plurality of tip portions 183pt of the plurality of projections 183 alternately partially overlap with each other when seen from the inner periphery side to the outer periphery side. In this case, concave portions 183p which are concave toward the inner periphery side are formed by the base end portions 183fd and the body portions 183bd, and the target to be sealed can be smoothly returned to the pumping region along the curved surfaces of the projections 183 while the target to be sealed is received at the concave portions 183p.

Further, as described above, the shape of the groove 33 provided at the slinger 3 is not limited to the screw (four-start screw) shape as illustrated in FIG. 4, and may be other shapes. For example, as illustrated in FIG. 15A, the groove 33 may be a groove which extends in a radial manner centered on or substantially centered on the axis line x from the inner periphery side toward the outer periphery side or, as illustrated in FIG. 15B, may be a groove which extends while tilting in the circumferential direction.

While, in the sealing apparatus 300, the elastic body portion 20 includes the dust lip 28 and the intermediate lip 29, the elastic body portion 20 does not have to include the dust lip 28 and the intermediate lip 29, and may include only one of the dust lip 28 and the intermediate lip 29.

Further, while description has been provided that the sealing apparatus 300 according to the third embodiment is applied to a crank hole of an engine, an application target of the sealing apparatus according to the present disclosure is not limited to this, and the present disclosure can be applied to all configurations which can utilize effects provided by the present disclosure, such as other vehicles, general-purpose machine and industrial machine.

Fourth Embodiment

Figure 25:
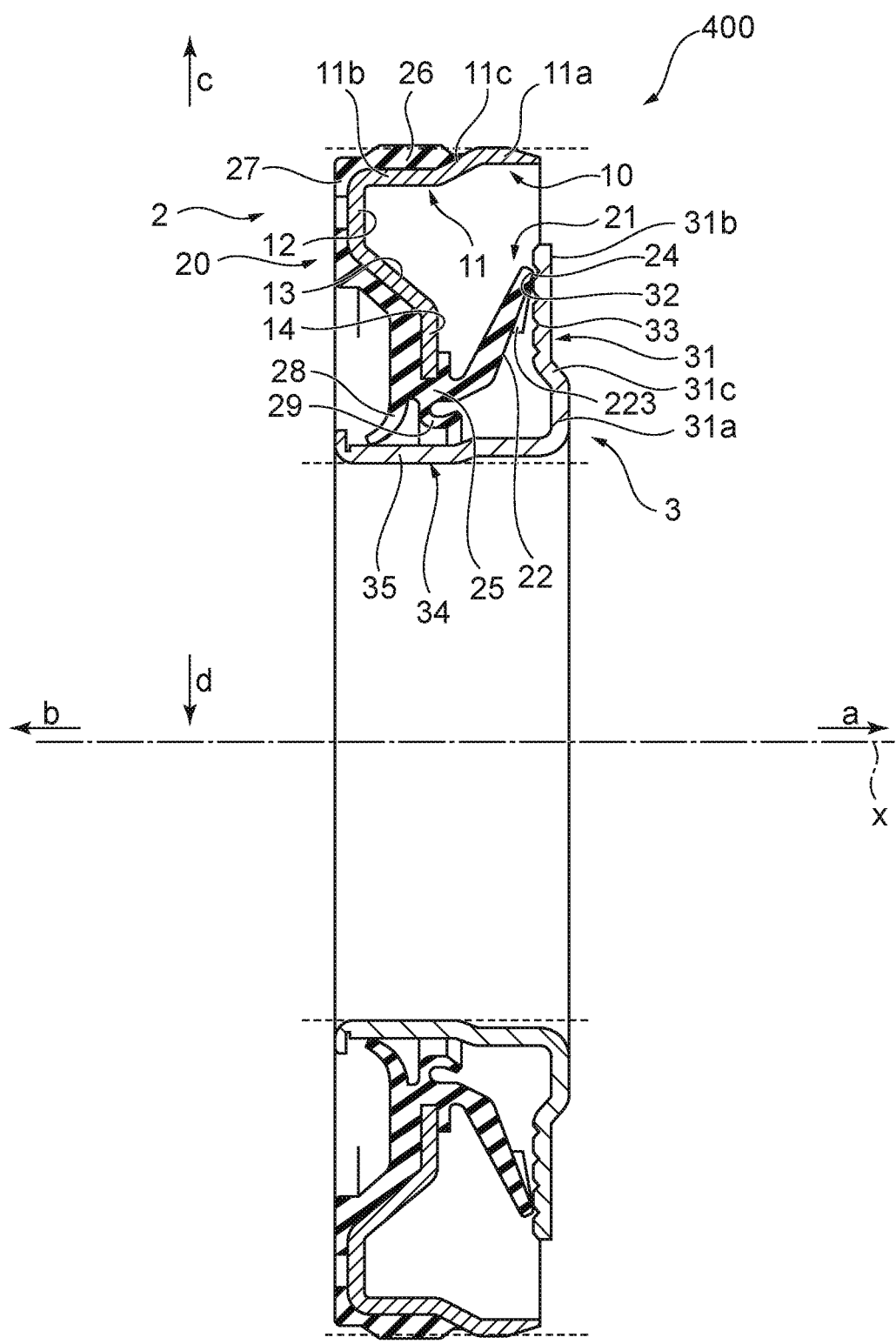
FIG. 25 is a cross-sectional diagram on a cross-section along an axis line x for illustrating a schematic configuration of a sealing apparatus according to a fourth embodiment of the present disclosure.
Figure 26:
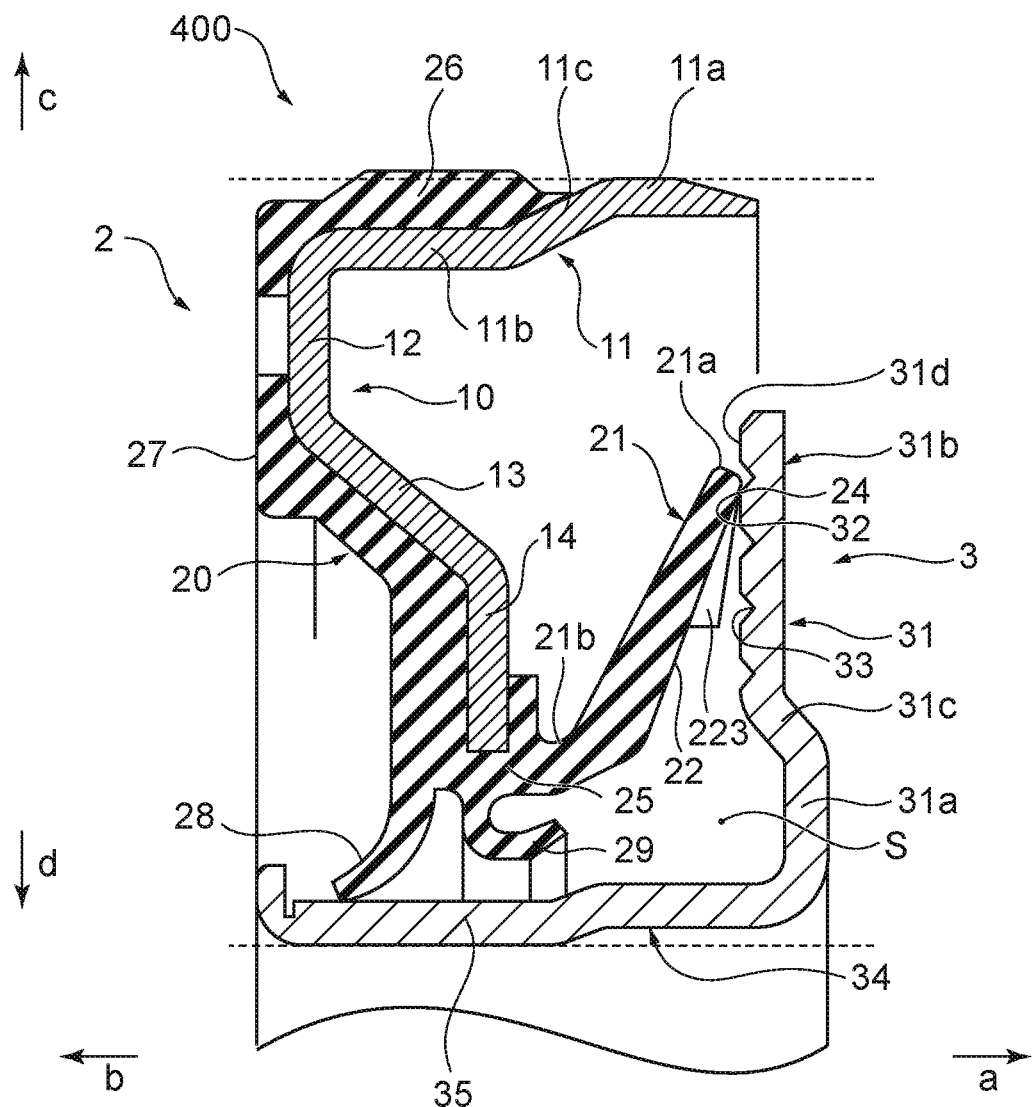
FIG. 26 is a partially enlarged cross-sectional diagram illustrating enlarged part of the cross-section along the axis line of the sealing apparatus according to the fourth embodiment of the present disclosure.

FIG. 25 is a cross-sectional diagram on a cross-section along an axis line x for illustrating a schematic configuration of a sealing apparatus 400 according to a fourth embodiment of the present disclosure, and FIG. 26 is a partially enlarged cross-sectional diagram illustrating enlarged part of the cross-section along the axis line x of the sealing apparatus 400 according to the fourth embodiment of the present disclosure. The sealing apparatus 400 according to the fourth embodiment is a sealing apparatus for sealing an annular gap between a shaft and a hole into which this shaft is to be inserted, and is used to seal a gap between a shaft and a hole (shaft hole) which is formed at a housing, or the like, and into which this shaft is to be inserted at a vehicle and general-purpose machine. For example, the sealing apparatus is used to seal annular space between a crank shaft of an engine and a crank hole which is a shaft hole formed at a front cover, a cylinder block and a crank case. Note that a target to which the sealing apparatus 400 according to the fourth embodiment of the present disclosure is applied is not limited to the above.

Hereinafter, for the purpose of illustration, a direction of an arrow a (see FIG. 26) in the axis line x direction (one side in the axis line direction) is set as an inner side, a direction of an arrow b (see FIG. 26) in the axis line x direction (another side in the axis line direction) is set as an outer side. More specifically, the inner side is a side of space to be sealed (side of the target to be sealed) and a side of space where the target to be sealed such as a lubricant exists, and the outer side is an opposite side of the inner side. Further, in a direction perpendicular to the axis line x (hereinafter, also referred to as a "radial direction"), a direction away from the axis line x (a direction of an arrow c in FIG. 26) is set as an outer periphery side, and a direction approaching the axis line x (a direction of an arrow d in FIG. 26) is set as an inner periphery side.

As illustrated in FIG. 26, the sealing apparatus 400 includes a sealing apparatus body 2 to be fitted into a hole as an attachment target which will be described later, and a slinger 3 to be attached to a shaft as an attachment target which will be described later. The sealing apparatus body 2 includes a reinforcing ring 10 annular around the axis line x, and an elastic body portion 20 which is formed with an elastic body attached to the reinforcing ring 10 and which is annular around the axis line x. The slinger 3 includes a flange portion 31 which is a portion extending toward the outer periphery side (the direction of the arrow c) and annular around the axis line x. The elastic body portion 20 includes an end-face lip 21 which is a lip extending toward one side (inner side, the direction of the arrow a) in the axis line x direction, contacting the flange portion 31 from another side (outer side, the side of the direction of the arrow b) in the axis line x direction and annular around the axis line x.

At least one groove 33 is formed on the other side (outer side) of the flange portion 31 of the slinger 3, and a plurality of main projections 223 are formed side by side in a circumferential direction on a surface on the inner periphery side (inner periphery surface 22) of the end-face lip 21. As will be described later, the main projections 223 extend in a spiral manner in a rotation direction of the shaft 52 (slinger 3) which will be described later from the other side (outer side) toward the one side (inner side), and are formed on the inner periphery side of a slinger contact portion 24 which is a portion where the end-face lip 21 contacts the slinger 3 at the end-face lip 21.

Note that, because basic configurations of the sealing apparatus body 2 and the slinger 3 of the sealing apparatus 400 are the same as those of the sealing apparatus body 2 and the slinger 3 of the sealing apparatus 1 in the first embodiment, description will be omitted here, and points of different configurations will be described.

Figure 27:
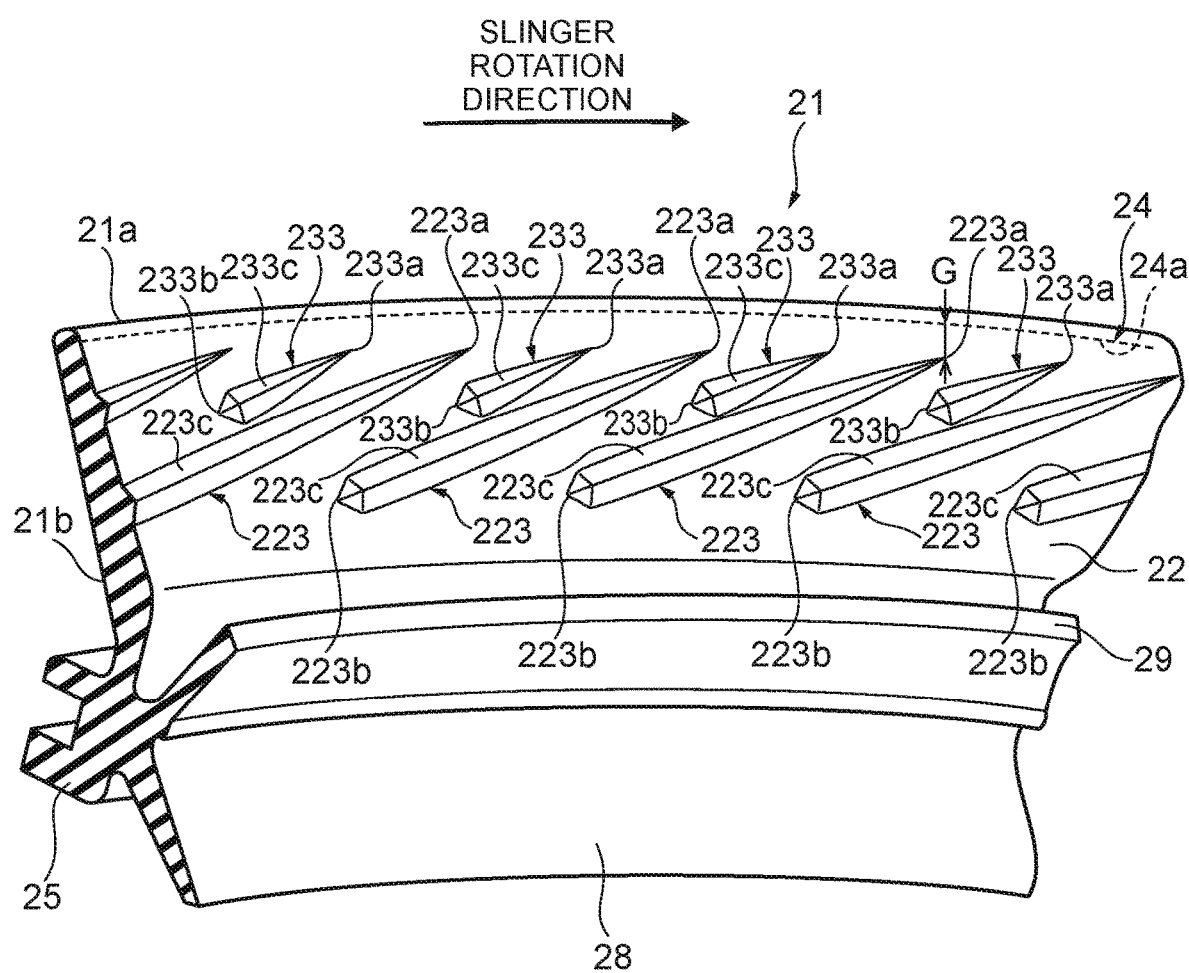
FIG. 27 is a partially enlarged perspective view of an elastic body portion in the sealing apparatus illustrated in FIG. 25 in a state where the elastic body portion at a portion on an inner periphery side from a base portion is cut on a plane along the axis line.

The shape of the end-face lip 21 will be described next in more detail. FIG. 27 is a partially enlarged perspective view of the elastic body portion 20 seen from the inner periphery side, in a state where the elastic body portion 20 at a portion from the inner periphery side of the base portion 25 is cut on a plane along the axis line x. As illustrated in FIG. 27, the plurality of main projections 223 are arranged at equal angular intervals or substantially equal angular intervals in the circumferential direction and at equal pitch intervals or substantially equal pitch intervals on the same or substantially the same circumference on the inner periphery surface 22 of the end-face lip 21. As described above, the respective main projections 223 extend in a spiral manner in the rotation direction of the shaft 52 (slinger 3) which will be described later from the outer side (lower side in FIG. 27) toward the inner side (upper side in FIG. 27). That is, the respective main projections 223 extend from the side of the root 21b of the end-face lip 21 toward the side of the tip 21a of the end-face lip 21 while tilting in the rotation direction of the slinger 3.

Further, the respective main projections 223 are formed at intervals from the slinger contact portion 24, and are formed on the inner periphery side (outer side) of the slinger contact portion 24, that is, on the side of the root 21b of the end-face lip 21, of the slinger contact portion 24.

At the end-face lip 21, the main projections 223 are formed at intervals from the slinger contact portion 24. Specifically, as illustrated in FIG. 27, inner ends 223a which are end portions on the inner side (outer periphery side) of the main projections 223 are located at positions away from an outer edge 24a which is an edge portion on the outer side (inner periphery side) of the slinger contact portion 24 by a predetermined interval G in a direction along the axis line x along the inner periphery surface 22. This interval G is an interval such that the main projections 223 at least partially exist in a region on the inner periphery side of a region where pumping action based on the groove 33 of the slinger 3 occurs in a state where the sealing apparatus 1 is used which will be described later.

Further, as illustrated in FIG. 26, the respective main projections 223 are formed in a shape such that the main projections 223 do not contact the slinger 3 in the state where the sealing apparatus 400 is used. That is, a height of the main projections 223 from the inner periphery surface 22 and the interval G are set so that the main projections 223 do not contact an outer side surface 31d which is a surface on the outer side of the flange portion 31 of the slinger 3 in the usage state. While, in the fourth embodiment, as illustrated in FIG. 26 and FIG. 27, the height of the main projections 223 from the inner periphery surface 22 becomes higher from the inner ends 223a toward outer ends 223b which are end portions on the side of the root 21b of the end-face lip 21, the height of the main projections 223 from the inner periphery surface 22 is not limited to this. The height of the main projections 223 from the inner periphery surface 22 may be fixed from the inner ends 223a to the outer ends 223b or the height from the inner periphery surface 22 may become lower from the inner ends 223a toward the outer ends 223b. Further, the height of the main projections 223 from the inner periphery surface 22 from the inner ends 223a toward the outer ends 223b may be various kinds of combination of the above-described becoming higher, becoming lower, being fixed, or the like. Further, a shape of the cross-section of the main projections 223 orthogonal to the extending direction may be various shapes such as, for example, a triangle, a rectangle and an inverted U shape. Because the main projections 223 are formed in a shape such that the main projections 223 do not contact the slinger 3 in the state where the sealing apparatus 400 is used, sliding resistance to the slinger 3 does not increase by the main projections 223.

Further, as illustrated in FIG. 27, the shape of the main projections 223 in the extending direction is a shape which is tapered from the outer ends 223b toward the inner ends 223a. However, the shape is not limited to this, and the shape may be various shapes such as a shape in which a width in a direction orthogonal to the extending direction is fixed between the outer ends 223b and the inner ends 223a. Further, the main projections 223 may extend straight between the inner ends 223a and the outer ends 223b along the rotation direction of the slinger 3 or may extend in a curved manner while being slightly curved. The tips of the main projections 223 having a tapered shape or having a shape which is smoothly connected to the inner periphery surface 22 of the end-face lip 21 are preferable in that the main projections 223 can be made to extend closer to the side of the tip 21a of the end-face lip 21 without the main projections 223 being brought into contact with the slinger 3, and are preferable in formability.

Further, in addition to the plurality of main projections 223, sub-projections 233 are formed on the inner periphery surface 22 of the end-face lip 21. Specifically, sub-projections 233 which have the same shape as that of the main projections 223, but which has a shorter entire length than that of the main projections 223 are arranged between the plurality of main projections 223. That is, the sub-projections 233 are arranged at equal angular intervals or substantially equal angular intervals in the circumferential direction and at equal pitch intervals or substantially equal pitch intervals on the same or substantially the same circumference in a similar manner to the main projections 223. While the sub-projections 233 have substantially the same outer diameter as that of the main projections 223, the outer diameter of the sub-projections 233 may be slightly larger or slightly smaller than that of the main projections 223. Further, the sub-projections 233 may extend straight between the inner ends 233a and the outer ends 233b or extend in a curved shape in a similar manner to the main projections 223. That is, while the main projections 223 extend straight between the inner ends 223a and the outer ends 223b, the sub-projections 233 may extend while being curved between the inner ends 233a and the outer ends 233b and vice versa.

One sub-projection 233 is disposed between the plurality of main projections 223, and the main projections 223 and the sub-projections 233 are alternately arranged in the rotation direction of the slinger 3 such that the main projection 223, the sub-projection 233, the main projection 223, the sub-projection 233, . . . . However, two or more or an arbitrary number of sub-projections 233 may be disposed between the plurality of main projections 223. Because the sub-projections 233 have a shorter entire length than that of the main projections 223, on the side of the outer ends 223b of the main projections 223, the sub-projections 233 do not exist in the rotation direction of the slinger 3, and only the main projections 223 successively exist. Note that also the tips of the sub-projections 233 having a tapered shape or a shape which is smoothly connected to the inner periphery surface 22 of the end-face lip 21 are preferable in that the sub-projections 233 can be made to extend closer to the side of the tip 21a of the end-face lip 21 without the sub-projections 233 being brought into contact with the slinger 3, and are preferable in formability. Because the slinger 3 is the same as the slinger 3 of the sealing apparatus 1 in the first embodiment, description thereof will be omitted here.

Figure 28:
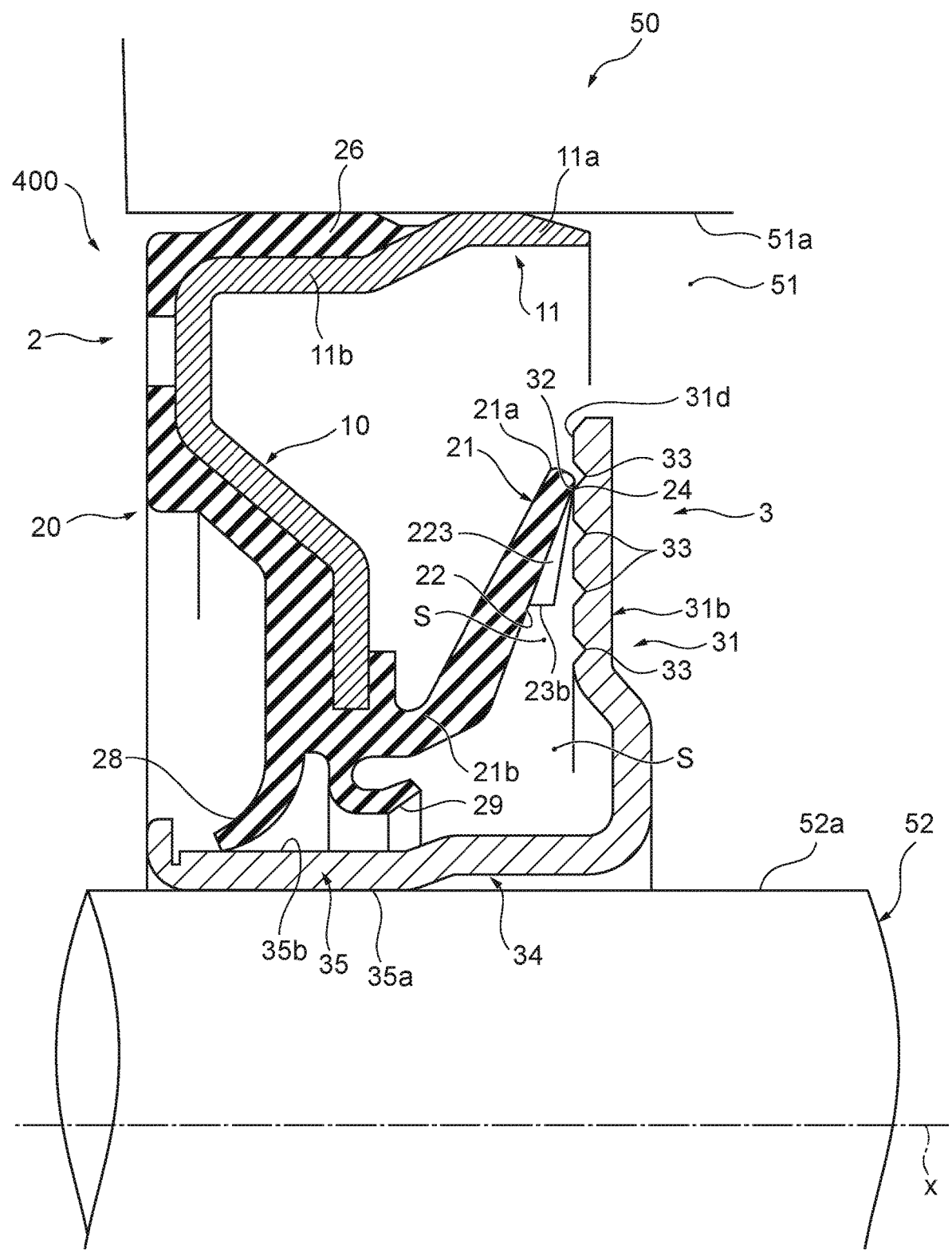
FIG. 28 is a partially enlarged cross-sectional diagram of the sealing apparatus in a usage state where the sealing apparatus according to the fourth embodiment of the present disclosure is attached to a housing and a shaft inserted into a shaft hole.

Action of the sealing apparatus 400 having the above-described configuration will be described next. FIG. 28 is a partially enlarged cross-sectional diagram of the sealing apparatus 400 in the usage state where the sealing apparatus 400 is attached to the housing 50 as an attachment target and the shaft 52 inserted into the shaft hole 51 which is a through-hole formed at this housing 50. In this case, while only the main projections 223 can be seen, the sub-projections 233 cannot be seen by being hidden behind the main projections 223. The housing 50 is, for example, a front cover of an engine, or a cylinder block and a crank case, and the shaft hole 51 is a crank hole formed at the front cover or the cylinder block and the crank case. Further, the shaft 52 is, for example, a crank shaft.

As illustrated in FIG. 28, in the state where the sealing apparatus 400 is used, the sealing apparatus body 2 is fitted into the shaft hole 51 by being pressed into the shaft hole 51, and the slinger 3 is attached to the shaft 52 by being interference-fitted at the shaft 52. More specifically, an outer periphery side cylindrical portion 11a of the reinforcing ring 10 contacts an inner periphery surface 51a of the shaft hole 51, so that a shaft center of the sealing apparatus body 2 is made to match a shaft center of the shaft hole 51, and the gasket portion 26 tightly contacts the inner periphery surface 51a of the shaft hole 51 by the gasket portion 26 of the elastic body portion 20 being compressed in a radial direction between the inner periphery surface 51a of the shaft hole 51 and an inner periphery side cylindrical portion 11b of the reinforcing ring 10, so that sealing between the sealing apparatus body 2 and the shaft hole 51 is realized. Further, a cylindrical portion 35 of the slinger 3 is pressed into the shaft 52, and an inner periphery surface 35a of the cylindrical portion 35 tightly contacts an outer periphery surface 52a of the shaft 52, so that the slinger 3 is fixed at the shaft 52.

In the state where the sealing apparatus 400 is used, relative positions between the sealing apparatus body 2 and the slinger 3 in the axis line x direction are determined so that the end-face lip 21 of the elastic body portion 20 contacts the lip contact portion 32 which is a portion of an outer side surface 31d of an outer periphery side disk portion 31b of the flange portion 31 of the slinger 3 at the slinger contact portion 24 which is a portion on the side of the tip 21a of the inner periphery surface 22. Further, the dust lip 28 contacts the tubular portion 34 of the slinger 3 from the outer periphery side at a portion on the tip side. The dust lip 28, for example, contacts the outer periphery surface 35b of the cylindrical portion 35 of the slinger 3.

In this manner, in the state where the sealing apparatus 400 is used, the end-face lip 21 contacts the lip contact portion 32 of the flange portion 31 at the slinger contact portion 24 so as to be able to slide, and the end-face lip 21 and the slinger 3 prevent the target to be sealed such as a lubricant from oozing inside from the side of the target to be sealed beyond the slinger contact portion 24 and the lip contact portion 32. Further, the dust lip 28 contacts the inner periphery surface of the tubular portion 34 of the slinger 3 so as to be able to slide to thereby to try to prevent a foreign matter from entering inside from outside.

Further, in the state where the sealing apparatus 400 is used, the groove 33 which forms a four-start screw formed at the outer periphery side disk portion 31b of the flange portion 31 of the slinger 3 exerts pumping action in the case where the shaft 52 (slinger 3) rotates. By rotation of the shaft 52 (slinger 3), pumping action occurs in a region in the vicinity of the slinger contact portion 24 and the lip contact portion 32 in narrow space S which is space between the flange portion 31 and the end-face lip 21. By this pumping action, even in the case where the target to be sealed oozes from the side of the target to be sealed to the narrow space S, the target to be sealed which has oozed is returned from the narrow space S to the side of the target to be sealed beyond the slinger contact portion 24 and the lip contact portion 32. In this manner, by the pumping action caused by the groove 33 formed at the flange portion 31 of the slinger 3, ooze of the target to be sealed to the narrow space S is suppressed.

In the narrow space S, the target to be sealed which has further oozed to the outer side beyond the pumping region where the pumping action by the groove 33 occurs rotates around the axis line x in the rotation direction of the slinger 3 in a region adjacent to the pumping region on the inner periphery side by rotation of the shaft 52 and is retained in the circular current region.

At the end-face lip 21, the main projections 223 and the sub-projections 233 are alternately formed on the inner periphery surface 22 along the rotation direction of the slinger 3, and the main projections 223 and the sub-projections 233 extend toward the inner periphery side of positions away from the outer edge 24a of the slinger contact portion 24 by the interval G and at least partially extend in the circular current region. Therefore, the target to be sealed which is retained in the circular current region while rotating collides with the main projections 223 and the sub-projections 233, or the target to be sealed which is retained in the circular current region while rotating is led from the side of the outer ends 223b and the side of the outer ends 233b which are end portions on the outer side (inner periphery side) of the main projections 223 and the sub-projections 233 to the inner ends 223a and the inner ends 233a which are end portions on the inner side (outer periphery side) along the main projections 223 and the sub-projections 233, and the target to be sealed which is retained in the circular current region is led to the pumping region. The target to be sealed which is led to the pumping region by the main projections 223 and the sub-projections 233 is returned to the side of the target to be sealed by receiving the pumping action.

Figure 29:
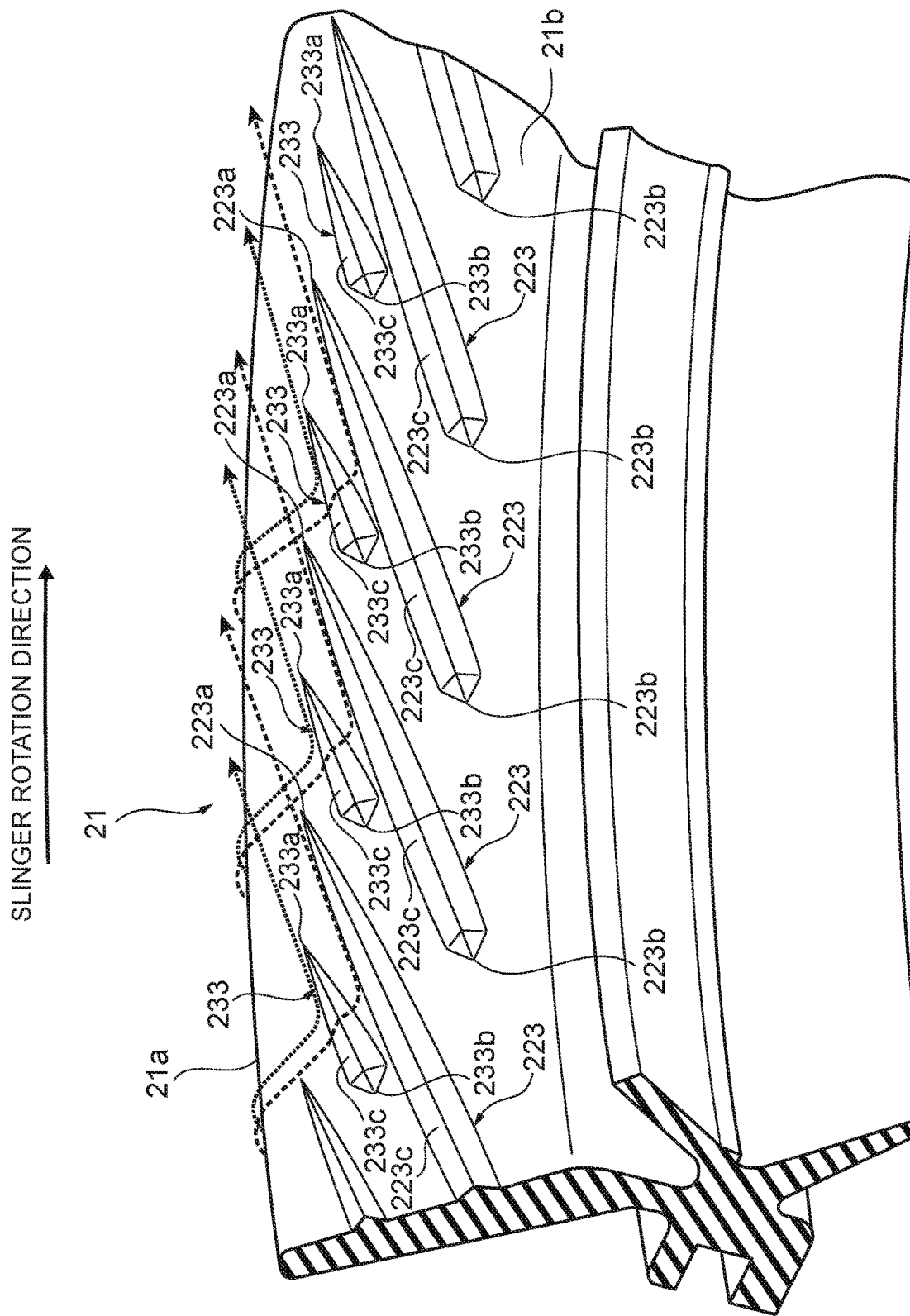
FIG. 29 is a diagram for illustrating aspect of flow of a target to be sealed by action of projections of an end-face lip.

FIG. 29 is a diagram for illustrating aspect of flow of the target to be sealed by action of the main projections 223 and the sub-projections 233 of the end-face lip 21, for explaining the action of the main projections 223 and the sub-projections 233 of the end-face lip 21. In FIG. 29, as indicated with dashed lines, the target to be sealed which has oozed to the side of the circular current region beyond the pumping region collides with side surfaces 233c as well as side surfaces 223c which are side surfaces facing on the outer periphery side of the sub-projections 233 and the main projections 223, and is bounced to the side of the pumping region, or, as indicated with dashed lines and dotted lines, is led to the inner ends 223a and the inner ends 233a along the side surfaces 223c and the side surfaces 233c of the main projections 223 and the sub-projections 233, and is returned to the pumping region from the inner ends 223a and the inner ends 233a. Therefore, it is preferable that the main projections 223 are formed on the inner periphery surface 22 of the end-face lip 21 so that part on the side of the inner ends 223a enters the pumping region. Further, it is preferable that the sub-projections 233 are also formed on the inner periphery surface 22 of the end-face lip 21 so that all of the sub-projections 233 or part on the side of the inner ends 233a enters the pumping region. Because it can be considered that a width of the pumping region in the radial direction changes in accordance with the rotation speed of the shaft, it is preferable that part of the main projections 223 on the side of the inner ends 223a or part of the sub-projections 233 on the side of the inner ends 233a is formed so as to enter the pumping region regardless of the rotation speed of the shaft. Further, in the case where the whole main projections 223 and the whole sub-projections 233 are formed so as to exist in the circular current region, the interval G from the outer edge 24a of the slinger contact portion 24 is set in a range where the target to be sealed which has oozed to the side of the circular current region beyond the pumping region can be returned to the pumping region again as described above.

Further, there is also a target to be sealed which is not bounced even if the target to be sealed hits against the side surfaces 223c of the main projections 223 or the side surfaces 233c of the sub-projections 233, and is not led to the inner ends 223a and the inner ends 233a along the side surfaces 223c and the side surfaces 233c, and, as indicated with dashed lines, further proceeds to the side of the root 21b of the end-face lip 21 beyond the side surfaces 223c and the side surfaces 233c. Therefore, it is preferable that the main projections 223 and the sub-projections 233 are arranged so as to partially overlap with the sub-projection 233 and the main projection 223 adjacent on the side of the rotation direction of the shaft 52 (slinger 3) when seen from the inner periphery side (outer side) to the outer periphery side (inner side) in the axis line x direction. As indicated with dashed lines in a left part of FIG. 29, even if the target to be sealed flows to the side of the root 21b of the end-face lip 21 beyond the side surface 233c of the sub-projection 233 on the side of the inner end 233a, the target to be sealed which has moved beyond the sub-projection 233 hits against the side surface 223c of the main projection 223 adjacent on the side of the rotation direction of the slinger 3, and the target to be sealed is led to the inner end 223a along the side surface 223c, and can be returned to the pumping region from the inner end 223a. Further, even in the case where there is a target to be sealed which has moved beyond the side surface 223c of the main projection 223, because the target to be sealed hits against the side surface 223c of the adjacent main projection 223 and is led to the inner end 223a along the side surface 223c, in this case, it is possible to return the target to be sealed to the pumping region while making progression speed of the target to be sealed slower in three steps. However, if the intrusion angle of the target to be sealed is closer to parallel to the rotation direction of the slinger, because the target to be sealed collides with both the sub-projections 233 and the main projections 223 a plurality of times, it is possible to more reliably avoid a situation where the target to be sealed oozes from the pumping region to the side of the circular current region.

Further, to improve a function to return the target to be sealed to the pumping region by the main projections 223 and the sub-projections 233 which are adjacent to each other as described above, and to make a portion where the main projections 223 overlap with the sub-projections 233 when seen from the inner periphery side to the outer periphery side in the axis line x direction larger, it is preferable to adjust the extending direction (angle) of the main projections 223 and the sub-projections 233 and the interval (pitch) between the main projections 223 and the sub-projections 233 which are adjacent to each other. Further, it is preferable that the main projections 223 and the sub-projections 233 are adjacent to each other at equal intervals so that the end-face lip 21 equally has the above-described functions of the main projections 223 and the sub-projections 233 in the circumferential direction.

In this manner, in the sealing apparatus 400, even if the target to be sealed further oozes to the circular current region beyond the pumping region where the pumping action is exerted, it is possible to return this target to be sealed which has oozed to the pumping region by the main projections 223 and the sub-projections 233, and further return the target to be sealed to the side of the target to be sealed by the pumping action. In this manner, according to the sealing apparatus 400, it is possible to cause the pumping action exerted by the groove 33 formed at the slinger 3 to be exerted more effectively by the main projections 223 and the sub-projections 233 formed at the end-face lip 21, so that it is possible to suppress ooze of the target to be sealed compared to the related art. Further, because the main projections 223 and the sub-projections 233 do not contact the slinger 3, according to the sealing apparatus 400, it is possible to suppress ooze of the target to be sealed without increasing sliding resistance to the slinger 3.

The pumping action based on the groove 33 of the slinger 3 is reduced as the rotation speed of the slinger 3 becomes higher. It can be considered that this is because the pumping region contracts toward the side of the slinger contact portion 24 and the lip contact portion 32 as the rotation speed of the slinger 3 becomes higher. Therefore, in the case where the target to be sealed has oozed from the side of the target to be sealed to the narrow space S, the target to be sealed which enters the circular current region increases as the rotation speed of the slinger 3 becomes higher. If an amount of the target to be sealed which circulates in the circular current region exceeds an amount of the target to be sealed which can be retained in the circular current region, the target to be sealed further oozes inside, and there is a case where the target to be sealed further oozes outside the sealing apparatus 400.

In the sealing apparatus 400 according to the fourth embodiment of the present disclosure, as described above, even if the target to be sealed oozes to the circular current region beyond the pumping region, it is possible to return this target to be sealed which has oozed to the pumping region by the main projections 223 and the sub-projections 233, and further return the target to be sealed to the side of the target to be sealed by the pumping action. Therefore, even if the rotation speed of the slinger 3 becomes higher, and the target to be sealed which is retained in the circular current region increases, it is possible to return this target to be sealed which is retained in the circular current region to the pumping region by the main projections 223 and the sub-projections 233, so that it is possible to prevent the amount of the target to be sealed which is refluxed in the circular current region from exceeding the amount of the target to be sealed which can be retained in the circular current region. Further, even if the pumping action is reduced by high-speed rotation of the slinger 3, because the target to be sealed is returned to the pumping region by the main projections 223 and the sub-projections 233, it is possible to increase the target to be sealed which can be returned to the side of the target to be sealed by the pumping action upon high-speed rotation of the slinger 3. Also in this case, because speed of the target to be sealed which circulates in the circular current region becomes higher as the rotation speed of the shaft 52 becomes higher, the target to be sealed which is retained in the circular current region is further more likely to be led to the pumping region.

In this manner, according to the sealing apparatus 400 according to the fourth embodiment of the present disclosure, even in the case where the pumping action by the groove 33 of the slinger 3 is utilized, it is possible to suppress ooze of the target to be sealed regardless of a value of the rotation speed of the shaft 52.

Further, also in the sealing apparatus 400 according to the fourth embodiment, it can be estimated that the following effects can be obtained. Flow of air in the rotation direction of the slinger 3 occurs in the narrow space S formed by the end-face lip 21 and the slinger 3 in accordance with rotation of the slinger 3. This air is derived to the side of the tip 21*a* of the end-face lip 21 by colliding with the main projections 223 and the sub-projections 233 on the inner periphery surface 22 of the end-face lip 21, and flows toward the slinger contact portion 24.

As a result, because flow of air occurring from the narrow space S to the side of the slinger contact portion 24 by the presence of the main projections 223 and the sub-projections 233 functions to push back the lubricant which oozes from the side of the target to be sealed to the narrow space S, to the pumping region, it is possible to reduce ooze of the lubricant.

Particularly, because such flow of air becomes higher as the rotation speed of the slinger 3 becomes higher, the flow of air becomes faster, and strength of air flowing from the tip 21*a* of the end-face lip 21 to the side of the target to be sealed increases, so that the function to push back the lubricant to the pumping region becomes further strong.

Particularly, because, in addition to the main projections 223, the sub-projections 233 are provided, the flow of air becomes further stronger than in the case where only the main projections 223 are provided, and the function to push back the lubricant to the pumping region is exerted further effectively. In this manner, according to the sealing apparatus 400, even in the case where the rotation speed of the shaft 52 becomes higher, it is possible to suppress ooze of the target to be sealed by an effect of the flow of air occurring by the main projections 223 and the sub-projections 233.

Note that, in the sealing apparatus 400, while it is only necessary to increase the number of main projections 223 to improve an effect of suppressing ooze of the target to be sealed using only the main projections 223, there is limitation in increase of the number of main projections 223 within a range where the main projections 223 which are adjacent to each other do not contact each other. However, in the sealing apparatus 400, because the main projections 223 have a tapered shape, space in the circumferential direction can be created on the side of the tips of the adjacent main projections 223, and the sub-projections 233 can be naturally disposed there, so that it is possible to efficiently suppress ooze compared to the case where only the main projections 223 are provided. Particularly, in the sealing apparatus 400, because the sub-projections 233 are disposed at a tip portion closer to the outer periphery side where a circumferential length is longer on the inner periphery surface 22 of the end-face lip 21, it is possible to dispose further more sub-projections 233 than at a portion closer to the inner periphery side where the circumferential length is shorter on the inner periphery surface 22.

Fifth Embodiment

A sealing apparatus 500 according to a fifth embodiment of the present disclosure will be described below with reference to the drawings. The sealing apparatus 500 according to a 5th embodiment of the present disclosure is different from the sealing apparatus 400 according to the fourth embodiment of the present disclosure in a form of the elastic body portion. Hereinafter, the same reference numerals are assigned to components having functions which are the same as or similar to those of the above-described sealing apparatus 1 according to the first embodiment of the present disclosure and the sealing apparatus 400 according to the fourth embodiment, description thereof will be omitted, and only different part will be described.

Figure 30:
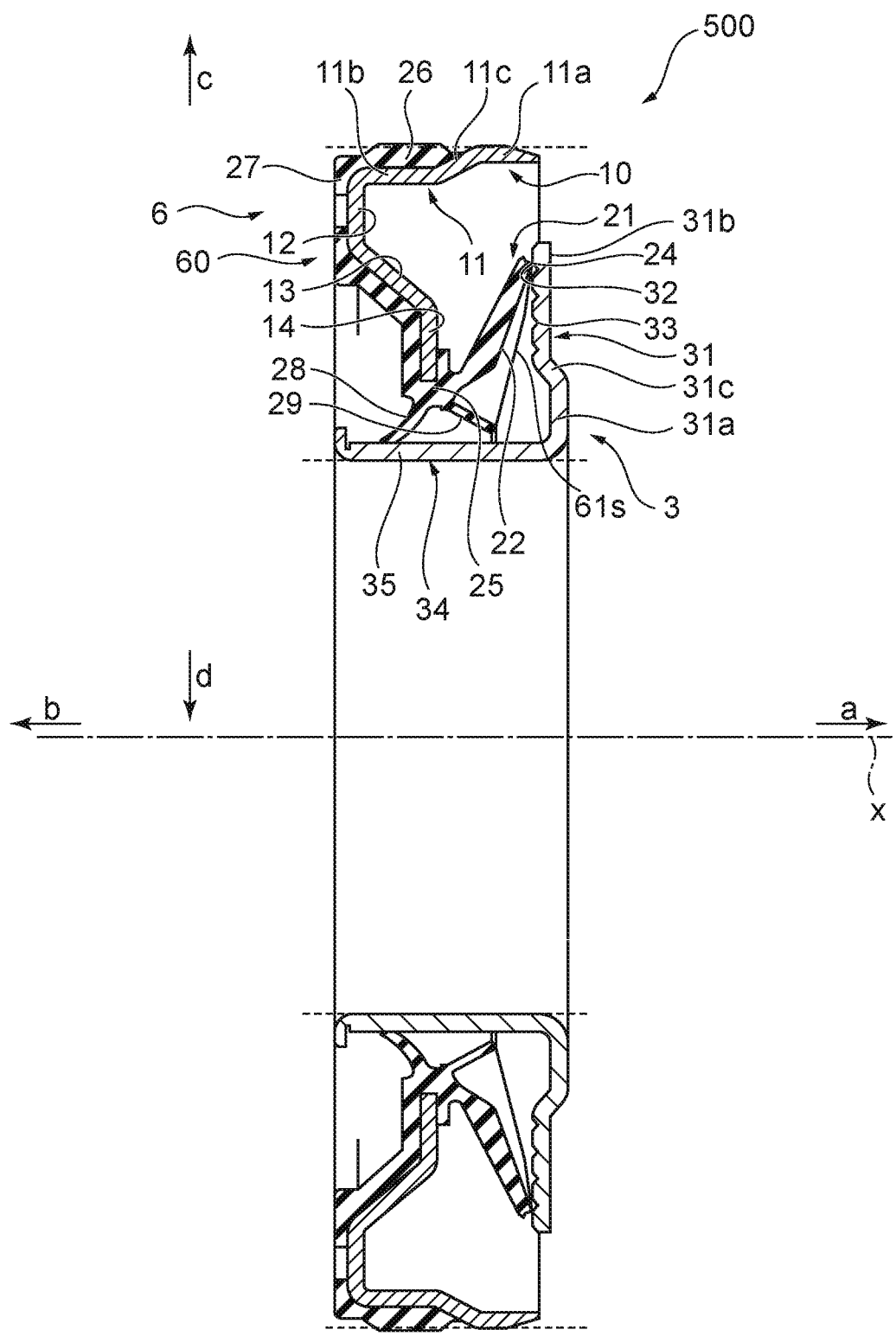
FIG. 30 is a cross-sectional diagram on a cross-section along an axis line x for illustrating a schematic configuration of a sealing apparatus according to a fifth embodiment of the present disclosure.
Figure 31:
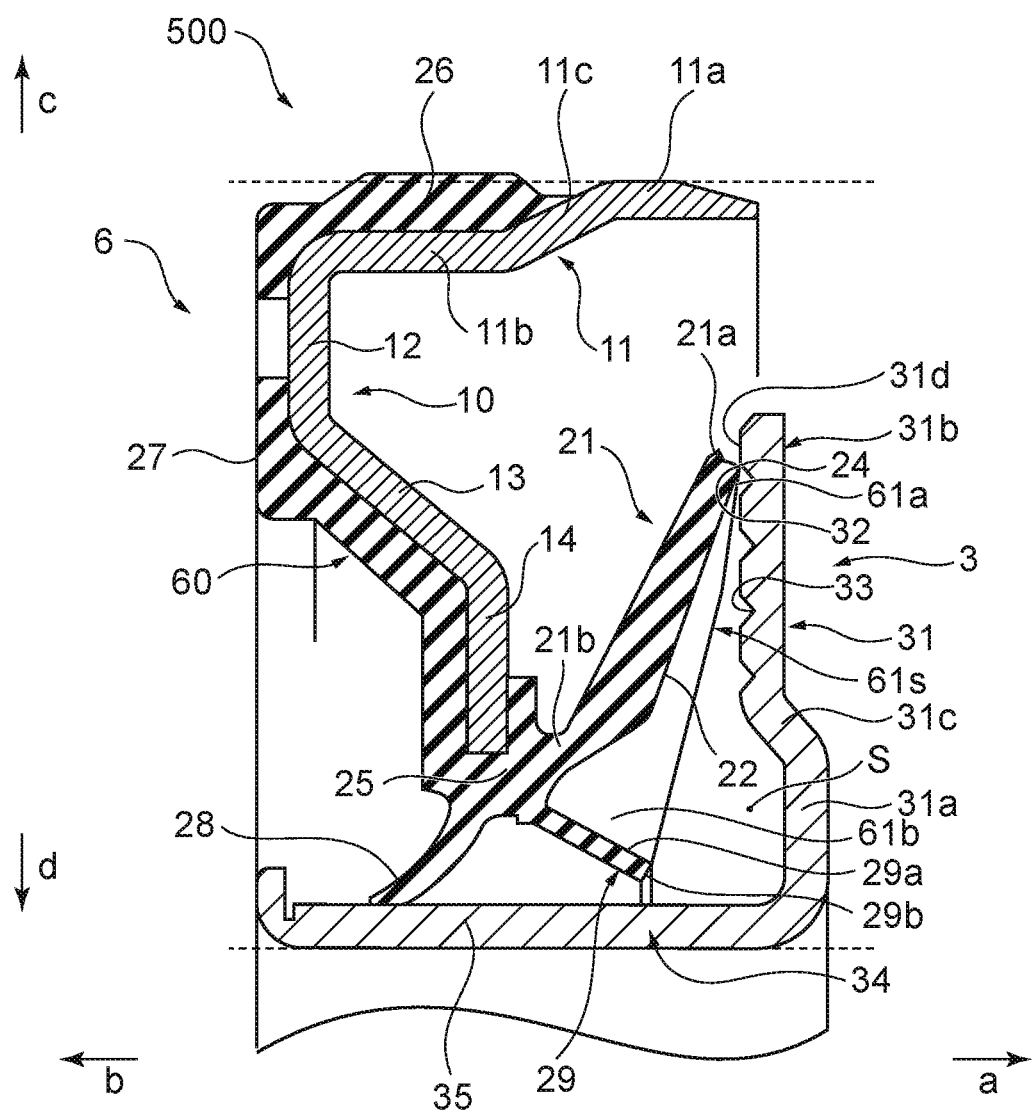
FIG. 31 is a partially enlarged cross-sectional diagram illustrating enlarged part of the cross-section along the axis line x of the sealing apparatus according to the fifth embodiment of the present disclosure.

FIG. 30 is a cross-sectional diagram on a cross-section along an axis line x for illustrating a schematic configuration of the sealing apparatus 500 according to the fifth embodiment of the present disclosure, and FIG. 31 is a partially enlarged cross-sectional diagram illustrating enlarged part of the cross-section along the axis line x of the sealing apparatus 500. In a similar manner to the above-described sealing apparatus 400, the sealing apparatus 500 according to the present embodiment is a sealing apparatus for sealing an annular gap between a shaft and a hole into which this shaft is to be inserted.

As illustrated in FIG. 30 and FIG. 31, the sealing apparatus 500 includes a sealing apparatus body 6 corresponding to the sealing apparatus body 2 of the above-described sealing apparatus 400, and a slinger 3. The sealing apparatus body 6 includes a reinforcing ring 10, and an elastic body portion 60 which is formed with an elastic body attached to the reinforcing ring 10 and which is annular around the axis line x. The elastic body portion 60 is different from the elastic body portion 20 of the above-described sealing apparatus 400 in a form of projections, and includes main projections 61s having a shape different from that of the main projections 223 of the above-described elastic body portion 20.

Figure 32:
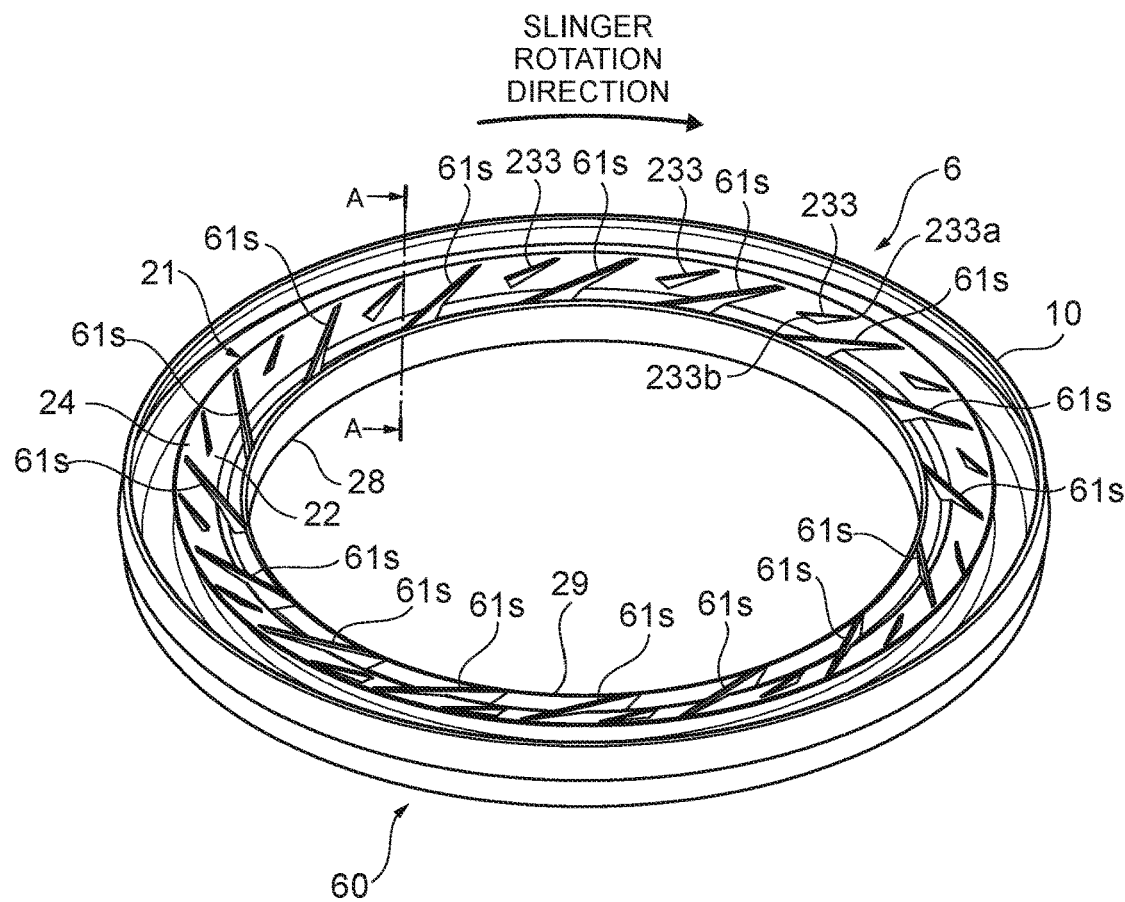
FIG. 32 is a perspective view of a sealing apparatus body of the sealing apparatus according to the fifth embodiment of the present disclosure, seen from inside.

At the elastic body portion 60, as illustrated in FIG. 32, a plurality of main projections 61s are formed side by side in a circumferential direction on the inner periphery surface 22 of the end-face lip 21. In a similar manner to the main projections 61s in the first embodiment, the main projections 61s extend in a spiral manner in a rotation direction of the shaft 52 (slinger 3) from the outer side to the inner side as will be described later, and are formed on the inner periphery side of the slinger contact portion 24 which is a portion where the end-face lip 21 contacts the slinger 3 at the end-face lip 21.

Figure 33:
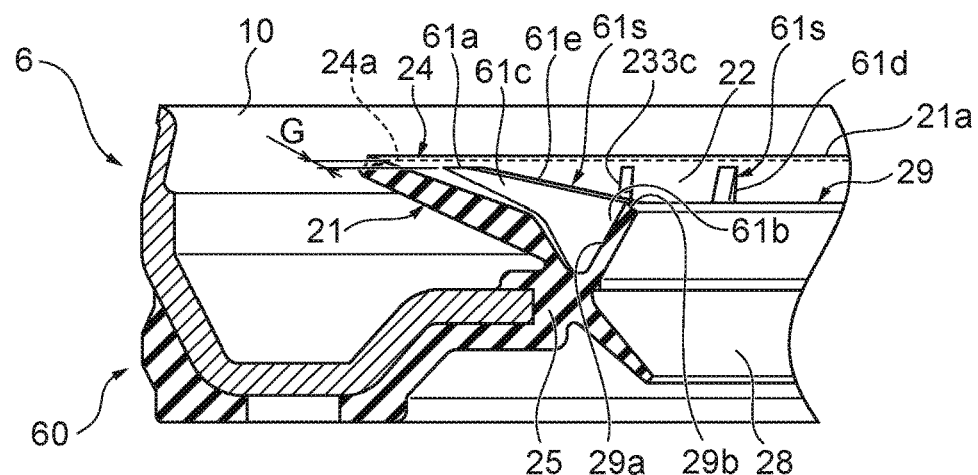
FIG. 33 is a partial perspective view of the sealing apparatus body illustrating a cross-section along a line A-A in FIG. 32.

As illustrated in FIG. 32 and FIG. 33, the plurality of main projections 61s are arranged at equal angular intervals or substantially equal angular intervals in the circumferential direction and at equal pitch interval or substantially equal pitch intervals on the same or substantially the same circumference on the inner periphery surface 22 of the end-face lip 21. As described above, the respective main projections 61s extend in a spiral manner in the rotation direction of the shaft 52 (slinger 3) from the outer side (lower side in FIG. 34) toward the inner side (upper side in FIG. 34). That is, the respective main projections 61s extend from the side of the base portion 25 toward the side of the tip 21a of the end-face lip 21 while tilting in the rotation direction of the slinger 3. Further, the respective main projections 61s are formed at intervals from the slinger contact portion 24, and are formed on the inner periphery side (outer side) of the slinger contact portion 24, that is, on the side of the root 21b of the end-face lip 21.

At the end-face lip 21, the main projections 61s are formed at intervals from the slinger contact portion 24 in a similar manner to the above-described main projections 223, and inner ends 61a which are end portions on the inner side (outer periphery side) of the main projections 61s are located at positions away from the outer edge 24a of the slinger contact portion 24 by a predetermined interval G in a direction along the axis line x along the inner periphery surface 22 (see FIG. 33). Further, the main projections 61s extend to the intermediate lip 29 along the inner periphery surface 22 of the end-face lip 21, and outer ends 61b which are end portions on the outer side (inner periphery side) of the main projections 61s are connected to the outer periphery surface 29a which is a surface on the outer periphery side of the intermediate lip 29.

Further, as will be described later, the respective main projections 61s are formed in a shape such that the main projections 61s do not contact the slinger 3 in a state where the sealing apparatus 500 is used in a similar manner to the main projections 223 of the above-described sealing apparatus 400. That is, a height of the main projections 61s from the inner periphery surface 22 and the interval G are set so that the main projections 61s do not contact the surface on the outer side of the flange portion 31 of the slinger 3 in the usage state. In the fifth embodiment, as illustrated in FIG. 31 and FIG. 33, the height of the main projections 61s from the inner periphery surface 22 becomes higher from the inner ends 61a toward the outer ends 61b. Further, the main projections 61s extend over the whole width of the outer periphery surface 29a of the intermediate lip 29 in the axis line x direction at the outer ends 61b, and the outer ends 61b of the main projections 61s extend from the root to the tip 29b of the intermediate lip 29.

Figure 34:
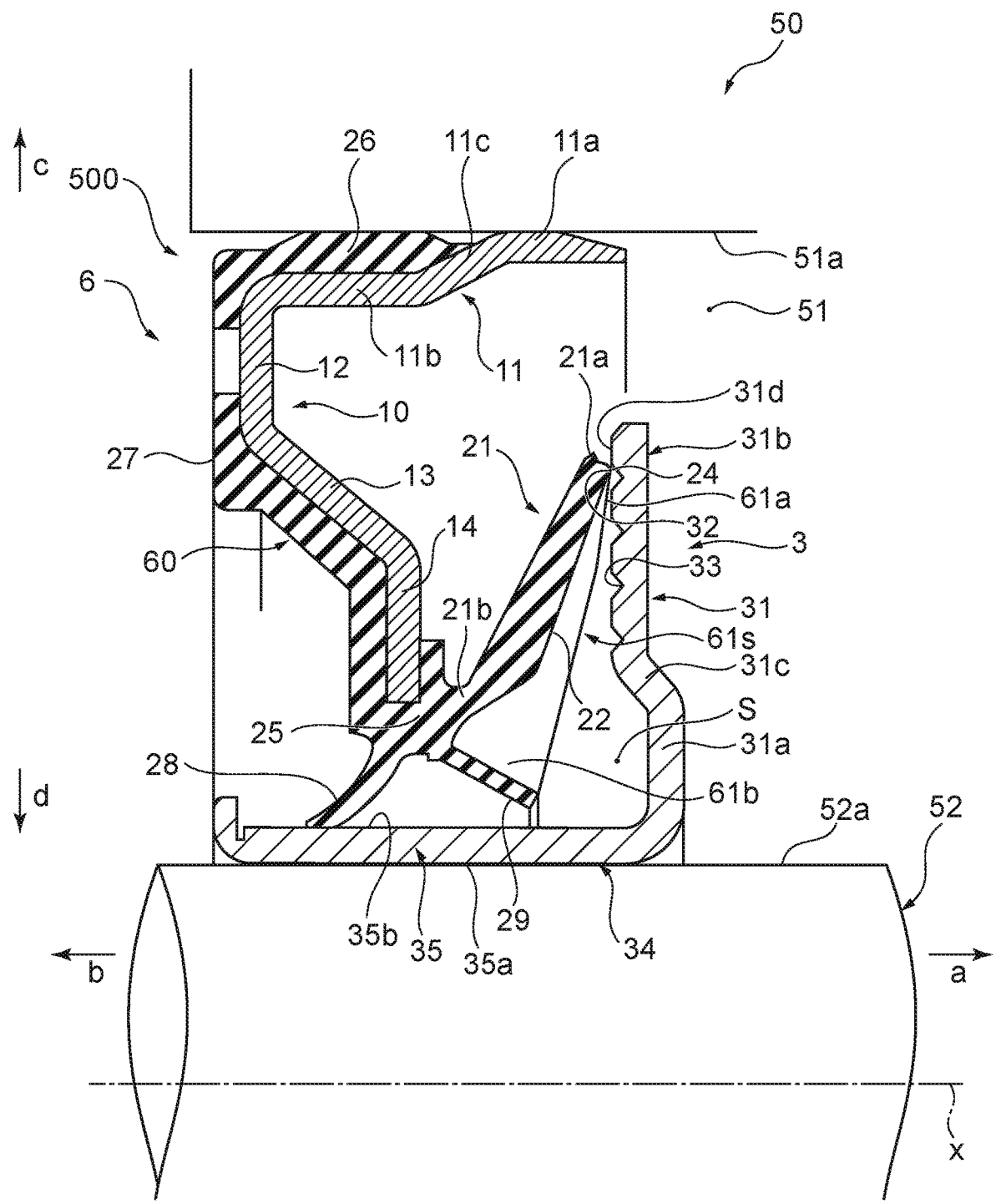
FIG. 34 is a partially enlarged cross-sectional diagram of the sealing apparatus illustrated in FIG. 30 in a usage state where the sealing apparatus is attached to a housing as an attachment target and a shaft inserted into a shaft hole.

As described above, the main projections 61s are formed in a rib shape from positions away from the outer edge 24a of the slinger contact portion 24 by the interval G to the outer periphery surface 29a of the intermediate lip 29 on the inner periphery surface 22 of the end-face lip 21, and side surfaces 61c and 61d which are surfaces facing in the circumferential direction extend while being orthogonal to or substantially orthogonal to the inner periphery surface 22 of the end-face lip 21. The side surfaces 61c and 61d may extend while tilting without being orthogonal to the inner periphery surface 22, and, for example, the side surface 61c may tilt to the side of the inner periphery surface 22. The side surfaces 61c and the side surfaces 61d extend in parallel or substantially parallel to each other, and end faces 61e which form surfaces of the main projections 61s on the side of the slinger 3 extend in a planar shape or substantially planar shape. As illustrated in FIG. 34, a shape of portions of the end faces 61e on the side of the inner ends 61a is set so as to be smoothly connected to the inner periphery surface 22 of the end-face lip 21 at the inner ends 61a. For example, the portions of the end faces 61e on the side of the inner ends 61a are bent or curved from another portions.

A height of the main projections 61s from the inner periphery surface 22 is not limited to the above-described specific shape. The height of the main projections 61s from the inner periphery surface 22 may be fixed from the inner ends 61a to the outer ends 61b, or the height from the inner periphery surface 22 may become lower from the inner ends 61a toward the outer ends 61b. Therefore, the main projections 61s do not have to extend over the whole width of the outer periphery surface 29a of the intermediate lip 29 in the axis line x direction at the outer ends 61b, and may extend over part of the width in the axis line x direction of the outer periphery surface 29a of the intermediate lip 29. Further, the height of the main projections 61s from the inner periphery surface 22 from the inner ends 61a to the outer ends 61b may be various kinds of combination of the above-described becoming higher, becoming lower, being fixed, or the like. Further, a shape of the cross-section of the main projections 61s orthogonal to the extending direction may be various shapes such as, for example, a triangle, a rectangle and an inverted U shape. Because the main projections 61s are formed in a shape such that the main projections 61s do not contact the slinger 3 in the state where the sealing apparatus 500 is used, sliding resistance to the slinger 3 does not increase by the main projections 61s.

Further, the shape of the main projections 61s in the extending direction may be various shapes such as a shape tapered from the outer ends 61b toward the inner ends 61a in a similar manner to the above-described main projections 223 (see FIG. 27), and a shape in which a width in a direction orthogonal to the extending direction changes toward the extending direction between the outer ends 61b and the inner ends 61a. Further, the main projections 61s may extend straight between the inner ends 61a and the outer ends 61b along the rotation direction of the slinger 3 or may extend in a curved shape while being slightly curved.

Further, as illustrated in FIG. 32, in addition to the plurality of main projections 61s, the sub-projections 233 are arranged on the inner periphery surface 22 of the end-face lip 21. Specifically, the sub-projections 233 in the above-described fourth embodiment having a shorter entire length than that of the main projections 61s are arranged in a similar manner between the plurality of main projections 61s. That is, the sub-projections 233 are arranged at equal angular intervals or substantially equal angular intervals in a circumferential direction and at equal pitch intervals or substantially equal pitch intervals on the same or substantially the same circumference in a similar manner to the main projections 61s. While the sub-projections 233 have substantially the same outer diameter as that of the main projections 61s, the outer diameter of the sub-projections 233 may be slightly larger or slightly smaller than that of the main projections 61s. Further, in a similar manner to the main projections 61s, the sub-projections 233 may extend straight between the inner ends 233a and the outer ends 233b, or may extend in a curved shape while being slightly curved. That is, while the main projections 61s extend straight between the inner ends 61a and the outer ends 61b, the sub-projections 233 may extend while being slightly curved between the inner ends 233a and the outer ends 233b and vice versa.

The sub-projections 233 are disposed between the plurality of main projections 61s, and the main projections 61s and the sub-projections 233 are alternately arranged in the rotation direction of the slinger 3 such that the main projection 61s, the sub-projection 233, the main projection 61s, the sub-projection 233, . . . . However, two or more or an arbitrary number of sub-projections 233 may be disposed between the plurality of main projections 61s. Because the sub-projections 233 have a shorter entire length than that of the main projections 61s, on the side of the outer ends 61b of the main projections 61s, the sub-projections 233 do not exist in the rotation direction of the slinger 3, and only the main projections 61s successively exist.

Action of the sealing apparatus 500 having the above-described configuration will be described next. FIG. 34 is a partially enlarged cross-sectional diagram of the sealing apparatus 500 in a usage state where the sealing apparatus 500 is attached to the housing 50 as an attachment target and the shaft 52 inserted into the shaft hole 51. In the state where the sealing apparatus 500 is used, the sealing apparatus 500 is attached in a similar manner to the above-described sealing apparatus 400, and relative positions between the sealing apparatus body 6 and the slinger 3 are similar positional relationship between the above-described sealing apparatus body 2 and the slinger 3.

At the end-face lip 21, in a similar manner to the main projections 223 and the sub-projections 233 in the fourth embodiment, the main projections 61s and the sub-projections 233 extend from positions away from the outer edge 24a of the slinger contact portion 24 by the interval G and at least partially extend in the circular current region. Therefore, also in the fifth embodiment, the main projections 61s and the sub-projections 233 act in a similar manner to the main projections 223 and the sub-projections 233 in the above-described fourth embodiment of the present disclosure (see FIG. 29), and the target to be sealed which is retained in the circular current region while rotating collides with and is bounced against the side surfaces 61c and the side surfaces 233c which are side surfaces of the main projections 61s and the sub-projections 233 facing on the outer periphery side, or the target to be sealed which is retained in the circular current region while rotating is led from the side of the outer ends 61b and the side of the outer ends 233b of the main projections 61s and the sub-projections 233 to the inner ends 61a and the inner ends 233a along the side surfaces 61c and the side surfaces 233c of the main projections 61s and the sub-projections 233, and the target to be sealed which is retained in the circular current region is led to the pumping region. The target to be sealed which is led to the pumping region by the main projections 61s and the sub-projections 233 is returned to the side of the target to be sealed by receiving the pumping action.

In a similar manner to the main projections 223 and the sub-projections 233 of the sealing apparatus 400 in the fourth embodiment, it is preferable that the main projections 61s and the sub-projections 233 are formed so that part on the side of the inner ends 61a and the side of the inner ends 233a enters the pumping region on the inner periphery surface 22 of the end-face lip 21, and are formed so that part on the side of the inner ends 61a and the side on the inner ends 233a enters the pumping region regardless of the rotation speed of the shaft. Further, in the case where the main projections 61s and the sub-projections 233 are formed so that the whole main projections 61s and the whole sub-projections 233 exist in the circular current region, the interval G from the outer edge 24a of the slinger contact portion 24 is set in a range where the target to be sealed which has oozed to the side of the circular current region beyond the pumping region can be returned to the pumping region again as described above. Further, in a similar manner to the main projections 223 and the sub-projections 233 in the fourth embodiment, it is preferable that the main projections 61s and the sub-projections 233 are arranged so as to partially overlap with the main projections 61s and the sub-projections 233 adjacent on the side of the rotation direction of the shaft 52 (slinger 3) when seen from the inner periphery side (outer side) to the outer periphery side (inner side) in the axis line x direction. Further, to make a portion where the main projections 61s and the sub-projections 233 which are adjacent to each other overlap with each other when seen from the inner periphery side to the outer periphery side in the axis line x direction larger, it is preferable to adjust the extending direction (angle) of the main projections 61s and the sub-projections 233 and the interval (pitch) of the main projections 61s and the sub-projections 233 which are adjacent to each other, and it is preferable that the main projections 61s and the sub-projections 233 are adjacent to each other at equal intervals.

Further, there is also a target to be sealed which is not bounced even if the target to be sealed hits against the side surfaces 61c of the main projections 61s and the side surfaces 233c of the sub-projections 233, and which is not led to the inner ends 61a and the inner ends 233a along the side surfaces 61c and the side surfaces 233c and which further proceeds to the side of the root 21b of the end-face lip 21 beyond the side surfaces 61c and the side surfaces 233c. Therefore, it is preferable that the main projections 61s and the sub-projections 233 are arranged so as to partially overlap with the sub-projections 233 and the main projections 223 adjacent on the side of the rotation direction of the shaft 52 (slinger 3) when seen from the inner periphery side (outer side) to the outer periphery side (inner side) in the axis line x direction. This is because, as indicated with dashed lines in a left part of FIG. 29, even if the target to be sealed flows to the side of the root 21b of the end-face lip 21 beyond the side surface 233c of the sub-projection 233 on the side of the inner end 233a, the target to be sealed which moves beyond this sub-projection 233 hits against the side surface 61c of the main projection 61s adjacent on the side of the rotation direction of the slinger 3, the target to be sealed is led to the inner end 61a along the side surface 61c, and the target to be sealed can be returned to the pumping region from the inner end 61a. Further, even in the case where there exists a target to be sealed which has moved beyond the side surface 61c of this main projection 61s, because the target to be sealed hits against the side surface 233c of the adjacent sub-projection 233 or the side surface 61c of the main projection 61s, and the target to be sealed is led to the inner end 61a or the inner end 233a along the side surface 233c or the side surface 61c, in this case, it is possible to return the target to be sealed to the pumping region while making progression speed of the target to be sealed slower in three steps. However, if the intrusion angle of the target to be sealed is close to parallel to the rotation direction of the slinger, because the target to be sealed collides with the sub-projections 233 and the main projections 61s a plurality of times, it is possible to reliably avoid a situation where the target to be sealed oozes from the pumping region to the side of the circular current region.

Further, to improve a function to return the target to be sealed to the pumping region by the main projections 61s and the sub-projections 233 which are adjacent to each other as described above, and to make a portion where the main projections 61s and the sub-projections 233 overlap with each other when seen from the inner periphery side to the outer periphery side in the axis line x direction larger, it is preferable to adjust the extending direction (angle) of the main projections 61s and the sub-projections 233 and the interval (pitch) between the main projections 61s and the sub-projections 233 which are adjacent to each other. Further, it is preferable that the main projections 61s and the sub-projections 233 are adjacent to each other at equal intervals so that the end-face lip 21 equally has the above-described functions of the main projections 61s and the sub-projections 233 in the circumferentially direction.

In this manner, in the sealing apparatus 500, in a similar manner to the sealing apparatus 400, even if the target to be sealed further oozes to the circular current region beyond the pumping region where the pumping action is exerted, it is possible to return this target to be sealed which has oozed to the pumping region by the main projections 61s and the sub-projections 233, and further return the target to be sealed to the side of the target to be sealed by the pumping action. Also in this case, because speed of the target to be sealed which circulates in the circular current region becomes higher as the rotation speed of the shaft 52 becomes higher, the target to be sealed which is retained in the circular current region is further more likely to be led to the pumping region. In this manner, according to the sealing apparatus 500, it is possible to cause the pumping action exerted by the groove 33 formed at the slinger 3 to be exerted more effectively by the main projections 61s and the sub-projections 233 formed at the end-face lip 21, so that it is possible to suppress ooze of the target to be sealed compared to the related art. Further, because the main projections 61s and the sub-projections 233 do not contact the slinger 3, according to the sealing apparatus 500, it is possible to suppress ooze of the target to be sealed without increasing sliding resistance to the slinger 3. Further, the sealing apparatus 500 can provide effects similar to those of the above-described sealing apparatus 400.

In this manner, according to the sealing apparatus 500 according to the fifth embodiment of the present disclosure, even in the case where the pumping action by the groove 33 of the slinger 3 is utilized, it is possible to suppress ooze of the target to be sealed regardless of a value of the rotation speed of the shaft 52.

Further, also in the sealing apparatus 500 according to the fifth embodiment, it can be estimated that the following effects can be obtained. Flow of air in the rotation direction of the slinger 3 occurs in narrow space S formed by the end-face lip 21 and the slinger 3 in accordance with rotation of the slinger 3. This air is derived to the side of the tip 21a of the end-face lip 21 by colliding with the main projections 61s and sub-projections 233 on the inner periphery surface 22 of the end-face lip 21, and flows toward the slinger contact portion 24.

As a result, because the flow of air occurring from the narrow space S to the side of the slinger contact portion 24 by the presence of the main projections 61s and the sub-projections 233 functions to push back the lubricant which oozes from the side of the target to be sealed to the narrow space S, to the pumping region, it is possible to reduce ooze of the lubricant.

Particularly, because such flow of air becomes higher as the rotation speed of the slinger 3 becomes higher, the flow of air becomes faster, strength of air flowing from the tip 21a of the end-face lip 21 to the side of the target to be sealed increases, so that the function to push back the lubricant to the pumping region becomes further strong.

Particularly, the main projections 61s are formed to be longer as the main projections 61s reach the outer periphery surface 29a of the intermediate lip 29, the flow of air becomes further strong, and the function to push back the lubricant to the pumping region is exerted further effectively. In this manner, according to the sealing apparatus 500, even in the case where the rotation speed of the shaft 52 becomes higher, it is possible to suppress ooze of the target to be sealed by an effect of flow of air occurring by the main projections 61s and the sub-projections 233.

While the preferred fourth and fifth embodiments of the present disclosure have been described above, the present disclosure is not limited to the sealing apparatuses 400 and 500 according to the above-described fourth and fifth embodiments, and incorporates any aspect included in the concept of the present disclosure and the scope of the claims. Further, the respective configurations may be selectively combined as appropriate so that at least part of the above-described problems or effects is solved or provided. Further, for example, the shapes, materials, arrangement, sizes, or the like, of the respective components in the above-described fourth and fifth embodiments can be changed as appropriate in accordance with specific usage aspects of the present disclosure.

Figure 36:
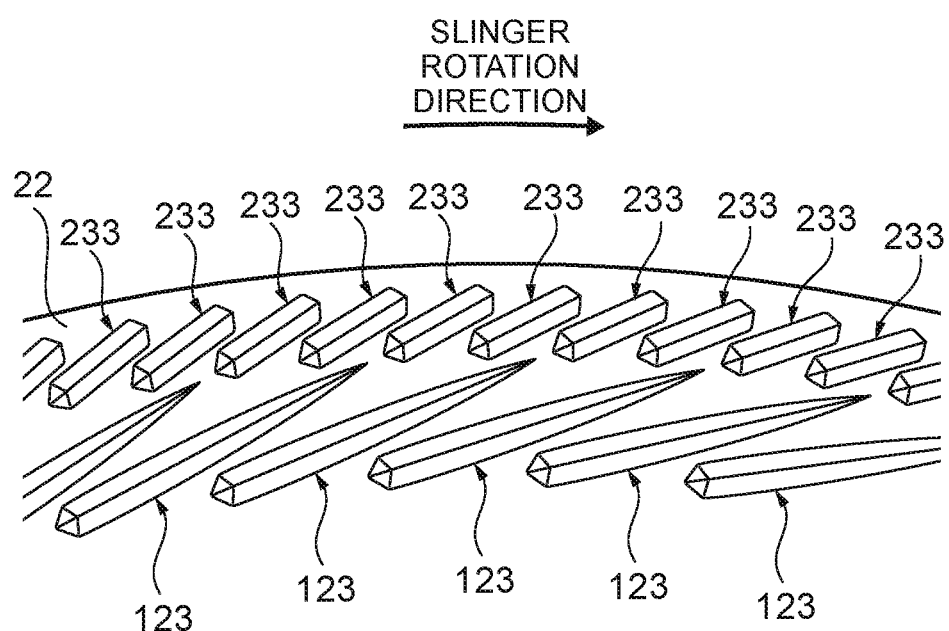
FIG. 36 is a diagram for illustrating a modified example of an arrangement state of main projections and sub-projections in the sealing apparatus.

While, as illustrated in FIG. 27, the shape of the tip portions (portions on the side of the inner ends 233*a*) of the sub-projections 233 in the extending direction is a shape (tapered shape) tapered toward the tips (inner ends 233*a*), the shape of the tip portions of the sub-projections 233 in the extending direction is not limited to this tapered shape, and, as illustrated in FIG. 36, may be a shape in which the side surfaces 233*c* and the side surfaces 233*d* which are opposite side of the side surfaces 233*c* extend in parallel, and the tips are not sharpened. Further, while, in a modified example in FIG. 36, the tips of the sub-projections 233 have surfaces facing in the extending direction of the sub-projections 233, the tips of the sub-projections 233 may have a shape such that the tips are smoothly connected to the inner periphery surface 22 of the end-face lip 21. That is, the shape of the main projections 223 and 61*s* does not necessarily have to be the same as the shape of the sub-projections 233.

Further, a shape of the cross-section of the main projections 223 orthogonal to the extending direction can be various shapes as illustrated in FIG. 14A to FIG. 14D. While, in the sealing apparatus 400 according to the above-described fourth embodiment, the cross-sectional shape of projections 123 is a triangle, the cross-sectional shape of the projections 123 may be a shape in which side surfaces 123*c* against which the target to be sealed to be returned hits extend while being at least partially orthogonal to or substantially orthogonal to the inner periphery surface 22 of the end-face lip 21. The cross-sectional shape of the projections 123 is, for example, a right triangle or a substantially right triangle in which the side surfaces 123*c* are orthogonal to or substantially orthogonal to the inner periphery surface 22. Further, the cross-sectional shape of the projections 123 is, for example, a pentagon in which portions of the side surfaces 123*c* and 123*d* on the side of the end-face lip 21 are orthogonal to or substantially orthogonal to the inner periphery surface 22. Further, the cross-sectional shape of the projections 123 is, for example, a rectangle in which the side surfaces 123*c* and 123*d* are orthogonal to or substantially orthogonal to the inner periphery surface 22. According to the projections 123 according to these modified examples, it is possible to prevent the target to be sealed from moving beyond the projections 123, and return the target to be sealed to the side of the pumping region more efficiently. Further, according to the projections 123 according to the modified examples as illustrated in FIG. 14B to FIG. 14D, it is possible to obtain projections having the same height (height in a direction orthogonal to the inner periphery surface 22 of the end-face lip 21) as a height of the projections 123 having a triangle cross-sectional shape with a smaller width (width in a direction orthogonal to the extending direction of the projections 123), so that it is possible to increase the number of projections 123 which can be disposed at the end-face lip 21. This will similarly apply to the cross-sectional shape of the main projections 61*s* and the sub-projections 233.

Figure 35:
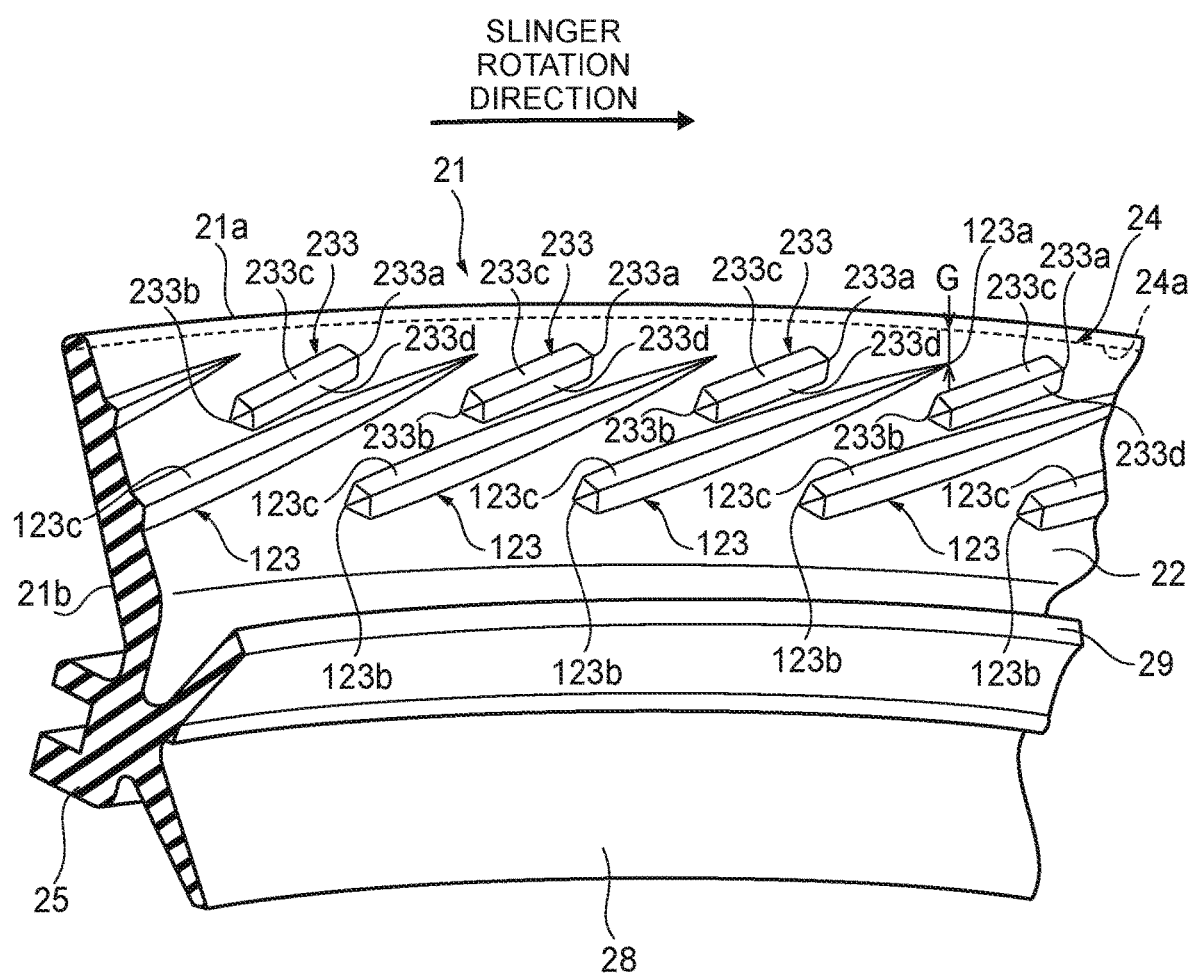
FIG. 35 is a partial perspective view of an elastic body portion for illustrating a modified example of a shape of tip portions of sub-projections in the sealing apparatus illustrated in FIG. 25 in an extending direction.

While, in the sealing apparatuses 400 and 500 according to the fourth and the fifth embodiments, a case has been described where, in addition to the plurality of main projections 223 and 61*s*, the sub-projections 233 are arranged on the inner periphery surface 22 of the end-face lip 21, the present disclosure is not limited to this, and, as illustrated in FIG. 36, on the inner periphery surface 22 of the end-face lip 21, the sub-projections 233 having a non-tapered shape in which the side surfaces 233*c* and the side surfaces 233*d* extend in parallel and the tips are not sharpened in a similar manner to FIG. 35 may be disposed at end portions on the outer periphery side of the main projections 223, and the main projections 223 and the sub-projections 233 may be arranged so as not to overlap with each other in the rotation direction of the slinger 3. However, because the sub-projections 233 are disposed at the end portions on the outer periphery side of the main projections 223, a height of the sub-projections 233 from the inner periphery surface 22 is made lower than that of the main projections 223. That is, the height is a height such that the sub-projections 233 do not contact the outer side surface 31*d* of the flange portion 31 of the slinger 3. In this case, the sub-projections 233 can first reject intrusion of the target to be sealed and return the target to be sealed to the pumping region, and the main projections 223 on the inner periphery side can return the target to be sealed which has moved beyond the sub-projections 233 to the pumping region. Note that the main projections 223 and the sub-projections 233 may be alternately arranged so as to partially overlap with each other. This will similarly apply to the main projections 61*s*.

Further, while the main projections 223 and 61*s* extend in a spiral manner, the main projections 223 and 61*s* extend to form various shapes on the inner periphery surface 22 of the end-face lip 21, and may be disposed in a spiral manner on the inner periphery surface 22 of the end-face lip 21. Further, the respective side surfaces 223*c* and 223*d* and the side surfaces 61*c* and 61*d* of the main projections 223 and 61*s* may have a planar shape or a curved shape.

As described above, the shape of the groove 33 provided at the slinger 3 is not limited to the screw (four-start screw) shape as illustrated in FIG. 4, and the groove 33 may have other shapes. For example, as illustrated in FIG. 15A, the groove 33 may be a groove which extends in a radial manner centered on or substantially centered on the axis line x from the inner periphery side toward the outer periphery side, or, as illustrated in FIG. 15B, may be a groove extending while tilting in the circumferential direction.

While, in the sealing apparatuses 400 and 500, the elastic body portions 20 and 60 include the dust lip 28 and the intermediate lip 29, the elastic body portions 20 and 60 do not have to include the dust lip 28 and the intermediate lip 29 and may include one of the dust lip 28 and the intermediate lip 29.

Further, while description has been provided that the sealing apparatuses 400 and 500 according to the fourth and the fifth embodiments are applied to a crank hole of an engine, an application target of the sealing apparatus according to the present disclosure is not limited to this, and the present disclosure can be applied to all configurations which can utilize effects provided by the present disclosure, such as other vehicles, general-purpose machine and industrial machine.

Figure 37:
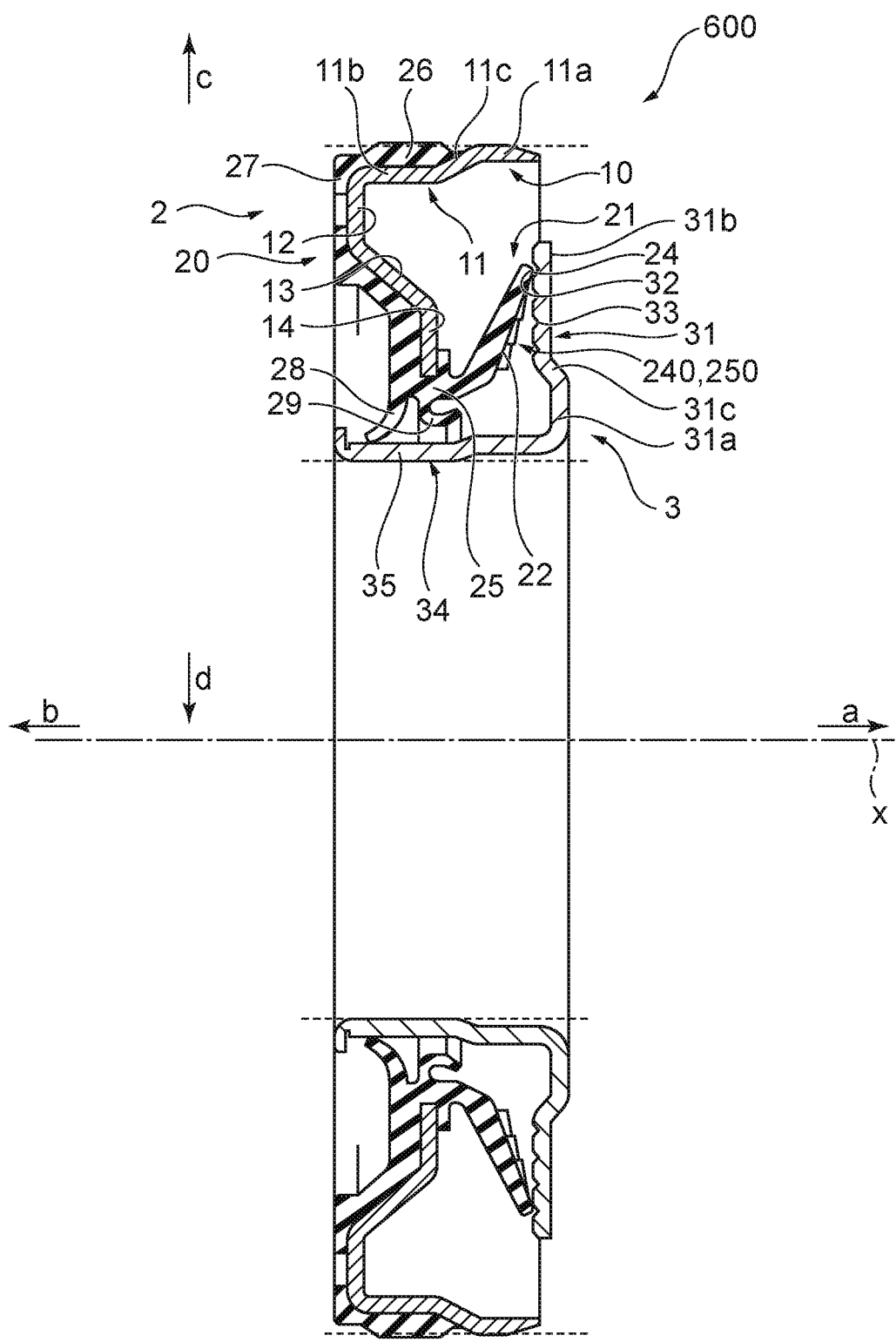
FIG. 37 is a cross-sectional diagram on a cross-section along an axis line x for illustrating a schematic configuration of a sealing apparatus according to a sixth embodiment of the present disclosure.
Figure 38:
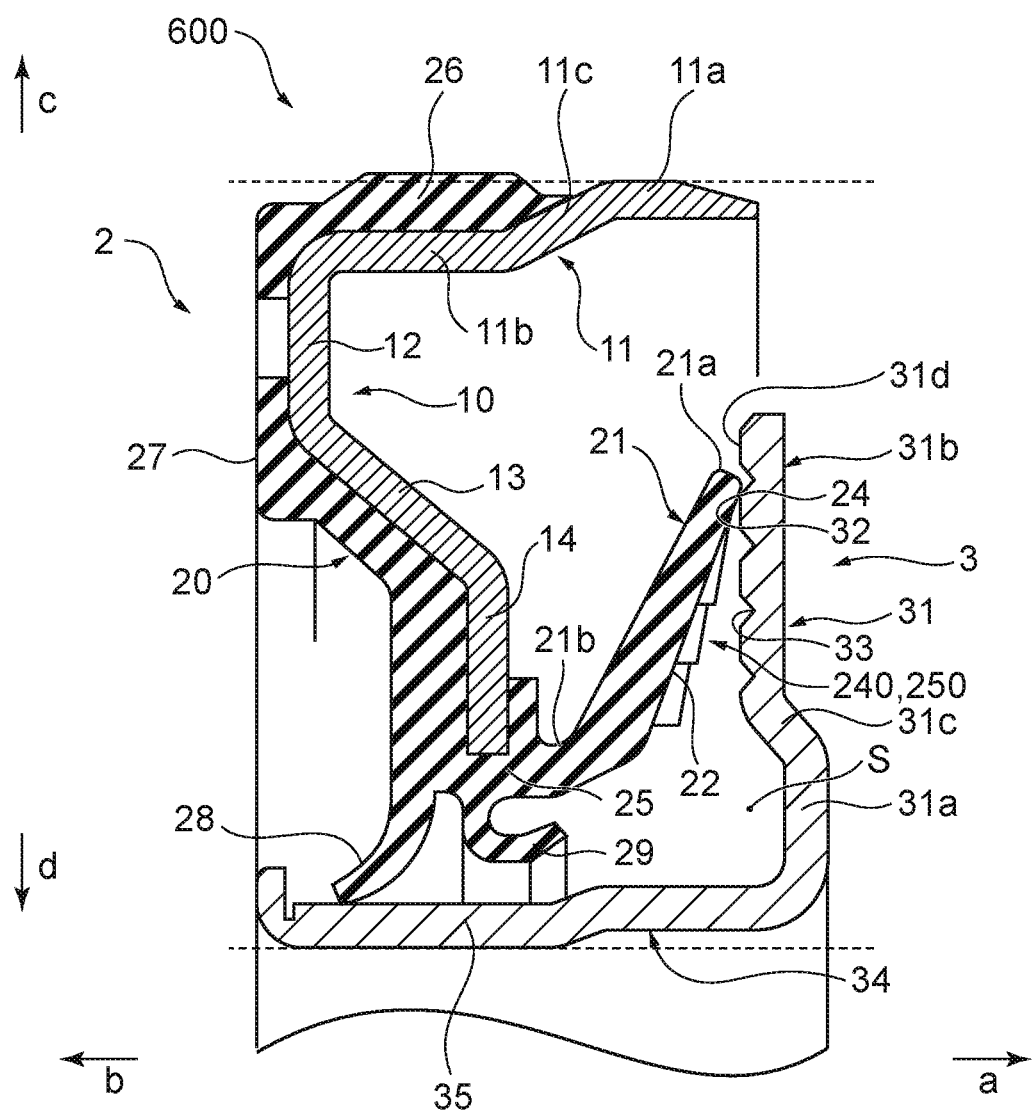
FIG. 38 is a partially enlarged cross-sectional diagram illustrating enlarged part of the cross-section along the axis line of the sealing apparatus according to the sixth embodiment of the present disclosure.

FIG. 37 is a cross-sectional diagram on a cross-section along an axis line x for illustrating a schematic configuration of a sealing apparatus 600 according to a sixth embodiment of the present disclosure, and FIG. 38 is a partially enlarged cross-sectional diagram illustrating enlarged part of the cross-section along the axis line x of the sealing apparatus 600 according to the sixth embodiment of the present disclosure. The sealing apparatus 600 according to the sixth embodiment is a sealing apparatus for sealing an annular gap between a shaft and a hole into which this shaft is to be inserted, and is used to seal a gap between a shaft and a hole (shaft hole) which is formed at a housing, or the like, and into which this shaft is to be inserted in a vehicle and general-purpose machine. For example, the sealing apparatus is used to seal annular space between a shaft which can rotate in both directions of a normal rotation direction and a reverse rotation direction and a shaft hole. Note that a target to which the sealing apparatus 600 according to the sixth embodiment of the present disclosure is applied is not limited to the above, and the sealing apparatus 600 can be used for, for example, a shaft which rotates in only one direction.

Hereinafter, for the purpose of illustration, a direction of an arrow a (see FIG. 37) in the axis line x direction (one side in the axis line direction) is set as an inner side, and a direction of an arrow b (see FIG. 37) in the axis line x direction (another side in the axis line direction) is set as an outer side. More specifically, the inner side is a side of space to be sealed (side of the target to be sealed) and is a side of space where the target to be sealed such as a lubricant exists, and the outer side is an opposite side of the inner side. Further, in a direction perpendicular to the axis line x (hereinafter, also referred to as a "radial direction"), a direction away from the axis line x (direction of an arrow c in FIG. 37) is set as an outer periphery side, and a direction approaching the axis line x (direction of an arrow d in FIG. 37) is set as an inner periphery side.

As illustrated in FIG. 37, the sealing apparatus 600 includes a sealing apparatus body 2 to be fitted into a hole as an attachment target which will be described later, and a slinger 3 to be attached to a shaft as an attachment target which will be described later. The sealing apparatus body 2 includes a reinforcing ring 10 annular around the axis line x, and an elastic body portion 20 which is formed with an elastic body attached to the reinforcing ring 10 and which is annular around the axis line x. The slinger 3 includes a flange portion 31 which is a portion extending toward the outer periphery side (direction of the arrow c) and annular around the axis line x. The elastic body portion 20 includes an end-face lip 21 which is a lip extending toward the one side (inner side, the direction of the arrow a) in the axis line x direction, contacting the flange portion 31 from the other side (outer side, the side of the direction of the arrow b) in the axis line x direction, and annular around the axis line x.

At least one groove 33 is formed on the other side (outer side) of the flange portion 31 of the slinger 3, and normal rotation projections 240 and reverse rotation projections 250 are alternately formed side by side in the circumferential direction on a surface on the inner periphery side (inner periphery surface 22) of the end-face lip 21.

The normal rotation projections 240 include a plurality of projections (normal rotation projections 241 to 243 which will be described later) aligned in the circumferential direction, and these normal rotation projections 241 to 243 extend while tilting to a normal rotation direction which is one rotation direction of the shaft (slinger 3) from the other side (outer side) toward the one side (inner side). Further, the respective normal rotation projections 241 to 243 are formed on the inner periphery side of the slinger contact portion 24 which is a portion where the end-face lip 21 contacts the slinger 3 at the end-face lip 21.

The reverse rotation projections 250 include a plurality of projections (reverse rotation projections 251 to 253 which will be described later) aligned in the circumferential direction, and these reverse rotation projections 251 to 253 extend while tilting to a reverse rotation direction which is another rotation direction of the shaft (slinger 3) from the other side (outer side) toward the one side (inner side). Further, the respective reverse rotation projections 251 to 253 are formed on the inner periphery side of the slinger contact portion 24 which is a portion where the end-face lip 21 contacts the slinger 3 at the end-face lip 21.

Note that because the respective configurations of the sealing apparatus body 2 and the slinger 3 of the sealing apparatus 600 are the same as those of the sealing apparatus body 2 and the slinger 3 of the sealing apparatus 1 in the first embodiment, description thereof will be omitted here, and points of different configurations will be described.

Figure 39:
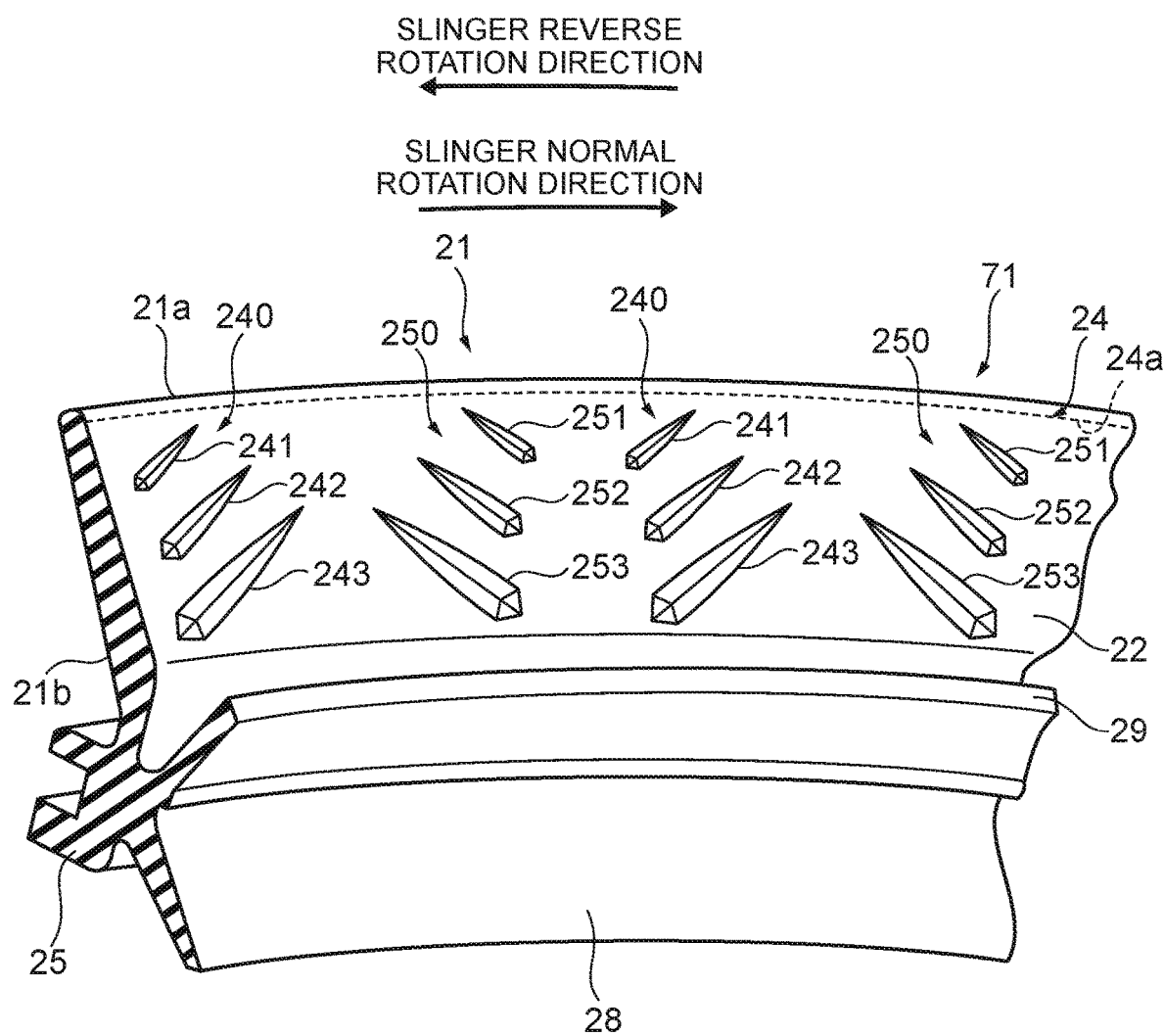
FIG. 39 is a partially enlarged perspective view of an elastic body portion in the sealing apparatus illustrated in FIG. 37 in a state where the elastic body portion at a portion on an inner periphery side from a base portion is cut on a plane along the axis line.

Here, a shape of the end-face lip 21 will be described in more detail. FIG. 39 is a partially enlarged perspective view of the elastic body portion 20 seen from the inner periphery side in a state where the elastic body portion 20 at a portion on the inner periphery side from the base portion 25 is cut on a plane along the axis line x. As illustrated in FIG. 39, a plurality of normal rotation projections 240 and reverse rotation projections 250 are arranged at equal angular intervals or substantially equal angular intervals in the circumferential direction and arranged at equal pitch intervals or substantially equal pitch intervals on the same or substantially the same circumference on the inner periphery surface 22 of the end-face lip 21.

As described above, the respective normal rotation projections 240 include a plurality of projections, and, in the present embodiment, include, for example, three normal rotation projections 241, 242 and 243. As described above, the normal rotation projections 241, 242 and 243 extend while tilting to the normal rotation direction of the shaft 52 (slinger 3), which will be described later, from the outer side (lower side in FIG. 39) toward the inner side (upper side in FIG. 39). That is, the respective normal rotation projections 241 to 243 extend while tilting in the normal rotation direction from the side of the root 21b of the end-face lip 21 toward the side of the tip 21a of the end-face lip 21. Further, the respective normal rotation projections 241 to 243 are formed at intervals from the slinger contact portion 24, and formed on the inner periphery side (outer side) of the slinger contact portion 24, that is, on the side of the root 21b of the end-face lip 21, of the slinger contact portion 24.

As illustrated in FIG. 39, the normal rotation projections 241 to 243 in the normal rotation projections 240 are aligned in the normal rotation direction or from the tip 21a of the end-face lip 21 toward the side of the root 21b (inner periphery side) of the end-face lip 21 in order of the normal rotation projection 241, the normal rotation projection 242 and the normal rotation projection 243. Further, the normal rotation projections 241 to 243 are arranged at equal angular intervals or substantially equal angular intervals in the circumferential direction, and arranged at equal pitch intervals or substantially equal pitch intervals.

Figure 40:
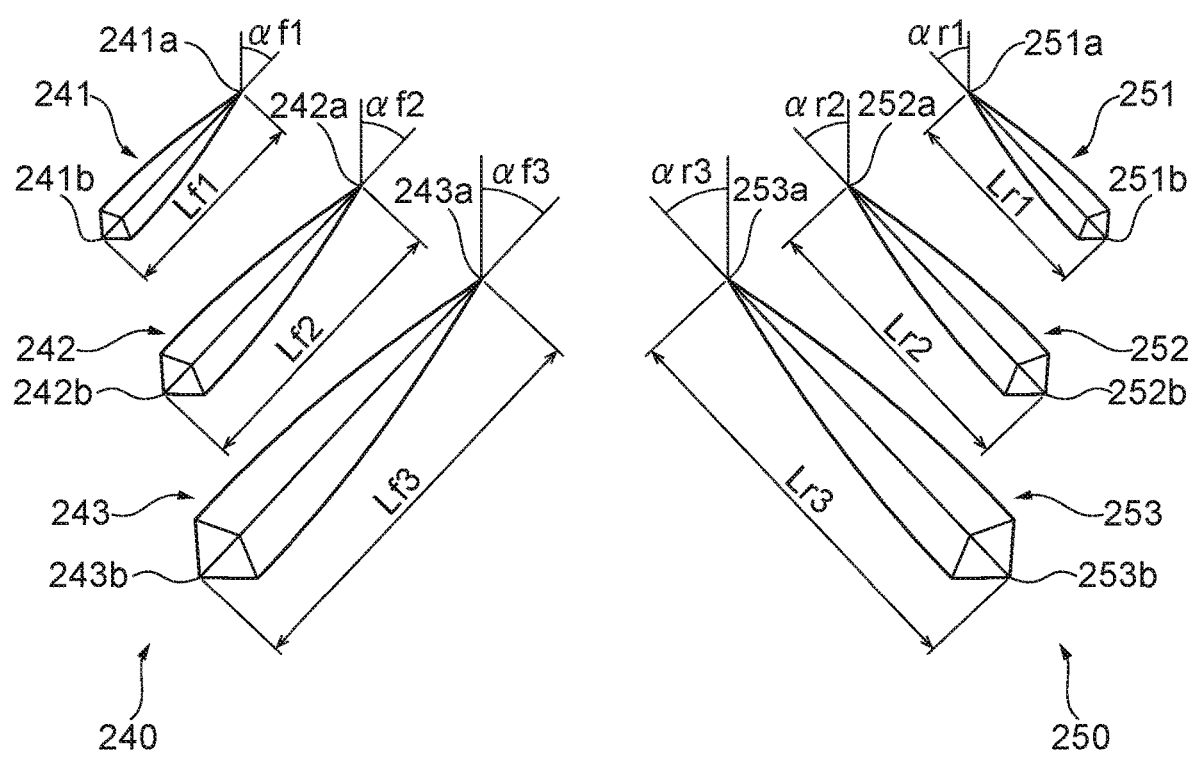
FIG. 40 is a diagram illustrating enlarged normal rotation projections and reverse rotation projections illustrated in FIG. 39.

Further, as illustrated in FIG. 40, the normal rotation projections 241 to 243 have different lengths in the extending direction. The length of the normal rotation projection 241 in the extending direction is a distance between an inner end 241a which is an end portion on the inner side (outer periphery side) of the normal rotation projection 241 and an outer end 241b which is an end portion on the outer side (inner periphery side) of the normal rotation projection 241, and is a length Lf1. The length of the normal rotation projection 242 in the extending direction is a distance between an inner end 242a which is an end portion on the inner side (outer periphery side) of the normal rotation projection 242 and an outer end 242b which is an end portion on the outer side (inner periphery side) of the normal rotation projection 242, and is a length Lf2. The length of the normal rotation projection 243 in the extending direction is a distance between an inner end 243a which is an end portion on the inner side (outer periphery side) of the normal rotation projection 243 and an outer end 243b which is an end portion on the outer side (inner periphery side) of the normal rotation projection 243, and is a length Lf3. In the sixth embodiment, of the normal rotation projections 241 to 243, the further on the side of the normal rotation direction or on the inner periphery side the normal rotation projection is located, the longer a length in the extending direction of the normal rotation projection is, and the length of the normal rotation projection 242 is longer than the length of the normal rotation projection 241, and the length of the normal rotation projection 243 is longer than the length of the normal rotation projection 242 (Lf1<Lf2<Lf3).

Further, as illustrated in FIG. 40, the normal rotation projection 241 tilts in the normal rotation direction of the shaft 52 (slinger 3) by an inclination angle $\alpha f1$ with respect to the radial direction, the normal rotation projection 242 tilts in the normal rotation direction of the shaft 52 (slinger 3) by an inclination angle $\alpha f2$ with respect to the radial direction, and the normal rotation projection 243 tilts in the normal rotation direction of the shaft 52 (slinger 3) by an inclination angle $\alpha f3$ with respect to the radial direction. In the sixth embodiment, the normal rotation projections 241 to 243 have the same or substantially the same inclination with respect to the radial direction ($\alpha f1=\alpha f2=\alpha f3$).

As described above, the normal rotation projections 241 to 243 are formed at intervals from the slinger contact portion 24 at the end-face lip 21. Specifically, as illustrated in FIG. 39, the inner ends 241a to 243a of the respective normal rotation projections 241 to 243 are located at positions away from the outer edge 24a which is an edge portion on the outer side (inner periphery side) of the slinger contact portion 24 in a direction along the axis line x along the inner periphery surface 22. As illustrated in FIG. 39 and FIG. 40, in the normal rotation projections 240, of the inner ends 241a to 243a of the normal rotation projections 241 to 243, the further on the side of the normal rotation direction or on the inner periphery side the inner end is located, the farther from the outer edge 24a of the slinger contact portion 24 the inner end is located.

Further, as illustrated in FIG. 38, the respective normal rotation projections 241 to 243 are formed in a shape such that the normal rotation projections 241 to 243 do not contact the slinger 3 in a state where the sealing apparatus 600 is used. That is, a height of the respective normal rotation projections 241 to 243 from the inner periphery surface 22 and the interval from the outer edge 24a of the slinger contact portion 24 are set so that the normal rotation projections 241 to 243 do not contact a surface on the outer side of the flange portion 31 of the slinger 3 in the usage state. While, in the sixth embodiment, as illustrated in FIG. 38 to FIG. 40, a height of the normal rotation projections 241, 242 and 243 becomes higher from the inner ends 241a, 242a and 243a toward outer ends 241b, 242b and 243b which are end portions on the side of the root 21b of the end-face lip 21, the height of the normal rotation projections 241 to 243 from the inner periphery surface 22 is not limited to this. The height of the normal rotation projections 241, 242 and 243 from the inner periphery surface 22 respectively from the inner ends 241a, 242a and 243a to the outer ends 241b, 242b and 243b may be fixed, or the height from the inner periphery surface 22 may be lower from the inner ends 241a, 242a and 243a toward the outer ends 241b, 242b and 243b. Further, the height of the normal rotation projections 241, 242 and 243 from the inner periphery surface 22 respectively from the inner ends 241a, 242a and 243a to the outer ends 241b, 242b and 243b may be various kinds of combination of the above-described becoming higher, becoming lower, being fixed, or the like. Because the normal rotation projections 241, 242 and 243 are formed in a shape such that the normal rotation projections 241, 242 and 243 do not contact the slinger 3 in the state where the sealing apparatus 600 is used, sliding resistance to the slinger 3 does not increase by the normal rotation projections 241, 242 and 243.

As described above, the respective reverse rotation projections 250 include a plurality of projections, and, in the sixth embodiment, include three reverse rotation projections 251, 252 and 253. As described above, the reverse rotation projections 251, 252 and 253 extend while tilting in the reverse rotation direction from the outer side (lower side in FIG. 39) toward the inner side (upper side in FIG. 39). That is, the respective reverse rotation projections 251 to 253 extend while tilting in the reverse rotation direction from the side of the root 21b of the end-face lip 21 toward the side of the tip 21a of the end-face lip 21. Further, the respective reverse rotation projections 251 to 253 are formed at intervals from the slinger contact portion 24, and are formed on the inner periphery side (outer side) of the slinger contact portion 24, that is, on the side of the root 21b of the end-face lip 21, of the slinger contact portion 24.

As illustrated in FIG. 39, in the reverse rotation projections 250, the reverse rotation projections 251 to 253 are aligned in the reverse rotation direction or on the inner periphery side in the order of the reverse rotation projection 251, the reverse rotation projection 252 and the reverse rotation projection 253. Further, the reverse rotation projections 251 to 253 are arranged at equal angular intervals or substantially equal angular intervals in the circumferential direction, and are arranged at equal pitch intervals or substantially equal pitch intervals.

Further, as illustrated in FIG. 40, the reverse rotation projections 251 to 253 have different lengths in the extending direction. The length of the reverse rotation projection 251 in the extending direction is a distance between an inner end 251a which is an end portion on the inner side (outer periphery side) of the reverse rotation projection 251 and an outer end 251b which is an end portion on the outer side (inner periphery side) of the reverse rotation projection 251, and is a length Lr1. The length of the reverse rotation projection 252 in the extending direction is a distance between an inner end 252a which is an end portion on the inner side (outer periphery side) of the reverse rotation projection 252 and an outer end 252b which is an end portion on the outer side (inner periphery side) of the reverse rotation projection 252, and is a length Lr2. The length of the reverse rotation projection 253 in the extending direction is a distance between an inner end 253a which is an end portion on the inner side (outer periphery side) of the reverse rotation projection 253 and an outer end 253b which is an end portion on the outer side (inner periphery side) of the reverse rotation projection 253, and is a length Lr3. In the sixth embodiment, of the reverse rotation projections 251 to 253, the further on the side of the reverse rotation direction or on the inner periphery side the reverse rotation projection is located, the longer a length in the extending direction of the reverse rotation direction is, and the length of the reverse rotation projection 252 is longer than the length of the reverse rotation projection 251, and the length of the reverse rotation projection 253 is longer than the length of the reverse rotation projection 252 (Lr1<Lr2<Lr3).

Further, as illustrated in FIG. 40, the reverse rotation projection 251 tilts in the reverse rotation direction by an inclination angle cr1 with respect to the radial direction, the reverse rotation projection 252 tilts in the reverse rotation direction by an inclination angle αr2 with respect to the radial direction, and the reverse rotation projection 253 tilts in the reverse rotation direction by an inclination angle cr3 with respect to the radial direction. In the sixth embodiment, the reverse rotation projections 251 to 253 have the same or substantially the same inclination with respect to the radial direction (αr1=αr2=αr3).

As described above, the reverse rotation projections 251 to 253 are formed at intervals from the slinger contact portion 24 at the end-face lip 21. Specifically, as illustrated in FIG. 39, the inner ends 251a to 253a of the respective reverse rotation projections 251 to 253 are located at positions away from the outer edge 24a of the slinger contact portion 24 in a direction along the axis line x along the inner periphery surface 22. As illustrated in FIG. 39 and FIG. 40, in the reverse rotation projections 250, of the inner ends 251a to 253a of the reverse rotation projections 251 to 253, the further on the side of the reverse rotation direction or on the inner periphery side the inner end is located, the farther from the outer edge 24a of the slinger contact portion 24 the inner end is located.

Further, as illustrated in FIG. 38, the respective reverse rotation projections 251 to 253 are formed in a shape such that the reverse rotation projections 251 to 253 do not contact the slinger 3 in the state where the sealing apparatus 600 is used. That is, a height of the respective reverse rotation projections 251 to 253 from the inner periphery surface 22 and the interval from the outer edge 24a of the slinger contact portion 24 are set so that the reverse rotation projections 251 to 253 do not contact a surface on the outer side of the flange portion 31 of the slinger 3 in the usage state. While, in the sixth embodiment, as illustrated in FIG. 38 to FIG. 40, the height of the reverse rotation projections 251, 252 and 253 from the inner periphery surface 22 becomes higher from the inner ends 251a, 252a and 253a toward the outer ends 251b, 252b and 253b, the height of the reverse rotation projections 251 to 253 from the inner periphery surface 22 is not limited to this. The height of the reverse rotation projections 251, 252 and 253 from the inner periphery surface 22 respectively from the inner ends 251a, 252a and 253a over the outer ends 251b, 252b and 253b may be fixed, or the height from the inner periphery surface 22 may become lower from the inner ends 251a, 252a and 253a toward the outer ends 251b, 252b and 253b. Further, the height of the reverse rotation projections 251, 252 and 253 from the inner periphery surface 22 respectively from the inner ends 251a, 252a and 253a over the outer ends 251b, 252b and 253b may be various kinds of combination of the above-described becoming higher, becoming lower, being fixed, or the like. Because the reverse rotation projections 251 to 253 are formed in a shape such that the reverse rotation projections 251 to 253 do not contact the slinger 3 in the state where the sealing apparatus 600 is used, sliding resistance to the slinger 3 does not increase by the reverse rotation projections 251 to 253.

A shape of the cross-section of the respective normal rotation projections 241 to 243 and the respective reverse rotation projections 251 to 253 orthogonal to the extending direction may be various shapes such as, for example, a triangle, a rectangle and an inverted U shape. Further, as illustrated in FIG. 39 and FIG. 40, the shape of the normal rotation projections 241, 242 and 243, and the reverse rotation projections 251, 252 and 253 in the extending direction may be various shapes such as a shape which is tapered respectively from the outer ends 241b, 242b, 243b, 251b, 252b and 253b toward the inner ends 241a, 242a, 243a, 251a, 252a and 253a, and a shape in which a width in a direction orthogonal to the extending direction is fixed between the outer ends 241b, 242b, 243b, 251b, 252b and 253b and the inner ends 241a, 242a, 243a, 251a, 252a and 253a. Further, the normal rotation projections 241, 242 and 243 and the reverse rotation projections 251, 252 and 253 may extend straight or extend in a curved manner respectively between the inner ends 241a, 242a, 243a, 251a, 252a and 253a and the outer ends 241b, 242b, 243b, 251b, 252b and 253b.

Figure 41:
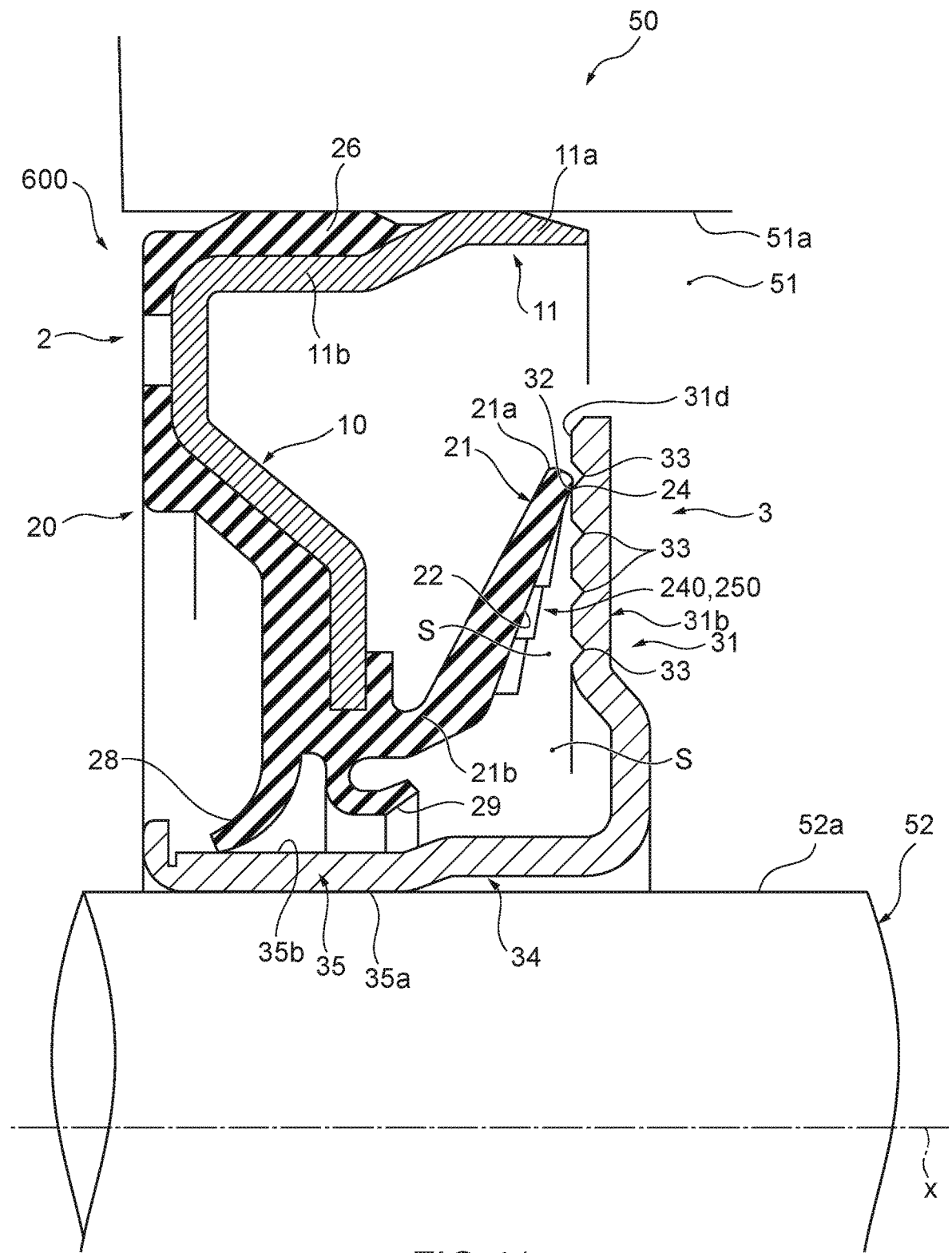
FIG. 41 is a partially enlarged cross-sectional diagram of the sealing apparatus in a usage state where the sealing apparatus according to the sixth embodiment of the present disclosure is attached to a housing and a shaft inserted into a shaft hole.

Action of the sealing apparatus 600 having the above-described configuration will be described next. FIG. 41 is a partially enlarged cross-sectional diagram of the sealing apparatus 600 in a usage state where the sealing apparatus 600 is attached to a housing 50 as an attachment target and the shaft 52 inserted into the shaft hole 51 which is a through-hole formed at this housing 50.

As illustrated in FIG. 41, in the state where the sealing apparatus 600 is used, the sealing apparatus body 2 is fitted into the shaft hole 51 by being pressed into the shaft hole 51 of the housing 50, and the slinger 3 is attached to the shaft 52 by being interference-fitted at the shaft 52. More specifically, the outer periphery side cylindrical portion 11a of the reinforcing ring 10 contacts the inner periphery surface 51a of the shaft hole 51, so that a shaft center of the sealing apparatus body 2 is made to match a shaft center of the shaft hole 51, and the gasket portion 26 tightly contacts the inner periphery surface 51a of the shaft hole 51 by the gasket portion 26 of the elastic body portion 20 being pressed into the radial direction between the inner periphery surface 51a of the shaft hole 51 and the inner periphery side cylindrical portion 11b of the reinforcing ring 10, so that sealing between the sealing apparatus body 2 and the shaft hole 51 is realized. Further, the cylindrical portion 35 of the slinger 3 is pressed into the shaft 52, and the inner periphery surface 35a of the cylindrical portion 35 tightly contacts the outer periphery surface 52a of the shaft 52, so that the slinger 3 is fixed at the shaft 52.

Relative positions between the sealing apparatus body 2 and the slinger 3 in the axis line x direction are determined so that the end-face lip 21 of the elastic body portion 20 contacts the lip contact portion 32 which is a portion on the outer side surface 31d of the outer periphery side disk portion 31b of the flange portion 31 of the slinger 3 at the slinger contact portion 24 which is a portion on the side of the tip 21a of the inner periphery surface 22 in the state where the sealing apparatus 600 is used. Further, the dust lip 28 contacts the tubular portion 34 of the slinger 3 from the outer periphery side at a portion on the tip side. The dust lip 28, for example, contacts the outer periphery surface 35b of the cylindrical portion 35 of the slinger 3.

In this manner, in the state where the sealing apparatus 600 is used, the end-face lip 21 contacts the lip contact portion 32 of the flange portion 31 at the slinger contact portion 24 so that the slinger 3 can slide at the lip contact portion 32, and the end-face lip 21 and the slinger 3 prevent the target to be sealed such as a lubricant from oozing inside from the side of the target to be sealed beyond the slinger contact portion 24 and the lip contact portion 32. Further, the dust lip 28 contacts the tubular portion 34 so that the tubular portion 34 of the slinger 3 can slide, and prevents a foreign matter from entering inside from outside.

Further, in the state where the sealing apparatus 600 is used, the groove 33 which forms a four-start screw formed at the outer periphery side disk portion 31b of the flange portion 31 of the slinger 3 exerts pumping action in the case where the shaft 52 (slinger 3) rotates (normally rotates). By rotation of the shaft 52 (slinger 3), pumping action occurs in a region in the vicinity of the slinger contact portion 24 and the lip contact portion 32 in the narrow space S which is space between the flange portion 31 and the end-face lip 21. By this pumping action, even in the case where the target to be sealed oozes from the side of the target to be sealed to the narrow space S, the target to be sealed which has oozed is returned from the narrow space S to the side of the target to be sealed beyond the slinger contact portion 24 and the lip contact portion 32. In this manner, by the pumping action caused by the groove 33 formed at the flange portion 31 of the slinger 3, ooze of the target to be sealed to the narrow space S is suppressed.

In the narrow space S, the target to be sealed which has further oozed to outside beyond the pumping region where the pumping action by the groove 33 is exerted, rotates around the axis line x in the rotation direction of the slinger 3 in a region adjacent to the pumping region on the inner periphery side and is retained in the circular current region by the rotation of the shaft 52.

Normal rotation projections 240 and reverse rotation projections 250 are formed on the inner periphery surface 22 at the end-face lip 21, and the respective projections of the normal rotation projections 240 and the reverse rotation projections 250 extend from positions at intervals from the outer edge 24a of the slinger contact portion 24, and, for example, one of the projections at least partially extends in the circular current region. Therefore, the target to be sealed which is retained in the circular current region while rotating collides with the projections, or the target to be sealed which is retained in the circular current region while rotating is led to inner ends of the projections along the projections, and the target to be sealed which is retained in the circular current region is led to the pumping region. The target to be sealed which is led to the pumping region by the projections is returned to the side of the target to be sealed by receiving the pumping action. Action of the normal rotation projections 240 and the reverse rotation projections 250 will be specifically described below.

Figure 42:
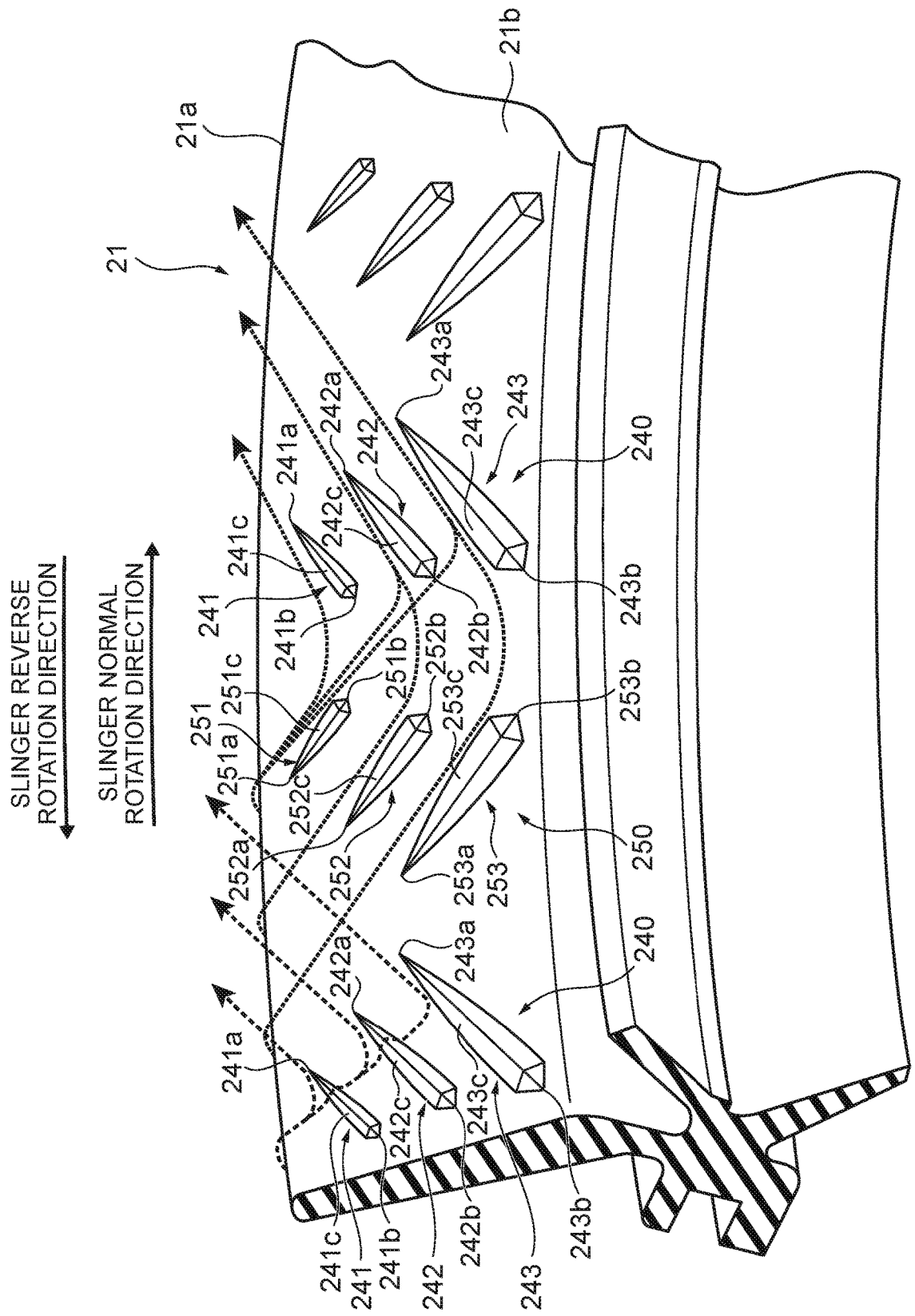
FIG. 42 is a diagram for illustrating aspect of flow of a target to be sealed by action of normal rotation projections and reverse rotation projections of an end-face lip.

FIG. 42 is a diagram for illustrating aspect of flow of the target to be sealed by action of the respective projections of the normal rotation projections 240 and the reverse rotation projections 250 of the end-face lip 21 for explaining action of the normal rotation projections 240 and the reverse rotation projections 250 of the end-face lip 21. In FIG. 42, as indicated with dashed lines, the target to be sealed which has oozed to the side of the circular current region beyond the pumping region collides with side surfaces of the respective projections of the normal rotation projections 240 or the reverse rotation projections 250 and is bounced to the side of the pumping region or is led to inner ends along the side surfaces of the respective projections and is returned from the inner ends to the pumping region. Action of the normal rotation projections 240 and the reverse rotation projections 250 in the respective directions of the normal rotation direction and the reverse rotation direction of the shaft 52 will be described below.

In the case where the shaft 52 normally rotates, as indicated with the dashed lines in FIG. 42, the target to be sealed which has oozed to the side of the circular current region beyond the pumping region collides with side surfaces 241c, 242c and 243c which are side surfaces facing on the respective outer periphery sides of the normal rotation projections 241, 242 and 243 of the normal rotation projections 240, is bounced to the side of the pumping region, or is led to the inner ends 241a, 242a and 243a along the respective side surfaces 241c, 242c and 243c of the normal rotation projections 241, 242 and 243, and is returned from the inner ends 241a, 242a and 243a to the pumping region.

Further, there is also a target to be sealed which is not bounced even if the target to be sealed hits against the respective side surfaces 241c and 242c of the normal rotation projections 241 and 242 and is not led to the inner ends 241a and 242a along the side surfaces 241c and 242c, and further proceeds to the side of the root 21b of the end-face lip 21 beyond the side surfaces 241c and 242c. As indicated with the dashed lines in a left part of FIG. 42, even if the target to be sealed flows to the side of the root 21b of the end-face lip 21 beyond the projections (normal rotation projections 241 and 242) on the side of the reverse rotation direction or on the outer periphery side, the target to be sealed which has moved beyond the projections hits against the projections (normal rotation projections 242 and 243) adjacent on the side of the normal rotation direction of the slinger 3 or on the inner periphery side, is led to the inner ends along the projections, and is returned from the inner ends to the pumping region.

For example, even if the target to be sealed flows to the side of the root 21b of the end-face lip 21 beyond the side surface 241c of the normal rotation projection 241, the target to be sealed which has moved beyond this normal rotation projection 241 hits against the side surface 242c of the normal rotation projection 242, is led to the inner end 242a along the side surface 242c, and is returned from the inner end 242a to the pumping region. Further, the target to be sealed which has moved beyond the side surface 241c of the normal rotation projection 241 and the side surface 242c of the normal rotation projection 242, or the target to be sealed which has moved beyond the side surface 242c of the normal rotation projection 242, hits against the side surface 243c of the normal rotation projection 243, is led to the inner end 243a along the side surface 243c, and is returned from the inner end 243a to the pumping region.

For action of returning the target to be sealed which has moved beyond the projections, it is preferable that the length of the projections on the side of the normal rotation direction or on the inner periphery side in the extending direction is longer because it is possible to make a region larger which is collided with by the target to be sealed which has moved beyond the projections on the side of the reverse rotation direction or on the outer periphery side and by the target to be sealed which has proceeded without colliding with the projections on the side of the reverse rotation direction or on the outer periphery side.

Meanwhile, in the case where the shaft 52 normally rotates, as indicated with dashed lines in a right part in FIG. 42, among the target to be sealed which has oozed to the side of the circular current region beyond the pumping region, there is a target to be sealed which is led to the inner side along the side surfaces 251c, 252c and 253c which are side surfaces facing on the respective outer periphery sides of the reverse rotation projections 251, 252 and 253 of the reverse rotation projections 250. Such a target to be sealed which is led to the inner side by the reverse rotation projections 251, 252 and 253 is led to the inner ends 241a, 242a and 243a along or by colliding with the respective side surfaces 241c, 242c and 243c of the normal rotation projections 241, 242 and 243 of the normal rotation projections 240 adjacent on the side of the normal rotation direction, and is returned from the inner ends 241a, 242a and 243a to the pumping region.

Meanwhile, in the case where the shaft 52 reversely rotates, the respective reverse rotation projections 251, 252 and 253 of the reverse rotation projections 250 act in a similar manner to the normal rotation projections 241, 242 and 243 of the normal rotation projections 240 upon the above-described normal rotation, and the respective normal rotation projections 241, 242 and 243 of the normal rotation projections 240 act in a similar manner to the reverse rotation projections 251, 252 and 253 of the reverse rotation projections 250 upon the above-described normal rotation, so that the target to be sealed which has oozed to the side of the circular current region is returned to the pumping region.

In this manner, in the sealing apparatus 600, even if the target to be sealed further oozes to the circular current region beyond the pumping region where the pumping action is exerted, it is possible to return this target to be sealed which has oozed to the pumping region by the normal rotation projections 240 and the reverse rotation projections 250, and further return the target to be sealed to the side of the target to be sealed by the pumping action. In this manner, according to the sealing apparatus 600, it is possible to use the pumping action exerted by the groove 33 formed at the slinger 3 more effectively by the normal rotation projections 240 and the reverse rotation projections 250 formed at the end-face lip 21, so that it is possible to suppress ooze of the target to be sealed compared to the related art. Further, because the respective projections of the normal rotation projections 240 and the reverse rotation projections 250 do not contact the slinger 3, according to the sealing apparatus 600, it is possible to suppress ooze of the target to be sealed without increasing sliding resistance to the slinger 3.

Further, in the sealing apparatus 600, upon normal rotation of the shaft 52, mainly the normal rotation projections 241, 242 and 243 of the normal rotation projections 240 return the target to be sealed which has oozed to the circular current region to the pumping region, and upon reverse rotation of the shaft 52, mainly the reverse rotation projections 251, 252 and 253 of the reverse rotation projections 250 return the target to be sealed which has oozed to the circular current region to the pumping region. In this manner, in the sealing apparatus 600, even in the case where the shaft 52 rotates in either direction of the normal rotation direction and the reverse rotation direction, it is possible to return the target to be sealed which has oozed to the circular current region to the pumping region, so that it is possible to use the pumping action exerted by the groove 33 formed at the slinger 3 more effectively.

The pumping action based on the groove 33 of the slinger 3 is reduced as rotation speed of the slinger 3 becomes higher. It can be considered that this is because the pumping region contracts toward the side of the slinger contact portion 24 and the lip contact portion 32 as the rotation speed of the slinger 3 becomes higher. Therefore, in the case where the target to be sealed oozes from the side of the target to be sealed to the narrow space S, the target to be sealed which enters the circular current region increases as the rotation speed of the slinger 3 becomes higher. If an amount of the target to be sealed which circulates in the circular current region exceeds an amount of the target to be sealed which can be retained in the circular current region, the target to be sealed further oozes inside, and there is a case where the target to be sealed further oozes outside the sealing apparatus 600.

In the sealing apparatus 600 according to the sixth embodiment of the present disclosure, as described above, even if the target to be sealed oozes to the circular current region beyond the pumping region, it is possible to return this target to be sealed which has oozed to the pumping region by the respective projections of the normal rotation projections 240 or the reverse rotation projections 250, and further return the target to be sealed to the side of the target to be sealed by the pumping action. Therefore, even if the rotation of the slinger 3 becomes higher and the target to be sealed which is retained in the circular current region increases, it is possible to return this target to be sealed which is retained in the circular current region to the pumping region by the respective projections of the normal rotation projections 240 or the reverse rotation projections 250, and it is possible to prevent the amount of the target to be sealed which circulates in the circular current region from exceeding the amount of the target to be sealed which can be retained in the circular current region. Further, even if the pumping action is reduced by high-speed rotation of the slinger 3, because the target to be sealed can be returned to the pumping region by the respective projections of the normal rotation projections 240 or the reverse rotation projections 250, it is possible to increase the target to be sealed which can be returned to the side of the target to be sealed by the pumping action upon high-speed rotation of the slinger 3. Also in this case, because speed of the target to be sealed which circulates in the circular current region becomes higher as the rotation speed of the shaft 52 becomes higher, the target to be sealed which is retained in the circular current region is further more likely to be led to the pumping region.

In this manner, according to the sealing apparatus 600 according to the sixth embodiment of the present disclosure, even in the case where the pumping action by the groove 33 of the slinger 3 is utilized, it is possible to suppress ooze of the target to be sealed regardless of a value of the rotation speed of the shaft 52.

Further, also in the sealing apparatus 600 according to the sixth embodiment, flow of air in the rotation direction of the slinger 3 occurs in the narrow space S formed by the end-face lip 21 and the slinger 3 in accordance with rotation of the slinger 3.

This air is derived to the side of the tip 21a of the end-face lip 21 by colliding with the normal rotation projections 241, 242 and 243 of the normal rotation projections 240 formed on the inner periphery surface 22 of the end-face lip 21, and flows toward the slinger contact portion 24 upon normal rotation of the shaft 52.

Meanwhile, upon reverse rotation of the shaft 52, this air is derived to the side of the tip 21a of the end-face lip 21 by colliding with the reverse rotation projections 251, 252 and 253 of the reverse rotation projections 250 formed on the inner periphery surface 22 of the end-face lip 21 and flows toward the slinger contact portion 24.

As a result, because the flow of air occurring from the narrow space S to the side of the slinger contact portion 24 by the presence of the normal rotation projections 240 or the reverse rotation projections 250 functions to push back a lubricant which oozes from the side of the target to be sealed to the narrow space S, to the pumping region, it is possible to reduce ooze of the lubricant.

Particularly, because such flow of air becomes higher as the rotation speed of the slinger 3 becomes higher, the flow of air becomes faster, strength of the air flowing from the tip 21a of the end-face lip 21 to the side of the target to be sealed increases, so that the function to push back the lubricant to the pumping region becomes further strong.

Particularly, because the normal rotation projections 240 and the reverse rotation projections 250 are provided, upon reverse rotation as well as normal rotation of the shaft 52, the flow of air becomes strong, and the function to push back the lubricant to the pumping region is exerted further effectively. In this manner, according to the sealing apparatus 600, even in the case where the rotation speed of the shaft 52 becomes higher, it is possible to suppress ooze of the target to be sealed by an effect of flow of air occurring by the normal rotation projections 240 and the reverse rotation projections 250.

While the preferred sixth embodiment of the present disclosure has been described above, the present disclosure is not limited to the sealing apparatus 600 according to the above-described sixth embodiment, and incorporates any aspect included in the concept of the present disclosure and the scope of the claims. Further, the respective configurations may be selectively combined as appropriate to solve or provide at least part of the above-described problems or effects. Further, for example, the shapes, materials, arrangement, sizes, or the like, of the respective components in the above-described sixth embodiment can be changed as appropriate in accordance with specific usage aspects of the present disclosure.

Figure 43:
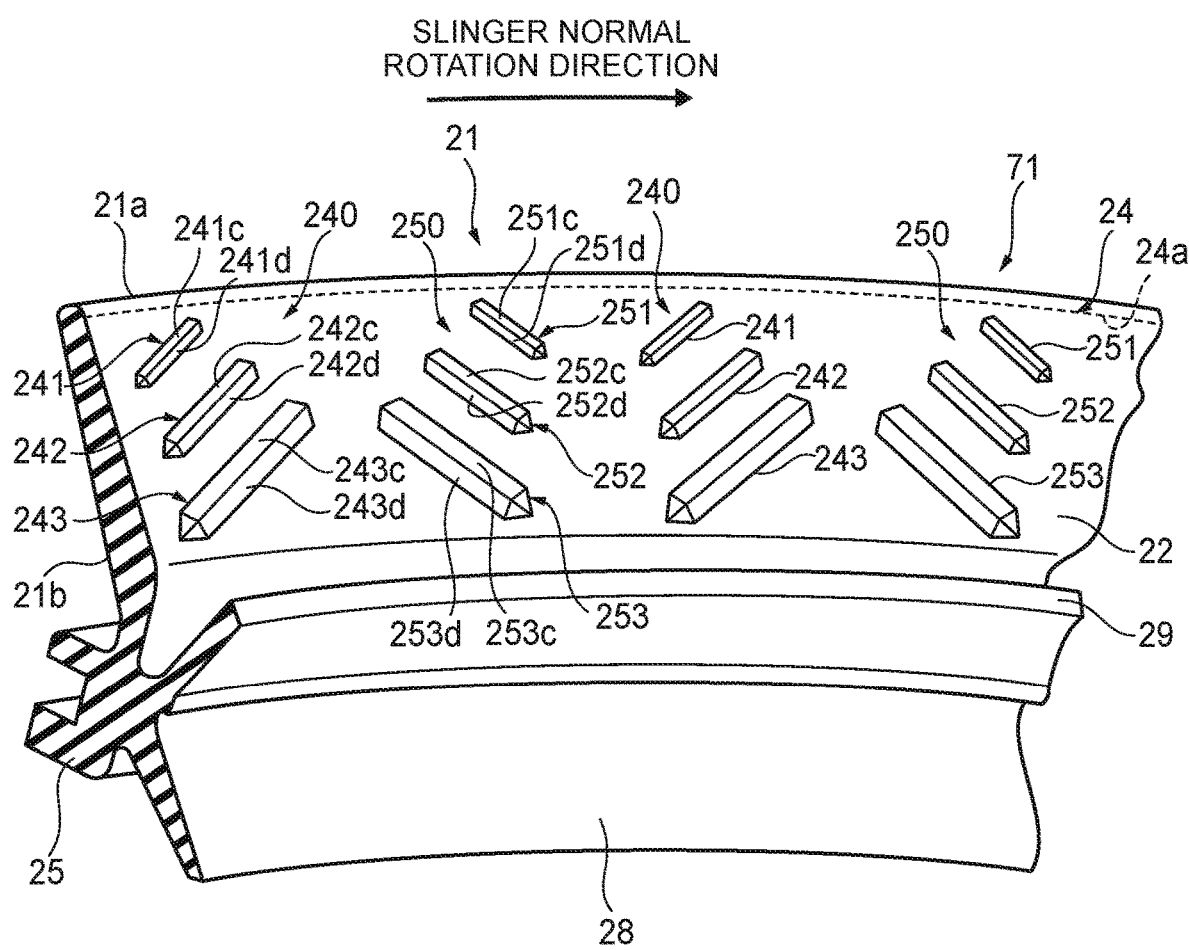
FIG. 43 is a diagram for illustrating a modified example of a shape of tip portions of respective projections of the normal rotation projections and the reverse rotation projections in an extending direction in the sealing apparatus illustrated in FIG. 40.

While, as illustrated in FIG. 39 and FIG. 40, the shape of the tip portions (portions on the side of the inner ends 241a to 243a) of the respective normal rotation projections 241 to 243 of the normal rotation projections 240 in the extending direction is a shape (tapered shape) tapered toward the tips (inner ends 241a to 243a), the shape of the tip portions of the respective normal rotation projections 241 to 243 in the extending direction is not limited to this tapered shape, and, as illustrated in FIG. 43, may be a shape in which the side surfaces 241c to 243c and the side surfaces 241d to 243d on the opposite side of the side surfaces 241c to 243c extend in parallel or substantially parallel, and the tips are not sharpened.

In a similar manner, while, as illustrated in FIG. 39 and FIG. 40, the shape of the tip portions (portions on the side of the inner ends 251a to 253a) of the respective reverse rotation projections 251 to 253 of the reverse rotation projections 250 in the extending direction is a shape (tapered shape) tapered toward the tips (the inner ends 251a to 253a), the shape of the tip portions of the respective reverse rotation projections 251 to 253 in the extending direction is not limited to this tapered shape, and, as illustrated in FIG. 43, may be a shape in which the side surfaces 251c to 253c and the side surfaces 251d to 253d on the opposite side of the side surfaces 251c to 253c extend in parallel or substantially parallel, and the tips are not sharpened.

Further, while, as illustrated in FIG. 39 and FIG. 40, inclination angles $\alpha f1$ to $\alpha f3$ of the respective normal rotation projections 241 to 243 of the normal rotation projections 240 may be respectively the same or substantially the same, the inclination angles do not have to be respectively the same or substantially the same. For example, of the normal rotation projections 241 to 243, the further on the side of the normal rotation direction or on the inner periphery side the normal rotation projection is located, the greater the inclination in the normal rotation direction of the normal rotation projection is, and the inclination of the normal rotation projection 242 is greater than the inclination of the normal rotation projection 241, and the inclination of the normal rotation projection 243 is greater than the inclination of the normal rotation projection 242 ($\alpha f1 < \alpha f2 < \alpha f3$). Inversely, of the normal rotation projections 241 to 243, the further on the side of the reverse rotation direction or on the outer periphery side the normal rotation direction projection is located, the greater the inclination in the normal rotation direction of the normal rotation projection is, and the inclination of the normal rotation projection 241 is greater than the inclination of the normal rotation projection 242, and the inclination of the normal rotation projection 242 is greater than the inclination of the normal rotation projection 243 ($\alpha f1 > \alpha f2 > \alpha f3$).

In a similar manner, while, as illustrated in FIG. 39 and FIG. 40, inclination angles $\alpha r1$ to $\alpha r3$ of the respective reverse rotation projections 251 to 253 of the reverse rotation projections 250 are respectively the same or substantially the same, the inclination angles do not have to be respectively the same or substantially the same. For example, of the reverse rotation projections 251 to 253, the further on the side of the reverse rotation direction or on the inner periphery side the reverse rotation projection is located, the greater the inclination in the reverse rotation direction of the reverse rotation projection is, and the inclination of the reverse rotation projection 252 is greater than the inclination of the reverse rotation projection 251, and the inclination of the reverse rotation projection 253 is greater than the inclination of the reverse rotation projection 252 ($\alpha r1 < \alpha r2 < \alpha r3$). Inversely, of the reverse rotation projections 251 to 253, the further on the side of the normal rotation direction or on the outer periphery side the reverse rotation projection is located, the greater the inclination in the reverse rotation direction of the reverse rotation projection is, and the inclination of the reverse rotation projection 251 is greater than the inclination of the reverse rotation projection 252, and the inclination of the reverser rotation projection 252 is greater than the inclination of the reverse rotation projection 253 ($\alpha r1 > \alpha r2 > \alpha r3$).

Further, while, as illustrated in FIG. 39 and FIG. 40, of lengths Lf1 to Lf3 of the respective normal rotation projections 241 to 243 of the normal rotation projections 240 in the extending direction, the further on the side of the normal rotation direction or on the inner periphery side the normal rotation projection is located, the longer the length is (Lf1<Lf2<Lf3), the lengths of the respective normal rotation projections 241 to 243 are not limited to these, and may be combination of the lengths different from these. For example, the lengths Lf1 to Lf3 of the respective normal rotation projections 241 to 243 may be respectively the same or substantially the same, or the further on the side of the reverse rotation direction or on the outer periphery side the normal rotation projection is located, the longer the length in the extending direction is (Lf1>Lf2>Lf3).

In a similar manner, while, as illustrated in FIG. 39 and FIG. 40, of lengths Lr1 to Lr3 of the respective reverse rotation projections 251 to 253 of the reverse rotation projections 250 in the extending direction, the further on the side of the reverse rotation direction or on the inner periphery side the reverse rotation projection is located, the longer the length is (Lr1<Lr2<Lr3), the lengths of the respective reverse rotation projections 251 to 253 are not limited to these, and may be combination of the lengths different from these. For example, the lengths Lr1 to Lr3 of the respective reverse rotation projections 251 to 253 may be respectively the same or substantially the same, or the further on the side of the normal rotation direction or on the outer periphery side the reverse rotation projection is located, the longer the length in the extending direction is (Lr1>Lr2>Lr3).

The number of the normal rotation projections 241 to 243 of the normal rotation projections 240 is not limited to the above-described three, and may be two or four or more, or may be one. In a similar manner, the number of the reverse rotation projections 251 to 253 of the reverse rotation projections 250 is not limited to the above-described three and may be two or four or more, or may be one. Further, the normal rotation projections 240 and the reverse rotation projections 250 may be symmetric with respect to a line or does not have to be symmetric with respect to a line.

As described above, the shape of the groove 33 provided at the slinger 3 is not limited to a screw (four-start screw) shape, and may be other shapes. For example, as illustrated in FIG. 15A, the groove 33 may be a groove extending in a radial manner centered on or substantially centered on the axis line x from the inner periphery side toward the outer periphery side, or, as illustrated in FIG. 15B, may be a groove extending while tilting in the circumferential direction.

While, in the sealing apparatus 600, the elastic body portion 20 includes the dust lip 28 and the intermediate lip 29, the elastic body portions 20 and 60 do not have to include the dust lip 28 and the intermediate lip 29 or may include only one of the dust lip 28 and the intermediate lip 29.

Further, the sealing apparatus 600 according to the sixth embodiment of the present disclosure can be applied to all configurations which can utilize effects provided by the present disclosure, such as other vehicles, general-purpose machine and industrial machine.

Seventh Embodiment

Figure 44:
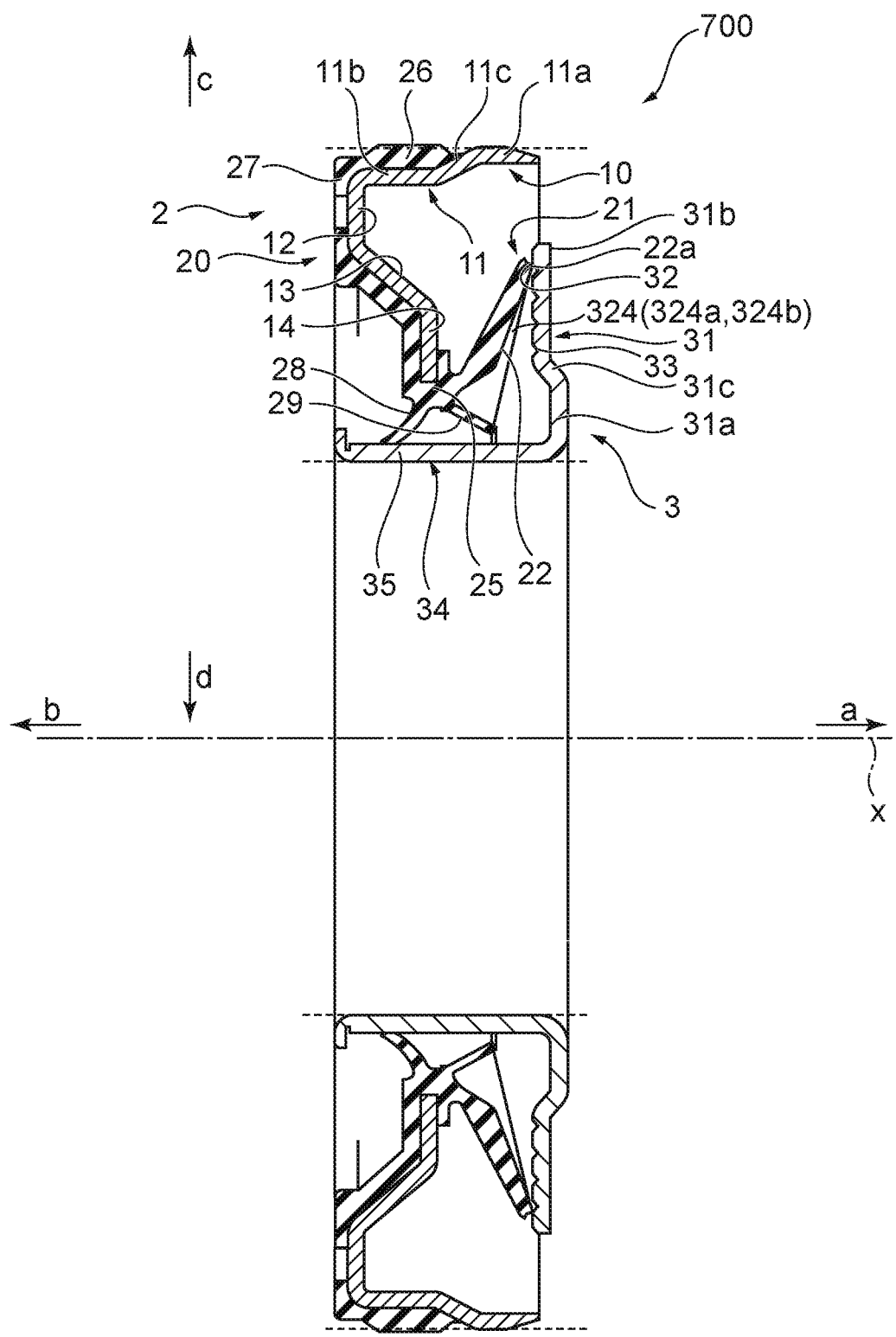
FIG. 44 is a cross-sectional diagram on a cross-section along an axis line x for illustrating a schematic configuration of a sealing apparatus according to a seventh embodiment of the present disclosure.
Figure 45:
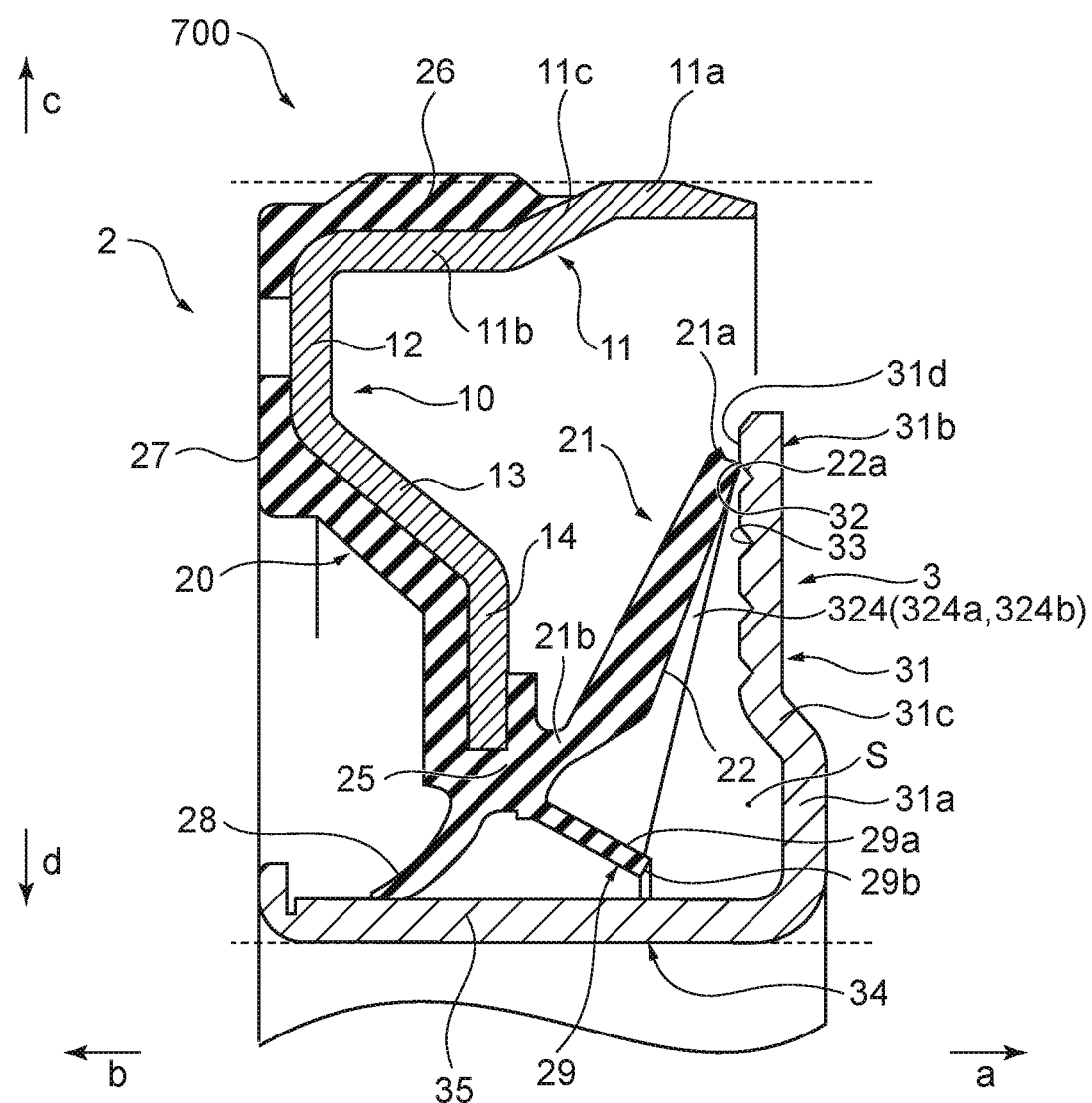
FIG. 45 is a partially enlarged cross-sectional diagram illustrating enlarged part of the cross-section along the axis line of the sealing apparatus according to the seventh embodiment of the present disclosure.

FIG. 44 is a cross-sectional diagram on a cross-section along the axis line x for illustrating a schematic configuration of a sealing apparatus 700 according to a seventh embodiment of the present disclosure, and FIG. 45 is a partially enlarged cross-sectional diagram illustrating enlarged part of the cross-section along the axis line x of the sealing apparatus 700 according to the seventh embodiment of the present disclosure. The sealing apparatus 700 according to the present embodiment is a sealing apparatus for sealing an annular gap between a shaft and a hole into which this shaft is to be inserted, and is used to seal a gap between a shaft and a hole (shaft hole) which is formed at a housing, or the like, and into which this shaft is to be inserted in a vehicle or general-purpose machine. For example, the sealing apparatus is used to seal annular space between a crank shaft of an engine and a crank hole which is a shaft hole formed at a front cover, a cylinder block and a crank case. Note that a target to which the sealing apparatus 700 according to the seventh embodiment of the present disclosure is applied is not limited to the above.

Hereinafter, for the purpose of illustration, a direction of an arrow a (see FIG. 44) in the axis line x direction (one side in the axis line direction) is set as an inner side, and a direction of an arrow b (see FIG. 44) in the axis line x direction (another side in the axis line direction) is set as an outer side. More specifically, the inner side is a side of space to be sealed (side of the target to be sealed) and a side of space where the target to be sealed such as a lubricant exists, and the outer side is an opposite side of the inner side. Further, in a direction perpendicular to the axis line x (hereinafter, also referred to as a "radial direction"), a direction away from the axis line x (direction of an arrow c in FIG. 44) is set as an outer periphery side, and a direction approaching the axis line x (direction of an arrow d in FIG. 44) is set as an inner periphery side.

As illustrated in FIG. 44, the sealing apparatus 700 includes a sealing apparatus body 2 fitted into a hole as an attachment target which will be described later, and a slinger 3 attached to a shaft as an attachment target which will be described later. The sealing apparatus body 2 includes a reinforcing ring 10 which is annular around the axis line x, and an elastic body portion 20 which is formed with an elastic body attached to the reinforcing ring 10 and which is annular around the axis line x. The slinger 3 includes a flange portion 31 which is a portion extending toward the outer periphery side (direction of the arrow c) and annular around the axis line x. The elastic body portion 20 includes an end-face lip 21 which is a lip extending toward the one side (inner side, the direction of the arrow a) in the axis line x direction, contacting the flange portion 31 from the other side (outer side, the direction of the arrow b) in the axis line x direction, and annular around the axis line x.

At least one groove 33 is formed on a surface on the other side (outer side) of the flange portion 31 of the slinger 3, and a plurality of ribs 324 which obliquely extend in the radial direction are integrally provided side by side at regular intervals on the inner periphery surface 22 which is a surface on the inner periphery side of the end-face lip 21. Note that a configuration of the ribs 324 will be described later.

Note that, because the respective basic configurations of the sealing apparatus body 2 and the slinger 3 of the sealing apparatus 700 are the same as those of the sealing apparatus body 2 and the slinger 3 of the sealing apparatus 1 in the first embodiment, description will be omitted here, and points of different configurations will be described.

At the elastic body portion 20, the end-face lip 21 extends from the base portion 25 toward the inner side (direction of the arrow a) in an annular manner centered on or substantially centered on the axis line x, and is formed so that, in the state where the sealing apparatus 1 is used which will be described later where the sealing apparatus 1 is attached to a desired position at an attachment target, the tip portion contacts the flange portion 31 of the slinger 3 from the outer side with a predetermined interference (slinger contact portion 24). The end-face lip 21 has, for example, a conical cylindrical shape whose diameter becomes greater toward the inner side (direction of the arrow a) in the axis line x direction. That is, as illustrated in FIG. 44 and FIG. 45, the end-face lip 21 extends obliquely with respect to the axis line x on the inner side and the outer periphery side of the base portion 25 on the cross-section along the axis line x (hereinafter, also simply referred to as a cross-section).

Figure 46:
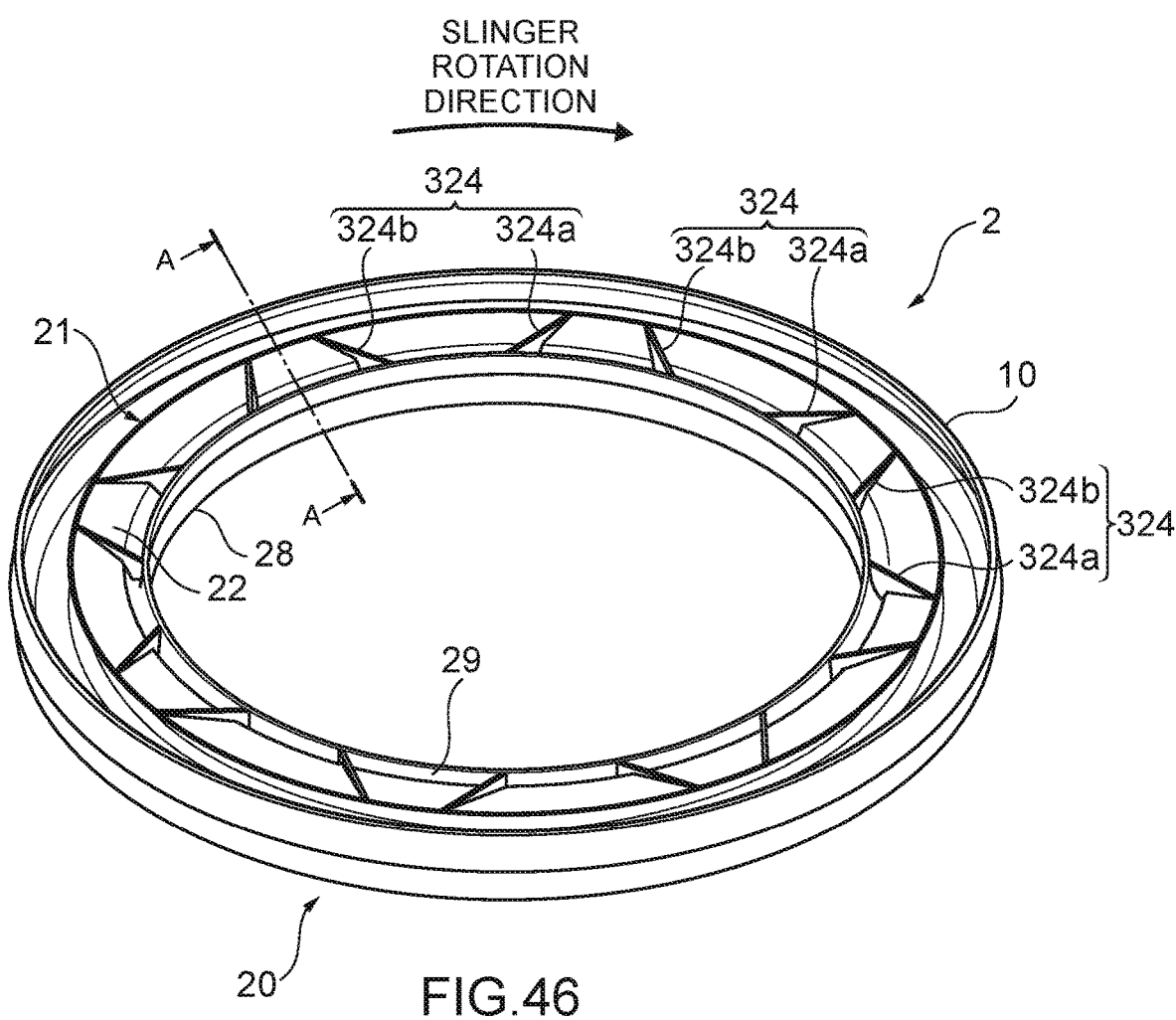
FIG. 46 is a perspective view of an elastic body portion in the sealing apparatus illustrated in FIG. 44, seen from an inner periphery side.
Figure 47:
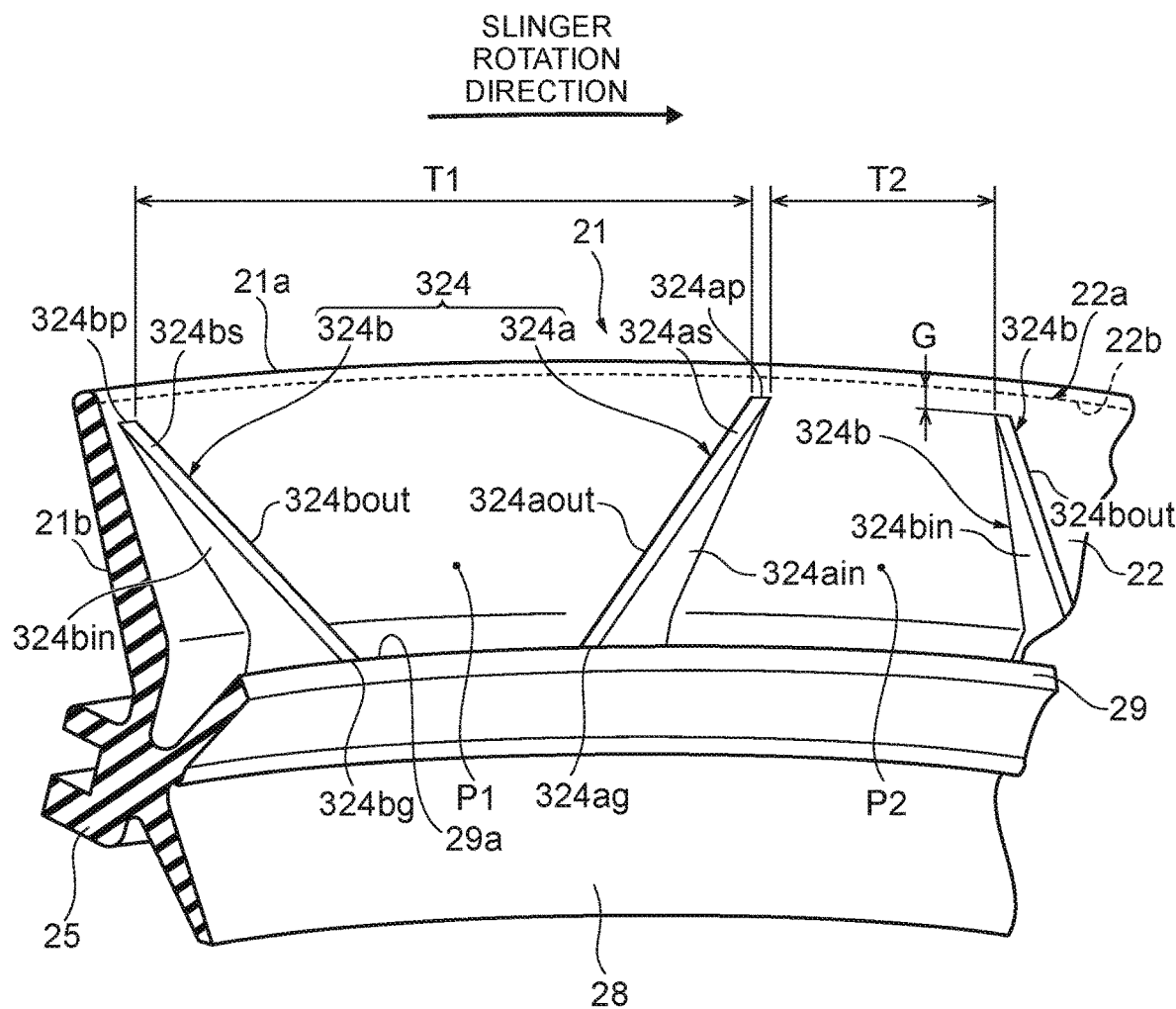
FIG. 47 is a partially enlarged perspective view of the elastic body portion in the sealing apparatus illustrated in FIG. 44 in a state where the elastic body portion at a portion on an inner side from a base portion is cut on a plane along the axis line.
Figure 48:
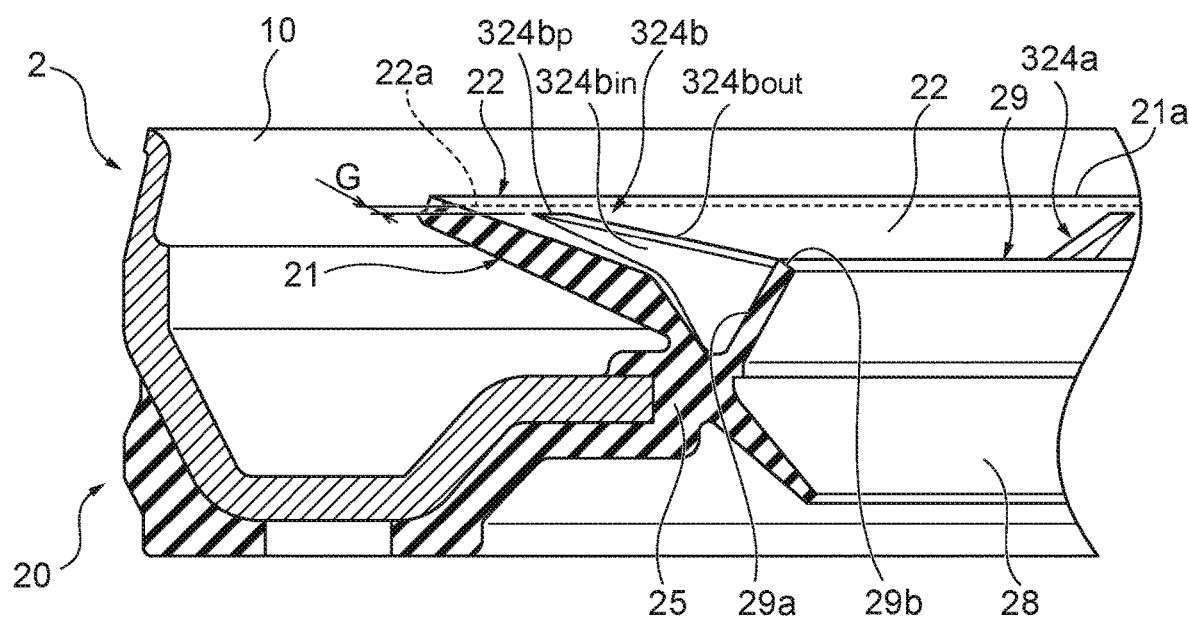
FIG. 48 is a partial perspective view of a sealing apparatus body illustrating a cross-section along a line A-A in FIG. 46.
Figure 49:
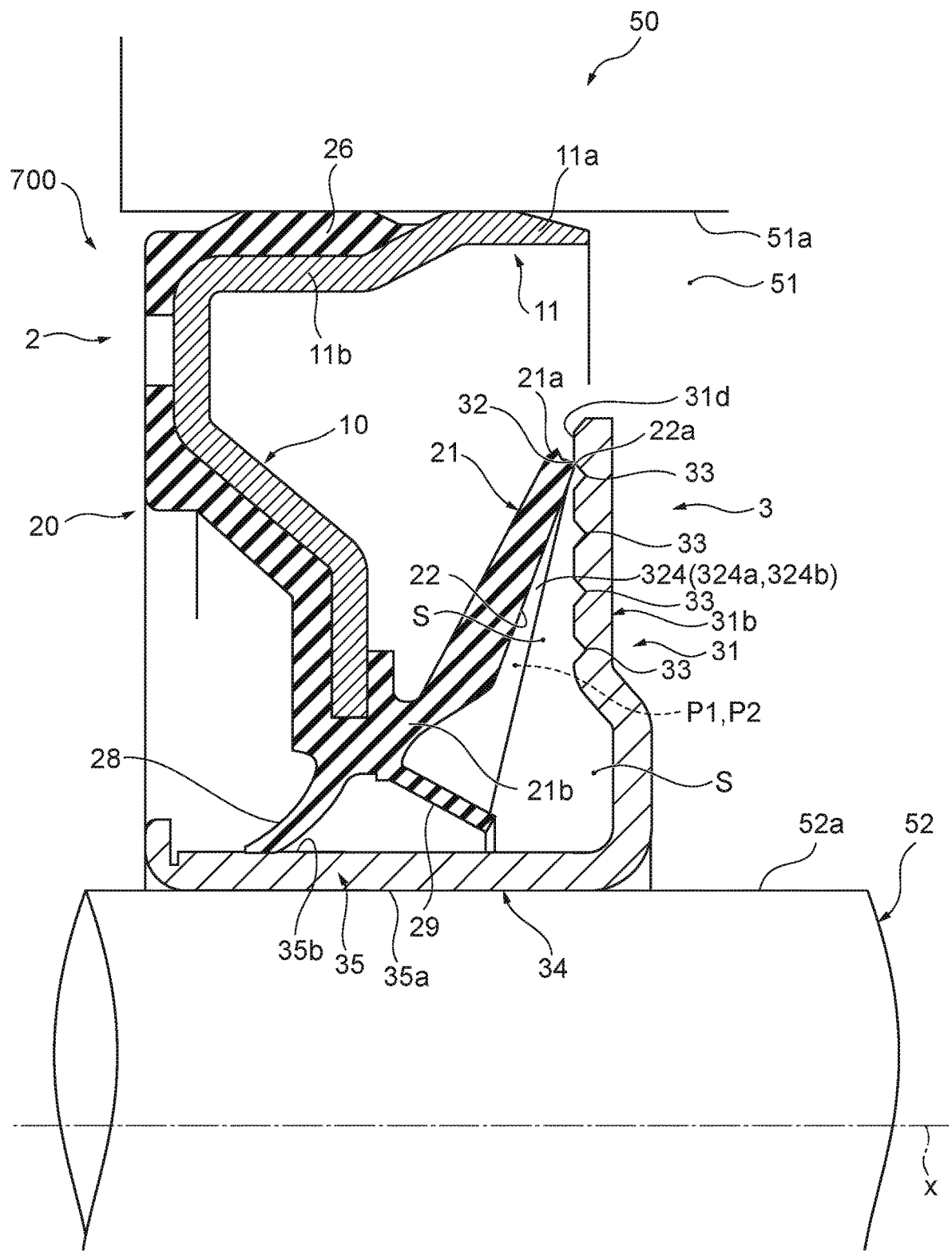
FIG. 49 is a partially enlarged cross-sectional diagram of the sealing apparatus in a usage state where the sealing apparatus according to the seventh embodiment of the present disclosure is attached to a housing and a shaft inserted into a shaft hole.

The shape of the end-face lip 21 will be described next in more detail. FIG. 46 is a perspective view of the elastic body portion 20 in the sealing apparatus 700 illustrated in FIG. 44 seen from the inner periphery side. Further, FIG. 47 is a partially enlarged perspective view of the elastic body portion 20 seen from the inner periphery side in a state where the elastic body portion 20 at a portion on the inner periphery side from the base portion 25 is cut on a plane along the axis line x. FIG. 48 is a partial perspective view of the sealing apparatus body illustrating a cross-section along a line A-A in FIG. 47. As illustrated in FIG. 47 to FIG. 49, on the inner periphery surface 22 of the end-face lip 21, a plurality of ribs 324 are arranged at equal angular intervals or substantially equal angular intervals in the circumferential direction and arranged at equal pitch intervals or substantially equal pitch intervals on the same or substantially the same circumference.

The ribs 324 are sheet members having a shape of a substantially triangle in lateral view, formed so that a height from the inner periphery surface 22 becomes gradually lower from the inner periphery side toward the outer periphery side, and having a cross-sectional shape of a substantially rectangle on a cross-section perpendicular to the extending direction. The plurality of ribs 324 are provided in the circumferential direction such that a slinger rotation direction ribs 324a as a first rib and a slinger reverse rotation direction rib 324b as a second rib, which have extending directions toward the tips different from each other, are paired. However, it is assumed that the slinger rotation direction rib 324a and the slinger reverse rotation direction rib 324b have the same basic configuration.

The ribs 324 (the slinger rotation direction rib 324a and the slinger reverse rotation direction rib 324b) are formed at intervals from the slinger contact portion 22a. That is, the ribs 324 are formed on the side of the root 21b of the end-face lip 21, of the slinger contact portion 22a.

Specifically, as illustrated in FIG. 47 and FIG. 48, inner ends 324ap which are tips on the inner side (outer periphery side) at tip portions 324as of the slinger rotation direction ribs 324a are located at positions away from the outer edge 22b which is an edge portion on the outer side (inner periphery side) of the slinger contact portion 22a by a predetermined interval G toward the axis line x along the inner periphery surface 22. This interval G is an interval such that the slinger rotation direction ribs 324a at least partially exist in a region on the inner periphery side of the pumping region where pumping action based on the groove 33 of the slinger 3 occurs in the state where the sealing apparatus 1 is used which will be described later.

As illustrated in FIG. 45, the slinger rotation direction ribs 324a are formed in a shape such that the slinger rotation direction ribs 324a do not contact the slinger 3 in the state where the sealing apparatus 700 is used. That is, a height of the slinger rotation direction ribs 324a from the inner periphery surface 22 and the interval G are set so that the slinger rotation direction ribs 324a do not contact the outer side surface 31d which is a surface on the outer side of the flange portion 31 of the slinger 3 in the state where the sealing apparatus 700 is used.

While, in the seventh embodiment, as illustrated in FIG. 45 to FIG. 48, the height of the slinger rotation direction ribs 324a from the inner periphery surface 22 becomes gradually higher from the inner ends 324ap toward the outer ends 324ag which are end portions on the side of the root 21b of the end-face lip 21, the height of the slinger rotation direction ribs 324a from the inner periphery surface 22 is not limited to this. The height of the slinger rotation direction ribs 324a from the inner periphery surface 22 may be fixed from the inner ends 324ap to the outer ends 324ag or the height from the inner periphery surface 22 may become lower from the inner ends 324ap toward the outer ends 324ag. Further, the height of the slinger rotation direction ribs 324a from the inner periphery surface 22 from the inner ends 324ap to the outer ends 324ag may be various kinds of combination of the above-described becoming higher, becoming lower, being fixed, or the like. Further, the shape of the slinger rotation direction ribs 324a on a cross-section perpendicular to the extending direction is not limited to a rectangular sheet shape, and may be a shape such as, for example, a triangle, a rectangle and an inverted U shape. Because the slinger rotation direction ribs 324a are formed in a shape such that the slinger rotation direction ribs 324a do not contact the slinger 3 in the state where the sealing apparatus 700 is used, sliding resistance to the slinger 3 does not increase by the slinger rotation direction ribs 324a.

As illustrated in FIG. 47, the slinger rotation direction ribs 324a extend so that the tip portions 324as are along the rotation direction of the slinger 3 (hereinafter, this will be also referred to as a "slinger rotation direction") from the inner periphery side toward the outer periphery side. Note that, on the side of the tips of the tip portions 324as, the height is the same height as the height of the inner periphery surface 22 of the end-face lip 21. However, the height is not limited to this, and the height on the side of the tips of the tip portions 324as may be set slightly higher than the height of the inner periphery surface 22 of the end-face lip 21. Further, outer ends 324ag which are base end portions of the slinger rotation direction ribs 324a extend to the intermediate lip 29, and the slinger rotation direction ribs 324a are integrally connected to the intermediate lip 29. However, the shape is not limited to this, and the outer ends 324ag of the slinger rotation direction ribs 324a may be away from the intermediate lip 29 via a slight gap.

The slinger rotation direction ribs 324a include outer periphery surfaces 324aout facing on the outer periphery side and inner periphery surfaces 324ain facing on the inner periphery side. The outer periphery surfaces 324aout of the slinger rotation direction ribs 324a have a function to guide the target to be sealed which is stemmed and retained by an outer periphery surfaces 324bout of the slinger reverse rotation direction ribs 324b and the intermediate lip 29, from the outer ends 324ag toward the inner ends 324ap along the outer periphery surfaces 324aout in the case where the target to be sealed such as a lubricant oozes from the side of the target to be sealed to inner space P1 between the slinger rotation direction ribs 324a and the slinger reverse rotation direction ribs 324b beyond the slinger contact portion 22a and the lip contact portion 32. Further, the inner periphery surfaces 324ain of the slinger rotation direction ribs 324a have a function to guide the target to be sealed from the tip portions 324as toward the outer ends 324ag along the inner periphery surfaces 324ain in the case where the target to be sealed oozes from the side of the target to be sealed to inner space P2 beyond the slinger contact portion 22a and the lip contact portion 32.

Meanwhile, the slinger reverse rotation direction ribs 324b extend so that the tip portions 324bs are along a direction opposite to the rotation direction of the slinger 3 (hereinafter, this will be also referred to as a "slinger reverse rotation direction") from the inner periphery side toward the outer periphery side, and outer ends 324bg which are base end portions of the slinger reverse rotation direction ribs 324b extend and are integrally connected to the intermediate lip 29. Note that the slinger reverse rotation direction ribs 324b and the slinger rotation direction ribs 324a have the same basic configuration, and only the extending directions are different.

Therefore, also the slinger reverse rotation direction ribs 324b include outer periphery surfaces 324bout facing on the outer periphery side and inner periphery surfaces 324bin facing on the inner periphery side in a similar manner to the slinger rotation direction ribs 324a. The outer periphery surfaces 324bout of the slinger reverse rotation direction ribs 324b have a function to guide the target to be sealed from the inner ends 324bp toward the outer ends 324bg in the case where the target to be sealed oozes from the side of the target to be sealed to the inner space P1 beyond the slinger contact portion 22a and the lip contact portion 32. Further, the inner periphery surfaces 324*b*in of the slinger reverse rotation direction ribs 324*b* have a function to guide the target to be sealed from the tip portions 324*as* toward the outer ends 324*ag* along the inner periphery surfaces 324*b*in in the case where the target to be sealed oozes from the side of the target to be sealed to the inner space P2 beyond the slinger contact portion 22*a* and the lip contact portion 32.

That is, the slinger rotation direction ribs 324*a* and the slinger reverse rotation direction ribs 324*b* in the ribs 324 extend in a substantially V shape in which the respective tip portions 324*as* and the tip portions 324*bs* are gradually separated from each other from the inner periphery side toward the outer periphery side. Here, the tip portions 324*as* of the slinger rotation direction ribs 324*a* and the tip portions 324*bs* of the slinger reverse rotation direction ribs 324*b* are separate from each other by a predetermined interval T1.

Note that, at the ribs 324, the outer ends 324*ag* of the slinger rotation direction ribs 324*a* and the outer ends 324*bg* of the slinger reverse rotation direction ribs 324*b* may be directly connected to each other as well as being connected to the intermediate lip 29. It is preferable that the outer ends 324*ag* of the slinger rotation direction ribs 324*a* and the outer ends 324*bg* of the slinger reverse rotation ribs 324*b* are provided in the circular current region which will be described later. A pair of ribs 324 are configured with the slinger rotation direction rib 324*a* and the slinger reverse rotation direction rib 324*b* which form a substantially V shape.

While, in this case, as illustrated in FIG. 46, at the end-face lip 21, a plurality of pairs of the ribs 324 are provided at regular intervals in the circumferential direction on the inner periphery surface 22 of the end-face lip 21, a fixed interval T2 (FIG. 47) is provided between the slinger rotation direction rib 324*a* in one pair of ribs 324 and the slinger reverse rotation direction rib 324*b* in another pair of ribs 324 adjacent to the one pair of ribs 324 (that is, a size of the inner space P2 between the two ribs 324 adjacent to each other). Here, the interval T1 in one pair of ribs 324 is greater than an interval T2 between two ribs 324 adjacent to each other (the interval T1>the interval T2). However, the relationship is not limited to this, and may be the interval T1=the interval T2 or may be the interval T1<the interval T2.

The slinger 3 is an annular member attached to the shaft in the state where the sealing apparatus 700 is used which will be described later, and is an annular member centered on or substantially centered on the axis line x. Because the slinger 3 is the same as the slinger 3 of the sealing apparatus 1 in the first embodiment, description thereof will be omitted here.

Action of the sealing apparatus 700 having the above-described configuration will be described next. FIG. 49 is a partially enlarged cross-sectional diagram of the sealing apparatus 700 in the usage state where the sealing apparatus 700 is attached to the housing 50 as an attachment target and the shaft 52 inserted into the shaft hole 51 which is a through-hole formed at the housing 50. The housing 50 is, for example, a front cover of an engine, or a cylinder block and a crank case, and the shaft hole 51 is a crank hole formed at the front cover, or the cylinder block and the crank case. Further, the shaft 52 is, for example, a crank shaft.

As illustrated in FIG. 49, in the state where the sealing apparatus 700 is used, the sealing apparatus body 2 is fitted into the shaft hole 51 by being pressed into the shaft hole 51 of the housing 50, and the slinger 3 is attached to the shaft 52 by being interference-fitted at the shaft 52. More specifically, the outer periphery side cylindrical portion 11*a* of the reinforcing ring 10 contacts the inner periphery surface 51*a* of the shaft hole 51, so that a shaft center of the sealing apparatus body 2 is made to match a shaft center of the shaft hole 51, and the gasket portion 26 tightly contacts the inner periphery surface 51*a* of the shaft hole 51 by the gasket portion 26 of the elastic body portion 20 being compressed in the radial direction between the inner periphery surface 51*a* of the shaft hole 51 and the inner periphery side cylindrical portion 11*b* of the reinforcing ring 10, so that sealing between the sealing apparatus body 2 and the shaft hole 51 is realized. Further, the cylindrical portion 35 of the slinger 3 is pressed into the shaft 52, and the inner periphery surface 35*a* of the cylindrical portion 35 tightly contacts the outer periphery surface 52*a* of the shaft 52, so that the slinger 3 is fixed at the shaft 52.

Relative positions between the sealing apparatus body 2 and the slinger 3 in the axis line x direction are determined so that, in the state where the sealing apparatus 700 is used, the end-face lip 21 of the elastic body portion 20 contacts the lip contact portion 32 which is a portion on the outer side surface 31*d* of the outer periphery side disk portion 31*b* of the flange portion 31 of the slinger 3 at the slinger contact portion 22*a* which is a portion on the side of the tip 21*a* of the inner periphery surface 22. Further, a portion on the tip side of the dust lip 28 contacts the tubular portion 34 of the slinger 3 from the outer periphery side. The dust lip 28, for example, contacts the outer periphery surface 35*b* of the cylindrical portion 35 of the slinger 3.

In this manner, in the state where the sealing apparatus 700 is used, the end-face lip 21 contacts the lip contact portion 32 of the flange portion 31 at the slip contact portion 22*a* so that the slinger 3 can slide, and the end-face lip 21 and the slinger 3 prevent the target to be sealed such as a lubricant from oozing inside from the side of the target to be sealed beyond the slinger contact portion 22*a* and the lip contact portion 32. Further, the dust lip 28 contacts the tubular portion 34 so that the tubular portion 34 of the slinger 3 can slide, and prevents a foreign matter from entering inside from outside.

Further, in the state where the sealing apparatus 700 is used, the groove 33 which forms a four-start screw formed at the outer periphery side disk portion 31*b* of the flange portion 31 of the slinger 3 exerts pumping action in the case where the shaft (slinger 3) rotates. By rotation of the shaft (slinger 3), in narrow space S which is space between the flange portion 31 and the end-face lip 21, pumping action occurs in a region in the vicinity of the slinger contact portion 22*a* and the lip contact portion 32. By this pumping action, even in the case where the target to be sealed oozes from the side of the target to be sealed to the narrow space S, the target to be sealed which has oozed is returned from the narrow space S to the side of the target to be sealed beyond the slinger contact portion 22*a* and the lip contact portion 32. In this manner, by the pumping action caused by the groove 33 formed at the flange portion 31 of the slinger 3, ooze of the target to be sealed to the narrow space S is suppressed.

In the narrow space S, the target to be sealed which has further oozed to the outer side beyond the pumping region where the pumping action by the groove 33 occurs rotates around the axis line x in the rotation direction of the slinger 3 in a region adjacent to the pumping region on the inner periphery side, and is retained in the circular current region by the rotation of the shaft 52.

A plurality of ribs 324 are provided on the inner periphery surface 22 at the end-face lip 21, and the slinger rotation direction ribs 324*a* and the slinger reverse rotation direction ribs 324*b* of the ribs 324 extend on the inner periphery side of positions away from the outer edge 22*b* of the slinger contact portion 22*a* by the interval G, and at least the outer ends 324*ag* and the outer ends 324*bg* partially extend in the circular current region. Therefore, the target to be sealed which tries to be retained in the circular current region while rotating is led from the inner periphery side toward the outer periphery side by the slinger rotation direction ribs 324*a*, the intermediate lip 29 and the slinger reverse rotation direction ribs 324*b*, and the target to be sealed which is retained in the circular current region is led to the pumping region. The target to be sealed which is led to the pumping region by the ribs 324 is returned to the side of the target to be sealed by receiving the pumping action.

Figure 50:
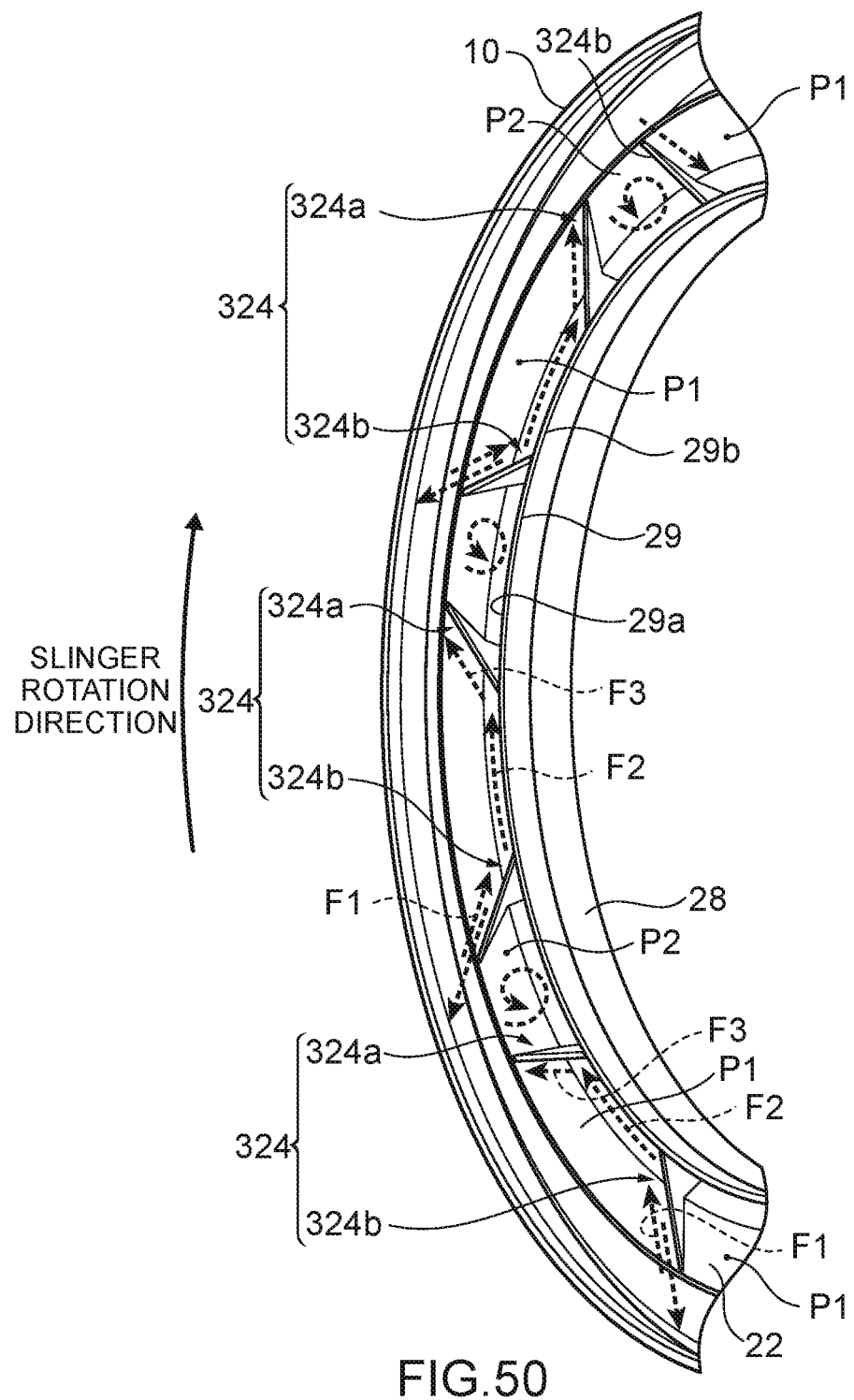
FIG. 50 is a perspective view for illustrating aspect of flow of a target to be sealed by action of ribs of an end-face lip in the sealing apparatus according to the seventh embodiment of the present disclosure.

FIG. 50 is a diagram for illustrating aspect of flow of the target to be sealed by action of the ribs 324 of the end-face lip 21 for explaining the action of the ribs 324 of the end-face lip 21. In FIG. 50, as indicated with a dashed line F1, the target to be sealed which has oozed to the side of the circular current region beyond the pumping region in the inner space P1 collides with the outer periphery surface 324*b*out of the slinger reverse rotation direction rib 324*b* of the ribs 324 and is bounced to the side of the pumping region or led from the inner end 324*bp* to the outer end 324*bg* along the outer periphery surface 324*b*out and reaches the intermediate lip 29. Then, the target to be sealed which has reached the intermediate lip 29 is led in the rotation direction of the slinger along the outer periphery surface 29*a* which is a surface on the outer periphery side of the intermediate lip 29 and reaches the slinger rotation direction rib 324*a*. The target to be sealed which has reached the slinger rotation direction rib 324*a* is led from the outer end 324*ag* to the inner end 324*ap* along the outer periphery surface 324*a*out of the slinger rotation direction rib 324*a* and is returned from the inner end 324*ap* to the pumping region.

Therefore, it is preferable that the slinger rotation direction ribs 324*a* are provided on the inner periphery surface 22 of the end-face lip 21 so that part of the tip portions 324*as* enters the pumping region. Because it can be considered that a width of the pumping region in the radial direction changes in accordance with the rotation speed of the shaft, it is preferable that the slinger rotation direction ribs 324*a* are provided so that part of the tip portions 324*as* of the slinger rotation direction ribs 324*a* enters the pumping region regardless of the rotation speed of the shaft 52. Further, in the case where the slinger rotation direction ribs 324*a* are provided so that the whole of the slinger rotation direction ribs 324*a* exists in the circular current region, the interval G from the outer edge 22*b* of the slinger contact portion 22*a* is set in a range where the target to be sealed which has oozed to the side of the circular current region beyond the pumping region can be returned to the pumping region again as described above.

Because the interval T2 (FIG. 47) is formed between the slinger rotation direction rib 324*a* in one pair of ribs 324 and the slinger reverse rotation direction rib 324*b* in another pair of ribs 324 adjacent to the one pair of ribs 324 (that is, between two ribs 324 adjacent to each other), the target to be sealed oozes to the inner space P2. In the inner space P2, because the interval T2 which becomes an entry is narrow, and the inner periphery surfaces 324*a*in of the slinger rotation direction ribs 324*a* and the inner periphery surfaces 324*b*in of the slinger reverse rotation direction ribs 324*b* tilt from the inner periphery side toward the outer periphery side so as to come closer to each other, the target to be sealed which has oozed to the inner space P2 is less likely to go out from the entry and is likely to be retained in the inner space P2. Here, while the interval T2 is smaller than the interval T1, the relationship is not limited to this, and the interval T1 is equal to the interval T2, or the interval T2 may be greater than the interval T1. However, it is not desirable that the tip portion 324*as* of the slinger rotation direction rib 324*a* in one pair of ribs 324 is connected to the tip portion 324*bs* of the slinger reverse rotation direction rib 324*b* of another pair of ribs 324 adjacent to the one pair of ribs 324 without the interval T2. This is because the target to be sealed which has intruded in the inner space P2 closed by the slinger rotation direction rib 324*a* and the slinger reverse rotation direction rib 324*b* becomes less likely to be returned to the pumping region.

Further, in a state where the slinger 3 (shaft 52) is at rest, the target to be sealed which has oozed from the slinger contact portion 22*a* and the lip contact portion 32 to the inner space P1 flows down from the tip 21*a* of the end-face lip 21 to the side of the target to be sealed along the outer periphery surface 324*b*out of the slinger reverse rotation direction rib 324*b* of the ribs 324. Therefore, in the sealing apparatus 700, it is possible to prevent the target to be sealed from oozing outside in the state where the slinger 3 (shaft 52) is at rest.

In this manner, in the sealing apparatus 700, even if the target to be sealed further oozes to the circular current region beyond the pumping region where the pumping action is exerted, it is possible to return this target to be sealed which has oozed to the pumping region by the ribs 324 and further return the target to be sealed to the side of the target to be sealed by the pumping action.

The pumping action based on the groove 33 of the slinger 3 is reduced as the rotation speed of the slinger 3 becomes higher. It can be considered that this is because the pumping region contracts toward the side of the slinger contact portion 22*a* and the lip contact portion 32 as the rotation speed of the slinger 3 becomes higher. Therefore, in the case where the target to be sealed oozes from the side of the target to be sealed to the narrow space S, the target to be sealed which enters the circular current region increases as the rotation speed of the slinger 3 becomes higher. If an amount of the target to be sealed which circulates in the circular current region exceeds an amount of the target to be sealed which can be retained in the circular current region, the target to be sealed further oozes inside, and there is a case where the target to be sealed further oozes outside the sealing apparatus 700.

In the sealing apparatus 700 according to the seventh embodiment of the present disclosure, as described above, even if the target to be sealed oozes to the circular current region beyond the pumping region, it is possible to return this target to be sealed which has oozed to the pumping region by the ribs 324, and it is possible to further return the target to be sealed to the side of the target to be sealed by the pumping action. Therefore, even if the target to be sealed which is retained in the circular current region increases as a result of the rotation speed of the slinger 3 becoming higher, it is possible to return this target to be sealed which is retained in the circular current region to the pumping region by the ribs 324, so that it is possible to prevent the amount of the target to be sealed which circulates in the circular current region from exceeding the amount of the target to be sealed which can be retained in the circular current region. Further, even if the pumping action is reduced by high-speed rotation of the slinger 3, because the target to be sealed is returned to the pumping region by the ribs 324, it is possible to increase the target to be sealed which can be returned to the side of the target to be sealed by the pumping action upon high-speed rotation of the slinger 3. Also in this case, because the speed of the target to be sealed which circulates in the circular current region becomes higher as the rotation speed of the shaft 52 becomes higher, the target to be sealed which is retained in the circular current region is further more likely to be led to the pumping region. Further, because the ribs 324 can stably guide the target to be sealed so as to be retained in the circular current region, it is possible to increase the amount of the target to be sealed which can be retained in the circular current region, so that, even if the pumping action is reduced by high-speed rotation of the slinger 3, it is possible to prevent the target to be sealed from further oozing outside. Still further, also in a state where the slinger 3 (shaft 52) is at rest, because the target to be sealed which has oozed from the slinger contact portion 22*a* and the lip contact portion 32 to the inner space P1 can flow down from the tip 21*a* of the end-face lip 21 to the side of the target to be sealed along the outer periphery surfaces 324*b*out of the slinger reverse rotation direction ribs 324*b* of the ribs 324, it is possible to prevent the target to be sealed from oozing outside.

In this manner, according to the sealing apparatus 700 according to the seventh embodiment of the present disclosure, because the target to be sealed which has oozed to the inner periphery surface 22 of the end-face lip 21 can be returned to the side of the target to be sealed by the slinger rotation direction ribs 324*a* and the slinger reverse rotation direction ribs 324*b* of the ribs 324, even in the case where the pumping action by the groove 33 of the slinger 3 is utilized, it is possible to suppress ooze of the target to be sealed regardless of a value of the rotation speed of the shaft 52.

Further, also in the sealing apparatus 700 according to the seventh embodiment, flow of air in a rotation direction of the slinger 3 occurs in the narrow space S formed by the end-face lip 21 and the slinger 3 in accordance with rotation of the slinger 3.

This air is derived to the side of the tip 21*a* of the end-face lip 21 by colliding with the ribs 324 formed on the inner periphery surface 22 of the end-face lip 21 and flows toward the slinger contact portion 22*a*. As a result, because the flow of air occurring from the narrow space S to the side of the slinger contact portion 22*a* by the presence of the ribs 324 functions to push back the lubricant oozing from the side of the target to be sealed to the narrow space S, to the pumping region, it is possible to reduce ooze of the lubricant.

Particularly, because such flow of air becomes higher as the rotation speed of the slinger 3 becomes higher, the flow of air becomes faster, and strength of the air flowing from the tip 21*a* of the end-face lip 21 to the side of the target to be sealed increases, so that the function to push back the lubricant to the pumping region becomes further strong. In this manner, according to the sealing apparatus 700, even in the case where the rotation speed of the shaft 52 becomes higher, it is possible to suppress ooze of the target to be sealed by an effect of flow of air occurring by the ribs 324.

Eighth Embodiment

A sealing apparatus 800 according to an eighth embodiment of the present disclosure will be described next. The sealing apparatus 800 according to the eighth embodiment of the present disclosure is different from the sealing apparatus 700 according to the above-described seventh embodiment of the present disclosure in that radial-direction projections are newly provided in the inner space P2. In the following description, the same reference numerals are assigned to the components having functions which are the same as or similar to those of the sealing apparatus 700 according to the above-described seventh embodiment of the present disclosure, description thereof will be omitted, and different configurations will be described.

Figure 51:
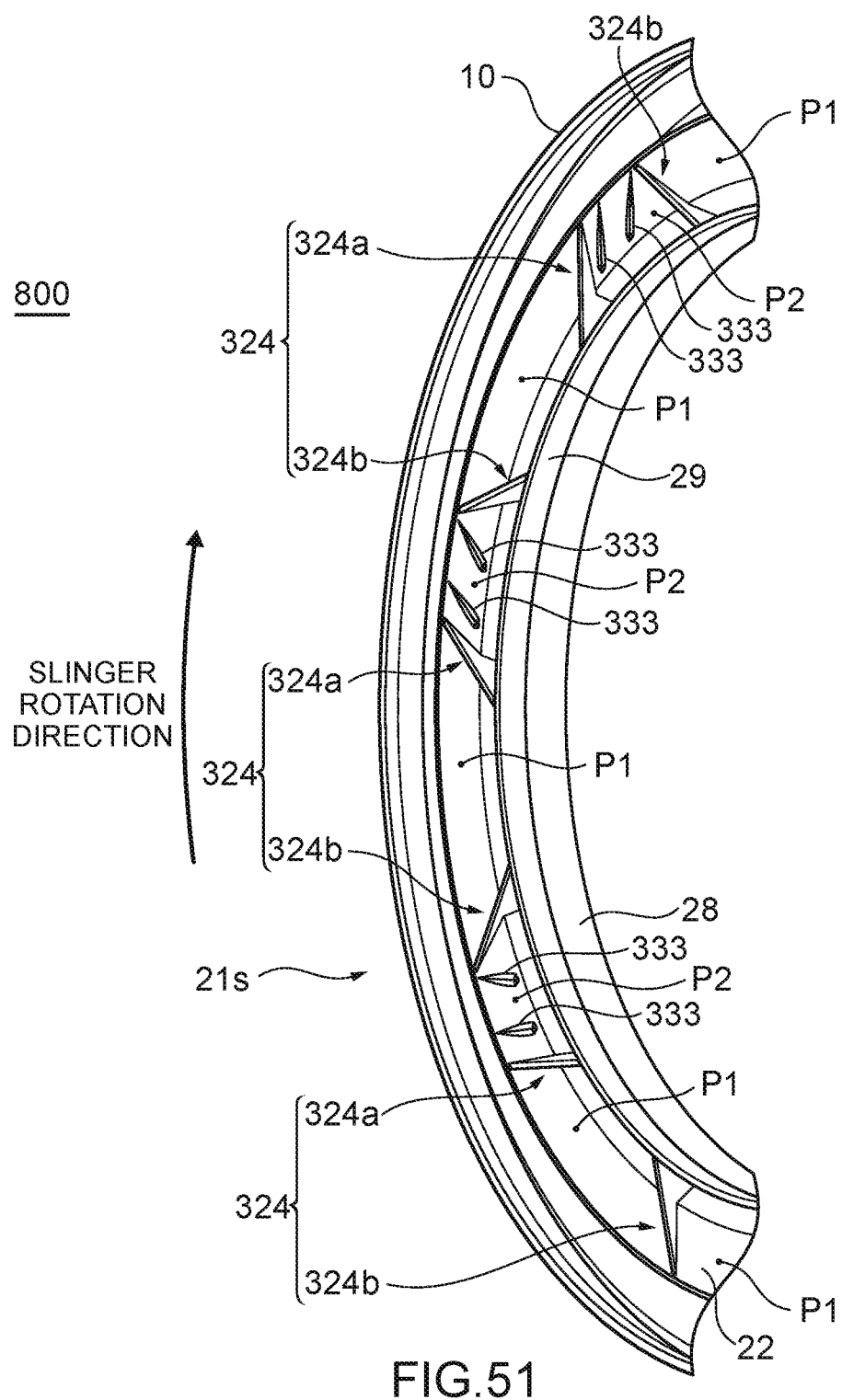
FIG. 51 is a partially enlarged perspective view of the elastic body portion in the sealing apparatus according to the eighth embodiment of the present disclosure, in a state where the elastic body portion at a portion on an inner periphery side from a base portion is cut on a plane along the axis line.
Figure 52:
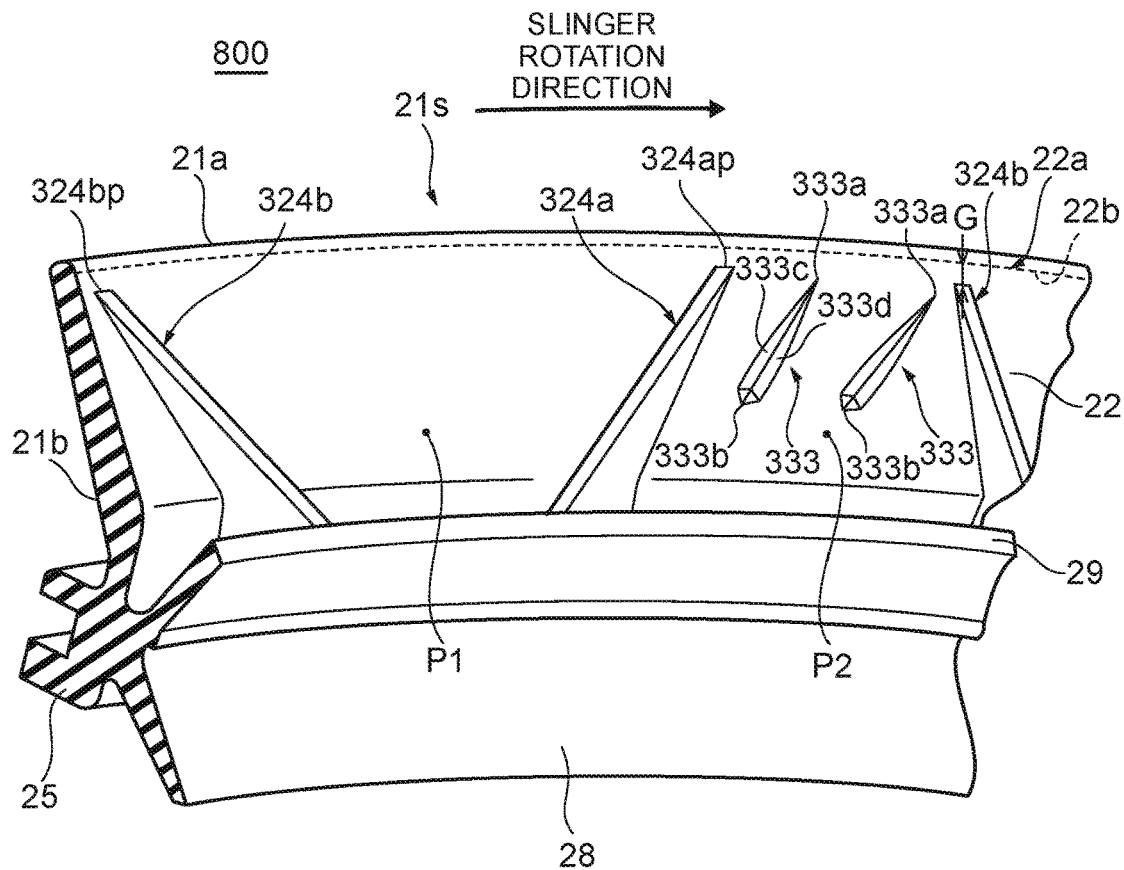
FIG. 52 is a partially enlarged perspective view of the elastic body portion in the sealing apparatus illustrated in FIG. 51 in a state where the elastic body portion at a portion on an inner side from the base portion is cut on a plane along the axis line.

As illustrated in FIG. 51 and FIG. 52, the end-face lip 21*s* of the sealing apparatus 800 in the eighth embodiment is arranged in a manner such that, in this case, a pair of two radial-direction projections 333 are provided in the inner space P2 between the slinger rotation direction rib 324*a* of one rib 324 and the slinger reverse rotation direction rib 324*b* of another rib 324 adjacent to the one rib 324 in the slinger rotation direction. This end-face lip 21*s* is the same as the end-face lip 21 of the sealing apparatus 700 in the seventh embodiment in configurations other than a configuration where the radial-direction projections 333 are provided.

A pair of radial-direction projection 333 arranged at equal angular intervals or substantially equal angular intervals in the circumferential direction and arranged at equal pitch intervals or substantially equal pitch intervals on the same or substantially the same circumference. However, the number of the radial-direction projections 333 in one pair may be not limited to two, and may be one or three or more. In this case, the radial-direction projections 333 are provided in the inner space P2 at the end-face lip 21*s* so as to return the target to be sealed from the circular current region to the pumping region.

The radial-direction projections 333 extend in a spiral manner in the rotation direction of the shaft 52 (slinger 3) from another side (the inner periphery side or the outer side) to one side (the outer periphery side or the inner side), and are provided on the inner periphery side of the slinger contact portion 22*a* which is a portion where the end-face lip 21 contacts the flange portion 31 of the slinger 3 at the end-face lip 21, and in the inner space P2 between the slinger rotation direction 324*a* of one rib 324 and the slinger reverse rotation direction 324*b* of another rib 324 adjacent to the one rib 324. The radial-direction projections 333 extend obliquely with respect to the rotation direction of the slinger 3 from the side of the root 21*b* toward the side of the tip 21*a* of the end-face lip 21.

That is, inner ends 333*a* which are end portions on the inner side (outer periphery side) of the radial-direction projections 333 extend toward the slinger contact portion 22*a* of the inner periphery surface 22 of the end-face lip 21. Outer ends 333*b* which are end portions on the outer side (inner periphery side) of the radial-direction projections 333 extend toward the side of the root 21*b* of the end-face lip 21. However, while the inner ends 333*a* of the radial-direction projections 333 do not reach the slinger contact portion 22*a*, the inner ends 324*ap* of the slinger rotation direction ribs 324*a* are substantially aligned with the tip positions. The outer ends 333*b* of the radial-direction projections 333 do not reach the intermediate lip 29. That is, the radial-direction projections 333 are shorter than the ribs 324.

Further, in a state where the sealing apparatus 800 is used, the respective radial-direction projections 333 are formed in a shape such that the radial-direction projections 333 do not contact the slinger 3. That is, in the state where the sealing apparatus 800 is used, a height of the radial-direction projections 333 from the inner periphery surface 22 is set so that the radial-direction projections 333 do not contact the outer side surface 31*d* of the flange portion 31 of the slinger 3. While the height of the radial-direction projections 333 from the inner periphery surface 22 in this case becomes gradually higher from the inner ends 333*a* toward the outer ends 333b, the height from the inner periphery surface 22 is set lower than the ribs 324. However, the height is not limited to this, and the height of the radial-direction projections 333 from the inner periphery surface 22 may be higher than the height of the ribs 324, or the height of the radial-direction projections 333 may be the same as the height of the ribs 324.

As described above, the radial-direction projections 333 extend so that side surfaces 333c which are surfaces facing on the outer periphery side along the circumferential direction and side surfaces 333d which are surfaces facing on the inner periphery side along the circumferential direction are orthogonal to or substantially orthogonal to the inner periphery surface 22 of the end-face lip 21 on the inner periphery surface 22 of the end-face lip 21. For example, the side surfaces 333c and 333d tilt with respect to the inner periphery surface 22. However, the shape is not limited to this, and the side surfaces 333c and 333d extend while being orthogonal to the inner periphery surface 22.

The height of the radial-direction projections 333 from the inner periphery surface 22 is not limited to the above-described specific shape. The height of the radial-direction projections 333 from the inner periphery surface 22 may be fixed from the inner ends 333a over the outer ends 333b, or the height from the inner periphery surface 22 may become lower from the inner ends 333a toward the outer ends 333b. Further, the height of the radial-direction projections 333 from the inner periphery surface 22 from the inner ends 333a to the outer ends 333b may be various kinds of combination of the above-described becoming higher, becoming lower, being fixed, or the like. Further, the shape of the radial-direction projections 333 on a cross-section perpendicular to the extending direction may be various shapes such as, for example, a triangle, a rectangle, a trapezoid and an inverted U shape. Because the radial-direction projections 333 are formed in a shape such that the radial-direction projections 333 do not contact the slinger 3 in the state where the sealing apparatus 800 is used, sliding resistance to the slinger 3 does not increase by the radial-direction projections 333.

Further, the shape of the radial-direction projections 333 in the extending direction may be various shapes such as a shape which is tapered from the outer ends 333b toward the inner ends 333a and a shape in which a width in a direction orthogonal to the extending direction changes toward the extending direction from the outer ends 333b to the inner ends 333a. Further, the radial-direction projections 333 may extend straight or may extend in a curved manner between the inner ends 333a and the outer ends 333b.

Figure 53:
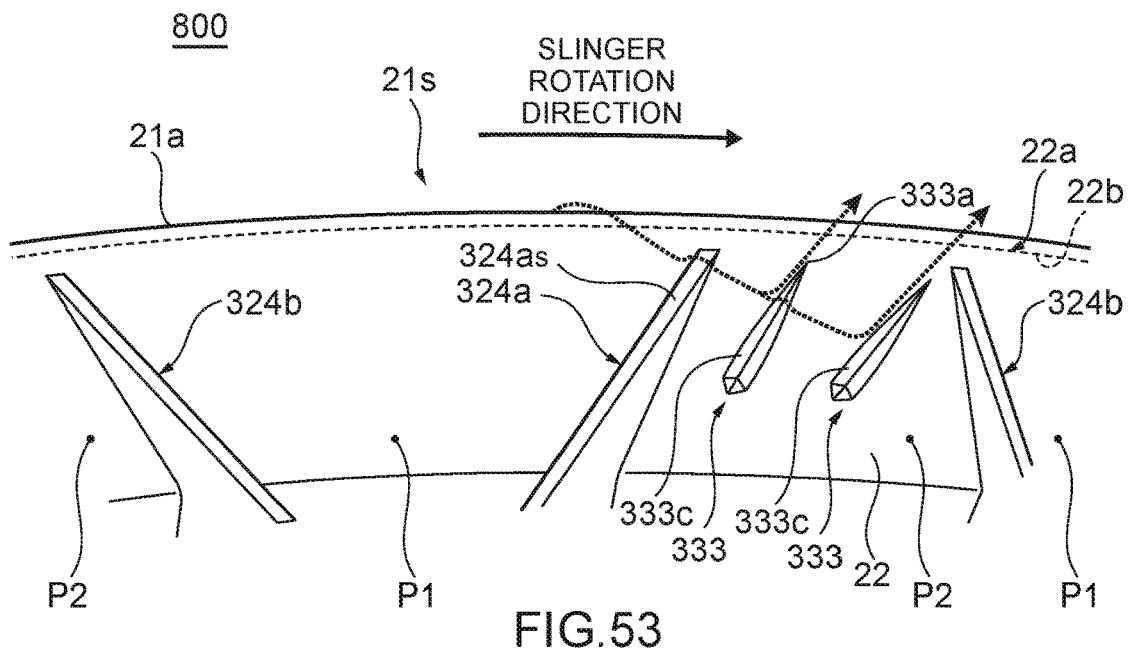
FIG. 53 is a perspective view for illustrating aspect of flow of a target to be sealed by action of ribs of an end-face lip in the sealing apparatus according to the eighth embodiment of the present disclosure.

In this manner, the end-face lip 21s is arranged in a manner such that, in addition to the plurality of ribs 324 (the slinger rotation direction ribs 324a and the slinger reverse rotation direction ribs 324b), one pair of two radial-direction projections 333 are provided in the inner space P2 between the two ribs 324 which are adjacent to each other. Therefore, as illustrated in FIG. 53, in the case where the target to be sealed oozes from the side of the target to be sealed, while this target to be sealed, for example, intrudes the inner space P2 beyond the tip portions 324as of the slinger rotation direction ribs 324a, in the case where the target to be sealed collides with the side surface 333c of the first radial-direction projection 333, the target to be sealed is bounced to the side of the pumping region or is returned to the pumping region after being led in a direction of the inner end 333a along the side surface 333c of the radial-direction projection 333. In this case, even in the case where the target to be sealed moves beyond the first radial-direction projection 333, the target to be sealed collides with the side surface 333c of the second radial-direction projection 333 and is bounced to the side of the pumping region or is returned to the pumping region after being led in the direction of the inner end 333a along the side surface 333c of the radial-direction projection 333.

In the sealing apparatus 800 according to the eighth embodiment, because a plurality of radial-direction projections 333 are provided in the inner space P2, it is possible to return the target to be sealed to the pumping region without the target to be sealed being retained in the inner space P2 by these radial-direction projections 333. In this manner, at the end-face lip 21s of the sealing apparatus 800, it is possible to return also the target to be sealed which has intruded the inner space P2 to the pumping region, so that it is possible to further prevent the target to be sealed from oozing outside. Further, in a similar manner to the seventh embodiment, also in a state where the slinger 3 (shaft 52) is at rest, because the target to be sealed which has oozed from the slinger contact portion 22a and the lip contact portion 32 to the inner space P1 flows down to the side of the target to be sealed from the tip 21a of the end-face lip 21s along the outer periphery surfaces 324bout of the slinger reverse rotation direction ribs 324b of the ribs 324, it is possible to prevent the target to be sealed from oozing outside.

In this manner, in the sealing apparatus 800 according to the eighth embodiment of the present disclosure, even in the case where the pumping action by the groove 33 of the slinger 3 is utilized, it is possible to provide operational effects which are similar to those provided by the sealing apparatus 700 according to the seventh embodiment, so that it is possible to prevent the target to be sealed from oozing regardless of a value of the rotation speed of the shaft 52.

Ninth Embodiment

Subsequently, a sealing apparatus 900 according to a ninth embodiment of the present disclosure will be described. The sealing apparatus 900 according to the ninth embodiment of the present disclosure is different from the sealing apparatus 800 according to the above-described eighth embodiment of the present disclosure in that radial-direction projections are provided also in the inner space P1 as well as in the inner space P2. In the following description, the same reference numerals are assigned to components having functions which are the same as or similar to those of the sealing apparatuses 700 and 800 according to the above-described seventh and eighth embodiments, description thereof will be omitted, and only different configurations will be described.

Figure 54:
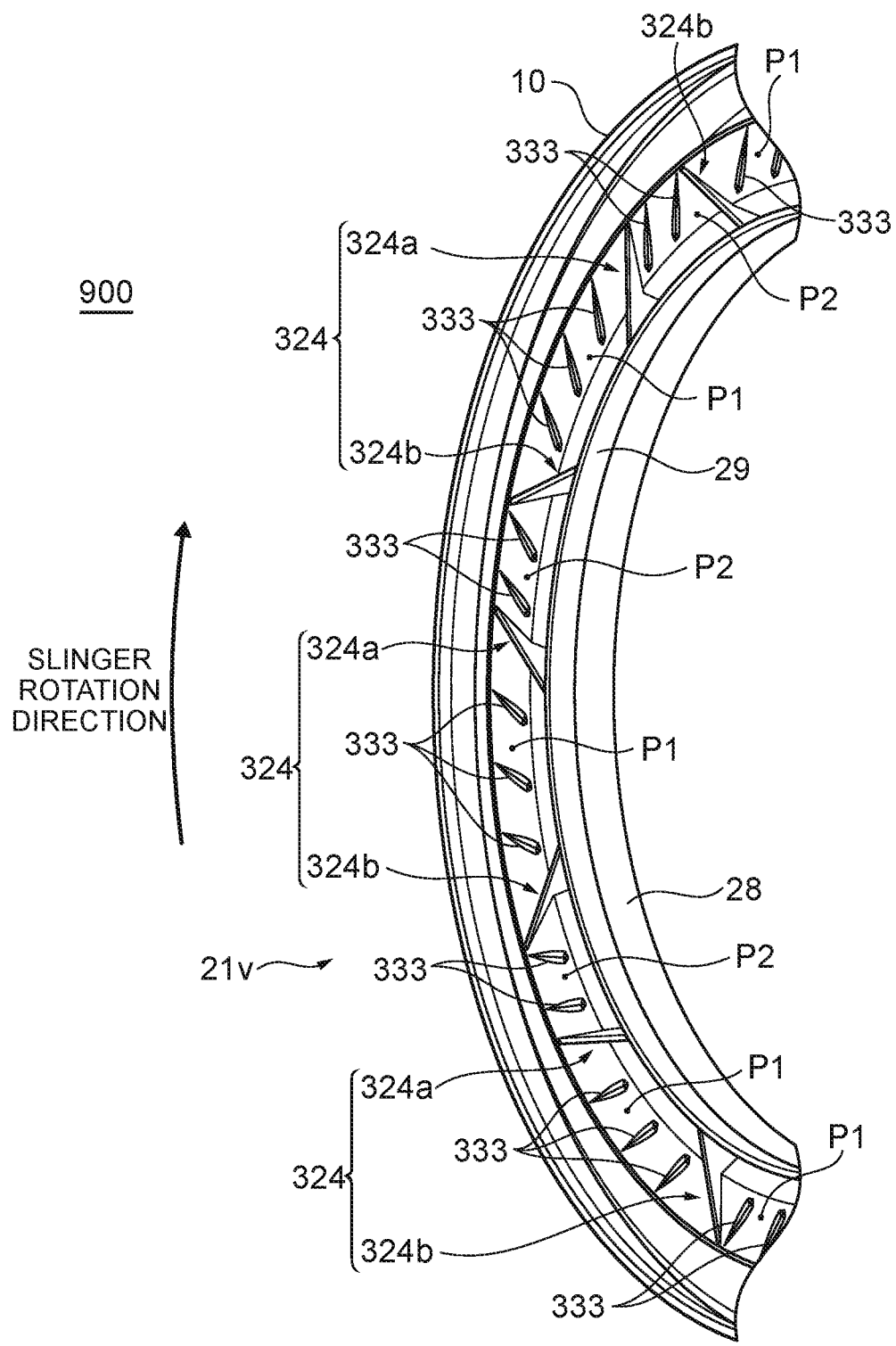
FIG. 54 is a partially enlarged perspective view of an elastic body portion in a sealing apparatus according to a ninth embodiment of the present disclosure in a state where the elastic body portion at a portion on an inner periphery side from a base portion is cut on a plane along an axis line.
Figure 55:
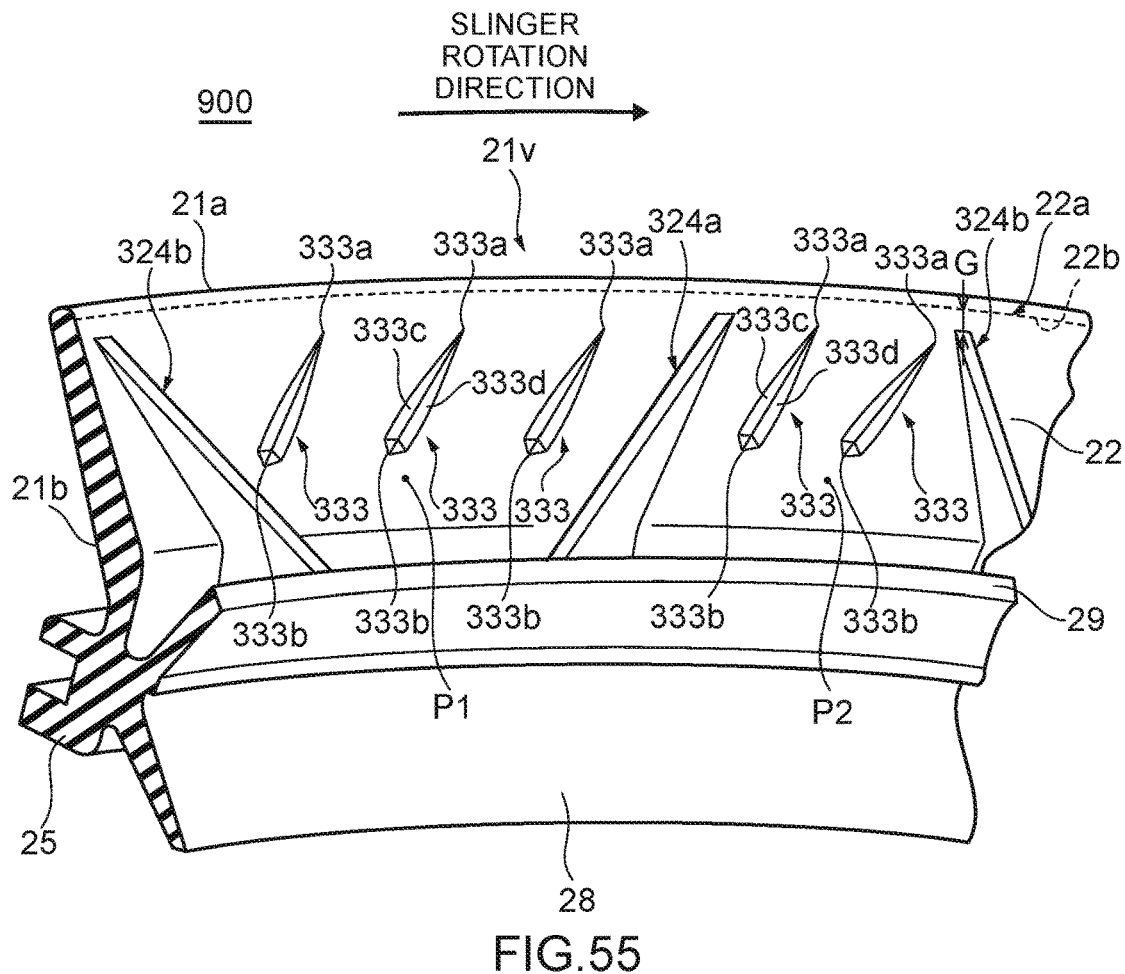
FIG. 55 is a partially enlarged perspective view of the elastic body portion in the sealing apparatus illustrated in FIG. 54 in a state where the elastic body portion at a portion on an inner side from the base portion is cut on a plane along the axis line.

As illustrated in FIG. 54 and FIG. 55, an end-face lip 21v in the ninth embodiment is arranged in a manner such that a pair of, in this case, three radial-direction projections 333 are provided in the inner space P1 between the slinger rotation direction ribs 324a and the slinger reverse rotation direction ribs 324b of the ribs 324 in addition to a pair of (two) radial-direction projections 333 provided in the inner space P2. Note that the radial-direction projections 333 provided in the inner space P1 are the same as the radial-direction projections 333 provided in the inner space P2.

Figure 56:
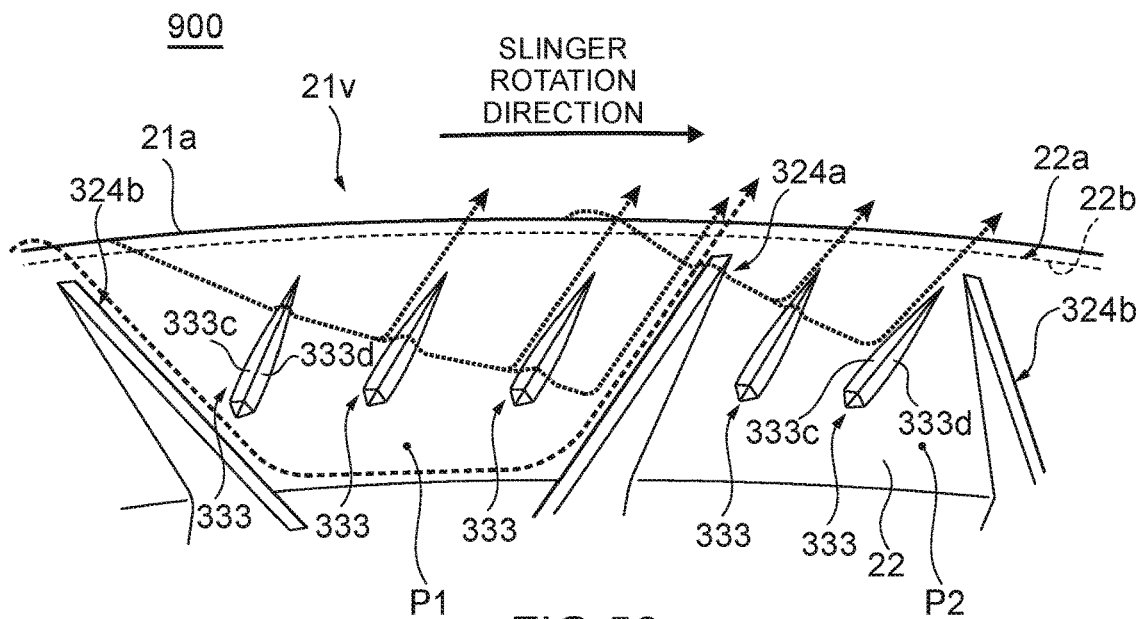
FIG. 56 is a perspective view for illustrating aspect of flow of a target to be sealed by action of ribs of an end-face lip in the sealing apparatus according to the ninth embodiment of the present disclosure.

In this manner, the end-face lip 21v is arranged in a manner such that, in addition to the plurality of ribs 324 (the slinger rotation direction ribs 324a and the slinger reverse rotation direction ribs 324b), a plurality of radial-direction projections 333 are provided both in the inner space P1 and the inner space P2 between the ribs 324. Therefore, as illustrated in FIG. 56, in the case where the target to be sealed oozes from the side of the target to be sealed and intrudes the inner space P1, and, in the case where the target to be sealed collides with the side surface 333c of the first radial-direction projection 333, the target to be sealed is bounced to the side of the pumping region, or is returned to the pumping region after being led in a direction of the inner end 333a along the side surface 333c of the radial-direction projection 333.

That is, in the sealing apparatus 900 according to the ninth embodiment, because the three radial-direction projections 333 are provided in the inner space P1, it is possible to efficiently return all the target to be sealed to the pumping region in three steps without the target to be sealed being retained. Note that, at the end-face lip 21v, in a similar manner to the seventh embodiment, because the target to be sealed can be returned to the pumping region along the outer periphery surfaces 324bout of the slinger reverse rotation direction ribs 324b of the ribs 324, the intermediate lip 29 and the outer periphery surfaces 324aout of the slinger rotation direction ribs 324a, it is possible to further prevent the target to be sealed from leaking outside with the radial-direction projections 333. Still further, in a similar manner to the seventh and the eight embodiments, also in a state where the slinger 3 (shaft 52) is at rest, because the target to be sealed which has oozed from the slinger contact portion 22a and the lip contact portion 32 to the inner space P1 flows down to the side of the target to be sealed from the tip 21a of the end-face lip 21 along the outer periphery surfaces 324bout of the slinger reverse rotation direction ribs 324b of the ribs 324, it is possible to prevent the target to be sealed from oozing outside.

In this manner, also in the sealing apparatus 900 according to the ninth embodiment of the present disclosure, even in the case where the pumping action by the groove 33 of the slinger 3 is utilized, it is possible to suppress ooze of the target to be sealed regardless of a value of the rotation speed of the shaft 52.

Note that, while the radial-direction projections 333 extend in a spiral manner (involutedly), the radial-direction projections 333 may extend in a straight manner or in a curved manner on the inner periphery surface 22 of the end-face lip 21. Further, the respective side surfaces 333c and 333d of the radial-direction projections 333 may have a planar shape or a curved shape.

As described above, the shape of the groove 33 provided at the slinger 3 is not limited to the shape of the screw (four-start screw), and may be other shapes. For example, as illustrated in FIG. 15A, the groove 33 may be a groove extending in a radial manner centered on or substantially centered on the axis line x from the inner periphery side toward the outer periphery side, or, as illustrated in FIG. 15B, may be a groove extending while tilting in the circumferential direction.

While, in the sealing apparatuses 700, 800 and 900, the elastic body portion 20 includes the dust lip 28 and the intermediate lip 29, the elastic body portion 20 does not have to include the dust lip 28 and the intermediate lip 29, and may include only one of the dust lip 28 and the intermediate lip 29.

Further, while description is provided that the sealing apparatuses 700, 800 and 900 according to the seventh to the ninth embodiments are applied to a crank hole of an engine, an application target of the sealing apparatus according to the present disclosure is not limited to this, and the present disclosure can be applied to all configurations which can utilize the effects provided by the present disclosure, such as other vehicles, general-purpose machine and industrial machine.

Further, it can be estimated that the following effects can be obtained also in the sealing apparatuses 800 and 900 according to the eighth and the ninth embodiments. Flow of air in the rotation direction of the slinger 3 occurs in the narrow space S formed by the end-face lip 21 and the slinger 3 in accordance with rotation of the slinger 3.

This air is derived to the side of the tip 21a of the end-face lip 21 by colliding with the ribs 324 and the plurality of radial-direction projections 333 formed on the inner periphery surface 22 of the end-face lip 21 and flows toward the slinger contact portion 22a. As a result, because the flow of air occurring from the narrow space S to the side of the slinger contact portion 22a by the presence of the ribs 324 and the plurality of radial-direction projections 333 functions to push back the lubricant which oozes from the side of the target to be sealed to the narrow space S, to the pumping region, it is possible to reduce ooze of the lubricant.

Particularly, because such flow of air becomes higher as the rotation speed of the slinger 3 becomes higher, the flow of the air becomes faster, and strength of the air flowing from the tip 21a of the end-face lip 21 to the side of the target to be sealed increases, so that the function to push back the lubricant to the pumping region becomes further strong. In this manner, according to the sealing apparatuses 800 and 900, even in the case where the rotation speed of the shaft 52 becomes higher, it is possible to suppress ooze of the target to be sealed by the effect of flow of air occurring by the ribs 324 and the plurality of radial-direction projections 333.

Tenth Embodiment

Figure 57:
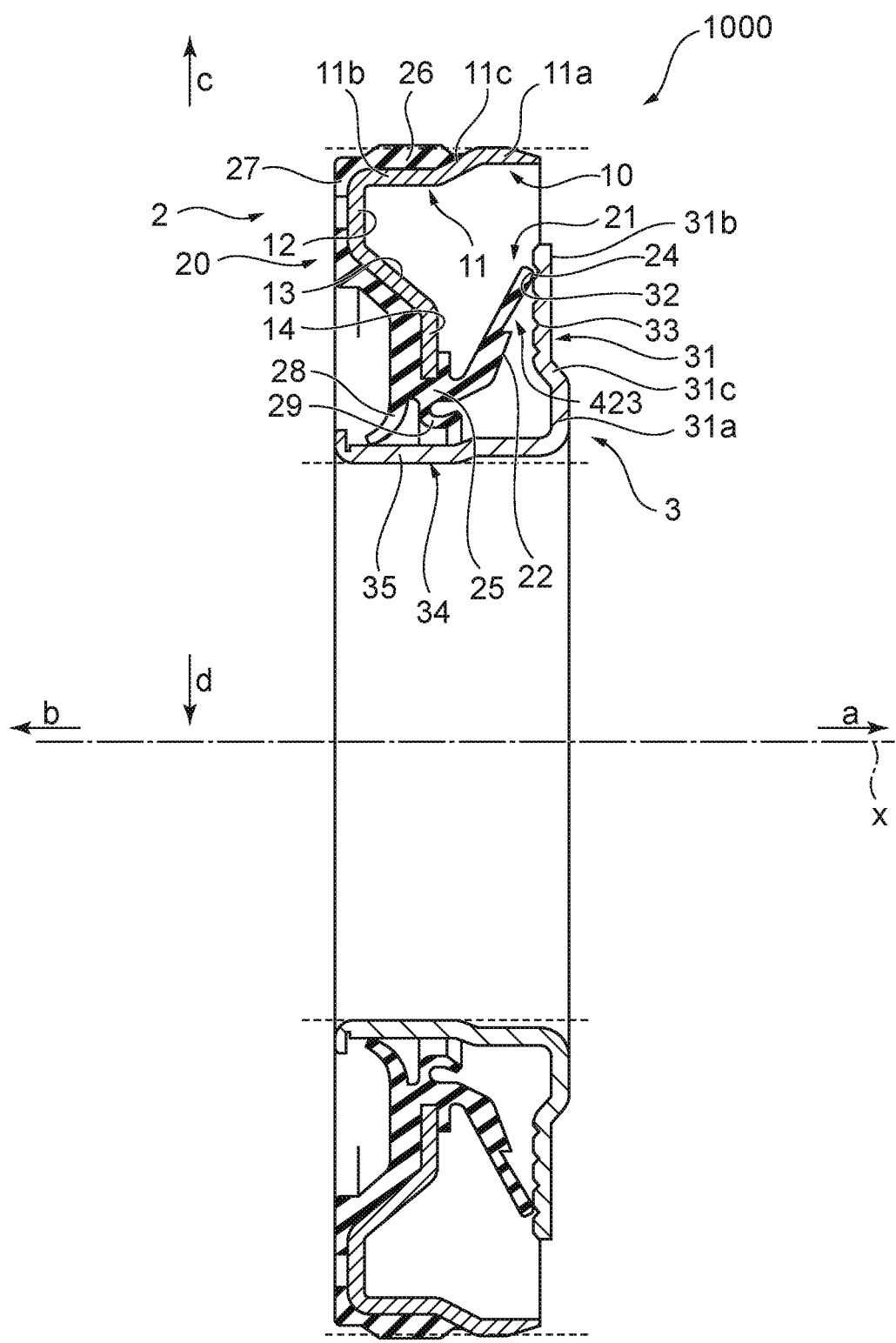
FIG. 57 is a cross-sectional diagram on a cross-section along an axis line x for illustrating a schematic configuration of a sealing apparatus according to a tenth embodiment of the present disclosure.
Figure 58:
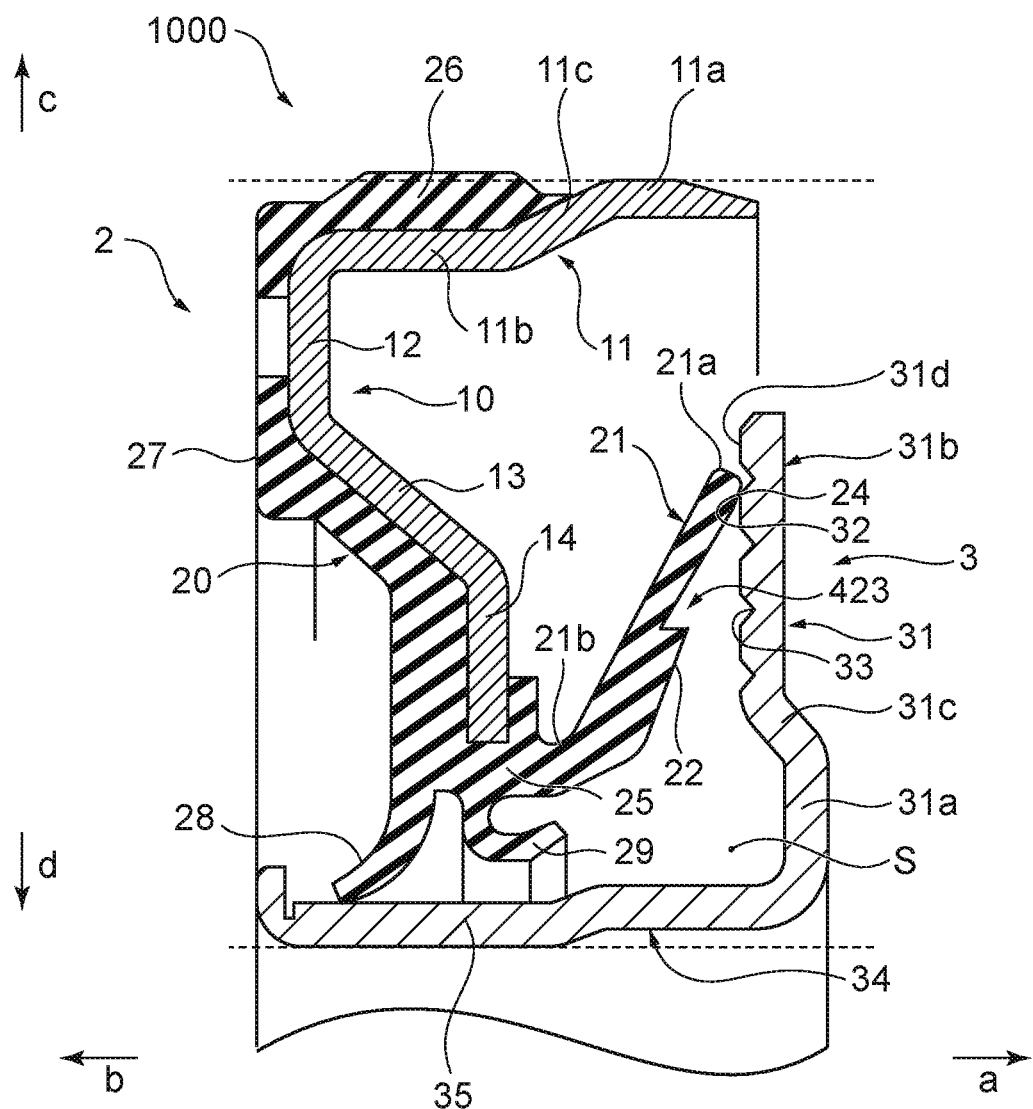
FIG. 58 is a partially enlarged cross-sectional diagram illustrating enlarged part of the cross-section along the axis line x of the sealing apparatus according to the tenth embodiment of the present disclosure.

FIG. 57 is a cross-sectional diagram on a cross-section along an axis line x for illustrating a schematic configuration of a sealing apparatus 1000 according to a tenth embodiment of the present disclosure, and FIG. 58 is a partially enlarged cross-sectional diagram illustrating enlarged part of the cross-section along the axis line x of the sealing apparatus 1000 according to the tenth embodiment of the present disclosure. The sealing apparatus 1000 according to the tenth embodiment is a sealing apparatus for sealing an annular gap between a shaft and a hole into which this shaft is to be inserted, and is used to seal a gap between a shaft and a hole (shaft hole) which is formed at a housing, or the like, and into which this shaft is to be inserted at a vehicle and general-purpose machine. For example, the sealing apparatus is used to seal annular space between a crank shaft of an engine and a crank hole which is a shaft hole formed at a front cover, a cylinder block and a crank case. Note that targets to which the sealing apparatus 1000 according to the tenth embodiment of the present disclosure are not limited to the above.

In the following description, for the purpose of illustration, a direction of an arrow a (see FIG. 57) in the axis line x direction (one side in the axis line direction) is set as an inner side, and a direction of an arrow b (see FIG. 57) in the axis line x direction (another side in the axis line direction) is set as an outer side. More specifically, the inner side is a side of space to be sealed (side of the target to be sealed), and a side of space where the target to be sealed such as a lubricant exists, and the outer side is an opposite side of the inner side. Further, in a direction perpendicular to the axis line x (hereinafter, also referred to as a "radial direction"), a direction away from the axis line x (a direction of an arrow c in FIG. 57) is set as an outer periphery side, and a direction approaching the axis line x (a direction of an arrow d in FIG. 57) is set as an inner periphery side.

As illustrated in FIG. 57, the sealing apparatus 1000 includes a sealing apparatus body 2 fitted into a hole as an attachment target which will be described later, and a slinger 3 attached to a shaft as an attachment target which will be described later. The sealing apparatus body 2 includes a reinforcing ring 10 annular around the axis line x, and an elastic body portion 20 which is formed with an elastic body attached to the reinforcing ring 10 and which is annular around the axis line x. The slinger 3 includes a flange portion 31 which is a portion extending toward the outer periphery side (the direction of the arrow c) and annular around the axis line x. The elastic body portion 20 includes an end-face lip 21 which is a lip extending toward the one side (the inner side, the direction of the arrow a) in the axis line x direction, contacting the flange portion 31 from the other side (the outer side, the side of the direction of the arrow b) in the axis line direction x, and annular around the axis line x.

At least one groove 33 is formed on the other side (outer side) of the flange portion 31 of the slinger 3, and a plurality of concave portions 423 are formed side by side in the circumferential direction on a surface (inner periphery surface 22) on the inner periphery side of the end-face lip 21. As will be described later, the concave portions 423 are formed as concaves extending in a spiral manner from the other side (outer side) toward the one side (inner side) in the rotation direction of the shaft (slinger 3) which will be described later, and the end-face lip 21 is formed on the inner periphery side of the slinger contact portion 24 which is a portion where the end-face lip 21 contacts the slinger 3 at the end-face lip 21.

Note that, because the sealing apparatus body 2 and the slinger 3 of the sealing apparatus 1000 have the same basic configurations as those of the sealing apparatus body 2 and the slinger 3 of the sealing apparatus 1 in the first embodiment, description will be omitted here, and points of different configurations will be described.

Figure 59:
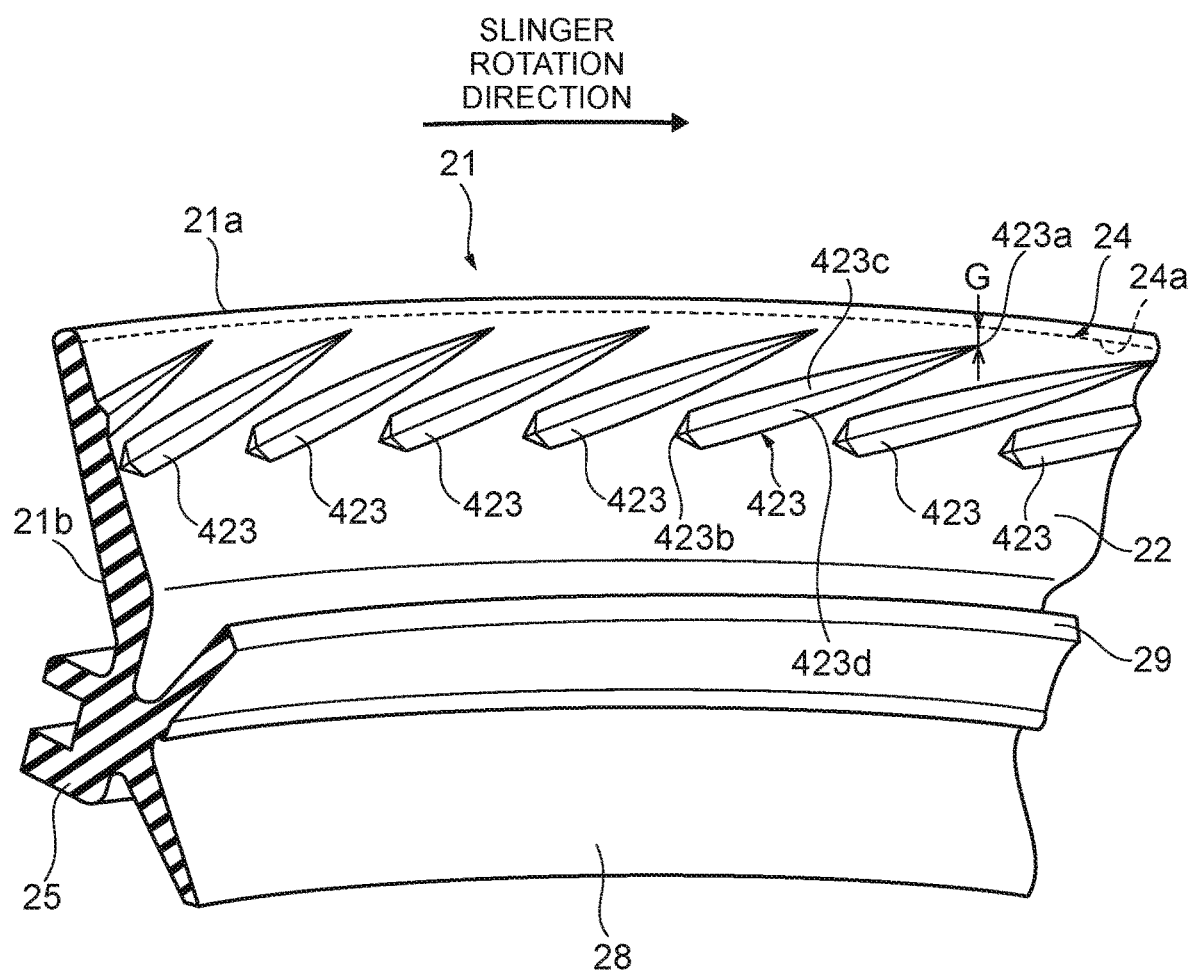
FIG. 59 is a partially enlarged perspective view of the elastic body portion seen from an inner periphery side, in a state where the elastic body portion at a portion on an inner periphery side from a base portion is cut on a plane along the axis line x.

Here, a shape of the end-face lip 21 will be described in more detail. FIG. 59 is a partially enlarged perspective view of the elastic body portion 20 seen from the inner periphery side, in a state where the elastic body portion 20 at a portion on the inner periphery side from the base portion 25 is cut on a plane along the axis line x. As illustrated in FIG. 59, a plurality of concave portions 423 are arranged at equal angular intervals or substantially equal angular intervals in the circumferential direction and at equal pitch intervals or substantially equal pitch intervals on the same or substantially the same circumference on the inner periphery surface 22 of the end-face lip 21. As described above, the respective concave portions 423 extend in a spiral manner in the rotation direction of the shaft 52 (slinger 3) which will be described later from the outer side (lower side in FIG. 59) toward the inner side (upper side in FIG. 59). That is, the respective concave portions 423 extend while tilting in the rotation direction of the slinger 3 from the side of the root 21*b* of the end-face lip 21 toward the side of the tip 21*a* of the end-face lip 21.

Further, the respective concave portions 423 are formed at intervals from the slinger contact portion 24, and are formed on the inner periphery side (outer side) of the slinger contact portion 24, that is, on the side of the root 21*b* of the end-face lip 21, of the slinger contact portion 24.

At the end-face lip 21, the concave portions 423 are formed at intervals from the slinger contact portion 24. Specifically, as illustrated in FIG. 59, inner ends 423*a* which are end portions on the inner side (outer periphery side) of the concave portions 423 are located at positions away from the outer edge 424*a* which is an edge portion on the outer side (inner periphery side) of the slinger contact portion 24 by a predetermined interval G in a direction along the axis line x along the inner periphery surface 22. This interval G is an interval such that the concave portions 423 at least partially exist in a region on the inner periphery side of a region where the pumping action based on the groove 33 of the slinger 3 occurs in the state where the sealing apparatus 1000 is used which will be described later.

Figure 60:
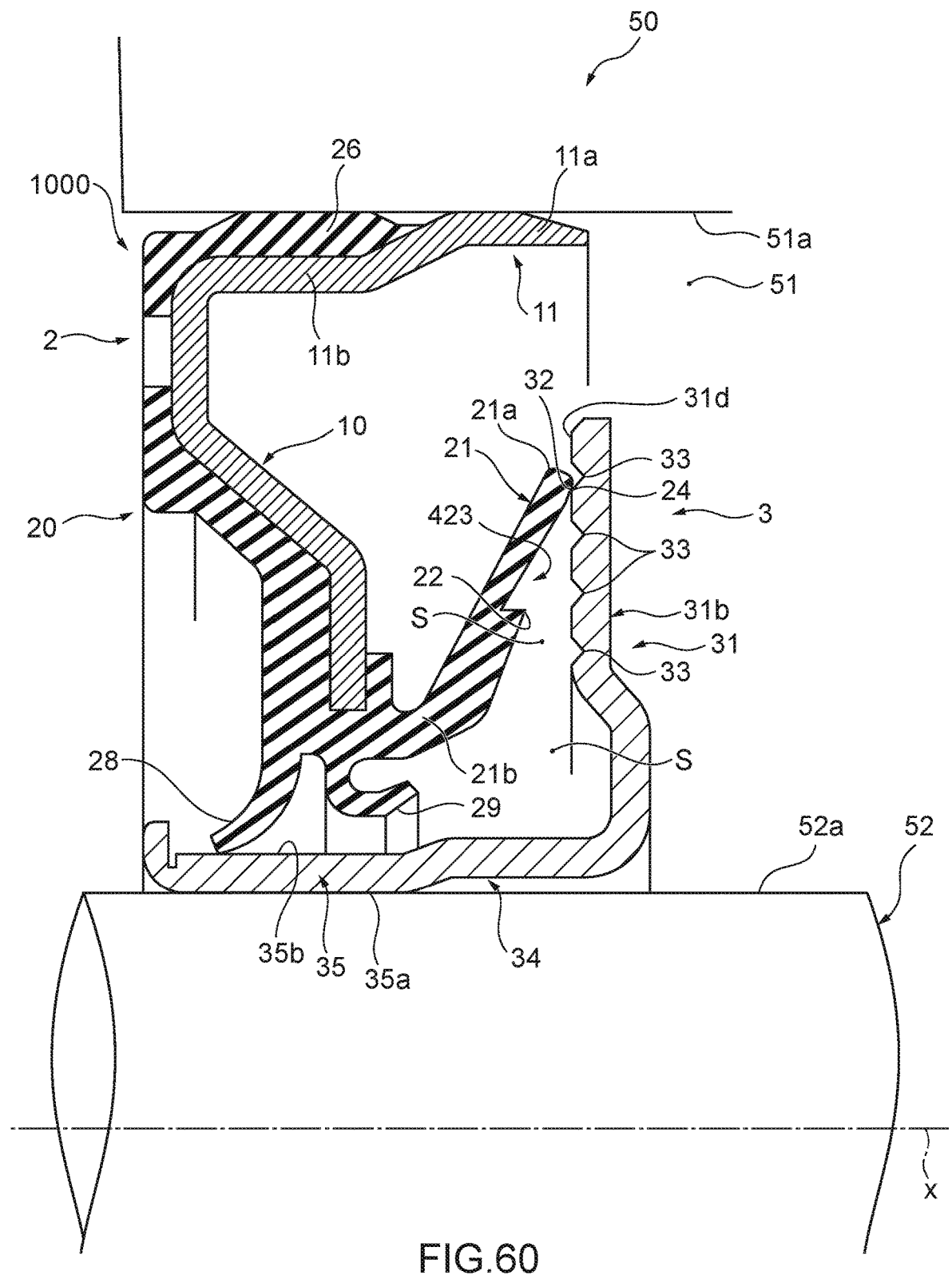
FIG. 60 is a partially enlarged cross-sectional diagram of the sealing apparatus in a usage state where the sealing apparatus is attached to a housing as an attachment target and a shaft inserted into a shaft hole which is a through-hole formed at the housing.

Further, as illustrated in FIG. 60, the respective concave portions 423 face the outer side surface 31*d* of the slinger 3 in the state where the sealing apparatus 1000 is used, and are formed as concave space having a concave in a predetermined shape such that the concave becomes gradually deeper with respect to the inner periphery surface 22 from the outer periphery side (the direction of the arrow c) toward the inner periphery side (the direction of the arrow d).

Figure 61:
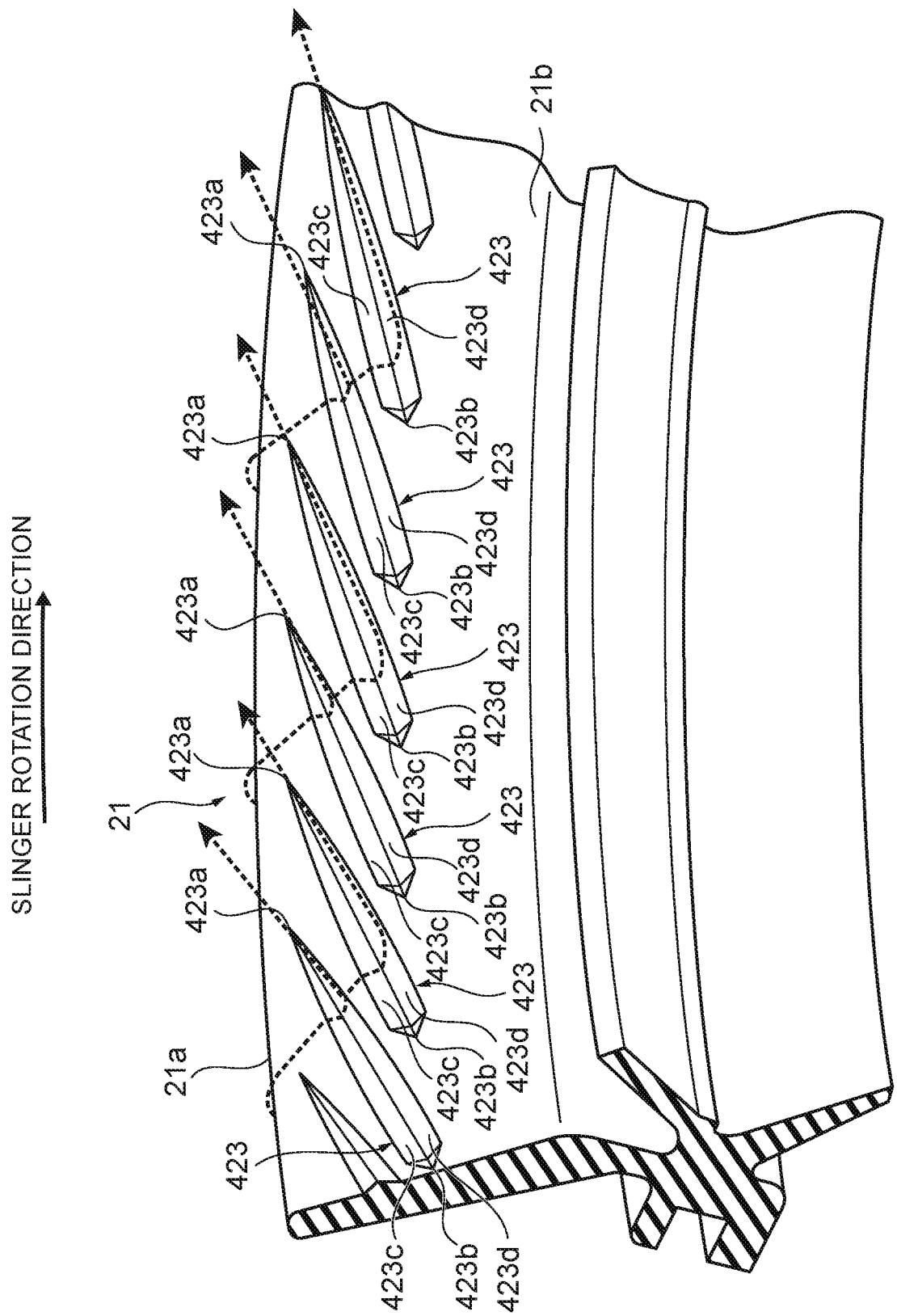
FIG. 61 is a diagram for explaining action of concave portions of an end-face lip and illustrating aspect of flow of a target to be sealed by action of the concave portions of the end-face lip.

In the tenth embodiment, as illustrated in FIG. 60 and FIG. 61, the concave portions 423 have a predetermined depth such that the concave portions 423 become gradually deeper with respect to the inner periphery surface 22 from inner ends 423*a* toward outer ends 423*b* which are end portions on the side of the root 21*b* of the end-face lip 21. However, the depth of the concave portions 423 from the inner periphery surface 22 is not limited to this.

The concave portions 423 are concave grooves having side surfaces 423*c* on the outer periphery side and side surfaces 423*d* on the inner periphery side, which define the concave portions 423, and the grooves being concave from the inner periphery surface 22 of the end-face lip 21 such that cross-sections have a triangle shape. The concave portions 423 may concave from the inner periphery surface 22 from the inner ends 423*a* to the outer ends 423*b* with a fixed depth, or the depth from the inner periphery surface 22 may be gradually lower from the inner ends 423*a* toward the outer ends 423*b*. Further, the depth of the concave portions 423 from the inner periphery surface 22 from the inner ends 423*a* to the outer ends 423*b* may be various kinds of combination of the above-described becoming gradually deeper, becoming gradually shallower, being fixed, or the like. Further, the shape of the concave portions 423 on a cross-section orthogonal to the extending direction may be various shapes such as, for example, a triangle, a rectangle and an inverted U shape. In the state where the sealing apparatus 1000 is used, because the concave portions 423 are concave grooves and do not project from the inner periphery surface 22, sliding resistance to the slinger 3 never increases by the concave portions 423.

Further, as illustrated in FIG. 59, the shape of the concave portions 423 in the extending direction is a shape which is tapered from the outer ends 423*b* toward the inner ends 423*a*. However, the shape is not limited to this, and the shape may be various shapes such as a shape in which a width in a direction orthogonal to the extending direction is fixed between the outer ends 423*b* and the inner ends 423*a*. Further, the concave portions 423 may extend straight between the inner ends 423*a* and the outer ends 423*b* along the rotation direction of the slinger 3, or may extend in a curved manner while being slightly curved. The tips of the concave portions 423 having a tapered shape or having a shape which is smoothly connected to the inner periphery surface 22 of the end-face lip 21 are preferable in that air (air current) caused by the concave portions 423 is not disturbed, and are preferable in formability.

Further, in addition to the plurality of concave portions 423, sub-concave portions which are not illustrated may be formed on the inner periphery surface 22 of the end-face lip 21. Specifically, the sub-concave portions which have the same shape as the shape of the concave portions 423, but whose entire length is shorter than that of the concave portions 423 and whose depth is wholly shallow, may be arranged between the plurality of concave portions 423.

Action of the sealing apparatus 1000 having the above-described configuration will be described next. FIG. 60 is a partially enlarged cross-sectional diagram of the sealing apparatus 1000 in the usage state where the sealing apparatus 1000 is attached to the housing 50 as an attachment target and the shaft 52 inserted into the shaft hole 51 which is a through-hole formed at this housing 50. The housing 50 is, for example, a front cover of an engine, or a cylinder block and a crank case, and the shaft hole 51 is a crank hole formed at the front cover, or the cylinder block and the crank case. Further, the shaft 52 is, for example, a crank shaft.

As illustrated in FIG. 60, in the state where the sealing apparatus 1000 is used, the sealing apparatus body 2 is fitted into the shaft hole 51 by being pressed into the shaft hole 51, and the slinger 3 is attached to the shaft 52 by being interference-fitted at the shaft 52. More specifically, the outer periphery side cylindrical portion 11a of the reinforcing ring 10 contacts the inner periphery surface 51a of the shaft hole 51, so that a shaft center of the sealing apparatus body 2 is made to match a shaft center of the shaft hole 51, and the gasket portion 26 tightly contacts the inner periphery surface 51a of the shaft hole 51 by the gasket portion 26 of the elastic body portion 20 being compressed in the radial direction between the inner periphery surface 51a of the shaft hole 51 and the inner periphery side cylindrical portion 11b of the reinforcing ring 10, so that sealing between the sealing apparatus body 2 and the shaft hole 51 is realized. Further, the cylindrical portion 35 of the slinger 3 is pressed into the shaft 52, and the inner periphery surface 35a of the cylindrical portion 35 tightly contacts the outer periphery surface 52a of the shaft 52, so that the slinger 3 is fixed at the shaft 52.

Relative positions between the sealing apparatus body 2 and the slinger 3 in the axis line x direction are determined so that, in the state where the sealing apparatus 1000 is used, the end-face lip 21 of the elastic body portion 20 contacts the lip contact portion 32 which is a portion on the outer side surface 31d of the outer periphery side disk portion 31b of the flange portion 31 of the slinger 3, at the slinger contact portion 24 which is a portion on the side of the tip 21a of the inner periphery surface 22. Further, a portion on the tip side of the dust lip 28 contacts the tubular portion 34 of the slinger 3 from the outer periphery side. The dust lip 28 contacts the outer periphery surface 35b of the cylindrical portion 35 of the slinger 3.

In this manner, in the state where the sealing apparatus 1000 is used, the end-face lip 21 contacts the lip contact portion 32 of the flange portion 31 so as to be able to slide at the slinger contact portion 24, and the end-face lip 21 and the slinger 3 prevent the target to be sealed such as a lubricant from oozing inside from the side of the target to be sealed beyond the slinger contact portion 24 and the lip contact portion 32. Further, the dust lip 28 contacts the inner periphery surface of the tubular portion 34 of the slinger 3 so as to be able to slide, and prevents a foreign matter from entering inside from outside.

Further, in the state where the sealing apparatus 1000 is used, the groove 33 which forms a four-start screw formed at the outer periphery side disk portion 31b of the flange portion 31 of the slinger 3 exerts pumping action in the case where the shaft 52 (slinger 3) rotates. By the rotation of the shaft 52 (slinger 3), the pumping action occurs in a region in the vicinity of the slinger contact portion 24 and the lip contact portion 32 in the narrow space S which is space between the flange portion 31 and the end-face lip 21. By this pumping action, even in the case where the target to be sealed oozes from the side of the target to be sealed to the narrow space S, the target to be sealed which has oozed is returned to the side of the target to be sealed from the narrow space S beyond the slinger contact portion 24 and the lip contact portion 32. In this manner, by the pumping action caused by the groove 33 formed at the flange portion 31 of the slinger 3, ooze of the target to be sealed to the narrow space S is suppressed.

In the narrow space S, the target to be sealed which has further oozed outside beyond the pumping region where the pumping action by the groove 33 occurs rotates around the axis line x in the rotation direction of the slinger 3 in a region adjacent to the pumping region on the inner periphery side, and is retained in the circular current region by the rotation of the shaft 52.

The plurality of concave portions 423 are alternately formed along the rotation direction of the slinger 3 on the inner periphery surface 22 at the end-face lip 21, and the concave portion 423 extend to the inner periphery side from positions away from an outer edge 24a of the slinger contact portion 24 by the interval G, and at least partially extend in the circular current region. Therefore, the target to be sealed which is retained in the circular current region while rotating collides with the concave portions 423 or the target to be sealed which is retained in the circular current region while rotating is led to the inner ends 423a and the inner ends 433a which are end portions on the inner side (outer periphery side) from the side of the outer ends 423b which are end portions on the outer side (inner periphery side) of the concave portions 423 along side surfaces 423d on the inner periphery side of the concave portions 423, and the target to be sealed which is retained in the circular current region is led to the pumping region. The target to be sealed which is led to the pumping region by the concave portions 423 is returned to the side of the target to be sealed by receiving the pumping action.

FIG. 61 is a diagram for illustrating aspect of flow of the target to be sealed by action of the concave portions 423 of the end-face lip 21, for explaining action of the concave portions 423 of the end-face lip 21. In FIG. 61, as indicated with dashed lines, the target to be sealed which has oozed to the side of the circular current region beyond the pumping region collides with the side surfaces 423d on the inner periphery side of the concave portion 423 and is bounced to the side of the pumping region, or as indicated with dashed lines and dotted lines, is led to the inner ends 423a along the side surfaces 423d on the inner periphery side of the concave portions 423, and is returned to the pumping region from the inner ends 423a. Therefore, it is preferable that the concave portions 423 are formed on the inner periphery surface 22 of the end-face lip 21 so that part on the side of the inner ends 423a enters the pumping region. Because it is considered that a width of the pumping region in the radial direction changes in accordance with rotation speed of the shaft, it is preferable that part of the concave portions 423 on the side of the inner ends 423a is formed so as to enter the pumping region regardless of the rotation speed of the shaft. Further, in the case where the concave portions 423 are formed so that the whole concave portions 423 exist in the circular current region, the interval G from the outer edge 24a of the slinger contact portion 24 is set in a range where the target to be sealed which has oozed to the side of the circular current region beyond the pumping region can be returned to the pumping region again as described above.

Further, there is a target to be sealed which is not bounced even if the target to be sealed hits against the side surfaces 423*d* on the inner periphery side of the concave portions 423 and is not led to the inner ends 423*a* along the side surfaces 423*d* on the inner periphery side, and, as indicated with the dashed lines, further proceeds to the side of the root 21*b* of the end-face lip 21 beyond the side surfaces 423*d* on the inner periphery side. Therefore, it is preferable that the concave portions 423 are arranged so as to partially overlap with the concave portions 423 adjacent on the side of the rotation direction of the shaft 52 (slinger 3) when seen from the inner periphery side (outer side) to the outer periphery side (inner side) in the axis line x direction. This is because, as indicated with the dashed lines in a left part of FIG. 61, even if the target to be sealed flows to the side of the root 21*b* of the end-face lip 21 beyond the concave portion 423 on the side of the inner end 423*a*, this target to be sealed hits against the side surface 423*d* on the inner periphery side of the concave portion 423 adjacent on the side of the rotation direction of the slinger 3, the target to be sealed is led to the inner end 423*a* along the side surface 423*d* on the inner periphery side, and can be returned to the pumping region from the inner end 423*a*. Further, even in the case where there is a target to be sealed which has moved beyond the side surface 423*d* on the inner periphery side of this concave portion 423, because the target to be sealed hits against the side surface 423*d* on the inner periphery side of the concave portion 423 adjacent to the concave portion 423 and is led to the inner end 423*a* along the side surface 423*d* on the inner periphery side, in this case, the target to be sealed can be returned to the pumping region while progression speed of the target to be sealed is made slower in three steps. In this manner, if an intrusion angle of the target to be sealed is close to parallel to the rotation direction of the slinger, because the target to be sealed collides with both the concave portions 423 a plurality of times, it is possible to avoid a situation where the target to be sealed oozes from the pumping region to the side of the circular current region further reliably.

Further, to improve the function to push back the target to be sealed to the pumping region by the concave portions 423 which are adjacent to each other as described above, to make a portion where the concave portions 423 overlap with each other when seen from the inner periphery side to the outer periphery side in the axis line x direction larger, it is preferable to adjust the extending direction (angle) of the concave portions 423 and the interval (pitch) between the concave portions 423 which are adjacent to each other. Further, it is preferable that the concave portions 423 are adjacent to each other at equal intervals so that the end-face lip 21 equally has the above-described functions of the concave portion 423 in the circumferential direction.

In this manner, in the sealing apparatus 1000, even if the target to be sealed further oozes to the circular current region beyond the pumping region where the pumping action is exerted, it is possible to return this target to be sealed which has oozed to the pumping region by the concave portions 423, and it is possible to further return the target to be sealed to the side of the target to be sealed by the pumping action. In this manner, according to the sealing apparatus 1000, it is possible to cause the pumping action exerted by the groove 33 formed at the slinger 3 to be exerted more effectively by the plurality of concave portions 423 formed at the end-face lip 21, so that it is possible to suppress ooze of the target to be sealed compared to the related art. Further, because the concave portions 423 are concave more deeply than the inner periphery surface 22 of the end-face lip 21 and does not contact the slinger 3, according to the sealing apparatus 1000, it is possible to suppress ooze of the target to be sealed without increasing sliding resistance to the slinger 3.

The pumping action based on the groove 33 of the slinger 3 is reduced as the rotation speed of the slinger 3 becomes higher. It can be considered that this is because the pumping region contracts toward the side of the slinger contact portion 24 and the lip contact portion 32 as the rotation speed of the slinger 3 becomes higher. Therefore, in the case where the target to be sealed oozes from the side of the target to be sealed to the narrow space S, the target to be sealed which enters the circular current region increases as the rotation speed of the slinger 3 becomes higher. If an amount of the target to be sealed which circulates in the circular current region exceeds an amount of the target to be sealed which can be retained in the circular current region, the target to be sealed further oozes inside, and there is a case where the target to be sealed further oozes outside the sealing apparatus 1000.

In the sealing apparatus 1000 according to the tenth embodiment of the present disclosure, as described above, even if the target to be sealed oozes to the circular current region beyond the pumping region, it is possible to return this target to be sealed which has oozed to the pumping region by the plurality of concave portions 423, and it is possible to further return the target to be sealed to the side of the target to be sealed by the pumping action. Therefore, even if the target to be sealed which is retained in the circular current region increases as a result of the rotation speed of the slinger 3 becoming higher, it is possible to return this target to be sealed which is retained in the circular current region to the pumping region by the plurality of concave portions 423, so that it is possible to prevent the amount of the target to be sealed which circulates in the circular current region from exceeding the amount of the target to be sealed which can be retained in the circular current region. Further, even if the pumping action is reduced by high-speed rotation of the slinger 3, because the target to be sealed is returned to the pumping region by the plurality of concave portions 423, it is possible to increase the target to be sealed which can be returned to the side of the target to be sealed by the pumping action upon high-speed rotation of the slinger 3. Also in this case, because the speed of the target to be sealed which circulates in the circular current region becomes higher as the rotation speed of the shaft 52 becomes higher, the target to be sealed which is retained in the circular current region is further more likely to be led to the pumping region.

In this manner, according to the sealing apparatus 1000 according to the tenth embodiment of the present disclosure, even in the case where the pumping action by the groove 33 of the slinger 3 is utilized, it is possible to suppress ooze of the target to be sealed regardless of a value of the rotation speed of the shaft 52.

Further, according to the sealing apparatus 1000 according to the tenth embodiment, flow of air in the rotation direction of the slinger 3 occurs in the narrow space S formed between the end-face lip 21 and the slinger 3 in accordance with rotation of the slinger 3.

This air is led to the side of the tip 21*a* of the end-face lip 21 by colliding with the side surfaces 423*c* and 423*d* of the concave portions 423 formed on the inner periphery surface 22 of the end-face lip 21, and flows toward the slinger contact portion 24. As a result, because the flow of the air occurring to the side of the target to be sealed from the narrow space S by the presence of the concave portions 423 functions to push back the lubricant which oozes from the side of the target to be sealed to the narrow space S, to the pumping region, it is possible to reduce ooze of the lubricant.

Particularly, because such flow of the air becomes higher as the rotation speed of the slinger 3 becomes higher, the flow of the air becomes faster, and strength of the air flowing from the tip 21a of the end-face lip 21 to the side of the target to be sealed increases, so that the function to push back the lubricant to the pumping region becomes further strong. In this manner, according to the sealing apparatus 1000, even in the case where the rotation speed of the shaft 52 becomes higher, it is possible to suppress ooze of the target to be sealed by an effect of the flow of air caused by the concave portions 423.

Note that, in the sealing apparatus 1000, to improve an effect of suppressing ooze of the target to be sealed using only the concave portions 423, while it is only necessary to increase the number of concave portions 423, there is limitation in increase of the number in a range where the concave portions 423 which are adjacent to each other do not contact each other. However, in the sealing apparatus 1000, because the concave portions 423 have the tapered shape, space in the circumferential direction can be created on the side of the tips of the adjacent concave portions 423, so that it is possible to naturally arrange sub-concave portions there. By this means, compared to a case where only the concave portions 423 are provided, it is possible to efficiently suppress ooze by a synergetic effect by the sub-concave portions. Particularly, in the sealing apparatus 1000, because it is possible to arrange sub-concave portions at tip portions closer to the outer periphery side where a circumferential length is longer on the inner periphery surface 22 of the end-face lip 21, it is possible to arrange further more sub-concave portions compared to at portions closer to the inner periphery side where the circumferential length is shorter on the inner periphery surface 22.

INDUSTRIAL APPLICABILITY

While a case has been described as an example where the sealing apparatus of the present disclosure is used to seal annular space between a crank shaft of an engine and a crank hole which is a shaft hole formed at a front cover, or a cylinder block and a crank case, an application target is not limited to this, and the sealing apparatus of the present disclosure can be utilized to seal annular space between a motor shaft of a motor, particularly, a motor for electric vehicles, and a housing.

What is claimed is:

1. A sealing apparatus for sealing an annular gap between a shaft and a hole into which the shaft is to be inserted, the sealing apparatus comprising:
   a sealing apparatus body to be fitted into the hole; and
   a slinger to be attached to the shaft,
   wherein the sealing apparatus body includes a reinforcing ring annular around an axis line, and an elastic body portion which is formed with an elastic body attached to the reinforcing ring and which is annular around the axis line,
   the slinger includes a flange portion which is a portion extending toward an outer periphery side and annular around the axis line,
   the elastic body portion includes an end-face lip which is a lip extending toward one side in an axis line direction, contacting the flange portion from another side in the axis line direction, and annular around the axis line,
   at least one groove is formed on the other side in the axis line direction of the flange portion of the slinger,
   the groove is formed over a region from the inner periphery side of a lip contact portion of the slinger to the outer periphery side of the lip contact portion,
   the end-face lip extends obliquely with respect to the axis line from a base portion of the elastic body portion to the inner side and the outer periphery side,
   a plurality of projections are formed side by side in a circumferential direction on a surface on an inner periphery side of a part that extends obliquely of the end-face lip, and
   the projections extend in a spiral manner in a rotation direction of the shaft from the other side toward the one side, and are formed on an inner periphery side of a slinger contact portion which is a portion where the end-face lip contacts the slinger at the end-face lip.

2. The sealing apparatus according to claim 1, wherein the projections are formed at intervals from the slinger contact portion at the end-face lip.

3. The sealing apparatus according to claim 2, wherein the projections are formed at intervals from the slinger contact portion so as to reach a pumping region from a circular current region in the sealing apparatus.

4. The sealing apparatus according to claim 1, wherein the projections partially overlap with the projections adjacent on a side of a rotation direction of the shaft when seen from an inner periphery side to an outer periphery side in the axis line direction.

5. A sealing apparatus for sealing an annular gap between a shaft and a hole into which the shaft is to be inserted, the sealing apparatus comprising;
   a sealing apparatus body to be fitted into the hole; and
   a slinger to be attached to the shaft,
   wherein the sealing apparatus body includes a reinforcing ring annular around an axis line, and an elastic body portion which is formed with an elastic body attached to the reinforcing ring and which is annular around the axis line,
   the slinger includes a flange portion which is a portion extending toward an outer periphery side and annular around the axis line,
   the elastic body portion includes an end-face lip which is a lip extending toward one side in an axis line direction, contacting the flange portion from another side in the axis line direction and annular around the axis line,
   at least one groove is formed on the other side of the flange portion of the slinger,
   the groove is formed over a region from the inner periphery side of a lip contact portion of the slinger to the outer periphery side of the lip contact portion,
   the end-face lip extends obliquely with respect to the axis line from a base portion of the elastic body portion to the inner side and the outer periphery side,
   a plurality of projections are formed side by side in a circumferential direction at regular intervals on a surface on an inner periphery side of a part that extends obliquely of the end-face lip, and
   the projections extend so that at least tip portions are along a rotation direction of the shaft.

6. The sealing apparatus according to claim 5, wherein the tip portions are formed by being bent from predetermined positions of body portions of the projections, and the tip portions extend so as to be along a rotation direction of the shaft.

7. The sealing apparatus according to claim 5,
wherein the tip portions are formed by being bent in a crank shape or in an S shape from predetermined positions of body portions of the projections, and the tip portions extend so as to be along a rotation direction of the shaft.

8. The sealing apparatus according to claim 5,
wherein the projections are formed while being wholly curved in a convex shape from an inner periphery side toward an outer periphery side of the end-face lip, and the tip portions extend so as to be along a rotation direction of the shaft.

9. The sealing apparatus according to claim 5,
wherein the projections partially overlap with each other when seen from an inner periphery side to an outer periphery side in the axis line direction.

10. A sealing apparatus for sealing an annular gap between a shaft and a hole into which the shaft is to be inserted, the sealing apparatus comprising:
a sealing apparatus body to be fitted into the hole; and
a slinger to be attached to the shaft,
wherein the sealing apparatus body includes a reinforcing ring annular around an axis line, and an elastic body portion which is formed with an elastic body attached to the reinforcing ring and which is annular around the axis line,
the slinger includes a flange portion which is a portion extending toward an outer periphery side and annular around the axis line,
the elastic body portion includes an end-face lip which is a lip extending toward one side in an axis line direction, contacting the flange portion from another side in the axis line direction, and annular around the axis line,
at least one groove is formed on the other side of the flange portion of the slinger,
a plurality of main projections are formed side by side in a circumferential direction on a surface on an inner periphery side of the end-face lip, and
in addition to the plurality of main projections, a plurality of sub-projections which are parallel to the plurality of main projections and which are shorter than the plurality of main projections are formed on the surface on the inner periphery side of the end-face lip.

11. The sealing apparatus according to claim 10,
wherein the plurality of sub-projections are alternately disposed between the plurality of main projections.

12. The sealing apparatus according to claim 10,
wherein the plurality of sub-projections are disposed closer to an end portion on the outer periphery side than the plurality of main projections.

13. The sealing apparatus according to claim 10,
wherein the main projections and the sub-projections are formed on an inner periphery side of a slinger contact portion which is a portion where the end-face lip contacts the slinger at the end-face lip.

14. The sealing apparatus according to claim 10,
wherein the main projections and the sub-projections partially overlap with each other when seen from the inner periphery side to the outer periphery side in the axis line direction.

15. A sealing apparatus for sealing an annular gap between a shaft and a hole into which the shaft is to be inserted, the sealing apparatus comprising:
a sealing apparatus body to be fitted into the hole; and
a slinger to be attached to the shaft,
wherein the sealing apparatus body includes a reinforcing ring annular around an axis line, and an elastic body portion which is formed with an elastic body attached to the reinforcing ring and which is annular around the axis line,
the slinger includes a flange portion which is a portion extending toward an outer periphery side and annular around the axis line,
the elastic body portion includes an end-face lip which is a lip extending toward one side in an axis line direction, contacting the flange portion from another side in the axis line direction, and annular around the axis line,
at least one groove is formed on the other side of the flange portion of the slinger,
normal rotation projections and reverse rotation projections are alternately formed side by side in a circumferential direction on a surface on the inner periphery side of the end-face lip,
the normal rotation projections include a plurality of projections aligned in the circumferential direction, the projections extending with tilting to a normal rotation direction of the shaft from the other side toward the one side,
and being formed on an inner periphery side of a slinger contact portion which is a portion where the end-face lip contacts the slinger at the end-face lip, and
the reverse rotation projections include a plurality of projections aligned in the circumferential direction, the projections extending with tilting to a reverse rotation direction of the shaft from the other side toward the one side,
and being formed on the inner periphery side of the slinger contact portion which is the portion where the end-face lip contacts the slinger at the end-face lip.

16. The sealing apparatus according to claim 15,
wherein the plurality of projections of the normal rotation projections have respectively different lengths in an extending direction, and
the plurality of projections of the reverse rotation projections have respectively different lengths in an extending direction.

17. The sealing apparatus according to claim 16,
wherein, of the plurality of projections of the normal rotation projections, the further on a side of the normal rotation direction the projection is located, the longer the length in the extending direction of the projection is, and
of the plurality of projections of the reverse rotation projections, the further on a side of the reverse rotation direction the projection is located, the longer the length in the extending direction of the projection is.

18. The sealing apparatus according to claim 15,
wherein the plurality of projections of the normal rotation projections have respectively different extending directions, and
the plurality of projections of the reverse rotation projections have respectively different extending directions.

19. The sealing apparatus according to claim 15,
wherein the plurality of projections of the normal rotation projections and the plurality of projections of the reverse rotation projections are symmetric with respect to a line.

20. A sealing apparatus for sealing an annular gap between a shaft and a hole into which the shaft is to be inserted, the sealing apparatus comprising:
a sealing apparatus body to be fitted into the hole; and
a slinger to be attached to the shaft,
wherein the sealing apparatus body includes a reinforcing ring annular around an axis line, and an elastic body portion which is formed with an elastic body attached to the reinforcing ring and which is annular around the axis line, the slinger includes a flange portion which is a portion extending from an inner periphery side toward an outer periphery side and annular around the axis line, the elastic body portion includes an end-face lip which is a lip extending toward one side in an axis line direction, contacting the flange portion from another side in the axis line direction, and annular around the axis line, at least one groove is formed on the other side of the flange portion of the slinger, a plurality of ribs are provided on a surface on the inner periphery side of the end-face lip, and the plurality of ribs are disposed in a manner such that a first rib extending so that a tip portion of the rib is along a rotation direction of the slinger as progresses from the inner periphery side toward the outer periphery side, and a second rib extending so that a tip portion of the rib is along a reverse direction of the rotation direction of the slinger as progresses from the inner periphery side toward the outer periphery side are paired and a plurality of the paired first and second ribs are disposed side by side in a circumferential direction.

21. The sealing apparatus according to claim 20, wherein the tip portion of the first rib and the tip portion of the second rib extend in a substantially V shape so that the tip portions are further separate from each other as progress from the inner periphery side toward the outer periphery side.

22. The sealing apparatus according to claim 20, wherein the slinger includes a cylindrical portion to be attached to the shaft, the end-face lip includes a dust lip extending toward an inner periphery surface of the cylindrical portion and an outer side, and an intermediate lip extending toward the inner periphery surface of the cylindrical portion and an inner side between the end-face lip and the dust lip, and the ribs whose base end portions on an opposite side of the tip portions extend to the intermediate lip, are integrated with the intermediate lip.

23. The sealing apparatus according to claim 20, wherein the ribs are formed at intervals from a slinger contact portion which is a portion where the end-face lip contacts the slinger at the end-face lip.

24. The sealing apparatus according to claim 23, wherein the first rib in the rib and the second ribs in another rib adjacent to the rib are disposed away from each other by a predetermined distance in the circumferential direction.

25. The sealing apparatus according to claim 24, wherein a radial-direction projection provided in a manner such that the radial-direction projection tilts from another side to one side so as to be along the rotation direction of the slinger is provided between the first rib in the rib and the second rib in the other rib adjacent to the rib.

26. The sealing apparatus according to claim 25, wherein the radial-direction projection provided in a manner such that the radial-direction projection tilts from the other side to the one side so as to be along the rotation direction of the slinger is provided also between the pair of the first rib and the second rib in the rib.

27. A sealing apparatus for sealing an annular gap between a shaft and a hole into which the shaft is to be inserted, the sealing apparatus comprising:

a sealing apparatus body to be fitted into the hole; and
a slinger to be attached to the shaft,
wherein the sealing apparatus body includes a reinforcing ring annular around an axis line, and an elastic body portion which is formed with an elastic body attached to the reinforcing ring and which is annular around the axis line, the slinger includes a flange portion which is a portion extending toward an outer periphery side and annular around the axis line, the elastic body portion includes an end-face lip which is a lip extending toward one side in an axis line direction, contacting the flange portion from another side in the axis line direction, and annular around the axis line, at least one groove is formed on the other side of the flange portion of the slinger, and on a surface on an inner periphery side of the end-face lip, a plurality of concave portions which are concave from the surface on the inner periphery side are formed side by side in a circumferential direction at regular intervals.

28. The sealing apparatus according to claim 27, wherein the concave portions extend so that at least concave portions on a tip side are along a rotation direction of the shaft.

29. The sealing apparatus according to claim 27, wherein the concave portions are formed at intervals from a slinger contact portion which is a portion where the end-face lip contacts the slinger at the end-face lip.

30. The sealing apparatus according to claim 29, wherein the concave portions are formed at intervals from the slinger contact portion so as to reach a pumping region from a circular current region in the sealing apparatus.

31. The sealing apparatus according to claim 27, wherein the concave portions partially overlap with the concave portions adjacent on a side of the rotation direction of the shaft when seen from the inner periphery side to the outer periphery side in the axis line direction.

32. The sealing apparatus according to claim 1, wherein the groove formed at the slinger is a screw groove.

* * * * *

UNITED STATES PATENT AND TRADEMARK OFFICE
CERTIFICATE OF CORRECTION

PATENT NO. : 11,287,042 B2
APPLICATION NO. : 16/423250
DATED : March 29, 2022
INVENTOR(S) : Yuya Sakano et al.

It is certified that error appears in the above-identified patent and that said Letters Patent is hereby corrected as shown below:

In the Specification

Column 57, Line 10, "angle cr1 with respect" should read -- angle $\alpha$r1 with respect --

Column 57, Line 14, "inclination angle cr3" should read -- inclination angle $\alpha$r3 --

Signed and Sealed this
Eleventh Day of April, 2023

Katherine Kelly Vidal
*Director of the United States Patent and Trademark Office*